(12) United States Patent
Dua et al.

(10) Patent No.: US 12,404,615 B2
(45) Date of Patent: *Sep. 2, 2025

(54) THERMOPLASTIC NON-WOVEN TEXTILE ELEMENTS

(71) Applicant: NIKE, Inc., Beaverton, OR (US)

(72) Inventors: Bhupesh Dua, Portland, OR (US); Karen A. Hawkinson, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,946

(22) Filed: Apr. 2, 2024

(65) Prior Publication Data

US 2024/0247417 A1 Jul. 25, 2024

Related U.S. Application Data

(60) Continuation of application No. 18/308,728, filed on Apr. 28, 2023, which is a continuation of application
(Continued)

(51) Int. Cl.
*A43B 1/00* (2006.01)
*A41B 1/08* (2006.01)
(Continued)

(52) U.S. Cl.
CPC ............. *D04H 3/14* (2013.01); *A41B 1/08* (2013.01); *A41D 1/06* (2013.01); *A43B 1/00* (2013.01);
(Continued)

(58) Field of Classification Search
CPC ......... A43B 1/0063; A43B 1/028; A43B 1/04; A43B 23/0215; A43B 23/0275
See application file for complete search history.

(56) References Cited

U.S. PATENT DOCUMENTS

| 236,323 A | 1/1881 | Graf |
| 610,390 A | 9/1898 | Felbel |

(Continued)

FOREIGN PATENT DOCUMENTS

| CA | 2483333 A1 | 4/2005 |
| CN | 85106873 A | 3/1987 |

(Continued)

OTHER PUBLICATIONS

Adanur, Sabit. Wellington Sears Handbook of Industrial Textiles. Technomic Publishing Company, Inc., Lancaster PA. 1995. pp. 66-77.
(Continued)

*Primary Examiner* — Sharon M Prange
(74) *Attorney, Agent, or Firm* — Bookoff McAndrews, PLLC

(57) ABSTRACT

A non-woven textile may be formed from a plurality of thermoplastic polymer filaments. The non-woven textile may have a first region and a second region, with the filaments of the first region being fused to a greater degree than the filaments of the second region. A variety of products, including apparel (e.g., shirts, pants, footwear), may incorporate the non-woven textile. In some of these products, the non-woven textile may be joined with another textile element to form a seam. More particularly, an edge area of the non-woven textile may be heatbonded with an edge area of the other textile element at the seam. In other products, the non-woven textile may be joined with another component, whether a textile or a non-textile.

20 Claims, 83 Drawing Sheets

Related U.S. Application Data

No. 16/160,259, filed on Oct. 15, 2018, now abandoned, which is a continuation of application No. 13/426,361, filed on Mar. 21, 2012, now abandoned, which is a division of application No. 12/367,274, filed on Feb. 6, 2009, now abandoned.

(51) Int. Cl.

| | | |
|---|---|---|
| *A41D 1/06* | (2006.01) | |
| *A43B 1/02* | (2022.01) | |
| *A43B 1/028* | (2022.01) | |
| *A43B 3/00* | (2022.01) | |
| *A43B 9/16* | (2006.01) | |
| *A43B 23/02* | (2006.01) | |
| *A43B 23/24* | (2006.01) | |
| *B29C 65/00* | (2006.01) | |
| *B29C 65/02* | (2006.01) | |
| *B29C 65/18* | (2006.01) | |
| *B29D 35/00* | (2010.01) | |
| *B32B 3/26* | (2006.01) | |
| *B32B 3/30* | (2006.01) | |
| *B32B 5/02* | (2006.01) | |
| *B32B 5/04* | (2006.01) | |
| *B32B 5/06* | (2006.01) | |
| *B32B 5/08* | (2006.01) | |
| *B32B 5/14* | (2006.01) | |
| *B32B 5/22* | (2006.01) | |
| *B32B 5/24* | (2006.01) | |
| *B32B 5/26* | (2006.01) | |
| *B32B 7/12* | (2006.01) | |
| *B32B 27/12* | (2006.01) | |
| *D04H 1/52* | (2006.01) | |
| *D04H 1/558* | (2012.01) | |
| *D04H 3/14* | (2012.01) | |
| *D04H 3/153* | (2012.01) | |
| *D04H 5/08* | (2012.01) | |
| *D04H 13/00* | (2006.01) | |
| *D06H 5/00* | (2006.01) | |
| *B29L 31/48* | (2006.01) | |
| *B29L 31/50* | (2006.01) | |

(52) U.S. Cl.
CPC ............ *A43B 1/0063* (2013.01); *A43B 1/028* (2022.01); *A43B 3/0078* (2013.01); *A43B 9/16* (2013.01); *A43B 23/0255* (2013.01); *A43B 23/026* (2013.01); *A43B 23/027* (2013.01); *A43B 23/0275* (2013.01); *A43B 23/24* (2013.01); *B29C 65/022* (2013.01); *B29C 65/18* (2013.01); *B29C 66/1122* (2013.01); *B29C 66/1282* (2013.01); *B29C 66/12841* (2013.01); *B29C 66/133* (2013.01); *B29C 66/14* (2013.01); *B29C 66/244* (2013.01); *B29C 66/303* (2013.01); *B29C 66/30326* (2013.01); *B29C 66/43* (2013.01); *B29C 66/431* (2013.01); *B29C 66/433* (2013.01); *B29C 66/45* (2013.01); *B29C 66/472* (2013.01); *B29C 66/4722* (2013.01); *B29C 66/4724* (2013.01); *B29C 66/71* (2013.01); *B29C 66/723* (2013.01); *B29C 66/7294* (2013.01); *B29C 66/7392* (2013.01); *B29C 66/73921* (2013.01); *B29C 66/8226* (2013.01); *B29C 66/83221* (2013.01); *B29C 66/8362* (2013.01); *B29D 35/00* (2013.01); *B32B 3/263* (2013.01); *B32B 3/30* (2013.01); *B32B 5/02* (2013.01); *B32B 5/022* (2013.01); *B32B 5/024* (2013.01); *B32B 5/04* (2013.01); *B32B 5/06* (2013.01); *B32B 5/08* (2013.01); *B32B 5/142* (2013.01); *B32B 5/22* (2013.01); *B32B 5/24* (2013.01); *B32B 5/245* (2013.01); *B32B 5/26* (2013.01); *B32B 7/12* (2013.01); *B32B 27/12* (2013.01); *D04H 1/52* (2013.01); *D04H 1/558* (2013.01); *D04H 3/153* (2013.01); *D04H 5/08* (2013.01); *D04H 13/00* (2013.01); *D06H 5/00* (2013.01); *A41D 2500/30* (2013.01); *B29C 66/727* (2013.01); *B29C 66/729* (2013.01); *B29C 66/7394* (2013.01); *B29C 66/81422* (2013.01); *B29C 66/81423* (2013.01); *B29C 66/81435* (2013.01); *B29L 2031/4842* (2013.01); *B29L 2031/4857* (2013.01); *B29L 2031/50* (2013.01); *B32B 2262/02* (2013.01); *B32B 2262/0253* (2013.01); *B32B 2262/0261* (2013.01); *B32B 2262/0269* (2013.01); *B32B 2262/0276* (2013.01); *B32B 2262/0292* (2013.01); *B32B 2262/106* (2013.01); *B32B 2262/12* (2013.01); *B32B 2262/14* (2013.01); *B32B 2266/02* (2013.01); *B32B 2266/0214* (2013.01); *B32B 2307/50* (2013.01); *B32B 2307/51* (2013.01); *B32B 2437/00* (2013.01); *B32B 2437/02* (2013.01); *D10B 2331/10* (2013.01); *D10B 2403/033* (2013.01); *Y10T 428/19* (2015.01); *Y10T 428/2481* (2015.01); *Y10T 428/24826* (2015.01); *Y10T 442/608* (2015.04); *Y10T 442/652* (2015.04); *Y10T 442/69* (2015.04)

(56) References Cited

U.S. PATENT DOCUMENTS

| | | |
|---|---|---|
| 1,077,556 A | 11/1913 | Richards |
| 2,440,393 A | 4/1948 | Clark |
| 2,536,163 A | 1/1951 | Feild, Jr. et al. |
| 2,763,759 A | 9/1956 | Sanai et al. |
| 3,249,129 A | 5/1966 | Renfroe |
| 3,375,156 A | 3/1968 | Edgar, Jr. |
| 3,415,919 A | 12/1968 | Kippan |
| 3,439,434 A | 4/1969 | Tangorra |
| 3,616,170 A | 10/1971 | Closson, Jr. |
| 3,617,417 A | 11/1971 | Olson |
| 3,635,625 A | 1/1972 | Voss |
| 3,681,826 A | 8/1972 | Bergwerk |
| 3,689,882 A | 9/1972 | Dessailly |
| 3,694,873 A | 10/1972 | Crowley |
| 3,734,813 A | 5/1973 | Pohl |
| 3,785,915 A | 1/1974 | Closson |
| 3,790,439 A | 2/1974 | Zosel et al. |
| 3,870,592 A | 3/1975 | Brock et al. |
| 3,912,567 A | 10/1975 | Schwartz |
| 4,016,329 A | 4/1977 | Matsuyama et al. |
| 4,041,203 A | 8/1977 | Brock et al. |
| 4,059,114 A | 11/1977 | Richards |
| 4,070,217 A | 1/1978 | Smith, II et al. |
| 4,100,319 A | 7/1978 | Schwartz |
| 4,107,364 A | 8/1978 | Sisson |
| 4,144,371 A | 3/1979 | Okie et al. |
| 4,168,606 A | 9/1979 | Callander |
| 4,197,345 A | 4/1980 | Worrall |
| 4,205,397 A | 6/1980 | Bechis |
| 4,228,641 A | 10/1980 | O'Neil |
| 4,265,954 A | 5/1981 | Romanek |
| 4,310,373 A | 1/1982 | Schuhmacher et al. |
| 4,355,489 A | 10/1982 | Heyer et al. |
| 4,410,385 A | 10/1983 | Murphy et al. |
| 4,410,575 A | 10/1983 | Obayashi et al. |
| 4,435,457 A | 3/1984 | Servo et al. |
| 4,445,951 A | 5/1984 | Lind et al. |
| 4,486,200 A | 12/1984 | Heyer et al. |
| 4,497,099 A | 2/1985 | Scott |
| 4,511,615 A | 4/1985 | Ohta |

(56) References Cited

U.S. PATENT DOCUMENTS

| | | | |
|---|---|---|---|
| 4,576,852 A | 3/1986 | Burgess et al. | |
| 4,588,630 A | 5/1986 | Shimalla | |
| 4,615,188 A | 10/1986 | Hursh et al. | |
| 4,621,013 A | 11/1986 | Holtrop et al. | |
| 4,647,492 A | 3/1987 | Grant et al. | |
| 4,654,099 A | 3/1987 | Sandman | |
| 4,695,501 A | 9/1987 | Robinson | |
| 4,741,941 A | 5/1988 | Englebert et al. | |
| 4,747,901 A | 5/1988 | Becker et al. | |
| 4,755,242 A | 7/1988 | Miller et al. | |
| 4,781,296 A | 11/1988 | Morris et al. | |
| 4,938,817 A | 7/1990 | Langley | |
| 4,980,927 A | 1/1991 | Wawiluk et al. | |
| 5,003,902 A | 4/1991 | Benstock et al. | |
| 5,102,724 A | 4/1992 | Okawahara et al. | |
| 5,106,678 A | 4/1992 | Abu-Isa | |
| 5,111,558 A * | 5/1992 | Ridley | A43C 9/00 24/300 |
| 5,118,550 A | 6/1992 | Baravian et al. | |
| 5,130,178 A | 7/1992 | Zerfass et al. | |
| 5,132,160 A | 7/1992 | Bird | |
| 5,150,787 A | 9/1992 | Bird et al. | |
| 5,203,939 A | 4/1993 | Sperling et al. | |
| 5,230,701 A | 7/1993 | Meyer et al. | |
| 5,238,733 A | 8/1993 | Joseph et al. | |
| 5,255,833 A | 10/1993 | McAllister | |
| 5,282,900 A | 2/1994 | McDonell et al. | |
| 5,306,275 A | 4/1994 | Bryan | |
| 5,316,838 A | 5/1994 | Crandall et al. | |
| 5,324,277 A | 6/1994 | Daugan et al. | |
| 5,328,758 A | 7/1994 | Markell et al. | |
| 5,380,580 A | 1/1995 | Rogers et al. | |
| 5,415,779 A | 5/1995 | Markell et al. | |
| 5,420,794 A | 5/1995 | James | |
| 5,423,783 A | 6/1995 | Battles et al. | |
| 5,458,962 A | 10/1995 | Birch | |
| 5,470,605 A | 11/1995 | Lundeen | |
| 5,478,628 A | 12/1995 | Billingsley et al. | |
| 5,482,756 A | 1/1996 | Berger et al. | |
| 5,496,507 A | 3/1996 | Angadjivand et al. | |
| 5,501,794 A | 3/1996 | Van De Graaf et al. | |
| 5,507,968 A | 4/1996 | Palaikis | |
| 5,539,042 A | 7/1996 | Birch | |
| 5,573,619 A | 11/1996 | Benedict et al. | |
| 5,586,563 A | 12/1996 | Newman | |
| 5,595,649 A | 1/1997 | Markell et al. | |
| 5,603,747 A | 2/1997 | Matuda et al. | |
| 5,604,271 A | 2/1997 | Lundeen | |
| 5,609,706 A | 3/1997 | Benedict et al. | |
| 5,624,726 A | 4/1997 | Sanocki et al. | |
| 5,629,079 A | 5/1997 | Battles et al. | |
| 5,639,287 A | 6/1997 | Van De Graaf et al. | |
| 5,641,563 A | 6/1997 | Truong et al. | |
| 5,651,853 A | 7/1997 | Wrigley et al. | |
| 5,655,833 A | 8/1997 | Raczynski | |
| 5,682,618 A | 11/1997 | Johnson et al. | |
| 5,695,853 A | 12/1997 | Billingsley et al. | |
| 5,698,358 A | 12/1997 | Yu | |
| 5,714,229 A | 2/1998 | Ogden | |
| 5,743,273 A | 4/1998 | Newman | |
| 5,744,207 A | 4/1998 | Bartusiak et al. | |
| 5,759,659 A | 6/1998 | Sanocki et al. | |
| 5,783,290 A | 7/1998 | Isaac et al. | |
| 5,803,086 A | 9/1998 | Scholz et al. | |
| 5,858,140 A | 1/1999 | Berger et al. | |
| 5,858,515 A | 1/1999 | Stokes et al. | |
| 5,879,493 A | 3/1999 | Johnson et al. | |
| 5,883,019 A | 3/1999 | Troung et al. | |
| 5,888,157 A | 3/1999 | Guenther et al. | |
| 5,928,070 A | 7/1999 | Lux | |
| 5,939,339 A | 8/1999 | Delmore et al. | |
| RE36,323 E | 10/1999 | Thompson et al. | |
| 5,981,033 A | 11/1999 | Haunschild et al. | |
| 6,004,642 A | 12/1999 | Langford | |
| 6,004,891 A | 12/1999 | Tuppin et al. | |
| 6,013,587 A | 1/2000 | Truong et al. | |
| 6,017,831 A | 1/2000 | Beardsley et al. | |
| 6,069,097 A | 5/2000 | Suzuki et al. | |
| 6,086,911 A | 7/2000 | Godbey | |
| 6,090,234 A | 7/2000 | Barone et al. | |
| 6,110,572 A | 8/2000 | Groh et al. | |
| 6,119,691 A | 9/2000 | Angadjivand et al. | |
| 6,123,752 A | 9/2000 | Wu et al. | |
| 6,174,964 B1 | 1/2001 | Jariwala et al. | |
| 6,251,154 B1 | 6/2001 | Van Rossen | |
| 6,284,843 B1 | 9/2001 | Jariwala et al. | |
| 6,288,157 B1 | 9/2001 | Jariwala et al. | |
| 6,315,130 B1 | 11/2001 | Olsen | |
| 6,332,465 B1 | 12/2001 | Xue et al. | |
| 6,391,200 B2 | 5/2002 | Pulek et al. | |
| 6,391,807 B1 | 5/2002 | Jariwala et al. | |
| 6,395,211 B1 | 5/2002 | Dettmer et al. | |
| 6,406,576 B1 | 6/2002 | Benedict et al. | |
| 6,406,577 B1 | 6/2002 | Benedict et al. | |
| 6,429,159 B1 | 8/2002 | Watanabe et al. | |
| 6,492,183 B1 | 12/2002 | Perman et al. | |
| 6,503,855 B1 | 1/2003 | Menzies et al. | |
| 6,537,930 B1 | 3/2003 | Middlesworth et al. | |
| 6,537,935 B1 | 3/2003 | Seth et al. | |
| 6,558,784 B1 | 5/2003 | Norton et al. | |
| 6,610,390 B1 | 8/2003 | Kauschke et al. | |
| 6,645,611 B2 | 11/2003 | Seth | |
| 6,715,188 B1 | 4/2004 | Jackson et al. | |
| 6,719,744 B2 | 4/2004 | Kinnear et al. | |
| 6,769,202 B1 | 8/2004 | Luthi et al. | |
| 6,773,718 B2 | 8/2004 | Seth et al. | |
| 6,783,574 B1 | 8/2004 | Angadjivand et al. | |
| 6,784,125 B1 | 8/2004 | Yamakawa et al. | |
| 6,784,127 B1 | 8/2004 | Yamakawa et al. | |
| 6,835,256 B2 | 12/2004 | Menzies et al. | |
| 6,875,710 B2 | 4/2005 | Eaton et al. | |
| 6,880,211 B2 | 4/2005 | Jackson et al. | |
| 6,910,288 B2 | 6/2005 | Dua | |
| 6,942,683 B2 | 9/2005 | Dunshee | |
| 6,942,894 B2 | 9/2005 | Alberg et al. | |
| 6,967,178 B2 | 11/2005 | Zhou et al. | |
| 6,986,825 B1 | 1/2006 | Squires et al. | |
| 7,066,182 B1 | 6/2006 | Dunshee | |
| 7,147,734 B2 | 12/2006 | Ogle et al. | |
| 7,147,904 B1 | 12/2006 | Crawford | |
| 7,150,774 B2 | 12/2006 | Kubokawa et al. | |
| 7,169,202 B2 | 1/2007 | Kubokawa | |
| 7,195,729 B2 | 3/2007 | Jackson et al. | |
| 7,230,043 B2 | 6/2007 | Klun et al. | |
| 7,238,314 B2 | 7/2007 | Jackson et al. | |
| 7,267,681 B2 | 9/2007 | Dunshee | |
| 7,291,236 B2 | 11/2007 | Guilhem et al. | |
| 7,293,371 B2 | 11/2007 | Aveni | |
| 7,303,805 B2 | 12/2007 | Seth et al. | |
| 7,311,880 B2 | 12/2007 | Perman et al. | |
| 7,320,719 B2 | 1/2008 | Van De Graaf et al. | |
| 7,390,451 B2 | 6/2008 | Jackson et al. | |
| 7,393,371 B2 | 7/2008 | O'Gary et al. | |
| 7,547,650 B2 | 6/2009 | Keep | |
| 7,709,075 B2 | 5/2010 | Suzuki | |
| 7,785,509 B2 | 8/2010 | Perera et al. | |
| 7,955,549 B2 | 6/2011 | Noda et al. | |
| 8,172,970 B2 * | 5/2012 | Sussmann | A43D 8/24 156/272.8 |
| 8,850,719 B2 | 10/2014 | Hawkinson et al. | |
| 8,906,275 B2 | 12/2014 | Davis et al. | |
| 12,127,631 B2 * | 10/2024 | Reichard | A43B 3/122 |
| 2001/0008683 A1 | 7/2001 | Takai et al. | |
| 2001/0035598 A1 | 11/2001 | Ampulski et al. | |
| 2001/0051474 A1 | 12/2001 | Matsuda et al. | |
| 2001/0051484 A1 | 12/2001 | Ishida et al. | |
| 2002/0070471 A1 | 6/2002 | Lee et al. | |
| 2002/0090875 A1 | 7/2002 | Lasko et al. | |
| 2002/0132121 A1 | 9/2002 | Palacio et al. | |
| 2002/0137418 A1 | 9/2002 | Seth | |
| 2002/0150610 A1 | 10/2002 | Kono et al. | |
| 2002/0172792 A1 | 11/2002 | Jarvis et al. | |
| 2003/0060858 A1 | 3/2003 | Kieval et al. | |
| 2003/0091617 A1 | 5/2003 | Mrozinski et al. | |

(56) References Cited

U.S. PATENT DOCUMENTS

| | | |
|---|---|---|
| 2003/0119411 A1 | 6/2003 | Yamakawa et al. |
| 2003/0124310 A1 | 7/2003 | Ellis et al. |
| 2003/0137221 A1 | 7/2003 | Radziemski et al. |
| 2003/0162458 A1 | 8/2003 | Tsujiyama et al. |
| 2003/0171051 A1 | 9/2003 | Bergsten et al. |
| 2004/0050506 A1 | 3/2004 | Haiber et al. |
| 2004/0060858 A1 | 4/2004 | Lucas et al. |
| 2004/0087230 A1 | 5/2004 | Wildeman |
| 2004/0118018 A1* | 6/2004 | Dua .............. A43B 1/028 36/3 A |
| 2004/0186482 A1 | 9/2004 | Kolb et al. |
| 2004/0216329 A1 | 11/2004 | Evans |
| 2004/0224596 A1 | 11/2004 | Mathis et al. |
| 2004/0241399 A1 | 12/2004 | Marmon et al. |
| 2005/0003139 A1 | 1/2005 | Keller |
| 2005/0084647 A1 | 4/2005 | Menzies et al. |
| 2005/0106326 A1 | 5/2005 | Audenaert et al. |
| 2005/0160629 A1 | 7/2005 | Jungkind |
| 2005/0188907 A1 | 9/2005 | D'Henin |
| 2005/0193592 A1 | 9/2005 | Dua et al. |
| 2005/0217226 A1 | 10/2005 | Sundet et al. |
| 2006/0009106 A1 | 1/2006 | Nishimura et al. |
| 2006/0036230 A1 | 2/2006 | Mills et al. |
| 2006/0081329 A1 | 4/2006 | Kikuchi |
| 2006/0121812 A1 | 6/2006 | Suzuki et al. |
| 2006/0135015 A1 | 6/2006 | Seo |
| 2006/0141881 A1 | 6/2006 | Bergsten et al. |
| 2006/0143947 A1 | 7/2006 | Ellis et al. |
| 2006/0165939 A1 | 7/2006 | Hottner |
| 2006/0169387 A1 | 8/2006 | Nayar et al. |
| 2006/0180067 A1 | 8/2006 | Yamazaki et al. |
| 2006/0204558 A1 | 9/2006 | Kantner et al. |
| 2006/0223403 A1 | 10/2006 | Mahboob |
| 2006/0246260 A1 | 11/2006 | Sundet et al. |
| 2006/0276095 A1 | 12/2006 | Dua et al. |
| 2007/0049148 A1 | 3/2007 | Chien et al. |
| 2007/0049153 A1 | 3/2007 | Dunbar et al. |
| 2007/0049646 A1 | 3/2007 | Moore et al. |
| 2007/0129524 A1 | 6/2007 | Sunkara |
| 2007/0135008 A1 | 6/2007 | Hall et al. |
| 2007/0169379 A1 | 7/2007 | Hazenberg et al. |
| 2007/0176325 A1 | 8/2007 | Jackson et al. |
| 2007/0186482 A1 | 8/2007 | Sudo |
| 2007/0199210 A1 | 8/2007 | Vattes et al. |
| 2007/0212963 A1 | 9/2007 | Keep |
| 2007/0271821 A1 | 11/2007 | Meschter |
| 2007/0298671 A1 | 12/2007 | Noda et al. |
| 2007/0298697 A1 | 12/2007 | Charmoille et al. |
| 2008/0001431 A1 | 1/2008 | Thompson et al. |
| 2008/0022642 A1 | 1/2008 | Fox et al. |
| 2008/0022643 A1 | 1/2008 | Fox et al. |
| 2008/0026659 A1 | 1/2008 | Brandner et al. |
| 2008/0044622 A1 | 2/2008 | Noda et al. |
| 2008/0064279 A1 | 3/2008 | Browning et al. |
| 2008/0070464 A1 | 3/2008 | Alberg et al. |
| 2008/0085399 A1 | 4/2008 | Noda et al. |
| 2008/0134543 A1 | 6/2008 | Klein |
| 2008/0139067 A1 | 6/2008 | Mukai et al. |
| 2008/0148946 A1 | 6/2008 | Lotgerink-Bruinenberg |
| 2008/0168684 A1* | 7/2008 | Khalifa .............. A43B 3/102 36/102 |
| 2008/0169055 A1 | 7/2008 | Seliskar et al. |
| 2008/0196136 A1 | 8/2008 | Fellouhe et al. |
| 2008/0241476 A1 | 10/2008 | Olguin |
| 2008/0245720 A1 | 10/2008 | Hutchinson et al. |
| 2008/0245725 A1 | 10/2008 | Patel et al. |
| 2008/0246182 A1 | 10/2008 | Patel et al. |
| 2008/0276805 A1 | 11/2008 | Lotgerink-Bruinenberg |
| 2009/0068908 A1 | 3/2009 | Hinchcliff |
| 2009/0100705 A1 | 4/2009 | Cook et al. |
| 2009/0140470 A1 | 6/2009 | Dua et al. |
| 2009/0151397 A1 | 6/2009 | Sturman et al. |
| 2009/0277041 A1 | 11/2009 | Hubner |
| 2009/0300942 A1* | 12/2009 | Peikert .............. D04H 13/00 12/146 B |
| 2010/0035963 A1 | 2/2010 | Chajut et al. |
| 2010/0037483 A1* | 2/2010 | Meschter .............. A43B 3/26 36/47 |
| 2010/0077634 A1 | 4/2010 | Bell |
| 2010/0095554 A1 | 4/2010 | Gillespie |
| 2010/0147444 A1 | 6/2010 | Hsu et al. |
| 2010/0154256 A1* | 6/2010 | Dua .............. A43B 7/20 12/146 B |
| 2010/0175276 A1 | 7/2010 | Dojan et al. |
| 2010/0186874 A1 | 7/2010 | Sussmann |
| 2010/0199406 A1 | 8/2010 | Dua et al. |
| 2010/0199520 A1 | 8/2010 | Dua et al. |
| 2010/0251491 A1 | 10/2010 | Dojan et al. |
| 2010/0287790 A1 | 11/2010 | Sokolowski et al. |
| 2010/0293814 A1* | 11/2010 | Skaja .............. B29D 35/122 428/206 |
| 2010/0325916 A1 | 12/2010 | Dua et al. |
| 2011/0098147 A1 | 4/2011 | Crane |
| 2011/0250378 A1 | 10/2011 | Eaton et al. |
| 2012/0157904 A1 | 6/2012 | Stein |
| 2012/0227282 A1 | 9/2012 | Hawkinson et al. |
| 2012/0291314 A1 | 11/2012 | Sokolowski et al. |
| 2013/0067639 A1 | 3/2013 | Dua et al. |
| 2013/0067768 A1 | 3/2013 | Dua et al. |
| 2013/0068378 A1 | 3/2013 | Dua et al. |
| 2013/0069266 A1 | 3/2013 | Dua et al. |
| 2013/0232815 A1 | 9/2013 | Meythaler et al. |
| 2013/0255103 A1 | 10/2013 | Dua et al. |
| 2013/0260104 A1 | 10/2013 | Dua et al. |
| 2013/0260629 A1 | 10/2013 | Dua et al. |
| 2013/0285294 A1 | 10/2013 | Huang et al. |
| 2015/0123305 A1 | 5/2015 | Davis et al. |
| 2016/0302508 A1* | 10/2016 | Kormann .............. G06Q 99/00 |
| 2018/0352899 A1* | 12/2018 | Ng .............. B29D 35/068 |
| 2019/0037967 A1 | 2/2019 | McFarland, II et al. |

FOREIGN PATENT DOCUMENTS

| | | |
|---|---|---|
| CN | 1190931 A | 8/1998 |
| CN | 1201846 A | 12/1998 |
| CN | 2354400 Y | 12/1999 |
| CN | 1278424 A | 1/2001 |
| CN | 1322869 A | 11/2001 |
| CN | 1451330 A | 10/2003 |
| CN | 1497086 A | 5/2004 |
| CN | 1571871 A | 1/2005 |
| CN | 1802104 A | 7/2006 |
| CN | 101001546 A | 7/2007 |
| CN | 101125044 A | 2/2008 |
| CN | 101326212 A | 12/2008 |
| CN | 101500794 A | 8/2009 |
| CN | 101542032 A | 9/2009 |
| CN | 102137600 A | 7/2011 |
| CN | 102292487 A | 12/2011 |
| DE | 2109143 A1 | 10/1972 |
| DE | 2753897 A1 | 6/1978 |
| DE | 19642253 A1 | 8/1997 |
| DE | 29911710 U1 | 12/1999 |
| DE | 102004030914 A1 | 1/2006 |
| DE | 102006009974 A1 | 9/2007 |
| DE | 102007004146 A1 | 7/2008 |
| DE | 102007035729 A1 | 2/2009 |
| EP | 0264132 A2 | 4/1988 |
| EP | 0304301 A2 | 2/1989 |
| EP | 0327402 A2 | 8/1989 |
| EP | 0370835 A2 | 5/1990 |
| EP | 0559969 A1 | 9/1993 |
| EP | 1068889 A1 | 1/2001 |
| EP | 1167606 A1 | 1/2002 |
| EP | 1264561 A1 | 12/2002 |
| EP | 1340848 A1 | 9/2003 |
| EP | 1342825 A1 | 9/2003 |
| EP | 1418092 A1 | 5/2004 |
| EP | 1491105 A1 | 12/2004 |
| EP | 1589140 A1 | 10/2005 |
| EP | 1884582 A1 | 2/2008 |
| EP | 2084981 A1 | 8/2009 |
| EP | 2393972 A2 | 12/2011 |
| EP | 2397593 A2 | 12/2011 |

(56) References Cited

FOREIGN PATENT DOCUMENTS

| | | |
|---|---|---|
| EP | 2397594 A2 | 12/2011 |
| EP | 2407302 A2 | 1/2012 |
| EP | 2453048 A1 | 5/2012 |
| EP | 2488685 A1 | 8/2012 |
| EP | 2530195 A1 | 12/2012 |
| EP | 2397593 B1 | 7/2013 |
| EP | 2397594 B1 | 11/2013 |
| EP | 2453048 B1 | 11/2013 |
| EP | 2683866 A1 | 1/2014 |
| EP | 2488685 B1 | 11/2014 |
| FR | 1176314 A | 4/1959 |
| GB | 1296202 A | 11/1972 |
| GB | 1353183 A | 5/1974 |
| GB | 1384326 A | 2/1975 |
| GB | 1411401 A | 10/1975 |
| GB | 1491602 A | 11/1977 |
| GB | 2115741 A | 9/1983 |
| GB | 2346624 A | 8/2000 |
| JP | S473280 Y1 | 2/1972 |
| JP | S4732180 U | 12/1972 |
| JP | S6052237 B2 | 11/1985 |
| JP | S61655 A | 1/1986 |
| JP | S6124634 A | 2/1986 |
| JP | S61111993 U | 7/1986 |
| JP | S62194030 U | 12/1987 |
| JP | S62203211 U | 12/1987 |
| JP | S62203212 U | 12/1987 |
| JP | S63282352 A | 11/1988 |
| JP | H0257993 U | 4/1990 |
| JP | H0266623 U | 5/1990 |
| JP | H02165942 A | 6/1990 |
| JP | H02130206 U | 10/1990 |
| JP | H02286225 A | 11/1990 |
| JP | H0386536 A | 4/1991 |
| JP | H03200885 A | 9/1991 |
| JP | H03224421 A | 10/1991 |
| JP | H04108152 A | 4/1992 |
| JP | H054291 A | 1/1993 |
| JP | H0522792 A | 1/1993 |
| JP | H05200890 A | 8/1993 |
| JP | H05321119 A | 12/1993 |
| JP | H0616426 U | 3/1994 |
| JP | H06126754 A | 5/1994 |
| JP | H06158501 A | 6/1994 |
| JP | H06277252 A | 10/1994 |
| JP | H0776052 A | 3/1995 |
| JP | H07157957 A | 6/1995 |
| JP | H07197355 A | 8/1995 |
| JP | 3016014 U | 9/1995 |
| JP | H07252762 A | 10/1995 |
| JP | H07292504 A | 11/1995 |
| JP | H08301 A | 1/1996 |
| JP | H08104164 A | 4/1996 |
| JP | H08503745 A | 4/1996 |
| JP | H08296161 A | 11/1996 |
| JP | H08323903 A | 12/1996 |
| JP | H0913252 A | 1/1997 |
| JP | H0958200 A | 3/1997 |
| JP | H0965907 A | 3/1997 |
| JP | H09188951 A | 7/1997 |
| JP | H09267456 A | 10/1997 |
| JP | H09275293 A | 10/1997 |
| JP | H1077556 A | 3/1998 |
| JP | H1077566 A | 3/1998 |
| JP | H10245760 A | 9/1998 |
| JP | H10273868 A | 10/1998 |
| JP | H10292271 A | 11/1998 |
| JP | H10323661 A | 12/1998 |
| JP | H1112912 A | 1/1999 |
| JP | H1161616 A | 3/1999 |
| JP | H1190836 A | 4/1999 |
| JP | H11217799 A | 8/1999 |
| JP | H11320736 A | 11/1999 |
| JP | H11320800 A | 11/1999 |
| JP | 2000503610 A | 3/2000 |
| JP | 2000248454 A | 9/2000 |
| JP | 2001058002 A | 3/2001 |
| JP | 2001179889 A | 7/2001 |
| JP | 2001181905 A | 7/2001 |
| JP | 2001523772 A | 11/2001 |
| JP | 2002011789 A | 1/2002 |
| JP | 2002234547 A | 8/2002 |
| JP | 2002317367 A | 10/2002 |
| JP | 2003117325 A | 4/2003 |
| JP | 3093555 U | 5/2003 |
| JP | 2003517950 A | 6/2003 |
| JP | 2003227060 A | 8/2003 |
| JP | 2003524534 A | 8/2003 |
| JP | 2003310331 A | 11/2003 |
| JP | 2004076445 A | 3/2004 |
| JP | 2004150008 A | 5/2004 |
| JP | 2004192182 A | 7/2004 |
| JP | 2004211258 A | 7/2004 |
| JP | 2004244791 A | 9/2004 |
| JP | 2004306149 A | 11/2004 |
| JP | 2005029907 A | 2/2005 |
| JP | 2005187954 A | 7/2005 |
| JP | 2005212055 A | 8/2005 |
| JP | 2005245542 A | 9/2005 |
| JP | 2006511306 A | 4/2006 |
| JP | 2006192723 A | 7/2006 |
| JP | 2006193881 A | 7/2006 |
| JP | 2006223403 A | 8/2006 |
| JP | 2006274453 A | 10/2006 |
| JP | 2006299425 A | 11/2006 |
| JP | 2006328221 A | 12/2006 |
| JP | 2007516046 A | 6/2007 |
| JP | 2007522908 A | 8/2007 |
| JP | 2007537372 A | 12/2007 |
| JP | 2008007930 A | 1/2008 |
| JP | 2008101285 A | 5/2008 |
| JP | 2008513626 A | 5/2008 |
| JP | 2008517183 A | 5/2008 |
| JP | 2008138908 A | 6/2008 |
| JP | 2008169506 A | 7/2008 |
| JP | 2009538197 A | 11/2009 |
| JP | 2010534535 A | 11/2010 |
| JP | 2011081082 A | 4/2011 |
| JP | 4785700 B2 | 10/2011 |
| JP | 2012517535 A | 8/2012 |
| JP | 5226844 B2 | 7/2013 |
| JP | 5411906 B2 | 2/2014 |
| JP | 5615786 B2 | 10/2014 |
| JP | 2015522722 A | 8/2015 |
| KR | 20050088367 A | 9/2005 |
| KR | 20090023339 A | 3/2009 |
| WO | WO-0051458 A1 | 9/2000 |
| WO | WO-0145927 A1 | 6/2001 |
| WO | WO-02054894 A1 | 7/2002 |
| WO | WO-03007864 A1 | 1/2003 |
| WO | WO-03021024 A1 | 3/2003 |
| WO | WO-2004060093 A1 | 7/2004 |
| WO | WO-2005000055 A1 | 1/2005 |
| WO | WO-2005052235 A1 | 6/2005 |
| WO | WO-2005063071 A2 | 7/2005 |
| WO | WO-2005066250 A1 * | 7/2005 ............ A43B 13/04 |
| WO | WO-2005082188 A1 | 9/2005 |
| WO | WO-2005112677 A2 | 12/2005 |
| WO | WO-2007103244 A2 | 9/2007 |
| WO | WO-2007139567 A1 | 12/2007 |
| WO | WO-2007140054 A1 | 12/2007 |
| WO | WO-2008069280 A1 | 6/2008 |
| WO | WO-2008077785 A1 | 7/2008 |
| WO | WO-2008111294 A1 | 9/2008 |
| WO | WO-2009027701 A1 | 3/2009 |
| WO | WO-2010036557 A1 | 4/2010 |
| WO | WO-2011046762 A1 | 4/2011 |

(56) References Cited

FOREIGN PATENT DOCUMENTS

| WO | WO-2013181082 A1 | 12/2013 |
|----|------------------|---------|
| WO | WO-2015190920 A1 | 12/2015 |

OTHER PUBLICATIONS

Advisory Action dated Aug. 1, 2012 in U.S. Appl. No. 12/367,274, filed Feb. 6, 2009.
Advisory Action in U.S. Appl. No. 12/579,838, dated Mar. 23, 2018, 4 pages.
Chawla, Krishan Kumar, "Fibrous Materials," Cambridge University Press, p. 42 (1998).
Chinese Office Action dated Apr. 28, 2015 in Chinese Patent Application No. 201410041109.X.
Chinese Office Action dated Jan. 10, 2014 and corresponding Search Report dated Nov. 26, 2013 in Chinese Application No. 201080046286.7.
Chinese Office Action dated Jan. 27, 2016 in Chinese Patent Application No. 201380028031.1 (51-4114).
Chinese Office Action dated May 25, 2015, in Chinese Application No. 201080046286.7.
Chinese Office Action dated May 6, 2015 in Chinese Patent Application No. 201280012038.X.
Chinese Office Action dated Nov. 15, 2014, in Chinese Application No. 201080046286.7.
Co-pending U.S. Appl. No. 14/528,491, filed Oct. 30, 2014.
Decision of Refusal, and English language translation thereof, in Japanese Application No. 2016-110241, dated Nov. 28, 2017, 5 pages.
Decision of Refusal dated Jan. 24, 2014 in Japanese Patent Application No. 2011-225838.
Decision of Refusal dated Jan. 29, 2015, in Japanese Patent Application No. 2011-225846.
Decision of Refusal dated Mar. 26, 2015, in Japanese Patent Application No. 2011-225849.
Decision to Grant a Patent dated Aug. 14, 2014 in Japanese Patent Application No. 2011-225838.
Districo—Bonding Yarns—Grilon® Fusible bonding yarns (Jul. 16, 2016); http://districo.com/page_gb/bondingyarn.htm.
European Office Action dated Aug. 31, 2015 in European Patent Application No. 11174751.5.
European Office Action dated Jan. 22, 2014 in European Patent Application No. 11174751.5.
European Office Action dated Mar. 31, 2015, in European Patent Application No. 12718759.9 (51-3460).
European Office Action dated Nov. 28, 2014, in European Patent Application No. 11174751.5.
European Search Report and Written Opinion dated Jun. 11, 2012 in European Patent Application No. 11174747.3.
European Search Report and Written Opinion dated Mar. 6, 2012 in European Patent Application No. 11174751.5.
European Search Report dated Apr. 17, 2012 in European Patent Application No. 11174753.1.
European Search Report dated Jan. 30, 2012 in European Patent Application No. 11174750.7.
European Search Report dated Jan. 30, 2012 in European Patent Application No. 11175063.4.
European Search Report dated Nov. 25, 2011 in European Patent Application No. 11174747.3.
European Search Report mailed Nov. 25, 2011, for European Application No. 12001388.3 filed Jan. 27, 2010.
Examination Report dated Oct. 31, 2014 in European Patent Application No. 11174747.3.
Extended European Search Report dated Jul. 17, 2014 in European Patent Application No. 14166582.8.
Extended European Search Report in connection with European Application No. 16000062.6, dated Jun. 30, 2016, 7 pages.
Extended European Search Report in connection with European Application No. 17151883.0, dated Mar. 24, 2017, 9 pages.

Final Office Action dated Dec. 24, 2014 in U.S. Appl. No. 13/426,349.
Final Office Action dated Dec. 4, 2014 in U.S. Appl. No. 12/367,274.
Final Office Action dated Feb. 23, 2015 in U.S. Appl. No. 12/579,838.
Final Office Action dated Feb. 23, 2015 in U.S. Appl. No. 13/426,290.
Final Office Action dated May 19, 2015, in U.S. Appl. No. 13/426,323.
Final Office Action dated May 21, 2015, in Japanese Patent Application No. 2013-164367.
Final Office Action dated May 9, 2012 in connection with U.S. Appl. No. 12/367,274, filed Feb. 6, 2009.
Final Office Action dated Nov. 28, 2012 in U.S. Appl. No. 12/579,838, filed Oct. 15, 2009.
Final Office Action dated Oct. 27, 2015, in U.S. Appl. No. 13/426,361.
Final Office Action for U.S. Appl. No. 13/426,290 dated Jan. 23, 2019, 7 pages.
Humphries, Mary. Fabric Reference. Prentice Hall, Upper Saddle River, NJ. 1996. pp. 84-85.
International Preliminary Report and Written Opinion dated Apr. 26, 2012 in PCT Application No. PCT/US2010/051149.
International Preliminary Report dated Aug. 18, 2011 in PCT Application No. PCT/US2010/022216.
International Preliminary Report dated Sep. 19, 2013 in connection with PCT Application No. PCT/US2012/027974.
International Preliminary Report on Patentability dated Dec. 11, 2014, for PCT Application No. PCT/US2013/042581.
International Preliminary Report on Patentability for Application No. PCT/US2013/034901, dated Oct. 16, 2014.
International Preliminary Report on Patentability for Application No. PCT/US2013/034916, dated Oct. 16, 2014.
International Preliminary Report on Patentability for PCT Application No. PCT/US2013/034931 dated Oct. 16, 2014.
International Preliminary Report on Patentability in connection with International Application No. PCT/US2016/021442, dated Sep. 12, 2017, 7 pages.
International Search Report and Written Opinion dated Jan. 14, 2011 in connection with PCT Application No. PCT/US2010/034779.
International Search Report and Written Opinion dated Jul. 4, 2012 in PCT Application No. PCT/US2012/027974.
International Search Report and Written Opinion dated Sep. 30, 2013 in connection with PCT Application No. PCT/US2013/042581.
International Search Report and Written Opinion for Application No. PCT/US2013/034901, dated Dec. 2, 2013.
International Search Report and Written Opinion for Application No. PCT/US2013/034916, dated Sep. 19, 2013.
International Search Report and Written Opinion for PCT/US2020/060236, dated Mar. 5, 2021.
International Search Report and Written Opinion for PCT/US2020/060247, dated Mar. 23, 2021.
International Search Report and Written Opinion for PCT/US2020/061032, mailed Dec. 4, 2021 (141406-2470).
International Search Report and Written Opinion in connection with International Application No. PCT/US2013/034931, dated Sep. 24, 2014, 12 pages.
International Search Report and Written Opinion in PCT Application No. PCT/US2010/022216, dated Dec. 6, 2010.
International Search Report and Written Opinion in PCT Application No. PCT/US2010/051149, dated Mar. 18, 2011.
International Search Report in connection with International Application No. PCT/US2016/021442, dated May 23, 2016, 3 pages.
Invitation to Pay Additional Fees and, Where Applicable, Protest Fee (with Search Report) for Application No. PCT/US2013/034901, mailed Aug. 28, 2013, 11 pages.
Jangala P.K., "Effect of Bonding Variables in Thermal Bonding of Polypropylene Nonwovens," Doctoral Dissertations, Aug. 2001, pp. 1-109.
Japanese Office Action dated Jul. 9, 2015 in Japanese Patent Application No. 2011-549186 (51-2318).
Lord, Peter R., "Handbook of Yarn Technology," in Science, Technology and Economics, Boca Raton, Florida, Woodhead Publishing, pp. 56-61 (2003).
Non-Final Office Action dated Aug. 27, 2014 in U.S. Appl. No. 13/426,323.

(56) References Cited

OTHER PUBLICATIONS

Non-Final Office Action dated Aug. 4, 2014 in U.S. Appl. No. 13/426,349.
Non-Final Office Action dated Jul. 21, 2014 in U.S. Appl. No. 12/367,274.
Non-Final Office Action dated May 12, 2015 in U.S. Appl. No. 13/426,349.
Non-Final Office Action dated Oct. 30, 2015, in U.S. Appl. No. 12/579,838.
Non-Final Office Action dated Sep. 2, 2015 in U.S. Appl. No. 12/367,274.
Non-Final Office Action dated Sep. 4, 2015 in U.S. Appl. No. 13/426,290.
Non-Final Office Action for U.S. Appl. No. 15/439,339 dated Dec. 11, 2018, 13 pages.
Non-Final Office Action in U.S. Appl. No. 12/367,274, dated Nov. 29, 2016 (18 pages).
Notice of Allowance date Apr. 11, 2014 in U.S. Appl. No. 13/045,168.
Notice of Allowance dated Aug. 1, 2014 in U.S. Appl. No. 13/482,182.
Notice of Allowance dated Aug. 25, 2015 in Japanese Patent Application No. 2011-225849.
Notice of Allowance dated Feb. 1, 2013 in European Patent Application No. 11174750.7 filed Jul. 20, 2011.
Notice of Allowance dated Feb. 1, 2013 in European Patent Application No. 11174753.1 filed Jul. 20, 2011.
Notice of Allowance dated Feb. 1, 2013 in European Patent Application No. 11175063.4 filed Jul. 22, 2011.
Notice of Allowance dated Feb. 21, 2013 in connection with Japanese Patent Application No. 2011-225851, filed Oct. 13, 2011.
Notice of Allowance dated Feb. 21, 2013 in European Patent Application No. 2011225851 filed Oct. 13, 2011.
Notice of Allowance dated Jul. 24, 2012 in European Patent Application No. 10734588.6 filed Jun. 27, 2011.
Notice of Allowance dated May 22, 2013 in connection with European Patent Application No. 11174753.1, filed Jul. 20, 2011.
Notice of Allowance dated Nov. 13, 2013 in connection with Chinese Patent Application No. 201080005095.6 and the English translation thereof.
Notice of Allowance dated Oct. 10, 2013 in connection with Japanese Patent Application No. 2011-225827, filed Oct. 13, 2011 and the English translation thereof.
Notice of Allowance dated Sep. 15, 2015, for European Patent Application No. 13723278.1.
Notice of Allowance dated Sep. 23, 2015, in U.S. Appl. No. 13/426,349.
Notice of Allowance dated Sep. 3, 2015 in European Patent Application No. 12718759.9.
Notice of Allowance mailed Apr. 12, 2017, in U.S. Appl. No. 13/438,535, 13 pages.
Notice of Opposition in European Application No. 11174751.5, dated Feb. 5, 2018, 74 pages.
Notice to Terminate Reconsideration before Appeal & Result of Reconsideration dated Oct. 16, 2014 for Japanese Patent Application No. 2011-549186.
Notification of Reason(s) for Refusal dated Aug. 21, 2014 in Japanese Patent Application No. 2013-164367.
Notification of Reason(s) for Refusal dated May 1, 2014 in Japanese Patent Application No. 2011-225846.
Notification of Reason(s) for Refusal dated May 22, 2014 in Japanese Patent Application No. 2011-225849.
Notification of Reason(s) for Refusal dated May 29, 2014 in Japanese Patent Application No. 2012-534219.
Office Action, and English language translation thereof, in Chinese Application No. 201380028031.1, dated Jul. 24, 2015, 14 pages.
Office Action and English language translation thereof, in connection with Chinese Application No. 201380029223.4, dated Apr. 12, 2016, 28 pages.
Office Action and English language translation thereof, in connection with Chinese Application No. 201380029223.4, dated Oct. 27, 2016, 4 pages.
Office Action and English language translation thereof, in connection with Chinese Application No. 201410041109.X, dated Dec. 31, 2015, 7 pages.
Office Action and English language translation thereof, in connection with Chinese Application No. 201410041109.X, dated Jan. 23, 2017, 37 pages.
Office Action and English language translation thereof, in connection with Chinese Application No. 201610085379.X, dated Aug. 28, 2017, 16 pages.
Office Action and English language translation thereof, in connection with Japanese Application No. 2011-549186, dated Jan. 21, 2016, 8 pages.
Office Action and English language translation thereof, in connection with Japanese Application No. 2015-086916, dated Jun. 30, 2016, 11 pages.
Office Action and English language translation thereof, in connection with Japanese Application No. 2015-515080, dated May 10, 2016, 9 pages.
Office Action and English language translation thereof, in connection with Japanese Application No. 2016-110241, dated Apr. 20, 2017, 8 pages.
Office Action dated Aug. 17, 2015, in U.S. Appl. No. 13/438,520.
Office Action dated Aug. 27, 2015 for Chinese Patent Application No. 201380029215.X) and the English translation thereof.
Office Action dated Dec. 1, 2011 in connection with U.S. Appl. No. 12/367,274, filed Feb. 6, 2009.
Office Action dated Feb. 14, 2013 in Japanese Patent Application No. 2011-225838, filed Oct. 13, 2011.
Office Action dated Feb. 21, 2013 in Japanese Patent Application No. 2011-225846, filed Oct. 13, 2011.
Office Action dated Feb. 7, 2013 in Japanese Patent Application No. 2011-225849, filed Oct. 13, 2011.
Office Action dated Feb. 7, 2013 in Japanese Patent Application No. 2011-549186, filed Aug. 1, 2011.
Office Action dated Jan. 22, 2013 in Chinese Application No. 20108005095.6, filed Dec. 12, 2012.
Office Action dated Jan. 24, 2013 in European Patent Application No. 11174751.5 filed Jul. 20, 2011.
Office Action dated Jan. 6, 2014 for U.S. Appl. No. 13/045,168.
Office Action dated Jul. 24, 2015, for Chinese Patent Application No. 201380029223.4 and the English translation thereof.
Office Action dated Jul. 31, 2015, for Chinese Patent Application No. 201380029220.0 and the English translation thereof.
Office Action dated Jun. 13, 2013 in connection with Japanese Patent Application No. 2011-534219, and the English translation thereof.
Office Action dated Jun. 14, 2012 in U.S. Appl. No. 12/579,838, filed Oct. 15, 2009.
Office Action, dated Mar. 16, 2016, with English translation, for Korean Application No. 10-2014-7031180, (11 pages).
Office Action dated Mar. 26, 2015 in U.S. Appl. No. 13/426,361.
Office Action dated May 9, 2013 in connection with Japanese Patent Application No. 2011-225827, filed Oct. 13, 2011 and the English translation thereof.
Office Action dated Nov. 11, 2013 for European Patent Application No. 10779359.8.
Office Action dated Oct. 1, 2014 in U.S. Appl. No. 13/426,290.
Office Action dated Sep. 24, 2015, in U.S. Appl. No. 13/426,323.
Office Action dated Sep. 30, 2014 in U.S. Appl. No. 12/579,838.
Office Action, end English language translation thereof, in connection with Chinese Application No. 201280012038.X, dated Jul. 13, 2016, 6 pages.
Office Action, end English language translation thereof, in connection with Chinese Application No. 201380029215.X, dated May 9, 2016, 7 pages.
Office Action, end English language translation thereof, in connection with Chinese Application No. 201380029215.X, dated Nov. 3, 2016, 6 pages.
Office Action, end English language translation thereof, in connection with Chinese Application No. 201410041109.X, dated Jul. 11, 2016, 19 pages.

(56) References Cited

OTHER PUBLICATIONS

Office Action, end English languagetranslation thereof, in connection with Chinese Application No. 201280012038.X, dated Dec. 8, 2015, 14 pages.
Office Action for U.S. Appl. No. 14/528,491, dated Dec. 5, 2016 (6 pages).
Office Action in connection with European Application No. 13739302.1 dated Mar. 15, 2017, 5 pages.
Office Action in connection with European Application No. 13739302.1 dated Oct. 4, 2017, 5 pages.
Office Action in connection with European Application No. 14166582.8) dated Dec. 8, 2015, 4 pages.
Office Action in connection with European Application No. 14166582.8. dated Jun. 28, 2016, 6 pages.
Office Action in connection with European Application No. 14166582.8. dated May 29, 2017, 8 pages.
Office Action in connection with European Application No. 14166582.8 dated Nov. 10, 2016, 9 pages.
Office Action in U.S. Appl. No. 12/367,274, dated Sep. 27, 2017 9 pages.
Office Action in U.S. Appl. No. 12/579,838, dated Nov. 28, 2017; 8 pages.
Office Action in U.S. Appl. No. 13/426,290, dated Feb. 26, 2018, 11 pages.
Office Action in U.S. Appl. No. 13/426,323, dated Sep. 19, 2017 22 pages.
Office Action in U.S. Appl. No. 13/438,535, dated Feb. 23, 2017, 17 pages.
Office Action in U.S. Appl. No. 14/956,783 dated Nov. 15, 2017, 12 pages.
Office Action in U.S. Appl. No. 15/206,495, dated Feb. 16, 2018 12 pages.
Office Action mailed Mar. 27, 2017 for U.S. Appl. No. 13/426,290, 12 pages.
Office Action mailed Mar. 30, 2016 in U.S. Appl. No. 13/426,290.
Office Action mailed Mar. 30, 2017 for U.S. Appl. No. 13/426,323, 24 pages.
Partial European Search Report dated Nov. 28, 2011 in European Patent Application No. 11177097.0.
Partial European Search Report dated Nov. 4, 2011 in connection with European Patent Application No. 11175063.4.
Partial European Search Report dated Nov. 4, 2011 in European Patent Application No. 11174750.7.
Partial European Search Report dated Nov. 7, 2011 in European Patent Application No. 11174751.5.
Response to European Office Action filed May 16, 2014 in European Patent Application No. 11174751.5.
Response to European Search Report and Written Opinion filed Sep. 21, 2012 in European Patent Application No. 11174751.5.
Response to European Search Report dated Jan. 11, 2013 in European Patent Application No. 11174747.3.
Response to European Search Report filed Aug. 15, 2012 in European Patent Application No. 11175063.4.
Response to European Search Report filed Aug. 16, 2012 in European Patent Application No. 11174750.7.
Response to European Search Report filed Dec. 21, 2011 in European Patent Application No. 11174747.3.

Response to Final Office Action dated Jul. 25, 2012 for U.S. Appl. No. 12/368,274, filed Feb. 6, 2009.
Response to Final Office Action filed Jul. 25, 2012 in connection with U.S. Appl. No. 12/367,274, filed Feb. 6, 2009.
Response to Final Office Action filed Mar. 13, 2013 in U.S. Appl. No. 12/579,838, filed Oct. 15, 2009.
Response to Office Action dated Mar. 1, 2012 for U.S. Appl. No. 12/368,274, filed Feb. 6, 2009.
Response to Office Action filed Aug. 2, 2013 in connection with European Patent Application No. 11174751.5.
Response to Office Action filed Aug. 29, 2013 in connection with Japanese Patent Application No. 2011-225827, filed Oct. 13, 2011 and the English translation thereof.
Response to Office Action filed Aug. 6, 2013 in connection with Chinese Patent Application No. 201080005095.6 filed Jul. 21, 2011 and the English translation thereof.
Response to Office Action filed Aug. 6, 2013 in connection with Japanese Patent Application No. 2011-225849, filed Oct. 13, 2011 and the English translation thereof.
Response to Office Action filed Aug. 7, 2013 in connection with Japanese Patent Application No. 2011-549186, filed Aug. 1, 2011 and the English translation thereof.
Response to Office Action filed Jul. 10, 2013 in connection with Japanese Patent Application No. 2011-225846, filed Oct. 13, 2011 and the English translation thereof.
Response to Office Action filed Jun. 10, 2013 in connection with Japanese Patent Application No. 2011-225838, filed Oct. 13, 2011 and the English translation thereof.
Response to Office Action filed Mar. 1, 2012 in connection with U.S. Appl. No. 12/367,274, filed Feb. 6, 2009.
Response to Office Action filed Sep. 10, 2013 in connection with Japanese Patent Application No. 2011-534219, filed Apr. 11, 2012 and the English translation thereof.
Response to Office Action filed Sep. 14, 2012 in U.S. Appl. No. 12/579,838, filed Oct. 15, 2009.
Response to Result of Reconsideration filed Dec. 19, 2014, in Japanese Patent Application No. 2011-549186 (51/2318).
Third Chinese Office Action (English translation of relevant portions only) for Chinese Patent Application No. 2013800292200, dated approximately Jan. 3, 2017 (10 pages).
Voluntary Amendment filed Apr. 12, 2012 in connection with Chinese Patent Application No. 20108005095.6, filed Jul. 21, 2011.
Voluntary Amendment filed Jan. 10, 2013 filed connection with Chinese Patent Application No. 201080046286.7, filed Apr. 13, 2012.
Voluntary Amendment filed May 15, 2012 in Japanese Patent Application No. 2012-534219 filed Apr. 11, 2012.
Voluntary Amendment filed Oct. 25, 2011 in Japanese Patent Application No. 2011-549186 filed Aug. 1, 2011.
Wise, R.J. Excerpt: "Thermal Welding of Polymers", Abington Publishing, 1999, 15 pages.
Written Opinion for PCT/US2020/060236, mailed Nov. 23, 2021 (141406-2410).
Written Opinion for PCT/US2020/060247 mailed Oct. 28, 2021 (141406-2420).
Written Opinion for PCT/US2020/061032 mailed Nov. 22, 2021 (141406-2470).

* cited by examiner

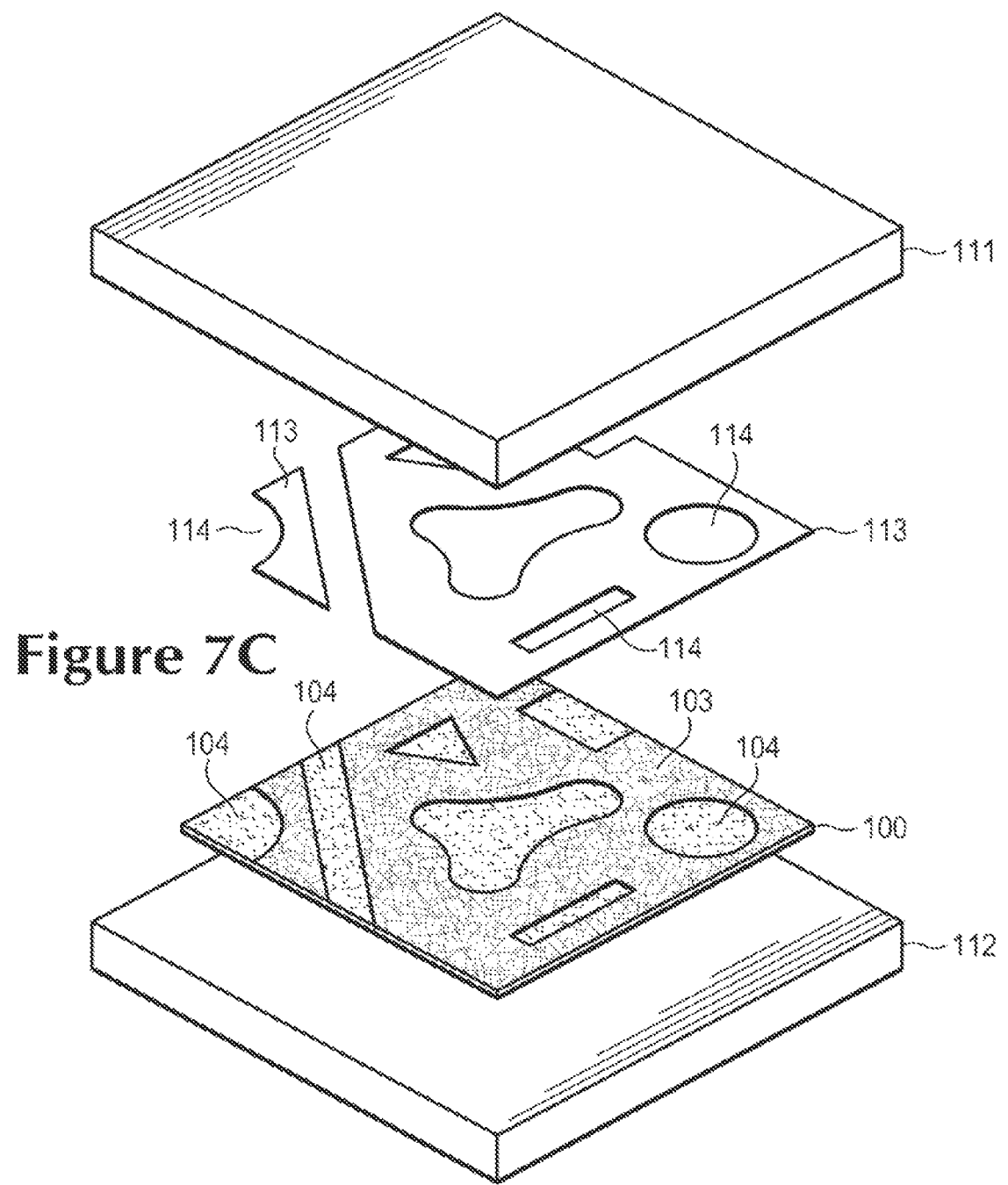

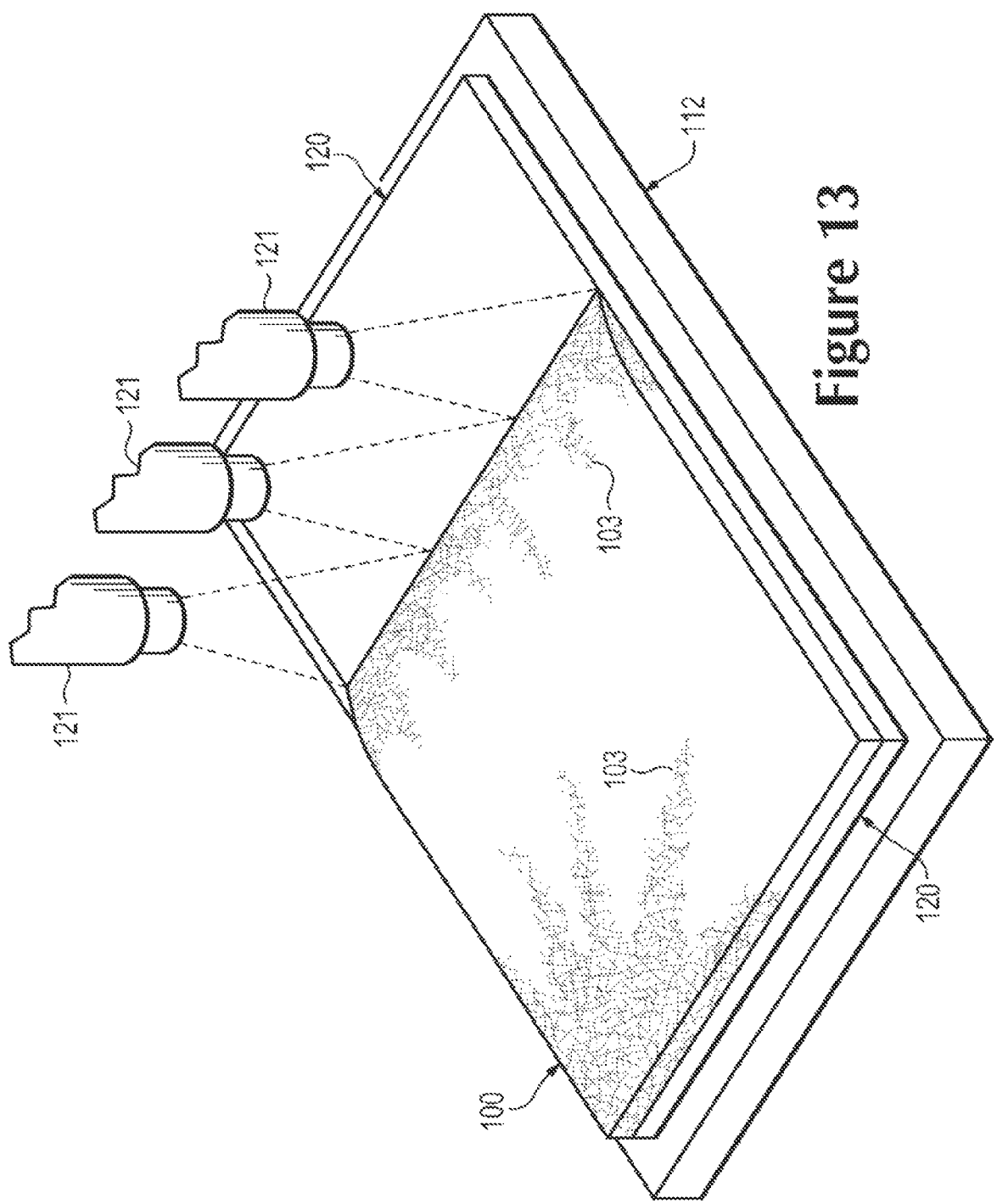

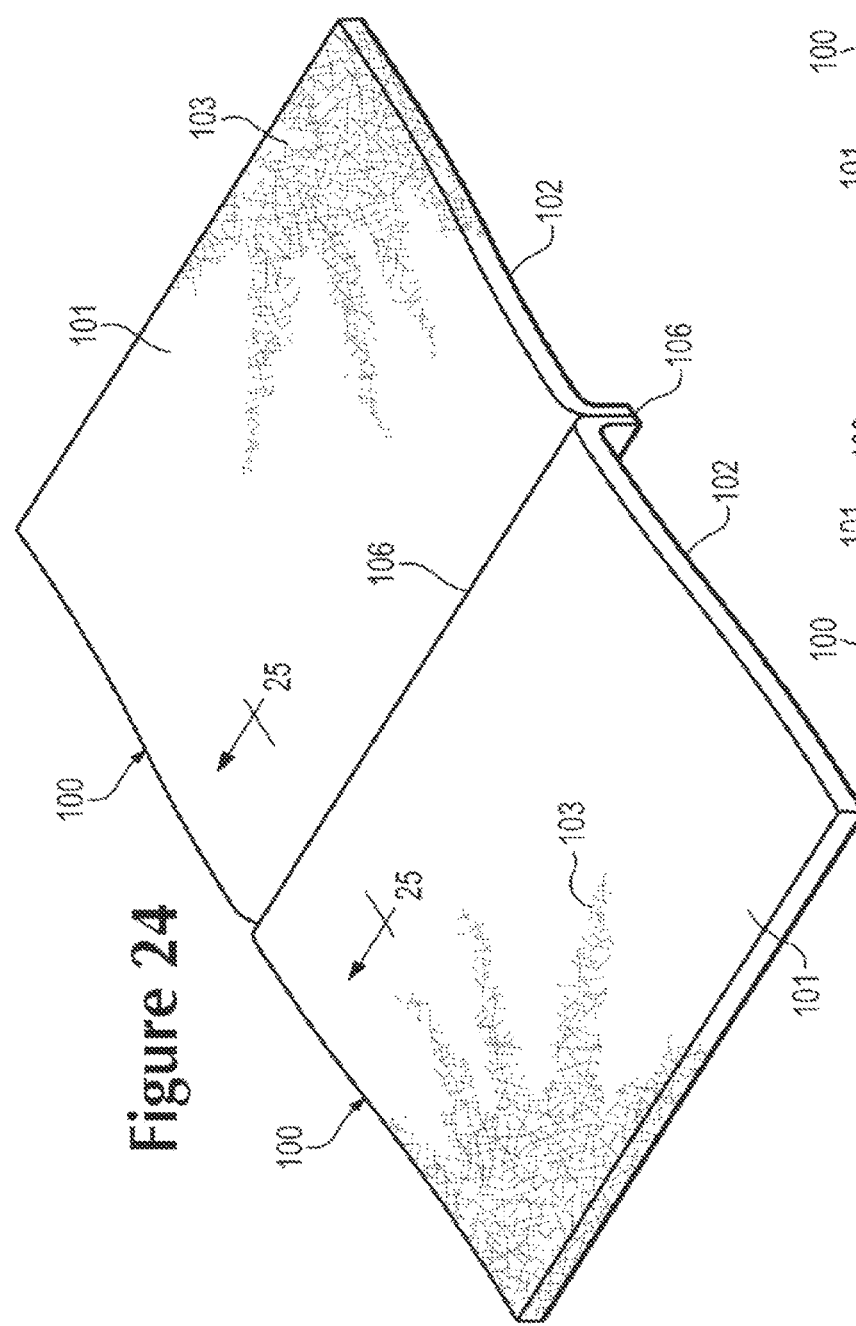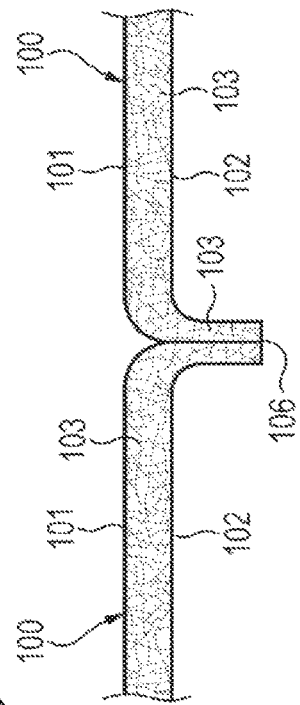

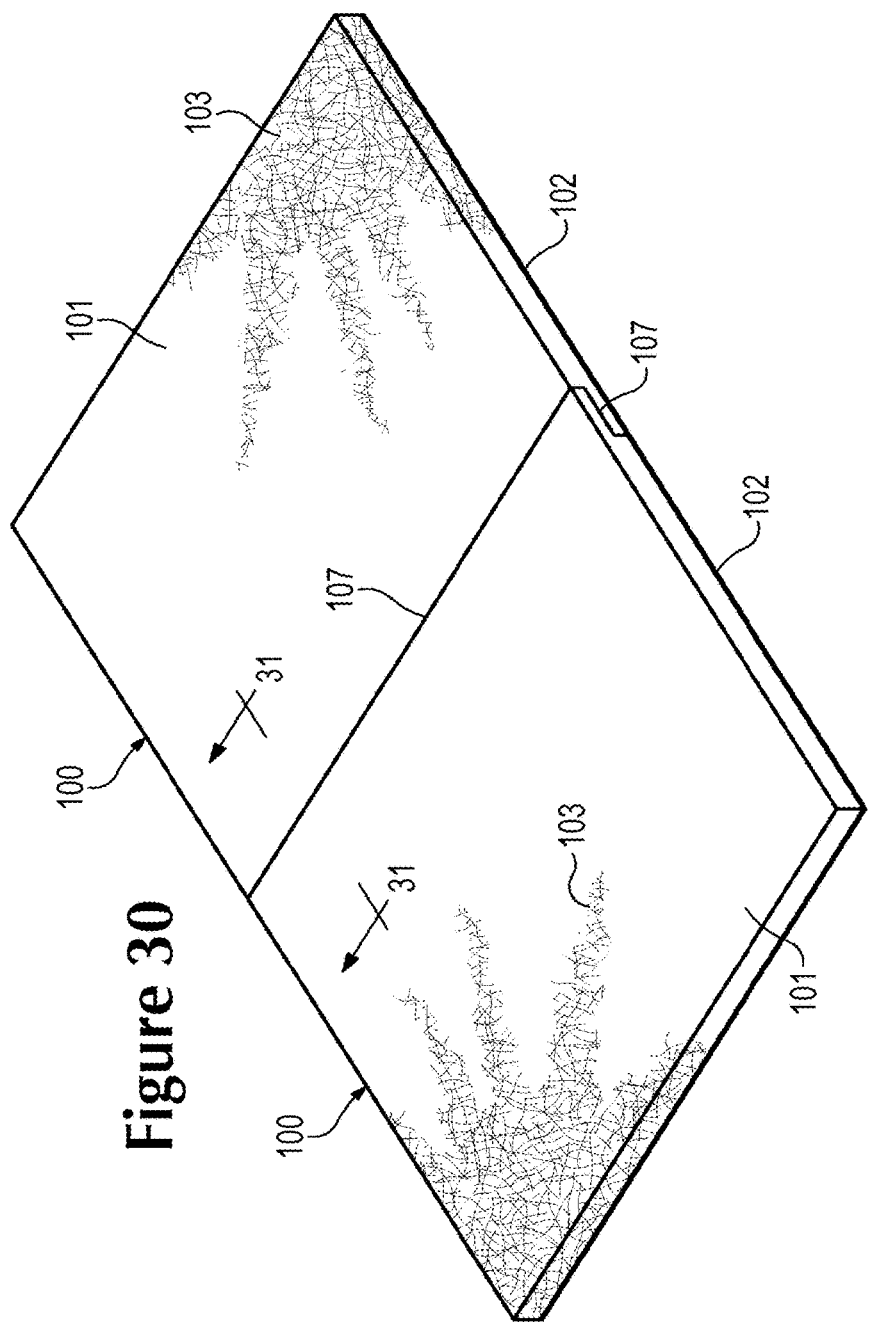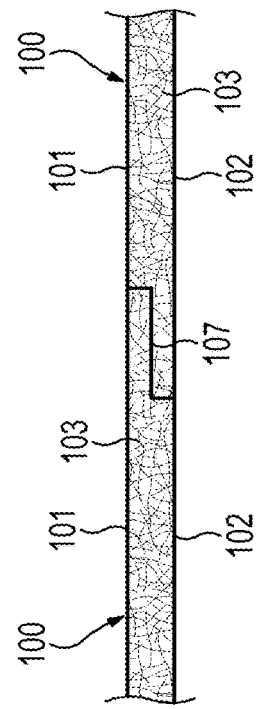

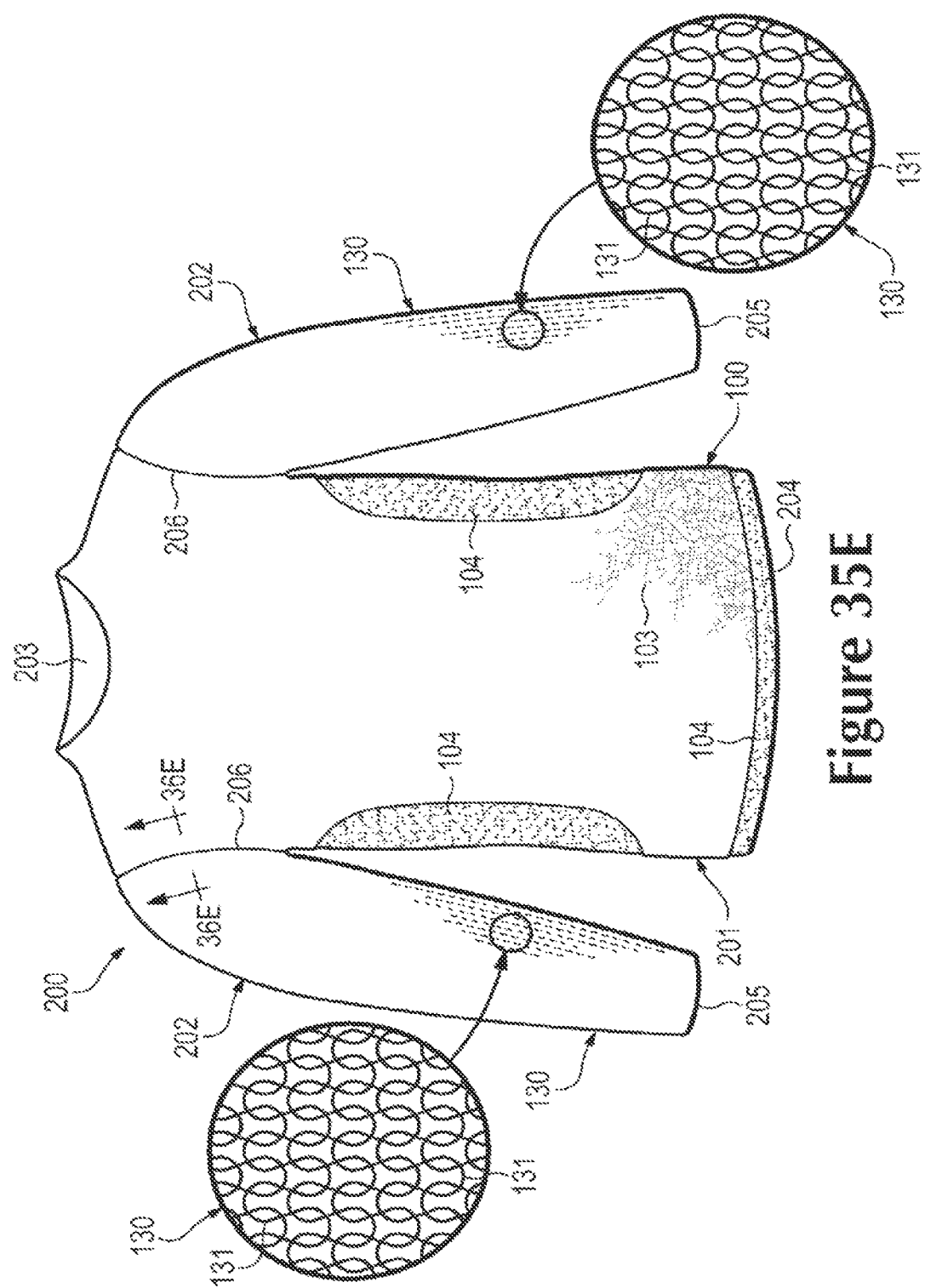

THERMOPLASTIC NON-WOVEN TEXTILE ELEMENTS

CROSS-REFERENCE TO RELATED APPLICATION

This application is a continuation of U.S. patent application Ser. No. 18/308,728, filed Apr. 28, 2023, which is a continuation of U.S. patent application Ser. No. 16/160,259, filed Oct. 15, 2018, now abandoned, which is a continuation of U.S. patent application Ser. No. 13/426,361, filed Mar. 21, 2012, now abandoned, which is a divisional of U.S. patent application Ser. No. 12/367,274, filed Feb. 6, 2009, now abandoned, the contents of which are each incorporated by reference in their entirety.

BACKGROUND

A variety of products are at least partially formed from textiles. As examples, articles of apparel (e.g., shirts, pants, socks, jackets, undergarments, footwear), containers (e.g., backpacks, bags), and upholstery for furniture (e.g., chairs, couches, car seats) are often formed from various textile elements that are joined through stitching or adhesive bonding. Textiles may also be utilized in bed coverings (e.g., sheets, blankets), table coverings, towels, flags, tents, sails, and parachutes. Textiles utilized for industrial purposes are commonly referred to as technical textiles and may include structures for automotive and aerospace applications, filter materials, medical textiles (e.g. bandages, swabs, implants), geotextiles for reinforcing embankments, agrotextiles for crop protection, and industrial apparel that protects or insulates against heat and radiation. Accordingly, textiles may be incorporated into a variety of products for both personal and industrial purposes.

Textiles may be defined as any manufacture from fibers, filaments, or yarns having a generally two-dimensional structure (i.e., a length and a width that are substantially greater than a thickness). In general, textiles may be classified as mechanically-manipulated textiles or non-woven textiles. Mechanically-manipulated textiles are often formed by weaving or interlooping (e.g., knitting) a yarn or a plurality of yarns, usually through a mechanical process involving looms or knitting machines. Non-woven textiles are webs or mats of filaments that are bonded, fused, interlocked, or otherwise joined. As an example, a non-woven textile may be formed by randomly depositing a plurality of polymer filaments upon a surface, such as a moving conveyor. Various embossing or calendaring processes may also be utilized to ensure that the non-woven textile has a substantially constant thickness, impart texture to one or both surfaces of the non-woven textile, or further bond or fuse filaments within the non-woven textile to each other. Whereas spunbonded non-woven textiles are formed from filaments having a cross-sectional thickness of 10 to 100 microns, meltblown non-woven textiles are formed from filaments having a cross-sectional thickness of less than 10 microns.

Although some products are formed from one type of textile, many products may also be formed from two or more types of textiles in order to impart different properties to different areas. As an example, shoulder and elbow areas of a shirt may be formed from a textile that imparts durability (e.g., abrasion-resistance) and stretch-resistance, whereas other areas may be formed from a textile that imparts breathability, comfort, stretch, and moisture-absorption. As another example, an upper for an article of footwear may have a structure that includes numerous layers formed from various types of textiles and other materials (e.g., polymer foam, leather, synthetic leather), and some of the layers may also have areas formed from different types of textiles to impart different properties. As yet another example, straps of a backpack may be formed from non-stretch textile elements, lower areas of a backpack may be formed from durable and water-resistant textile elements, and a remainder of the backpack may be formed from comfortable and compliant textile elements. Accordingly, many products may incorporate various types of textiles in order to impart different properties to different portions of the products.

In order to impart the different properties to different areas of a product, textile elements formed from the materials must be cut to desired shapes and then joined together, usually with stitching or adhesive bonding. As the number and types of textile elements incorporated into a product increases, the time and expense associated with transporting, stocking, cutting, and joining the textile elements may also increase. Waste material from cutting and stitching processes also accumulates to a greater degree as the number and types of textile elements incorporated into a product increases. Moreover, products with a greater number of textile elements and other materials may be more difficult to recycle than products formed from few elements and materials. By decreasing the number of elements and materials utilized in a product, therefore, waste may be decreased while increasing the manufacturing efficiency and recyclability.

SUMMARY

A non-woven textile and products incorporating the non-woven textile are disclosed below. The non-woven textile may be formed from a plurality of filaments that are at least partially formed from a thermoplastic polymer material. In some configurations of the non-woven textile, the filaments or the thermoplastic polymer material may be elastomeric or may stretch at least one-hundred percent prior to tensile failure.

The non-woven textile may have a first region and a second region, with the filaments of the first region being fused to a greater degree than the filaments of the second region. Depending upon the degree of fusing in the first region, the thermoplastic polymer material from the filaments may remain filamentous, become non-filamentous, or take an intermediate form that is partially filamentous and partially non-filamentous. Fusing within the first region may alter properties such as permeability, durability, and stretch-resistance.

A variety of products, including apparel (e.g., shirts, pants, footwear), may incorporate the non-woven textile. In some of these products, the non-woven textile may be joined with another textile element or component to form a seam. More particularly, an edge area of the non-woven textile may be heatbonded with an edge area of the other textile element or component at the seam. In other products, a surface the non-woven textile may be joined with another textile element or component (e.g., a polymer sheet, a polymer foam layer, or various strands) to form a composite element.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 7A-7C are perspective views of a first process for forming the fused regions in the non-woven textile.

FIG. 13 is a schematic perspective view of a another process for forming the first composite element.

FIG. 24 is a perspective view of two elements of the non-woven textile joined with a first seam configuration.

FIG. 25 is a cross-sectional view of the first seam configuration, as defined by section line 25-25 in FIG. 24.

FIG. 30 is a perspective view of two elements of the non-woven textile joined with a second seam configuration.

FIG. 31 is a cross-sectional view of the second seam configuration, as defined by section line 31-31 in FIG. 30.

FIGS. 35A-35H are front elevational views of various configurations of a shirt that includes the non-woven textile.

DETAILED DESCRIPTION

The following discussion and accompanying figures disclose a non-woven textile 100 and various products incorporating non-woven textile 100. Although non-woven textile 100 is disclosed below as being incorporated into various articles of apparel (e.g., shirts, pants, footwear) for purposes of example, non-woven textile 100 may also be incorporated into a variety of other products. For example, non-woven textile 100 may be utilized in other types of apparel, containers, and upholstery for furniture. Non-woven textile 100 may also be utilized in bed coverings, table coverings, towels, flags, tents, sails, and parachutes. Various configurations of non-woven textile 100 may also be utilized for industrial purposes, as in automotive and aerospace applications, filter materials, medical textiles, geotextiles, agrotextiles, and industrial apparel. Accordingly, non-woven textile 100 may be utilized in a variety of products for both personal and industrial purposes.

I—Non-Woven Textile Configuration

Figure 1:
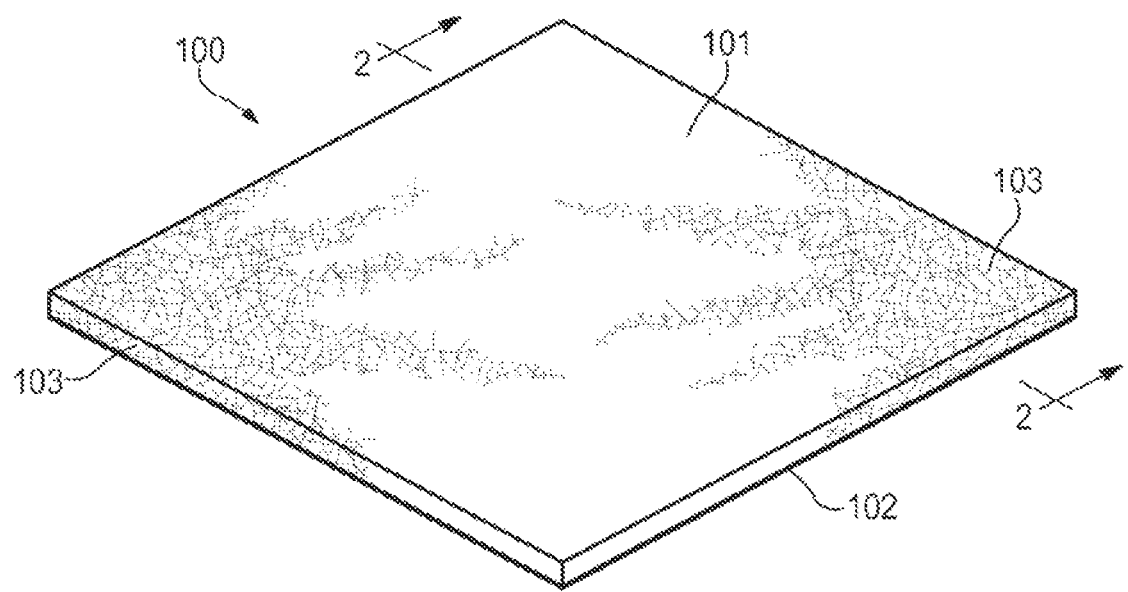
FIG. 1 is a perspective view of a non-woven textile.
Figure 2:
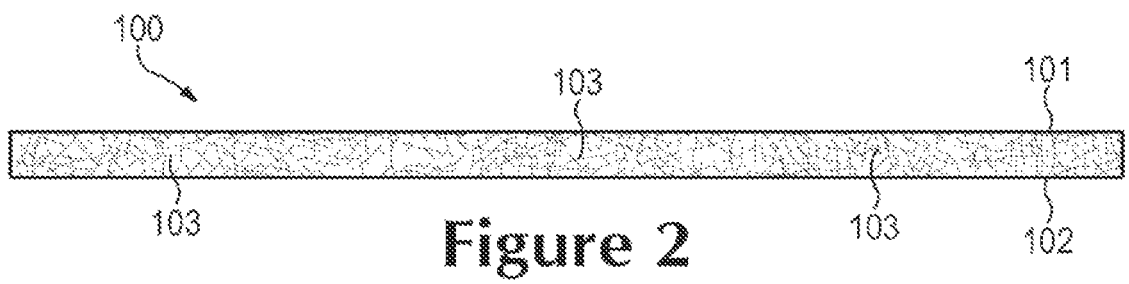
FIG. 2 is a cross-sectional view of the non-woven textile, as defined by section line 2-2 in FIG. 1.

Non-woven textile 100 is depicted in FIGS. 1 and 2 as having a first surface 101 and an opposite second surface 102. Non-woven textile 100 is primarily formed from a plurality of filaments 103 that include a thermoplastic polymer material. Filaments 103 are distributed randomly throughout non-woven textile 100 and are bonded, fused, interlocked, or otherwise joined to form a structure with a relatively constant thickness (i.e., distance between surfaces 101 and 102). An individual filament 103 may be located on first surface 101, on second surface 102, between surfaces 101 and 102, or on both of surfaces 101 and 102. Depending upon the manner in which non-woven textile 100 is formed, multiple portions of an individual filament 103 may be located on first surface 101, different portions of the individual filament 103 may be located on second surface 102, and other portions of the individual filament 103 may be located between surfaces 101 and 102. In order to impart an interlocking structure, the various filaments 103 may wrap around each other, extend over and under each other, and pass through various areas of non-woven textile 100. In areas where two or more filaments 103 contact each other, the thermoplastic polymer material forming filaments 103 may be bonded or fused to join filaments 103 to each other. Accordingly, filaments 103 are effectively joined to each other in a variety of ways to form a cohesive structure within non-woven textile 100.

Fibers are often defined, in textile terminology, as having a relatively short length that ranges from one millimeter to a few centimeters or more, whereas filaments are often defined as having a longer length than fibers or even an indeterminate length. As utilized within the present document, the term "filament" or variants thereof is defined as encompassing lengths of both fibers and filaments from the textile terminology definitions. Accordingly, filaments 103 or other filaments referred to herein may generally have any length. As an example, therefore, filaments 103 may have a length that ranges from one millimeter to hundreds of meters or more.

Filaments 103 include a thermoplastic polymer material. In general, a thermoplastic polymer material melts when heated and returns to a solid state when cooled. More particularly, the thermoplastic polymer material transitions from a solid state to a softened or liquid state when subjected to sufficient heat, and then the thermoplastic polymer material transitions from the softened or liquid state to the solid state when sufficiently cooled. As such, the thermoplastic polymer material may be melted, molded, cooled, re-melted, re-molded, and cooled again through multiple cycles. Thermoplastic polymer materials may also be welded or heatbonded, as described in greater detail below, to other textile elements, plates, sheets, polymer foam elements, thermoplastic polymer elements, thermoset polymer elements, or a variety of other elements formed from various materials. In contrast with thermoplastic polymer materials, many thermoset polymer materials do not melt when heated, simply burning instead. Although a wide range of thermoplastic polymer materials may be utilized for filaments 103, examples of some suitable thermoplastic polymer materials include thermoplastic polyurethane, polyamide, polyester, polypropylene, and polyolefin. Although any of the thermoplastic polymer materials mentioned above may be utilized for non-woven textile 100, an advantage to utilizing thermoplastic polyurethane relates to heatbonding and colorability. In comparison with various other thermoplastic polymer materials (e.g., polyolefin), thermoplastic polyurethane is relatively easy to bond with other elements, as discussed in greater detail below, and colorants may be added to thermoplastic polyurethane through various conventional processes.

Although each of filaments 103 may be entirely formed from a single thermoplastic polymer material, individual filaments 103 may also be at least partially formed from multiple polymer materials. As an example, an individual filament 103 may have a sheath-core configuration, wherein an exterior sheath of the individual filament 103 is formed from a first type of thermoplastic polymer material, and an interior core of the individual filament 103 is formed from a second type of thermoplastic polymer material. As a similar example, an individual filament 103 may have a bi-component configuration, wherein one half of the individual filament 103 is formed from a first type of thermoplastic polymer material, and an opposite half of the individual filament 103 is formed from a second type of thermoplastic polymer material. In some configurations, an individual filament 103 may be formed from both a thermoplastic polymer material and a thermoset polymer material with either of the sheath-core or bi-component arrangements. Although all of filaments 103 may be entirely formed from a single thermoplastic polymer material, filaments 103 may also be formed from multiple polymer materials. As an example, some of filaments 103 may be formed from a first type of thermoplastic polymer material, whereas other filaments 103 may be formed from a second type of thermoplastic polymer material. As a similar example, some of filaments 103 may be formed from a thermoplastic polymer material, whereas other filaments 103 may be formed from a thermoset polymer material. Accordingly, each filaments 103, portions of filaments 103, or at least some of filaments 103 may be formed from one or more thermoplastic polymer materials.

The thermoplastic polymer material or other materials utilized for non-woven textile 100 (i.e., filaments 103) may be selected to have various stretch properties, and the materials may be considered elastomeric. Depending upon the specific product that non-woven textile 100 will be incorporated into, non-woven textile 100 or filaments 103 may stretch between ten percent to more than eight-hundred percent prior to tensile failure. For many articles of apparel, in which stretch is an advantageous property, non-woven textile 100 or filaments 103 may stretch at least one-hundred percent prior to tensile failure. As a related matter, thermoplastic polymer material or other materials utilized for non-woven textile 100 (i.e., filaments 103) may be selected to have various recovery properties. That is, non-woven textile 100 may be formed to return to an original shape after being stretched, or non-woven textile 100 may be formed to remain in an elongated or stretched shape after being stretched. Many products that incorporate non-woven textile 100, such as articles of apparel, may benefit from properties that allow non-woven textile 100 to return or otherwise recover to an original shape after being stretched by one-hundred percent or more.

A variety of conventional processes may be utilized to manufacture non-woven textile 100. In general, a manufacturing process for non-woven textile 100 includes (a) extruding or otherwise forming a plurality of filaments 103 from a thermoplastic polymer material, (b) collecting, laying, or otherwise depositing filaments 103 upon a surface, such as a moving conveyor, (c) joining filaments 103, and (d) imparting a desired thickness through compressing or other processes. Because filaments 103 may be relatively soft or partially melted when deposited upon the surface, the polymer materials 103 that contact each other may become bonded or fused together upon cooling.

Following the general manufacturing process discussed above, various post-processing operations may be performed on non-woven textile 100. For example, embossing or calendaring processes may be utilized to ensure that non-woven textile 100 has a substantially constant thickness, impart texture to one or both of surfaces 101 and 102, or further bond or fuse filaments 103 to each other. Coatings may also be applied to non-woven textile 100. Furthermore, hydrojet, hydroentanglement, needlepunching, or stitchbonding processes may also be utilized to modify properties of non-woven textile 100.

Non-woven textile 100 may be formed as a spunbonded or meltblown material. Whereas spunbonded non-woven textiles are formed from filaments having a cross-sectional thickness of 10 to 100 microns, meltblown non-woven textiles are formed from filaments having a cross-sectional thickness of less than 10 microns.

Non-woven textile 100 may be either spunbonded, meltblown, or a combination of spunbonded and meltblown. Moreover, non-woven textile 100 may be formed to have spunbonded and meltblown layers, or may also be formed such that filaments 103 are combinations of spunbonded and meltblown.

In addition to differences in the thickness of individual filaments 103, the overall thickness of non-woven textile 100 may vary significantly. With reference to the various figures, the thickness of non-woven textile 100 and other elements may be amplified or otherwise increased to show details or other features associated with non-woven textile 100, thereby providing clarity in the figures. For many applications, however, a thickness of non-woven textile 100 may be in a range of 0.5 millimeters to 10.0 millimeters, but may vary considerably beyond this range. For many articles of apparel, for example, a thickness of 1.0 to 3.0 millimeters may be appropriate, although other thicknesses may be utilized. As discussed in greater detail below, regions of non-woven textile 100 may be formed such that the thermoplastic polymer material forming filaments 103 is fused to a greater degree than in other regions, and the thickness of non-woven textile 100 in the fused regions may be substantially reduced. Accordingly, the thickness of non-woven textile 100 may vary considerably.

II—Fused Regions

Figure 3:
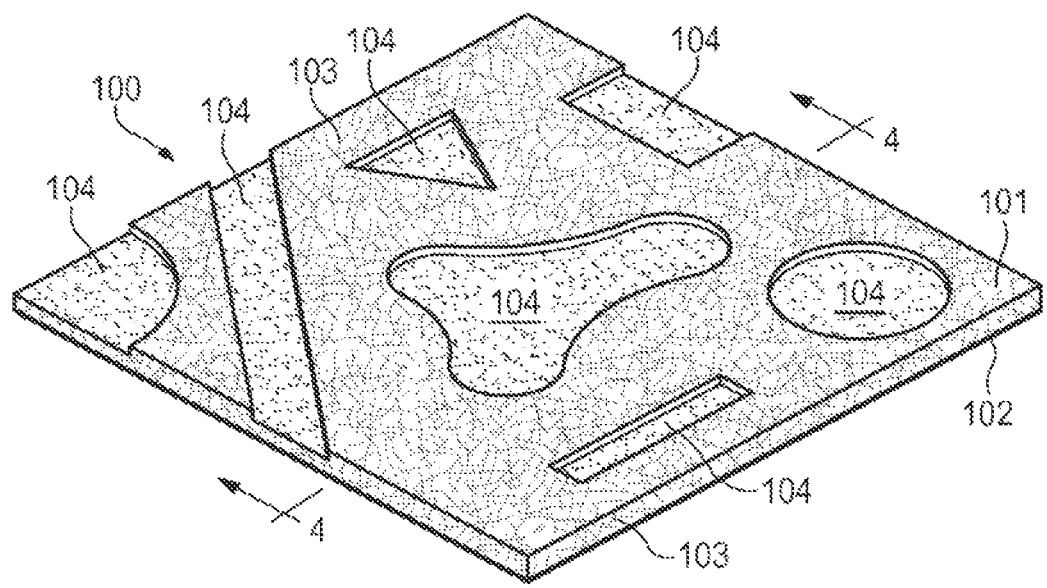
FIG. 3 is a perspective view of the non-woven textile with a plurality of fused regions.

Non-woven textile 100 is depicted as including various fused regions 104 in FIG. 3. Fused regions 104 are portions of non-woven textile 100 that have been subjected to heat in order to selectively change the properties of those fused regions 104. Non-woven textile 100, or at least the various filaments 103 forming non-woven textile 100, are discussed above as including a thermoplastic polymer material. When exposed to sufficient heat, the thermoplastic polymer material transitions from a solid state to either a softened state or a liquid state. When sufficiently cooled, the thermoplastic polymer material then transitions back from the softened state or the liquid state to the solid state. Non-woven textile 100 or regions of non-woven textile 100 may therefore, be exposed to heat in order to soften or melt the various filaments 103. As discussed in greater detail below, exposing various regions (i.e., fused regions 104) of non-woven textile 100 to heat may be utilized to selectively change the properties of those regions. Although discussed in terms of heat alone, pressure may also be utilized either alone or in combination with heat to form fused regions 104, and pressure may be required in some configurations of non-woven textile 100 to form fused regions 104.

Fused regions 104 may exhibit various shapes, including a variety of geometrical shapes (e.g., circular, elliptical, triangular, square, rectangular) or a variety of non-defined, irregular, or otherwise non-geometrical shapes. The positions of fused regions 104 may be spaced inward from edges of non-woven textile 100, located on one or more edges of non-woven textile 100, or located at a corner of non-woven textile 100. The shapes and positions of fused regions 104 may also be selected to extend across portions of non-woven textile 100 or between two edges of non-woven textile 100. Whereas the areas of some fused regions 104 may be relatively small, the areas of other fused regions 104 may be relatively large. As described in greater detail below, two separate elements of non-woven textile 100 may be joined together, some fused regions 104 may extend across a seam that joins the elements, or some fused regions may extend into areas where other components are bonded to non-woven textile 100. Accordingly, the shapes, positions, sizes, and other aspects of fused regions 104 may vary significantly.

When exposed to sufficient heat, and possibly pressure, the thermoplastic polymer material of the various filaments 103 of non-woven textile 100 transitions from a solid state to either a softened state or a liquid state. Depending upon the degree to which filaments 103 change state, the various filaments 103 within fused regions 104 may (a) remain in a filamentous configuration, (b) melt entirely into a liquid that cools into a non-filamentous configuration, or (c) take an intermediate configuration wherein some filaments 103 or portions of individual filaments 103 remain filamentous and other filaments 103 or portions of individual filaments 103 become non-filamentous. Accordingly, although filaments 103 in fused regions 104 are generally fused to a greater degree than filaments 103 in other areas of non-woven textile 100, the degree of fusing in fused regions 104 may vary significantly.

Figure 4A:
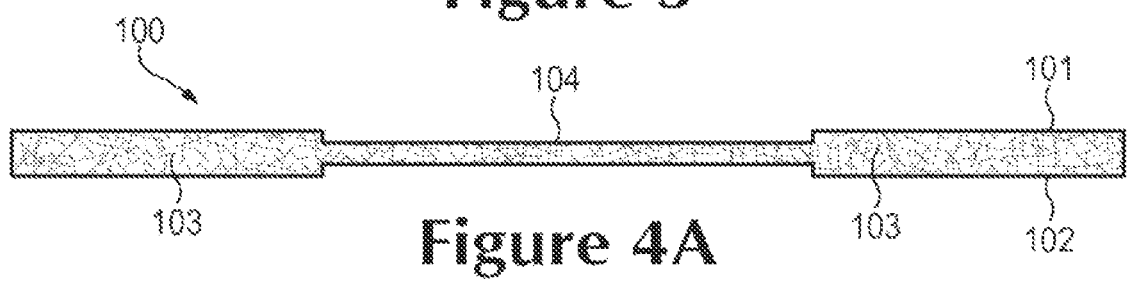
FIGS. 4A-4C are cross-sectional views, as defined by section line 4-4 in FIG. 3, depicting different configurations of the fused regions in the non-woven textile.
Figure 4B:
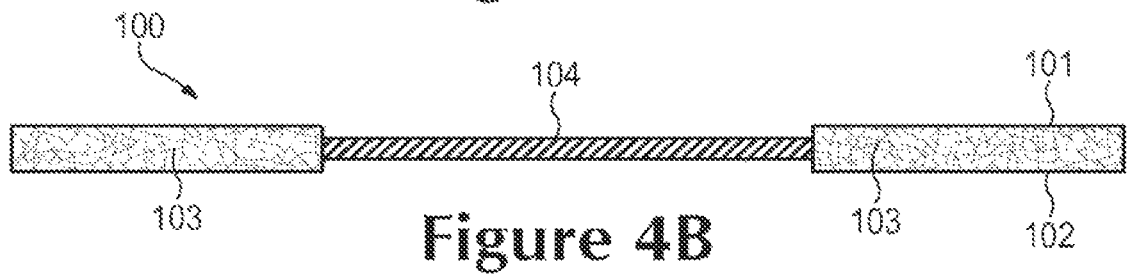
Figure 4C:
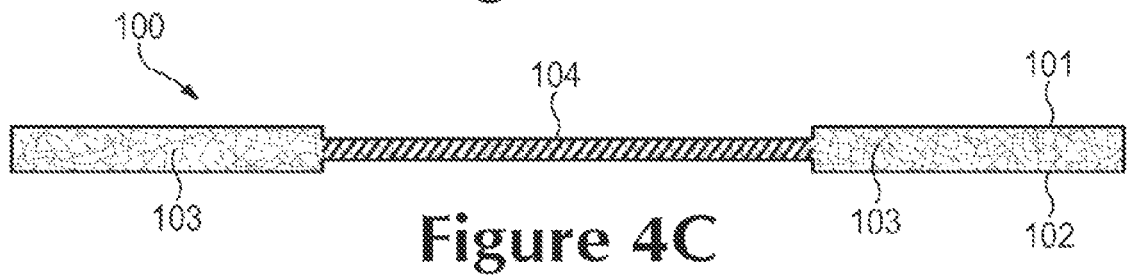

Differences between the degree to which filaments 103 may be fused in fused regions 104 are depicted in FIGS. 4A-4C. Referring specifically to FIG. 4A, the various filaments 103 within fused region 104 remain in a filamentous configuration. That is, the thermoplastic polymer material forming filaments 103 remains in the configuration of a filament and individual filaments 103 remain identifiable. Referring specifically to FIG. 4B, the various filaments 103 within fused region 104 melted entirely into a liquid that cools into a non-filamentous configuration. That is, the thermoplastic polymer material from filaments 103 melted into a non-filamentous state that effectively forms a solid polymer sheet in fused region 104, with none of the individual filaments 103 being identifiable. Referring specifically to FIG. 4C, the various filaments 103 remain in a partially-filamentous configuration. That is, some of the thermoplastic polymer material forming filaments 103 remains in the configuration of a filament, and some of the thermoplastic polymer material from filaments 103 melted into a non-filamentous state that effectively forms a solid polymer sheet in fused region 104. The configuration of the thermoplastic polymer material from filaments 103 in fused regions 104 may therefore, be filamentous, non-filamentous, or any combination or proportion of filamentous and non-filamentous. Accordingly, the degree of fusing in each of fused regions 104 may vary along a spectrum that extends from filamentous on one end to non-filamentous on an opposite end.

A variety of factors relating to the configuration of non-woven textile 100 and the processes by which fused regions 104 are formed determine the degree to which filaments 103 are fused within fused regions 104. As examples, factors that determine the degree of fusing include (a) the particular thermoplastic polymer material forming filaments 103, (b) the temperature that fused regions 104 are exposed to, (c) the pressure that fused regions 104 are exposed to, and (d) the time at which fused regions 104 are exposed to the elevated temperature and/or pressure. By varying these factors, the degree of fusing that results within fused regions 104 may also be varied along the spectrum that extends from filamentous on one end to non-filamentous on an opposite end.

Figure 5A:
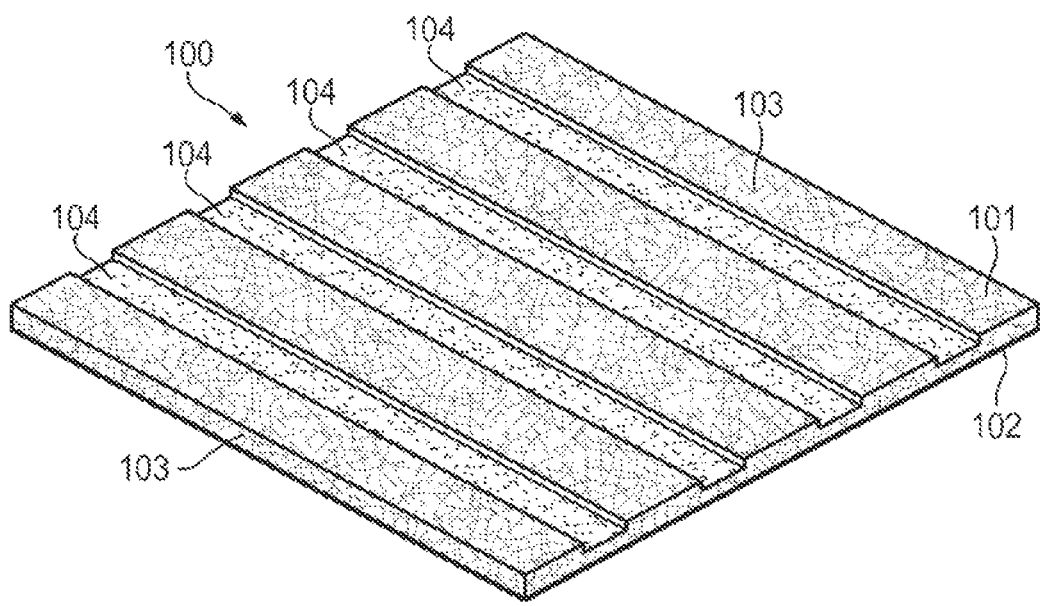
FIGS. 5A-5H are perspective views of further configurations of the fused regions in the non-woven textile.
Figure 5B:
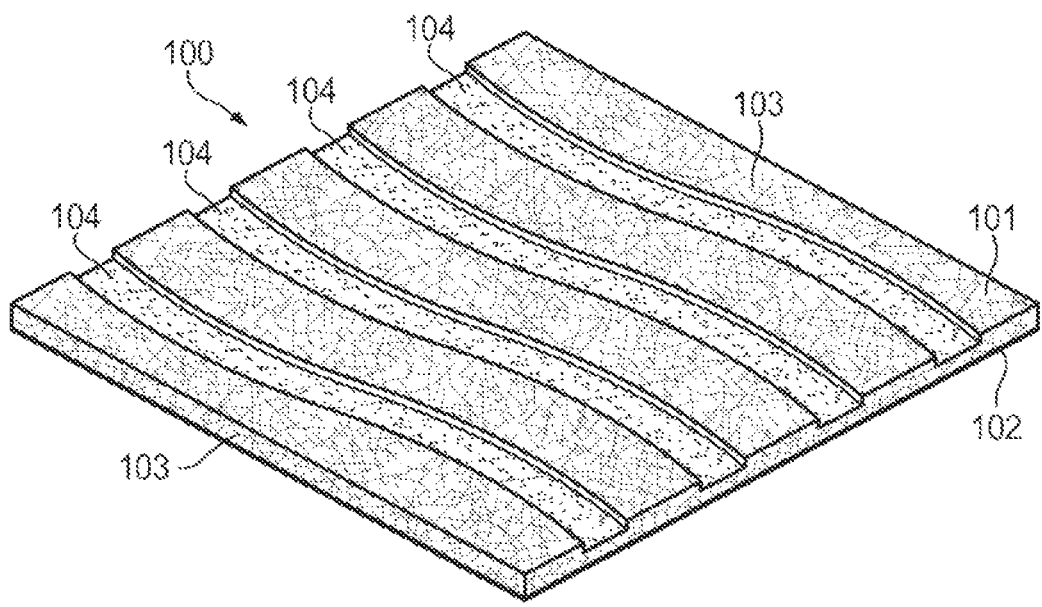
Figure 5C:
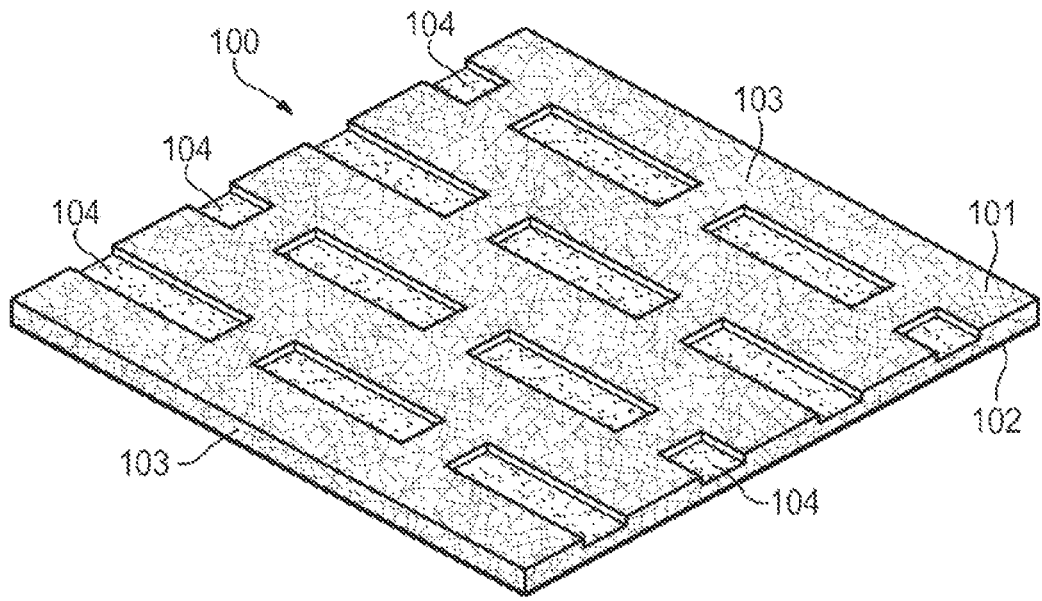
Figure 5D:
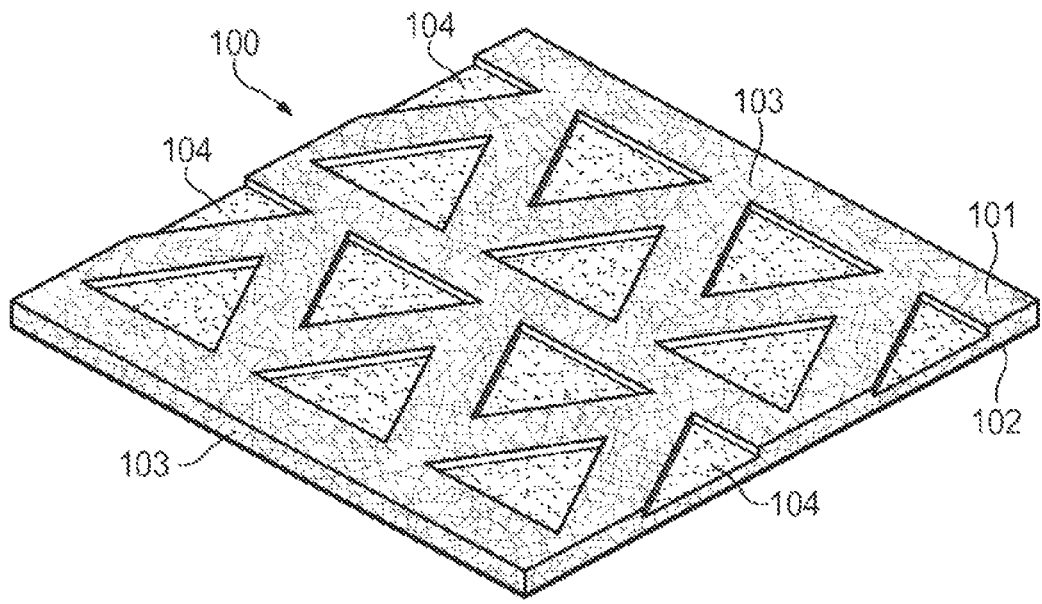
Figure 5E:
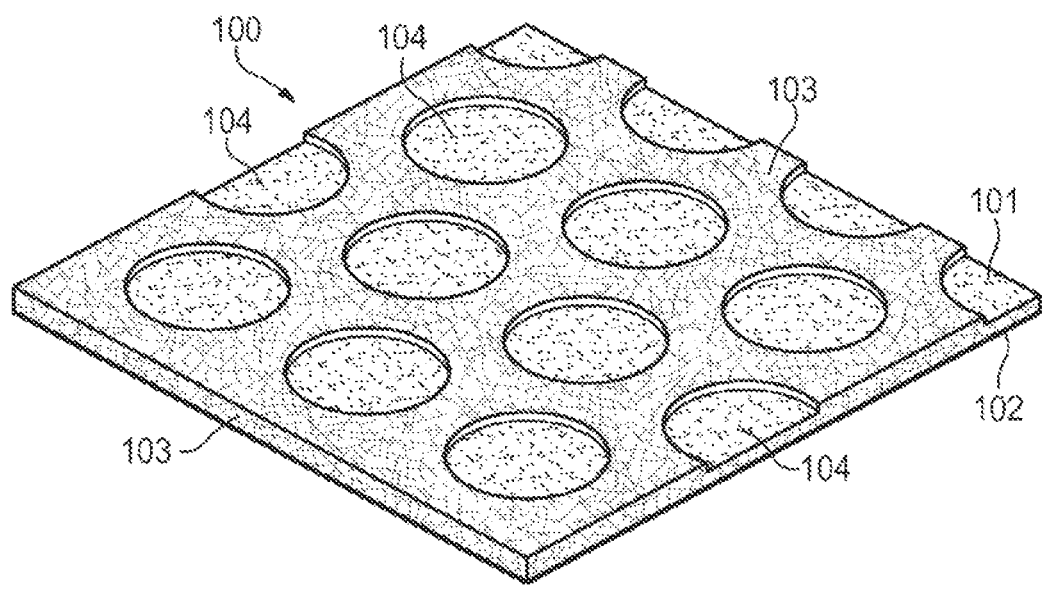
Figure 5F:
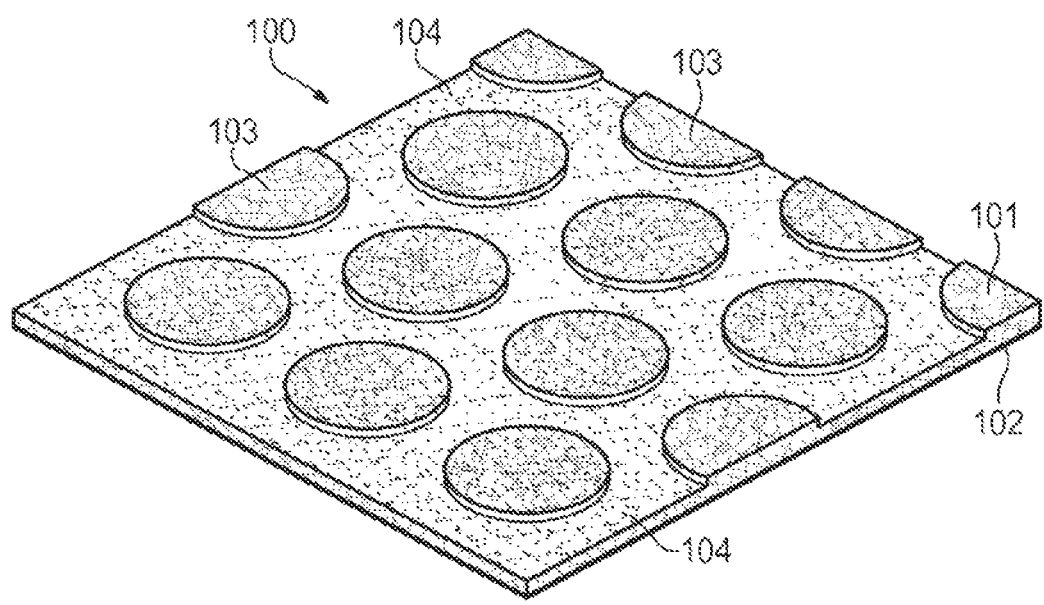
Figure 5G:
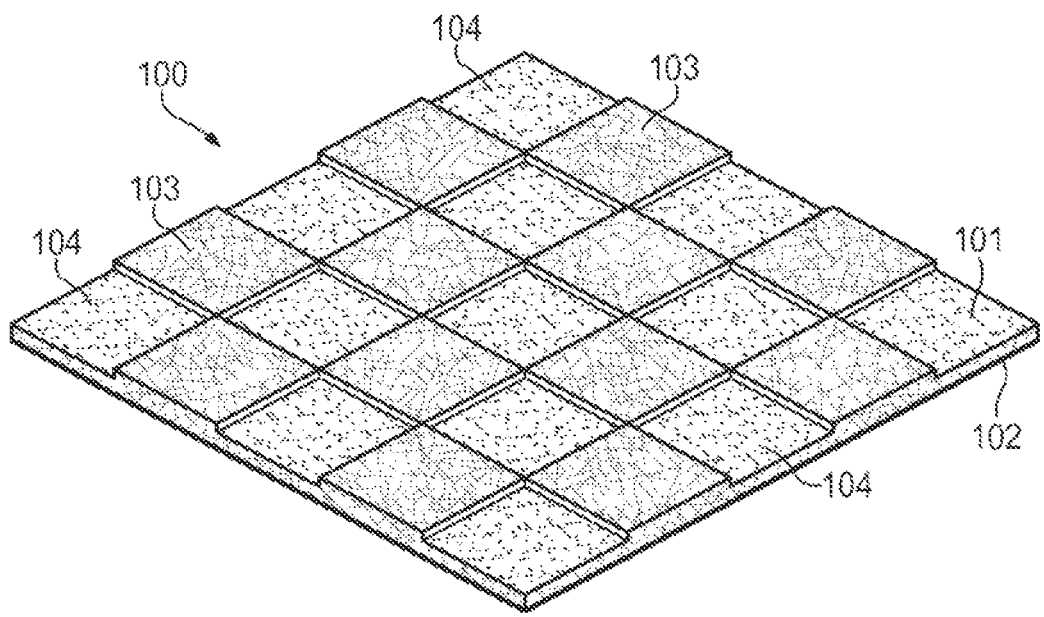
Figure 5H:
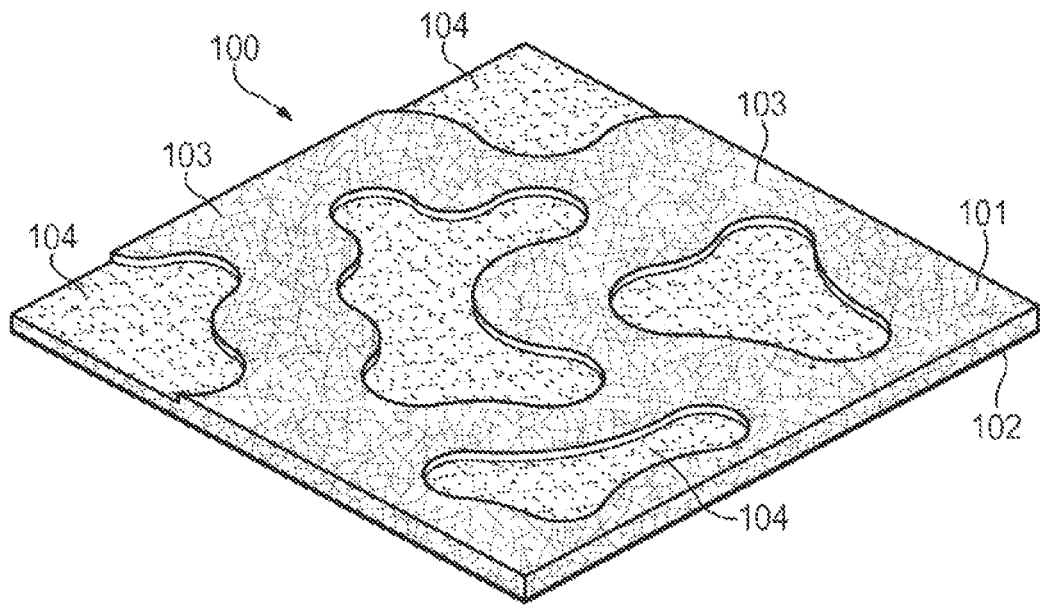

The configuration of fused regions 104 in FIG. 3 is intended to provide an example of the manner in which the shapes, positions, sizes, and other aspects of fused regions 104 may vary. The configuration of fused regions 104 may however, vary significantly. Referring to FIG. 5A, non-woven textile 100 includes a plurality of fused regions 104 with generally linear and parallel configurations. Similarly, FIG. 5B depicts non-woven textile 100 as including a plurality of fused regions 104 with generally curved and parallel configurations. Fused regions 104 may have a segmented configuration, as depicted in FIG. 5C. Non-woven textile 100 may also have a plurality of fused regions 104 that exhibit the configuration of a repeating pattern of triangular shapes, as in FIG. 5D, the configuration of a repeating pattern of circular shapes, as in FIG. 5E, or a repeating pattern of any other shape or a variety of shapes. In some configurations of non-woven textile 100, as depicted in FIG. 5F, one fused region 104 may form a continuous area that defines discrete areas for the remainder of non-woven textile 100. Fused regions 104 may also have a configuration wherein edges or corners contact each other, as in the checkered pattern of FIG. 5G. Additionally, the shapes of the various fused regions 104 may have a non-geometrical or irregular shape, as in FIG. 5H. Accordingly, the shapes, positions, sizes, and other aspects of fused regions 104 may vary significantly.

Figure 6A:
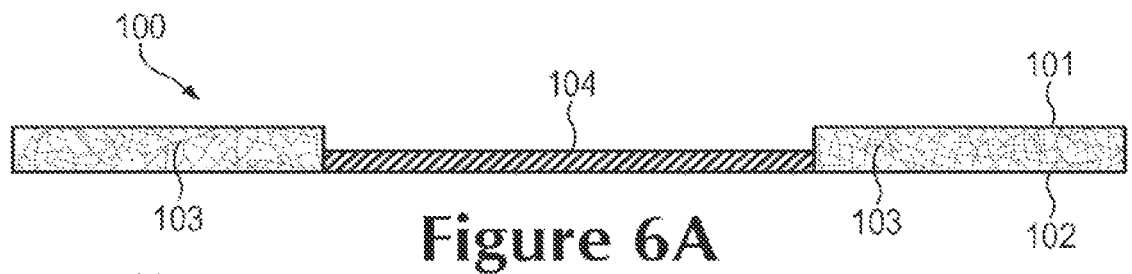
FIGS. 6A-6F are cross-sectional views corresponding with FIGS. 4A-4C and depicting further configurations of the fused regions in the non-woven textile.
Figure 6B:
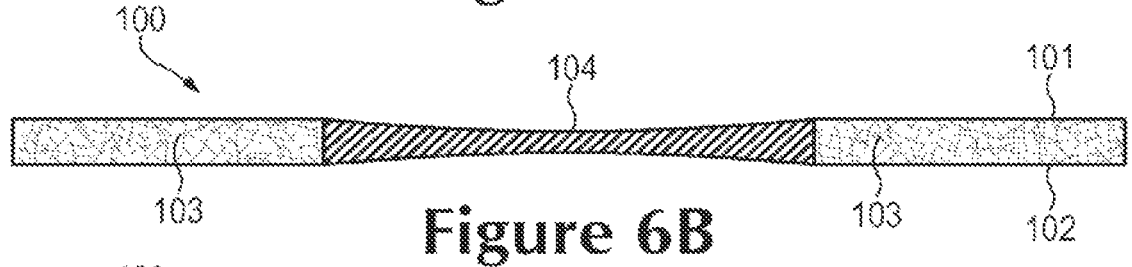
Figure 6C:
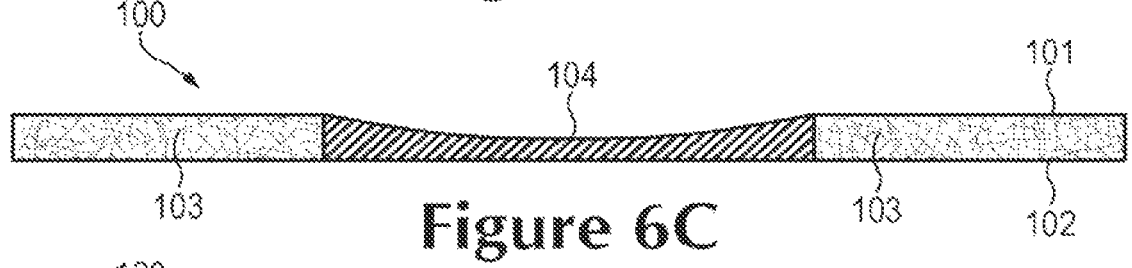
Figure 6D:
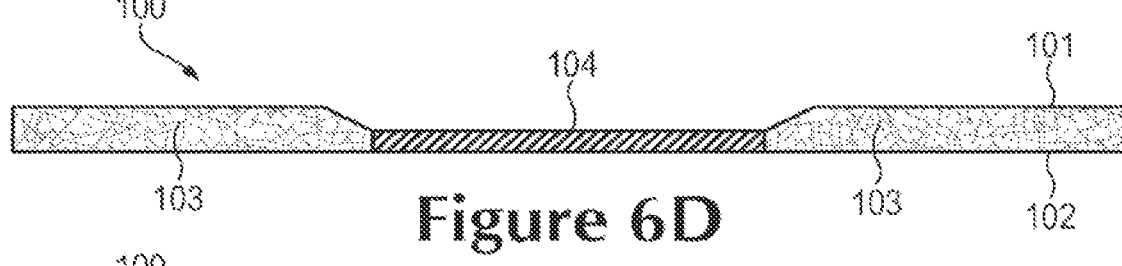
Figure 6E:
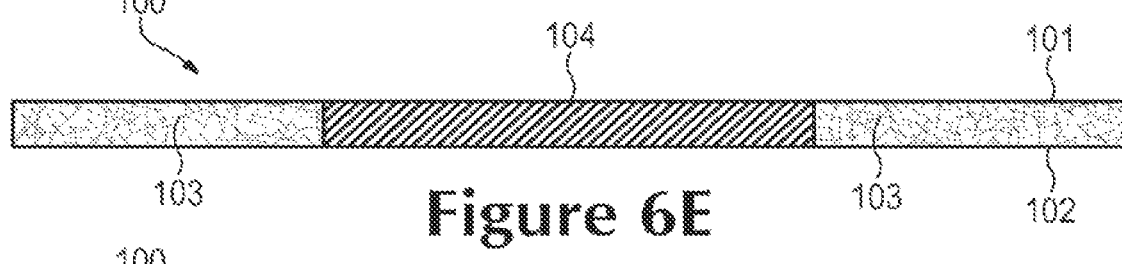
Figure 6F:
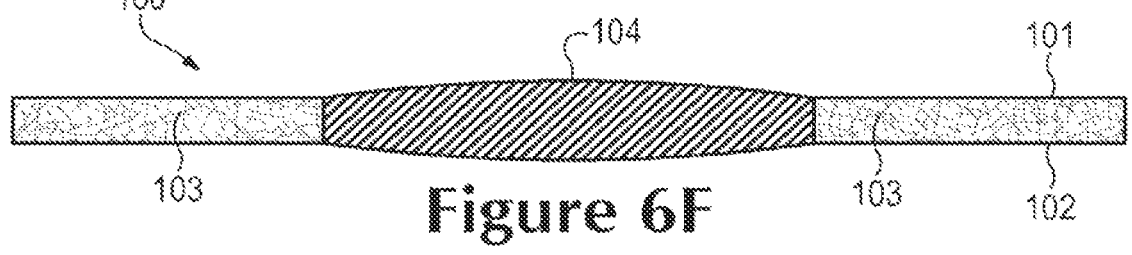

The thickness of non-woven textile 100 may decrease in fused regions 104. Referring to FIGS. 4A-4C, for example, non-woven textile 100 exhibits less thickness in fused region 104 than in other areas. As discussed above, fused regions 104 are areas where filaments 103 are generally fused to a greater degree than filaments 103 in other areas of non-woven textile 100. Additionally, non-woven textile 100 or the portions of non-woven textile 100 forming fused regions 104 may be compressed while forming fused regions 104. As a result, the thickness of fused regions 104 may be decreased in comparison with other areas of non-woven textile 100. Referring again to FIGS. 4A-4C, surfaces 102 and 103 both exhibit a squared or abrupt transition between fused regions 104 and other areas of non-woven textile 100. Depending upon the manner in which fused regions 104 are formed, however, surfaces 102 and 103 may exhibit other configurations. As an example, only first surface 101 has a squared transition to fused regions 104 in FIG. 6A. Although the decrease in thickness of fused regions 104 may occur through a squared or abrupt transition, a curved or more gradual transition may also be utilized, as depicted in FIGS. 6B and 6C. In other configurations, an angled transition between fused regions 104 and other areas of non-woven textile 100 may be formed, as in FIG. 6D. Although a decrease in thickness often occurs in fused regions 104, no decrease in thickness or a minimal decrease in thickness is also possible, as depicted in FIG. 6E. Depending upon the materials utilized in non-woven textile 100 and the manner in which fused regions 104 are formed, fused regions 104 may actually swell or otherwise increase in thickness, as depicted in FIG. 6F. In each of FIGS. 6A-6F, fused regions 104 are depicted as having a non-filamentous configuration, but may also have the filamentous configuration or the intermediate configuration discussed above.

Based upon the above discussion, non-woven textile 100 is formed from a plurality of filaments 103 that include a thermoplastic polymer material. Although filaments 103 are bonded, fused, interlocked, or otherwise joined throughout non-woven textile 100, fused regions 104 are areas where filaments 103 are generally fused to a greater degree than filaments 103 in other areas of non-woven textile 100. The shapes, positions, sizes, and other aspects of fused regions 104 may vary significantly. In addition, the degree to which filaments 103 are fused may also vary significantly to be filamentous, non-filamentous, or any combination or proportion of filamentous and non-filamentous.

III—Properties of Fused Regions

The properties of fused regions 104 may be different than the properties of other regions of non-woven textile 100. Additionally, the properties of one of fused regions 104 may be different than the properties of another of fused regions 104. In manufacturing non-woven textile 100 and forming fused regions 104, specific properties may be applied to the various areas of non-woven textile 100. More particularly, the shapes of fused regions 104, positions of fused regions 104, sizes of fused regions 104, degree to which filaments 103 are fused within fused regions 104, and other aspects of non-woven textile 100 may be varied to impart specific properties to specific areas of non-woven textile 100. Accordingly, non-woven textile 100 may be engineered, designed, or otherwise structured to have particular properties in different areas.

Examples of properties that may be varied through the addition or the configuration of fused regions 104 include permeability, durability, and stretch-resistance. By forming one of fused regions 104 in a particular area of non-woven textile 100, the permeability of that area generally decreases, whereas both durability and stretch-resistance generally increases. As discussed in greater detail below, the degree to which filaments 103 are fused to each other has a significant effect upon the change in permeability, durability, and stretch-resistance. Other factors that may affect permeability, durability, and stretch-resistance include the shapes, positions, and sizes of fused regions 104, as well as the specific thermoplastic polymer material forming filaments 103.

Permeability generally relates to ability of air, water, and other fluids (whether gaseous or liquid) to pass through or otherwise permeate non-woven textile 100. Depending upon the degree to which filaments 103 are fused to each other, the permeability may vary significantly. In general, the permeability is highest in areas of non-woven textile 100 where filaments 103 are fused the least, and the permeability is lowest in areas of non-woven textile 100 where filaments 103 are fused the most. As such, the permeability may vary along a spectrum depending upon the degree to which filaments 103 are fused to each other. Areas of non-woven textile 100 that are separate from fused regions 104 (i.e., non-fused areas of non-woven textile 100) generally exhibit a relatively high permeability. Fused regions 104 where a majority of filaments 103 remain in the filamentous configuration also exhibit a relatively high permeability, but the permeability is generally less than in areas separate from fused regions 104. Fused regions 104 where filaments 103 are in both a filamentous and non-filamentous configuration have a lesser permeability. Finally, areas where a majority or all of the thermoplastic polymer material from filaments 103 exhibits a non-filamentous configuration may have a relatively small permeability or even no permeability.

Durability generally relates to the ability of non-woven textile 100 to remain intact, cohesive, or otherwise undamaged, and may include resistances to wear, abrasion, and degradation from chemicals and light. Depending upon the degree to which filaments 103 are fused to each other, the durability may vary significantly. In general, the durability is lowest in areas of non-woven textile 100 where filaments 103 are fused the least, and the durability is highest in areas of non-woven textile 100 where filaments 103 are fused the most. As such, the durability may vary along a spectrum depending upon the degree to which filaments 103 are fused to each other. Areas of non-woven textile 100 that are separate from fused regions 104 generally exhibit a relatively low durability. Fused regions 104 where a majority of filaments 103 remain in the filamentous configuration also exhibit a relatively low durability, but the durability is generally more than in areas separate from fused regions 104. Fused regions 104 where filaments 103 are in both a filamentous and non-filamentous configuration have a greater durability. Finally, areas where a majority or all of the thermoplastic polymer material from filaments 103 exhibits a non-filamentous configuration may have a relatively high durability. Other factors that may affect the general durability of fused regions 104 and other areas of non-woven textile 100 include the initial thickness and density of non-woven textile 100, the type of polymer material forming filaments 103, and the hardness of the polymer material forming filaments 103.

Stretch-resistance generally relates to the ability of non-woven textile 100 to resist stretching when subjected to a textile force. As with permeability and durability, the stretch-resistance of non-woven textile 100 may vary significantly depending upon the degree to which filaments 103 are fused to each other. As with durability, the stretch-resistance is lowest in areas of non-woven textile 100 where filaments 103 are fused the least, and the stretch-resistance is highest in areas of non-woven textile 100 where filaments 103 are fused the most. As noted above, the thermoplastic polymer material or other materials utilized for non-woven textile 100 (i.e., filaments 103) may be considered elastomeric or may stretch at least one-hundred percent prior to tensile failure. Although the stretch-resistance of non-woven textile 100 may be greater in areas of non-woven textile 100 where filaments 103 are fused the most, fused regions 104 may still be elastomeric or may stretch at least one-hundred percent prior to tensile failure. Other factors that may affect the general stretch properties of fused regions 104 and other areas of non-woven textile 100 include the initial thickness and density of non-woven textile 100, the type of polymer material forming filaments 103, and the hardness of the polymer material forming filaments 103.

As discussed in greater detail below, non-woven textile 100 may be incorporated into a variety of products, including various articles of apparel (e.g., shirts, pants, footwear). Taking a shirt as an example, non-woven textile 100 may form a majority of the shirt, including a torso region and two arm regions. Given that moisture may accumulate within the shirt from perspiration, a majority of the shirt may be formed from portions of non-woven textile 100 that do not include fused regions 104 in order to provide a relatively high permeability. Given that elbow areas of the shirt may be subjected to relatively high abrasion as the shirt is worn, some of fused regions 104 may be located in the elbow areas to impart greater durability. Additionally, given that the neck opening may be stretched as the shirt is put on an individual and taken off the individual, one of fused regions 104 may be located around the neck opening to impart greater stretch-resistance. Accordingly, one material (i.e., non-woven textile 100) may be used throughout the shirt, but by fusing different areas to different degrees, the properties may be advantageously-varied in different areas of the shirt.

The above discussion focused primarily on the properties of permeability, durability, and stretch-resistance. A variety of other properties may also be varied through the addition or the configuration of fused regions 104. For example, the overall density of non-woven textile 100 may be increased as the degree of fusing of filaments 103 increases. The transparency of non-woven textile 100 may also be increased as the degree of fusing of filaments 103 increases. Depending upon various factors, the darkness of a color of non-woven textile 100 may also increase as the degree of fusing of filaments 103 increases. Although somewhat discussed above, the overall thickness of non-woven textile 100 may decrease as the degree of fusing of filaments 103 increases. The degree to which non-woven textile 100 recovers after being stretched, the overall flexibility of non-woven textile 100, and resistance to various modes of failure may also vary depending upon the degree of fusing of filaments 100. Accordingly, a variety of properties may be varied by forming fused regions 104.

IV—Formation of Fused Regions

Figure 7A:
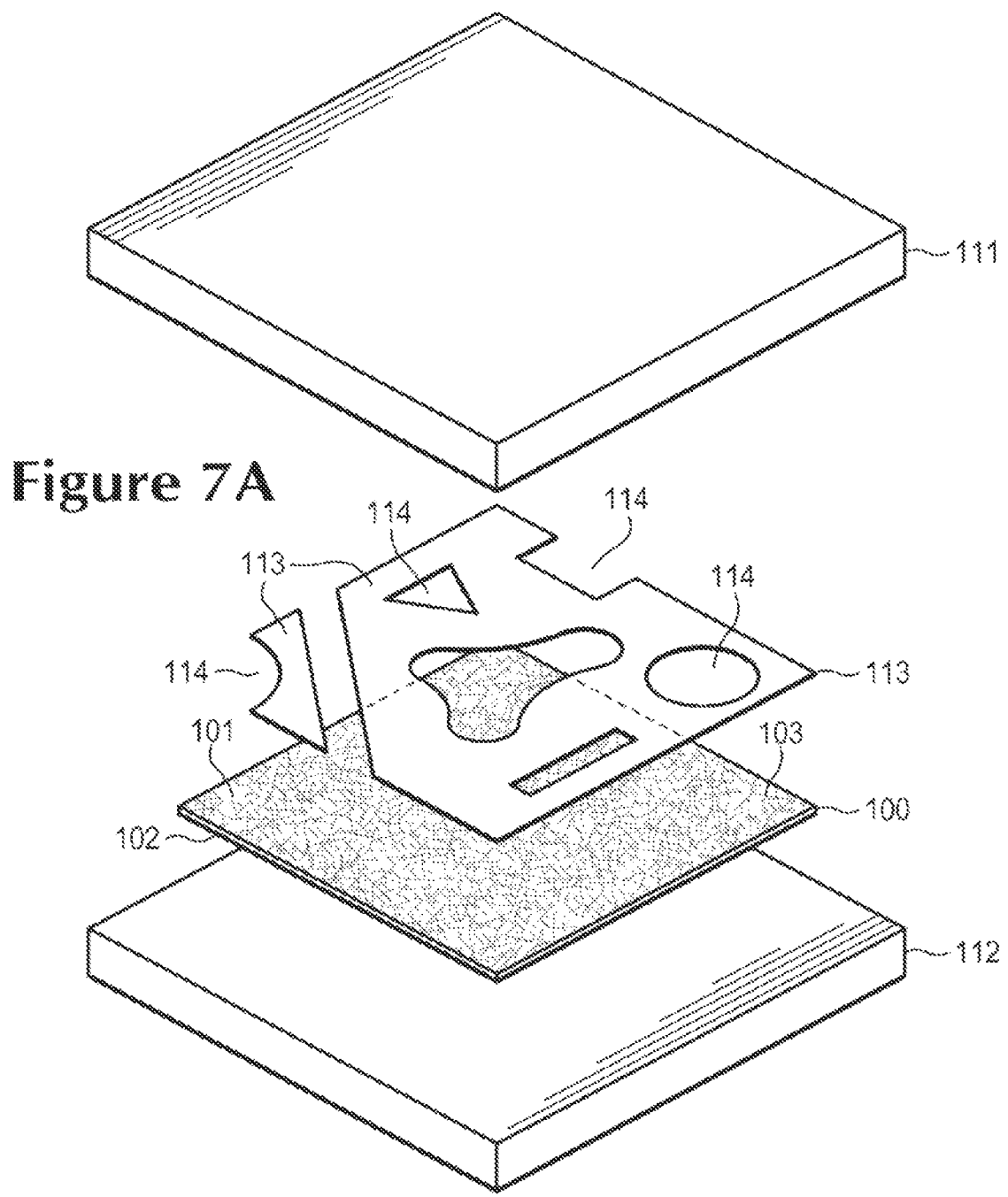
Figure 7B:
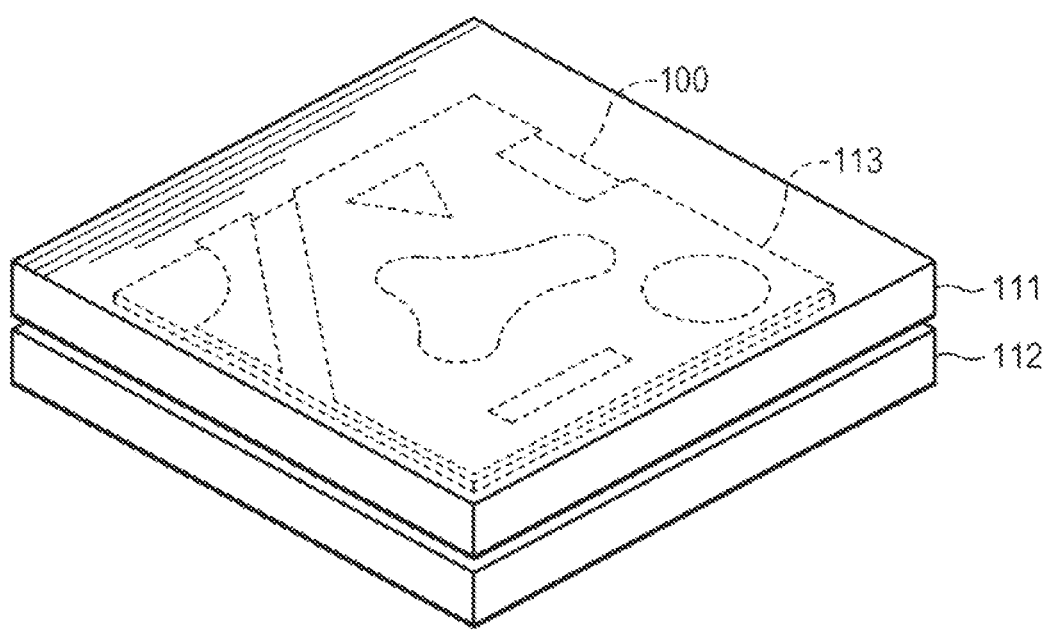

A variety of processes may be utilized to form fused regions 104. Referring to FIGS. 7A-7C, an example of a method is depicted as involving a first plate 111 and a second plate 112, which may be platens of a press. Initially, non-woven textile 100 and an insulating element 113 are located between plates 111 and 112, as depicted in FIG. 7A. Insulating element 113 has apertures 114 or other absent areas that correspond with fused regions 104. That is, insulating element 113 exposes areas of non-woven textile 100 corresponding with fused regions 104, while covering other areas of non-woven textile 100.

Plates 111 and 112 then translate or otherwise move toward each other in order to compress or induce contact between non-woven textile 100 and insulating element 113, as depicted in FIG. 7B. In order to form fused regions 104, heat is applied to areas of non-woven textile 100 corresponding with fused regions 104, but a lesser heat or no heat is applied to other areas of non-woven textile 100 due to the presence of insulating element 113. That is, the temperature of the various areas of non-woven textile 100 corresponding with fused regions 104 is elevated without significantly elevating the temperature of other areas. In this example method, first plate 111 is heated so as to elevate the temperature of non-woven textile 100 through conduction. Some areas of non-woven textile 100 are insulated, however, by the presence of insulating element 113. Only the areas of non-woven textile 100 that are exposed through apertures 114 are, therefore, exposed to the heat so as to soften or melt the thermoplastic polymer material within filaments 103. The material utilized for insulating element 113 may vary to include metal plates, paper sheets, polymer layers, foam layers, or a variety of other materials (e.g., with low thermal conductivity) that will limit the heat transferred to non-woven textile 100 from first plate 111. In some processes, insulating element 113 may be an integral portion of or otherwise incorporated into first plate 111.

Upon separating plates 111 and 112, as depicted in FIG. 7C, non-woven textile 100 and insulating element 113 are separated from each other. Whereas areas of non-woven textile 100 that were exposed by apertures 114 in insulating element 113 form fused regions 104, areas covered or otherwise protected by insulating element 113 remain substantially unaffected. In some methods, insulating element 113 may be structured to allow some of fused regions 104 to experience greater temperatures than other fused regions 104, thereby fusing the thermoplastic polymer material of filaments 103 more in some of fused regions 104 than in the other fused regions 104. That is, the configuration of insulating element 113 may be structured to heat fused regions 104 to different temperatures in order to impart different properties to the various fused regions 104.

Various methods may be utilized to apply heat to specific areas of non-woven textile 100 and form fused regions 104. As noted above, first plate 111 may be heated so as to elevate the temperature of non-woven textile 100 through conduction. In some processes, both plates 111 and 112 may be heated, and two insulating elements 113 may be located on opposite sides of non-woven textile 100. Although heat may be applied through conduction, radio frequency heating may also be used, in which case insulating element 113 may prevent the passage of specific wavelengths of electromagnetic radiation. In processes where chemical heating is utilized, insulating element 113 may prevent chemicals from contacting areas of non-woven textile 100. In other processes where radiant heat is utilized, insulating element 113 may be a reflective material (i.e., metal foil) that prevents the radiant heat from raising the temperature of various areas of non-woven textile 100. A similar process involving a conducting element may also be utilized. More particularly, the conducting element may be used to conduct heat directly to fused regions 104. Whereas insulating element 113 is absent in areas corresponding with fused regions 104, the conducting element would be present in fused regions 104 to conduct heat to those areas of non-woven textile 100.

Figure 8A:
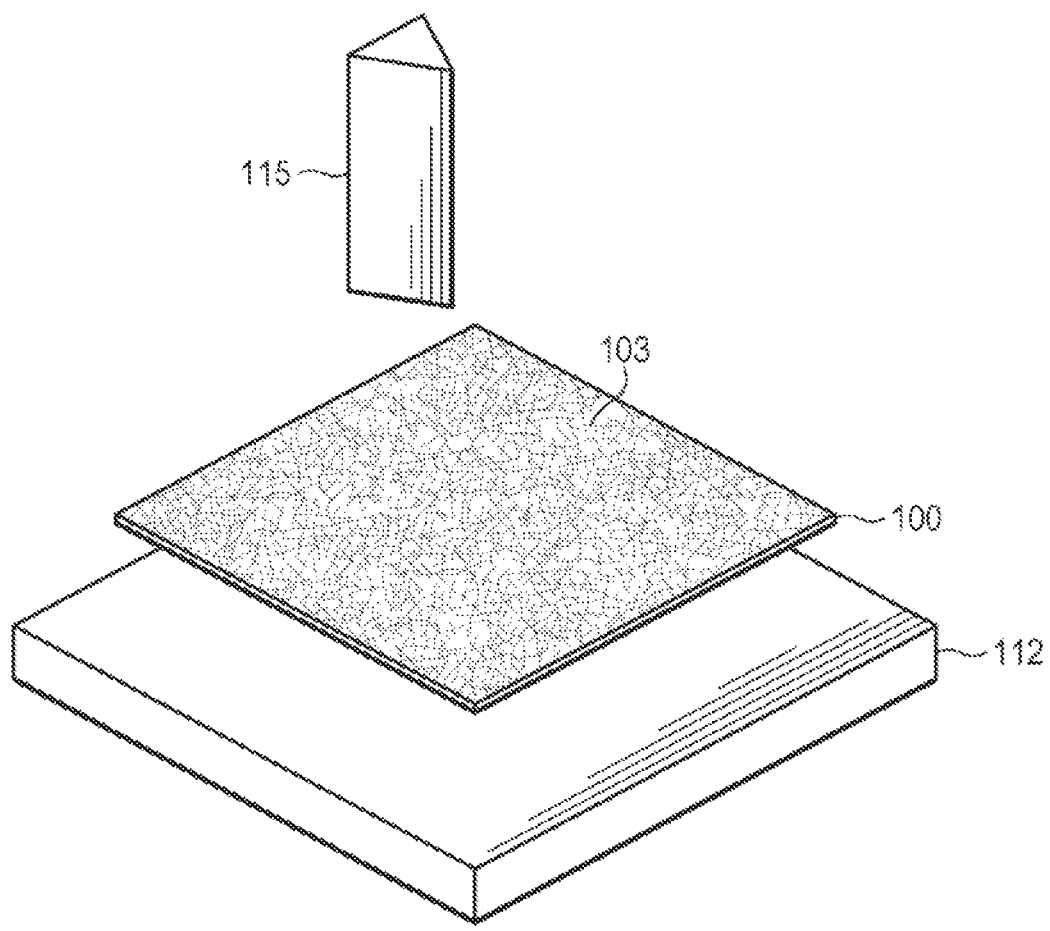
FIGS. 8A-8C are perspective views of a second process for forming the fused regions in the non-woven textile.
Figure 8B:
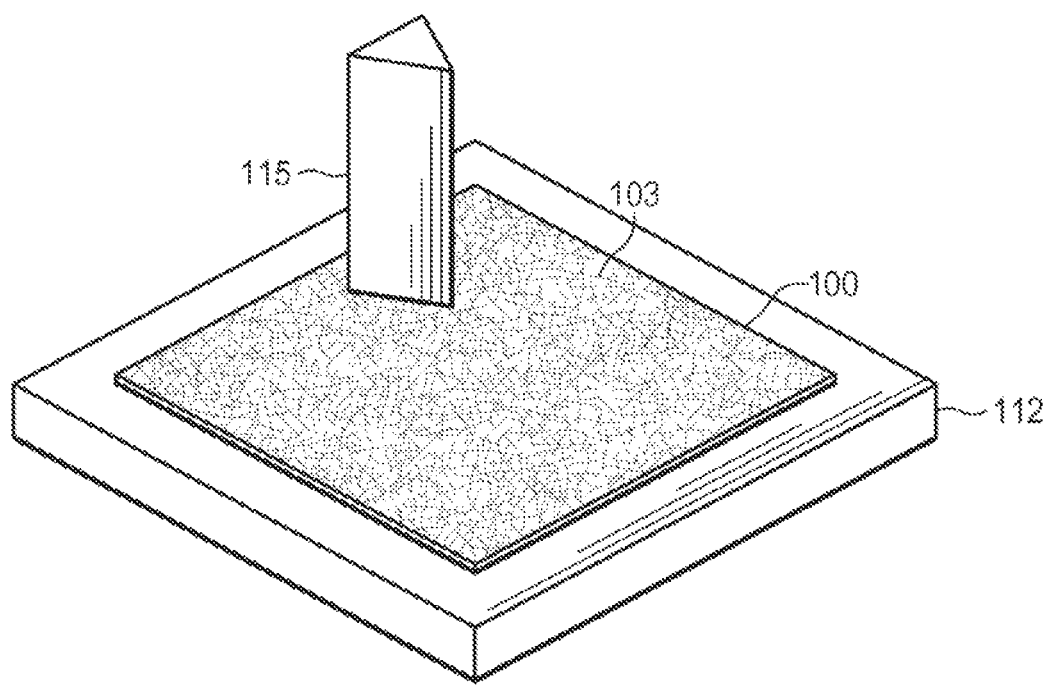
Figure 8C:
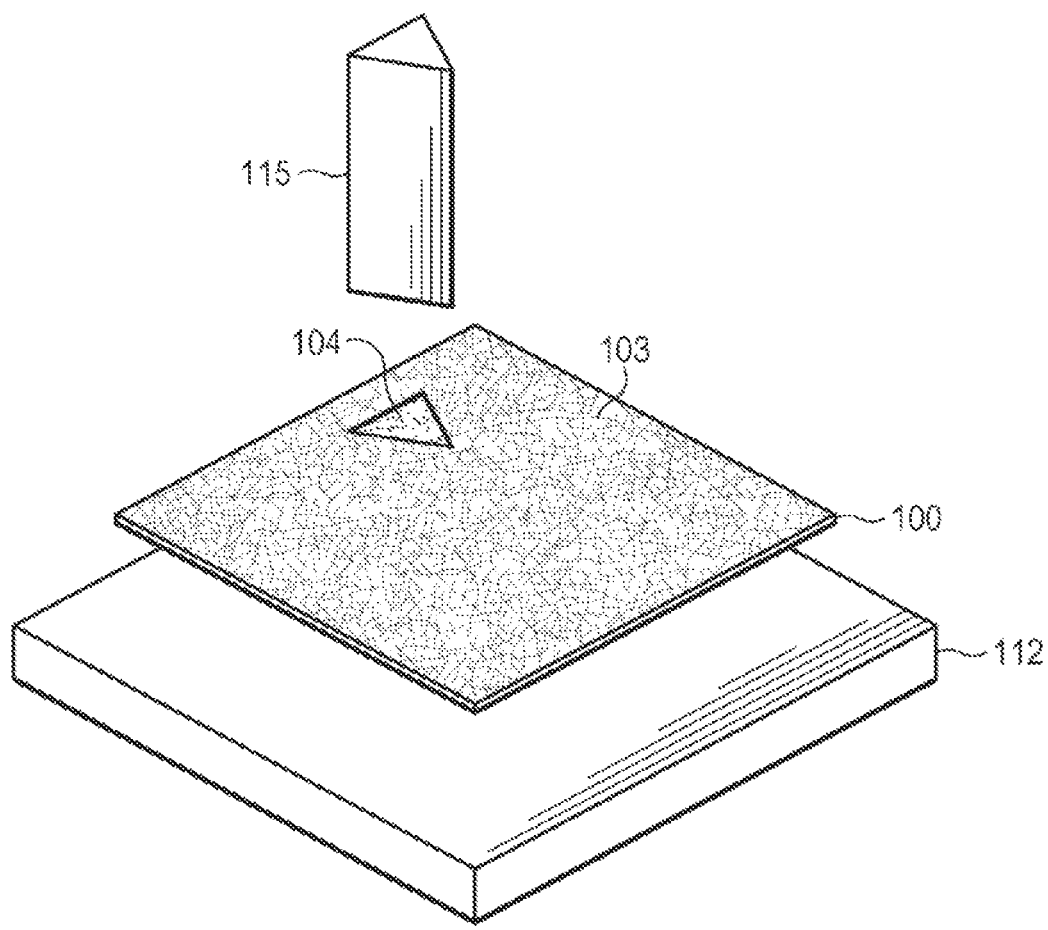

An example of another process that may be utilized to form fused regions 104 in non-woven textile 100 is depicted in FIGS. 8A-8C. Initially, non-woven textile 100 is placed adjacent to or upon second plate 112 or another surface, as depicted in FIG. 8A. A heated die 115 having the shape of one of fused regions 104 then contacts and compresses non-woven textile 100, as depicted in FIG. 8B, to heat a defined area of non-woven textile 100. Upon removal of die 115, one of fused regions 104 is exposed. Additional dies having the general shapes of other fused regions 104 may be utilized to form the remaining fused regions 104 in a similar manner. An advantage to this process is that die 115 and each of the other dies may be heated to different temperatures, held in contact with non-woven textile 100 for different periods of time, and compressed against non-woven textile 100 with different forces, thereby varying the resulting properties of the various fused regions 104.

Figure 9:
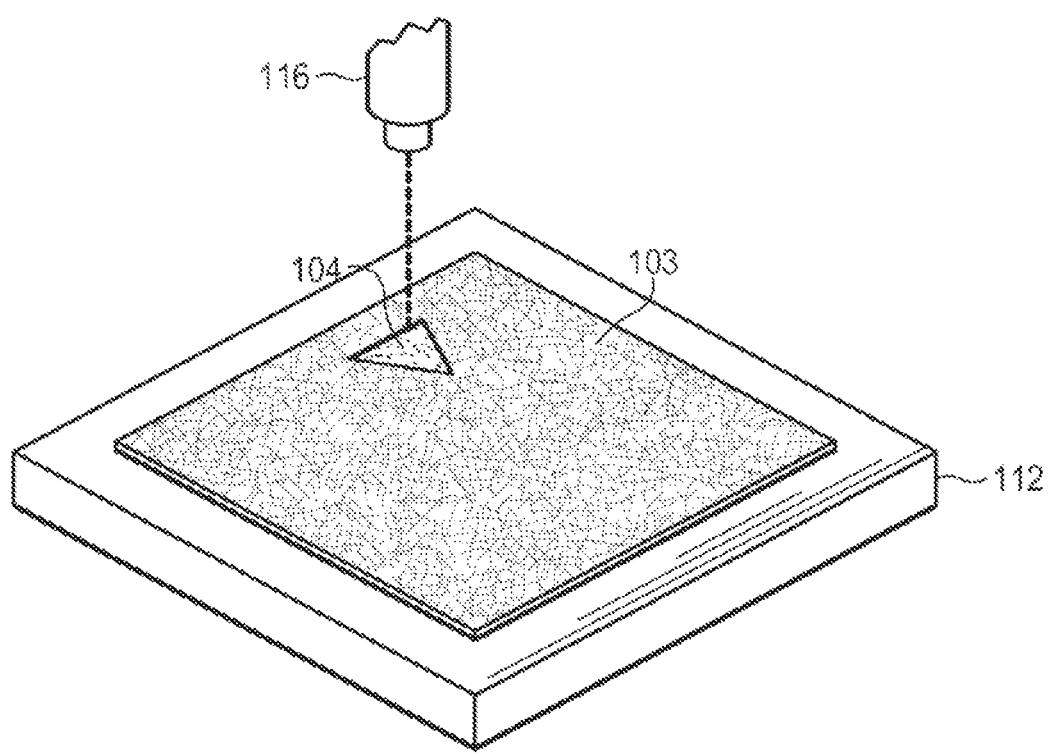
FIG. 9 is a perspective view of a third process for forming the fused regions in the non-woven textile.

An example of yet another process that may be utilized to form fused regions 104 in non-woven textile 100 is depicted in FIG. 9. In this process, non-woven textile 100 is placed upon second plate 112 or another surface, and a laser apparatus 116 is utilized to heat specific areas of non-woven textile 100, thereby fusing the thermoplastic polymer material of filaments 103 and forming fused regions 104. By adjusting any or all of the power, focus, or velocity of laser apparatus 116, the degree to which fused regions 104 are heated may be adjusted or otherwise varied. Moreover, different fused regions 104 may be heated to different temperatures to modify the degree to which filaments 103 are fused, thereby varying the resulting properties of the various fused regions 104. An example of a suitable laser apparatus 116 is any of a variety of conventional $CO_2$ or Nd:YAG laser apparatuses.

V—Composite Elements

Figure 10:
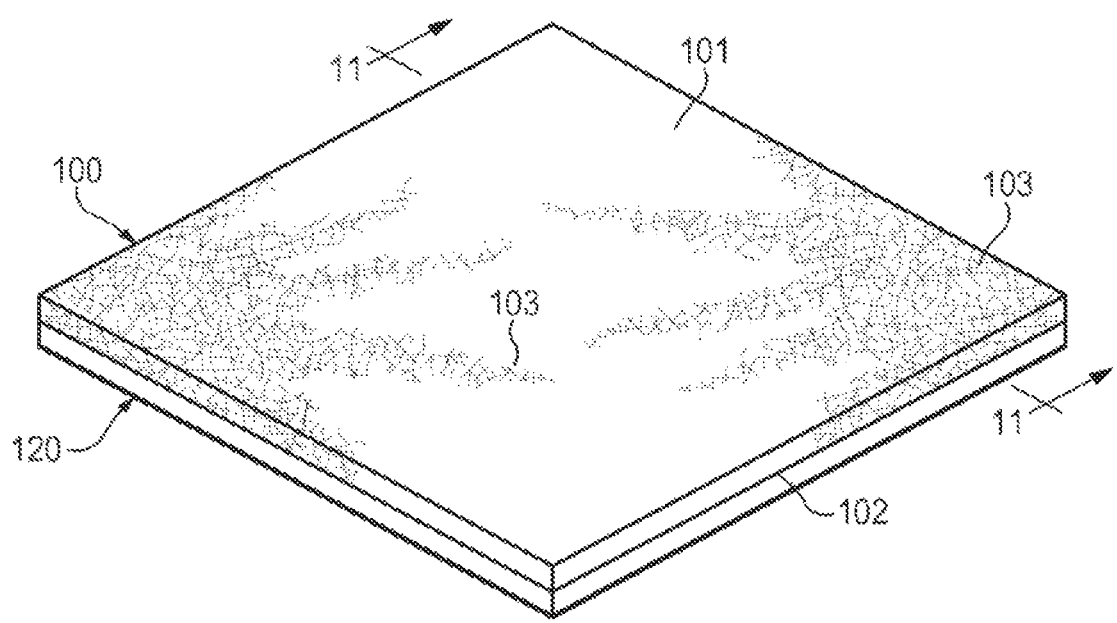
FIG. 10 is a perspective view of a first composite element that includes the non-woven textile.
Figure 11:
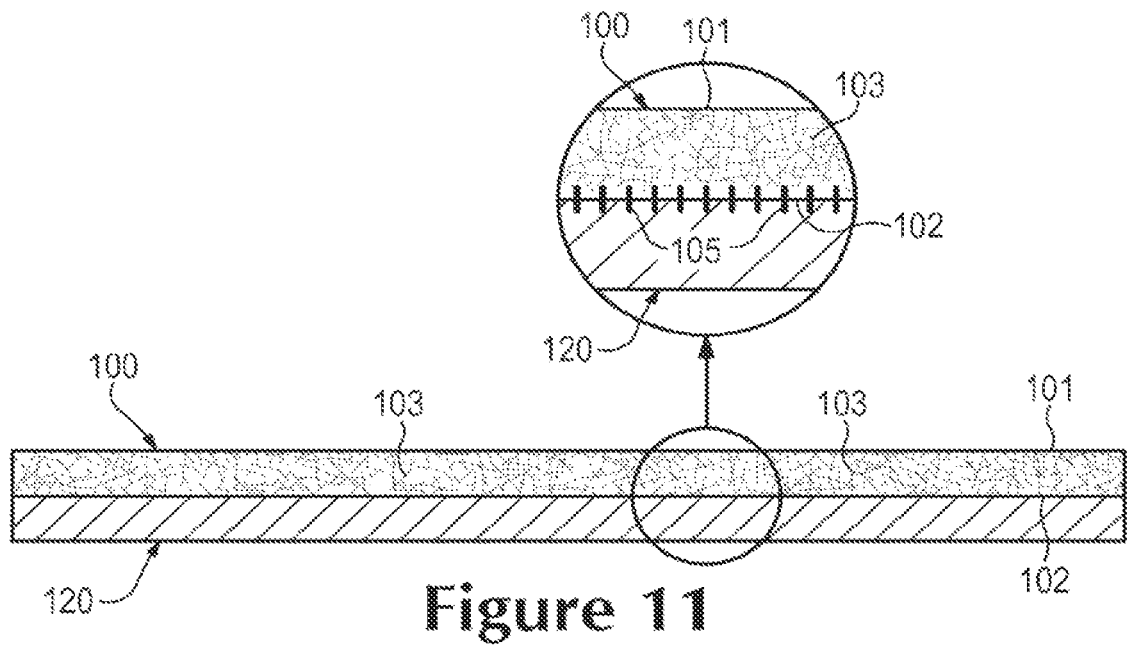
FIG. 11 is a cross-sectional view of the first composite element, as defined by section line 11-11 in FIG. 10.

Non-woven textile 100 may be joined with various textiles, materials, or other components to form composite elements. By joining non-woven textile 100 with other components, properties of both non-woven textile 100 and the other components are combined in the composite elements. An example of a composite element is depicted in FIGS. 10 and 11, in which a component 120 is joined to non-woven textile 100 at second surface 102. Although component 120 is depicted as having dimensions that are similar to dimensions of non-woven textile 100, component 120 may have a lesser or greater length, a lesser or greater width, or a lesser or greater thickness. If, for example, component 120 is a textile that absorbs water or wicks water away, then the combination of non-woven textile 100 and component 120 may be suitable for articles of apparel utilized during athletic activities where an individual wearing the apparel is likely to perspire. As another example, if component 120 is a compressible material, such as a polymer foam, then the combination of non-woven textile 100 and component 120 may be suitable for articles of apparel where cushioning (i.e., attenuation of impact forces) is advantageous, such as padding for athletic activities that may involve contact or impact with other athletes or equipment. As a further example, if component 120 is a plate or sheet, then the combination of non-woven textile 100 and component 120 may be suitable for articles of apparel that impart protection from acute impacts. Accordingly, a variety of textiles, materials, or other components may be joined with a surface of non-woven textile 100 to form composite elements with additional properties.

The thermoplastic polymer material in filaments 103 may be utilized to secure non-woven textile 100 to component 120 or other components. As discussed above, a thermoplastic polymer material melts when heated and returns to a solid state when cooled sufficiently. Based upon this property of thermoplastic polymer materials, heatbonding processes may be utilized to form a heatbond that joins portions of composite elements, such as non-woven textile 100 and component 120. As utilized herein, the term "heatbonding" or variants thereof is defined as a securing technique between two elements that involves a softening or melting of a thermoplastic polymer material within at least one of the elements such that the materials of the elements are secured to each other when cooled. Similarly, the term "heatbond" or variants thereof is defined as the bond, link, or structure that joins two elements through a process that involves a softening or melting of a thermoplastic polymer material within at least one of the elements such that the materials of the elements are secured to each other when cooled. As examples, heatbonding may involve (a) the melting or softening of two elements incorporating thermoplastic polymer materials such that the thermoplastic polymer materials intermingle with each other (e.g., diffuse across a boundary layer between the thermoplastic polymer materials) and are secured together when cooled; (b) the melting or softening of a first textile element incorporating a thermoplastic polymer material such that the thermoplastic polymer material extends into or infiltrates the structure of a second textile element (e.g., extends around or bonds with filaments or fibers in the second textile element) to secure the textile elements together when cooled; and (c) the melting or softening of a textile element incorporating a thermoplastic polymer material such that the thermoplastic polymer material extends into or infiltrates crevices or cavities formed in another element (e.g., polymer foam or sheet, plate, structural device) to secure the elements together when cooled. Heatbonding may occur when only one element includes a thermoplastic polymer material or when both elements include thermoplastic polymer materials. Additionally, heatbonding does not generally involve the use of stitching or adhesives, but involves directly bonding elements to each other with heat. In some situations, however, stitching or adhesives may be utilized to supplement the heatbond or the joining of elements through heatbonding. A needlepunching process may also be utilized to join the elements or supplement the heatbond.

Although a heatbonding process may be utilized to form a heatbond that joins non-woven textile 100 and component 120, the configuration of the heatbond at least partially depends upon the materials and structure of component 120. As a first example, if component 120 is at least partially formed from a thermoplastic polymer material, then the thermoplastic polymer materials of non-woven textile 100 and component 120 may intermingle with each other to secure non-woven textile 100 and component 120 together when cooled. If, however, the thermoplastic polymer material of component 120 has a melting point that is significantly higher than the thermoplastic polymer material of non-woven textile 100, then the thermoplastic polymer material of non-woven textile 100 may extend into the structure, crevices, or cavities of component 120 to secure the elements together when cooled. As a second example, component 120 may be formed from a textile that does not include a thermoplastic polymer material, and the thermoplastic polymer material of non-woven textile 100 may extend around or bond with filaments in component 120 to secure the textile elements together when cooled. As a third example, component 120 may be a polymer foam material, polymer sheet, or plate that includes a thermoplastic polymer material, and the thermoplastic polymer materials of non-woven textile 100 and component 120 may intermingle with each other to secure non-woven textile 100 and component 120 together when cooled. As a fourth example, component 120 may be a polymer foam material, polymer sheet, or plate that does not include a thermoplastic polymer material, and the thermoplastic polymer material of non-woven textile 100 may extend into or infiltrate crevices or cavities within component 120 to secure the elements together when cooled. Referring to FIG. 11, a plurality of heatbond elements 105 (e.g., the thermoplastic polymer material from one or both of non-woven textile 100 and component 120) are depicted as extending between non-woven textile 100 and component 120 to join the elements together. Accordingly, a heatbond may be utilized to join non-woven textile 100 and component 120 even when component 120 is formed from a diverse range of materials or has one of a variety of structures.

Figure 12A:
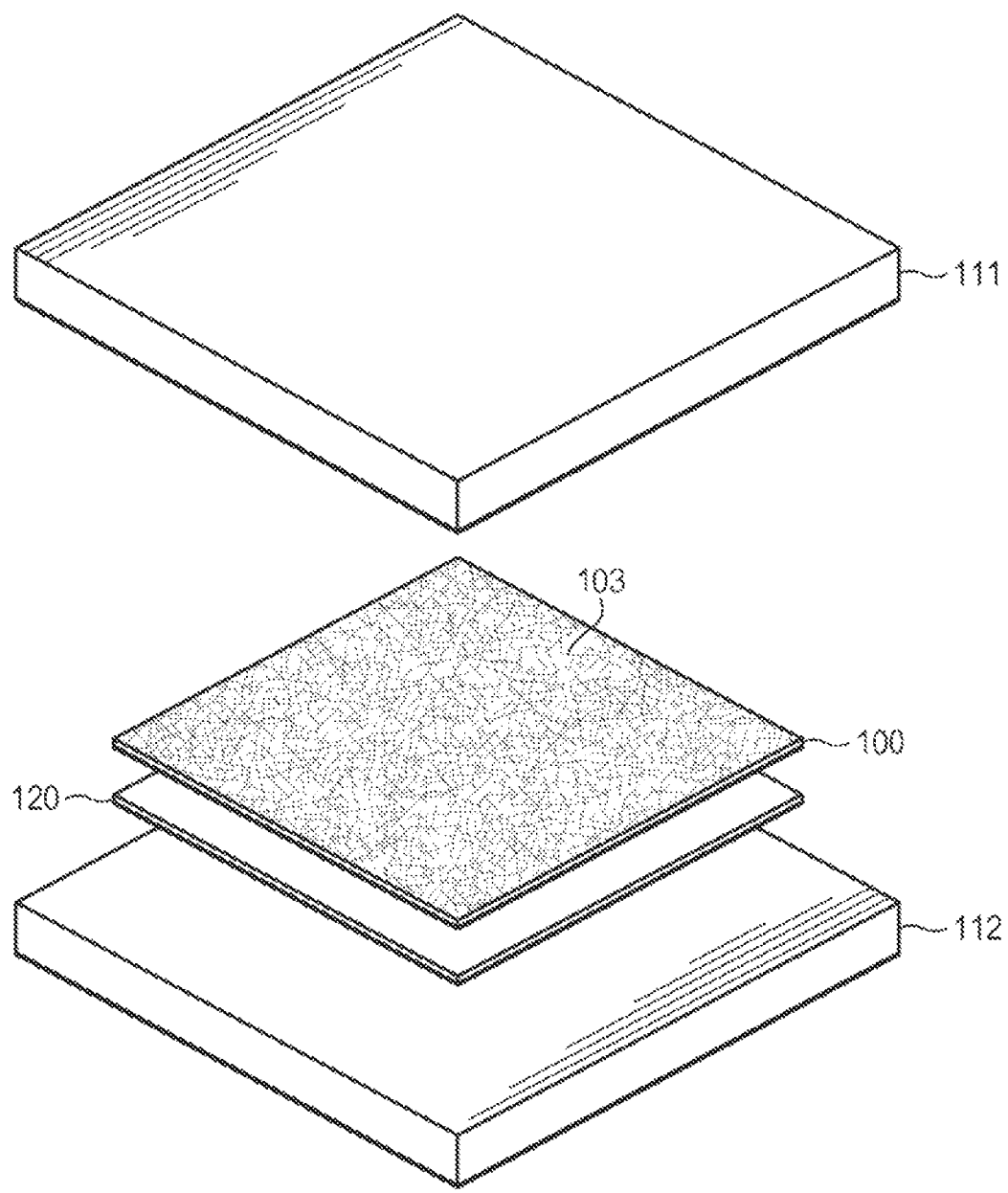
FIGS. 12A-12C are perspective views of a process for forming the first composite element.
Figure 12B:
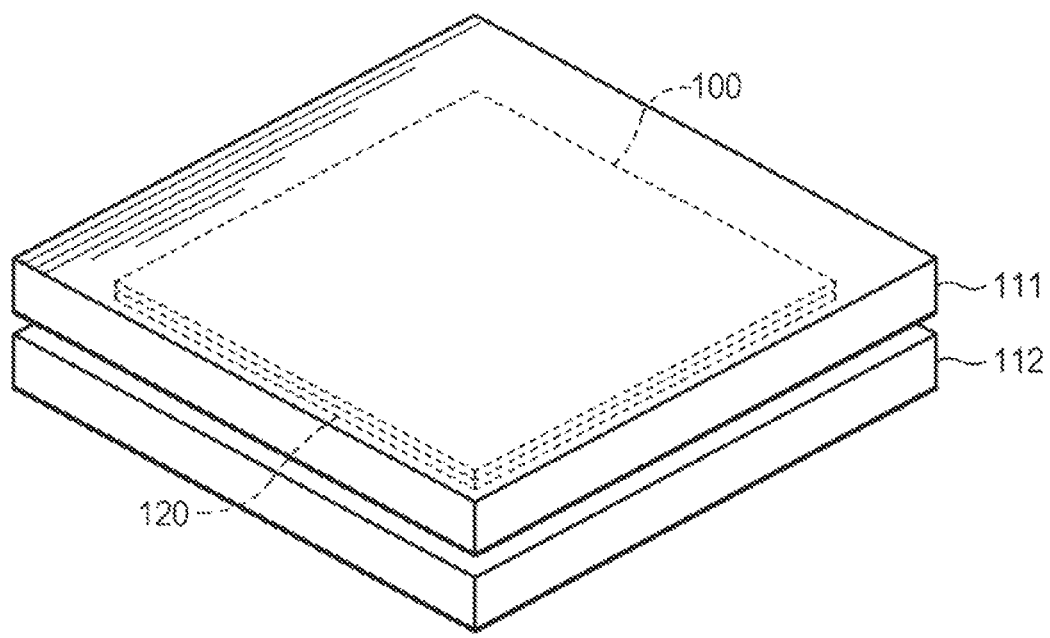
Figure 12C:
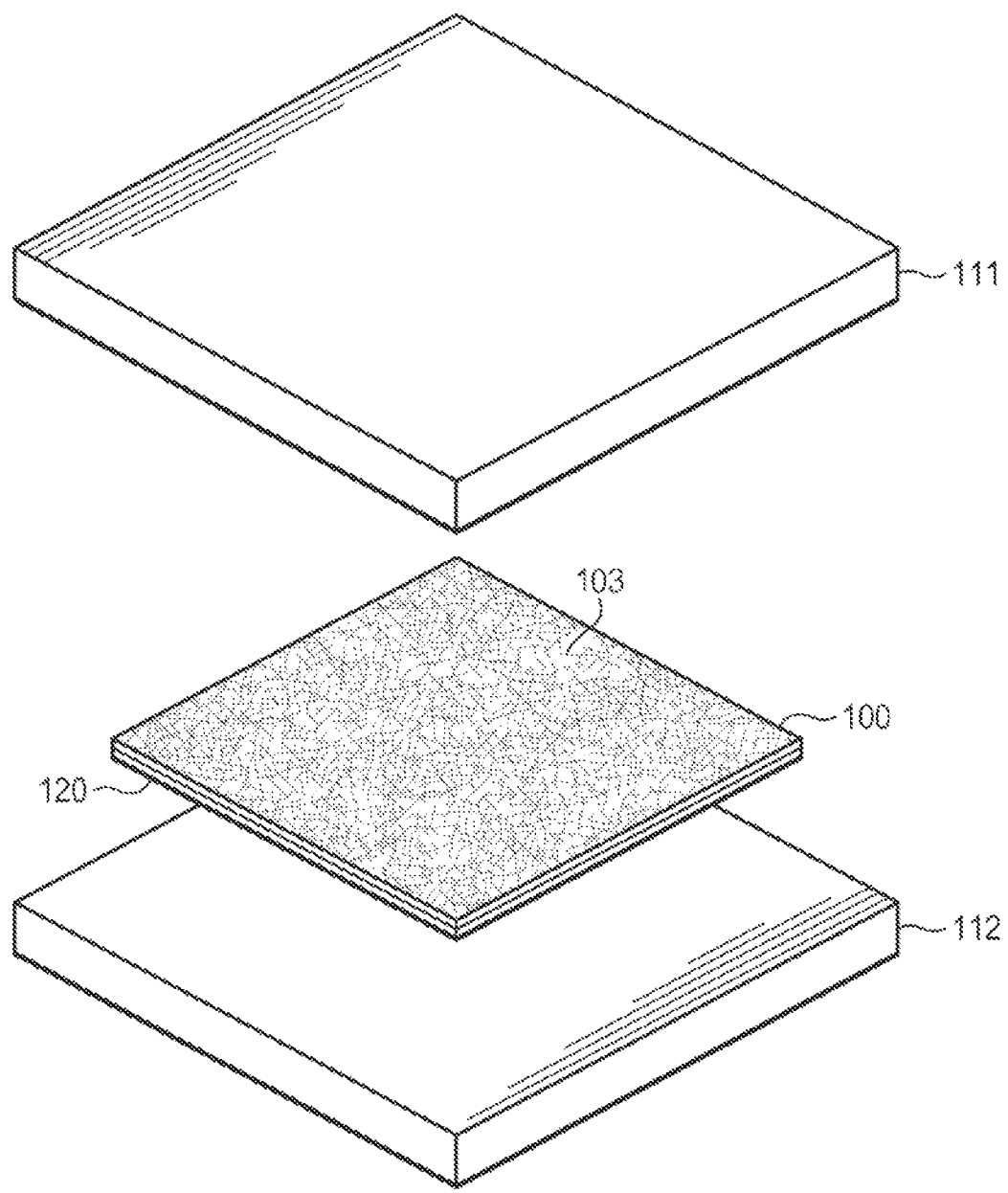

A general manufacturing process for forming a composite element will now be discussed with reference to FIGS. 12A-12C. Initially, non-woven textile 100 and component 120 are located between first plate 111 and second plate 112, as depicted in FIG. 12A. Plates 111 and 112 then translate or otherwise move toward each other in order to compress or induce contact between non-woven textile 100 and component 120, as depicted in FIG. 12B. In order to form the heatbond and join non-woven textile 100 and component 120, heat is applied to non-woven textile 100 and component 120. That is, the temperatures of non-woven textile 100 and component 120 are elevated to cause softening or melting of the thermoplastic polymer material at the interface between non-woven textile 100 and component 120. Depending upon the materials of both non-woven textile 100 and component 120, as well as the overall configuration of component 120, only first plate 111 may be heated, only second plate 112 may be heated, or both plates 111 and 112 may be heated so as to elevate the temperatures of non-woven textile 100 and component 120 through conduction. Upon separating plates 111 and 112, as depicted in FIG. 12C, the composite element formed from both non-woven textile 100 and component 120 may be removed and permitted to cool.

The manufacturing process discussed relative to FIGS. 12A-12C generally involves (a) forming non-woven textile 100 and component 120 separately and (b) subsequently joining non-woven textile 100 and component 120 to form the composite element. Referring to FIG. 13, a process wherein filaments 103 are deposited directly onto component 120 during the manufacture of non-woven textile 100 is depicted. Initially, component 120 is placed upon plate 112, which may also be a moving conveyor. An extrusion nozzle 121 then extrudes or otherwise forms a plurality of filaments 103 from a thermoplastic polymer material. As filaments 103 fall upon component 120, filaments 103 collect, lie, or otherwise deposit upon a surface of component 120, thereby forming non-woven textile 100. Once cooled, non-woven textile 100 is effectively joined to component 120, thereby forming the composite element. Accordingly, filaments 103 may be deposited directly upon component 120 during the manufacture of non-woven textile 100. As a similar manufacturing process, material (e.g., foam, molten polymer, a coating) may be sprayed, deposited, or otherwise applied to a surface of non-woven textile 100 to form the composite element. Moreover, a composite element that includes two or more layers of non-woven textile 100 may be formed by repeatedly depositing layers of filaments 103. When each of the layers of filaments 103 have different properties or are formed from different polymer materials, the resulting composite element may have the combined properties of the various layers.

Although the general processes discussed above may be utilized to form a composite element from non-woven textile 100 and component 120, other methods may also be utilized. Rather than heating non-woven textile 100 and component 120 through conduction, other methods that include radio frequency heating or chemical heating may be utilized. In some processes, second surface 102 and a surface of component 120 may be heated through radiant heating prior to being compressed between plates 111 and 112. An advantage of utilizing radiant heating to elevate the temperature of only the surfaces forming the heatbond is that the thermoplastic polymer material within other portions of non-woven textile 100 and component 120 are not heated significantly. In some processes, stitching or adhesives may also be utilized between non-woven textile 100 and component 120 to supplement the heatbond.

Non-woven textile 100 is depicted in FIGS. 10-120 as having a configuration that does not include fused regions 104. In order to impart varying properties to a composite element, fused regions 104 may be formed in non-woven textile 100. In some processes fused regions 104 may be formed prior to joining non-woven textile 100 with another component (e.g., component 120). In other processes, however, fused regions 104 may be formed during the heatbonding process or following the heatbonding process. Accordingly, fused regions 104 may be formed at any stage of the various manufacturing process for composite elements.

VI—Composite Element Configurations

Concepts relating to the general structure of composite elements and processes for forming the composite elements were presented above. As more specific examples, the following discussion discloses various composite element configurations, wherein non-woven textile 100 is joined with each of a mechanically-manipulated textile 130, a sheet 140, a foam layer 150, and a plurality of strands 160.

Figure 14:
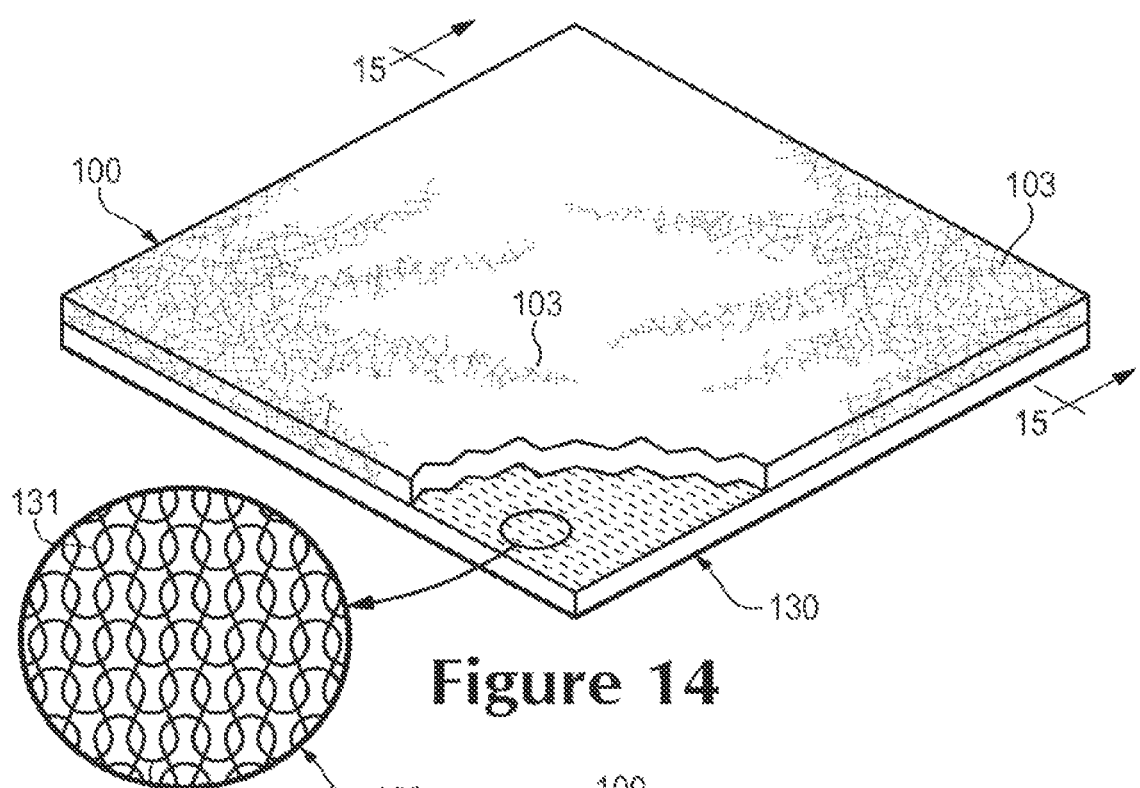
FIG. 14 is a perspective view of a second composite element that includes the non-woven textile.
Figure 15:
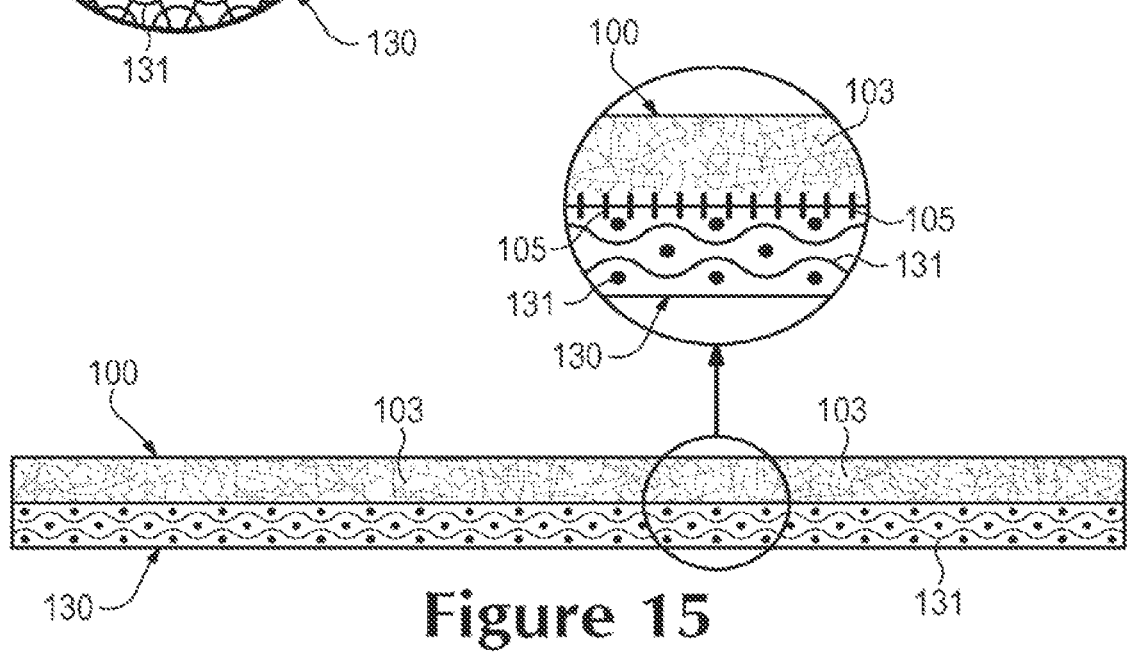
FIG. 15 is a cross-sectional view of the second composite element, as defined by section line 15-15 in FIG. 14.

An example of a composite element that includes non-woven textile 100 and mechanically-manipulated textile 130 is depicted in FIGS. 14 and 15. Whereas non-woven textile 100 is formed from randomly-distributed filaments 103, textile 130 is formed by mechanically-manipulating one or more yarns 131 to form a woven or interlooped structure. When manufactured with an interlooped structure, textile 130 may be formed through a variety of knitting processes, including flat knitting, wide tube circular knitting, narrow tube circular knit jacquard, single knit circular knit jacquard, double knit circular knit jacquard, warp knit jacquard, and double needle bar raschel knitting, for example. Accordingly, textile 130 may have a variety of configurations, and various weft-knitting and warp-knitting techniques may be utilized to manufacture textile 130. Although yarns 131 of textile 130 may be at least partially formed from a thermoplastic polymer material, many mechanically-manipulated textiles are formed from natural filaments (e.g., cotton, silk) or thermoset polymer materials. In order to form a heatbond between non-woven textile 100 and textile 130, the thermoplastic polymer material from non-woven textile 100 extends around or bonds with yarns 131 or extends into the structure of yarns 131 to secure non-woven textile 100 and textile 130 together when cooled. More particularly, various heatbond elements 105 are depicted in FIG. 15 as extending around or into yarns 131 to form the heatbond. A process similar to the process discussed above relative to FIGS. 12A-12C may be utilized to form the heatbond between non-woven textile 100 and textile 130. That is, the heatbond between non-woven textile 100 and textile 130 may be formed, for example, by compressing and heating the elements between plates 111 and 112.

The combination of non-woven textile 100 and textile 130 may impart some advantages over either of non-woven textile 100 and textile 130 alone. For example, textile 130 may exhibit one-directional stretch, wherein the configuration of yarns 131 allows textile 130 to stretch in one direction, but limits stretch in a perpendicular direction. When non-woven textile 100 and textile 130 are joined, the composite element may also exhibit a corresponding one-directional stretch. As another example, the composite element may also be incorporated into various articles of apparel, with textile 130 being positioned to contact the skin of an individual wearing the apparel, and the materials selected for textile 130 and the structure of textile 130 may impart more comfort than non-woven textile 100 alone. In addition to these advantages, various fused regions 104 may be formed in non-woven textile 100 to impart different degrees of permeability, durability, and stretch-resistance to specific areas of the composite element. Accordingly, the composite element may have a configuration that imparts a combination of properties that neither non-woven textile 100 nor textile 130 may impart alone.

Figure 16:
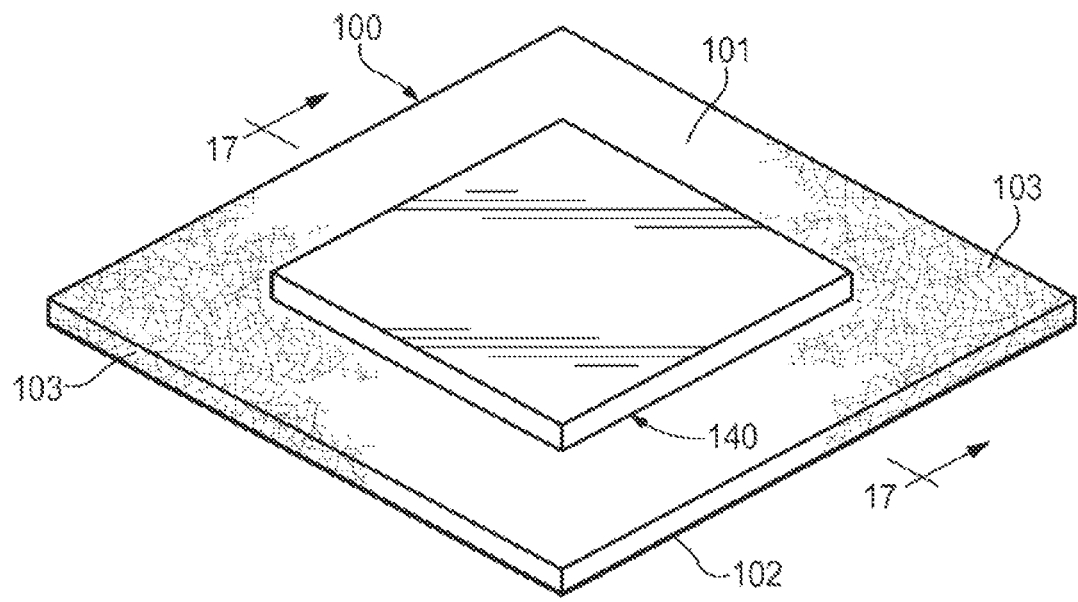
FIG. 16 is a perspective view of a third composite element that includes the non-woven.
Figure 17:
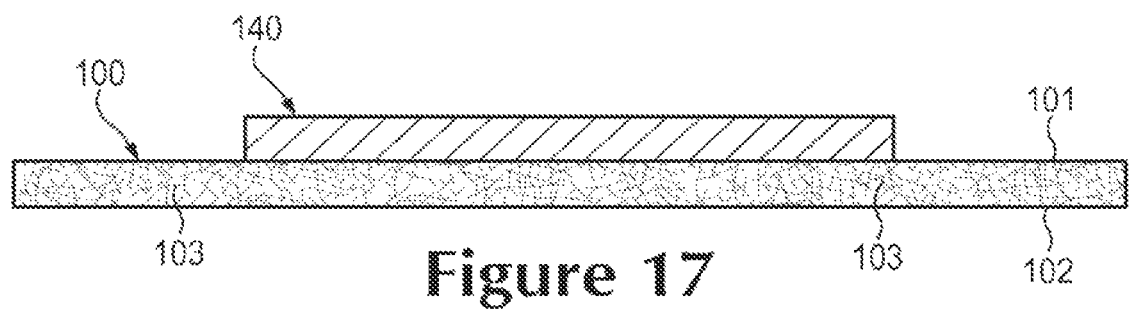
FIG. 17 is a cross-sectional view of the third composite element, as defined by section line 17-17 in FIG. 16.

Another example of a composite element, which includes non-woven textile 100 and sheet 140, is depicted in FIGS. 16 and 17. Sheet 140 may be formed from a sheet or plate of a polymer, suede, synthetic suede, metal, or wood material, for example, and may be either flexible or inflexible. In order to form a heatbond between non-woven textile 100 and sheet 140, the thermoplastic polymer material of non-woven textile 100 may extend into or infiltrate crevices or cavities within sheet 140 to secure the elements together when cooled. In circumstances where sheet 140 is formed from a thermoplastic polymer material, then the thermoplastic polymer materials of non-woven textile 100 and sheet 140 may intermingle with each other (e.g., diffuse across a boundary layer between the thermoplastic polymer materials) to secure non-woven textile 100 and sheet 140 together when cooled. A process similar to the process discussed above relative to FIGS. 12A-12C may be utilized to form the heatbond between non-woven textile 100 and sheet 140. As an alternative, stitching or adhesives may be utilized, as well as a needle punching process to push filaments 103 into or through sheet 140 to join non-woven textile 100 and sheet 140 or to supplement the heatbond.

The combination of non-woven textile 100 and sheet 140 may be suitable for articles of apparel that impart protection from acute impacts, for example. A lack of stitching, rivets, or other elements joining non-woven textile 100 and sheet 140 forms a relatively smooth interface. When incorporated into an article of apparel, the lack of discontinuities in the area joining non-woven textile 100 and sheet 140 may impart comfort to the individual wearing the apparel. As another example, edges of sheet 140 are depicted as being spaced inward from edges of non-woven textile 100. When incorporating the composite element into a product, such as apparel, the edges of non-woven textile 100 may be utilized to join the composite element to other textile elements or portions of the apparel. In addition to these advantages, various fused regions 104 may be formed in non-woven textile 100 to impart different degrees of permeability, durability, and stretch-resistance to areas of the composite element.

Figure 18A:
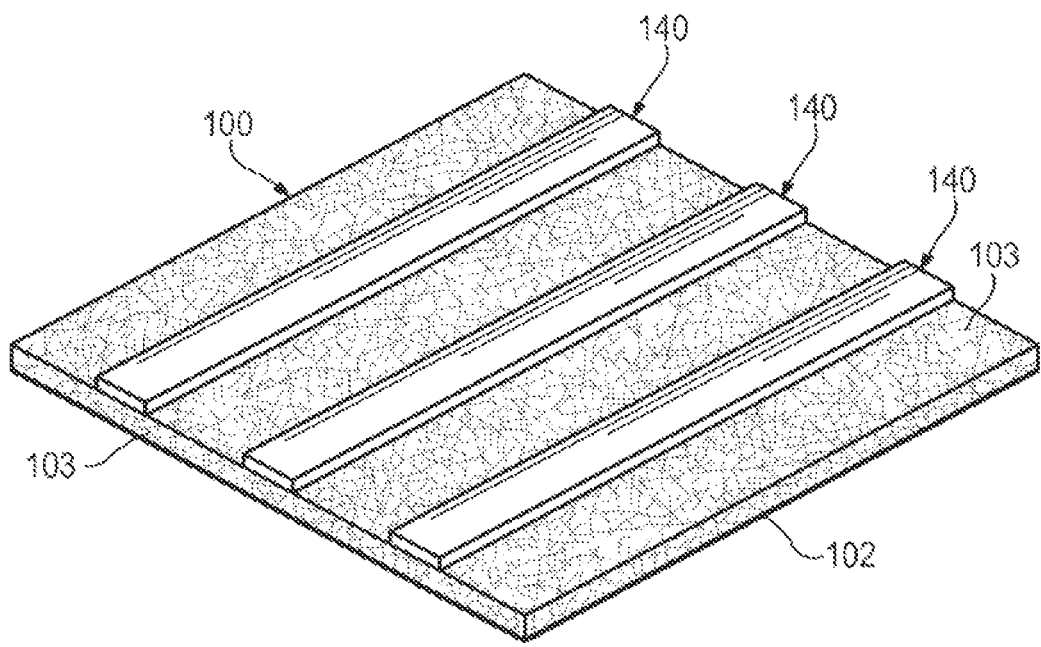
FIGS. 18A-18C are perspective views of further configurations of the third composite element.
Figure 18B:
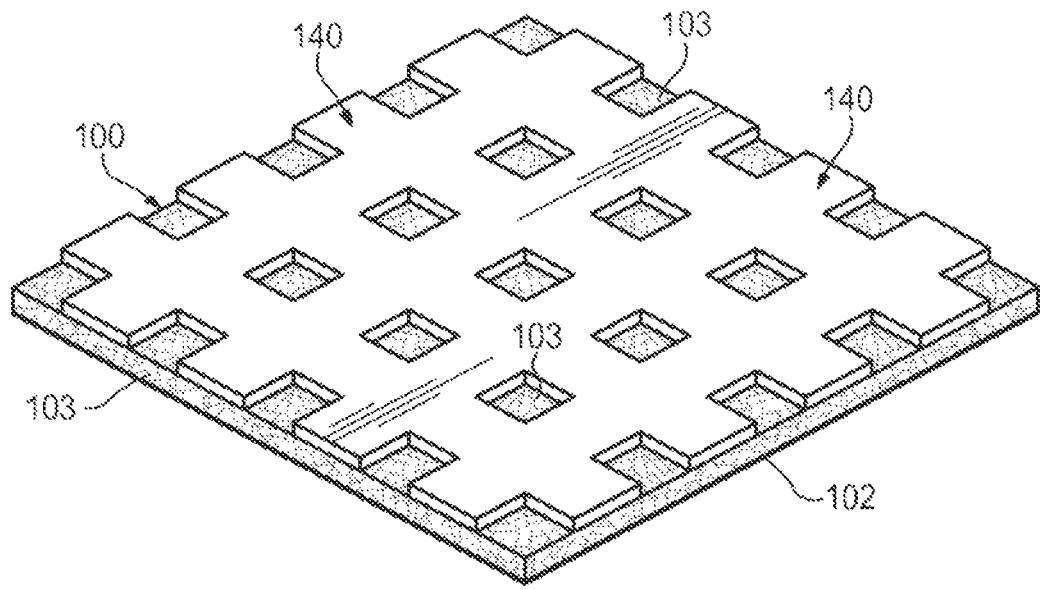
Figure 18C:
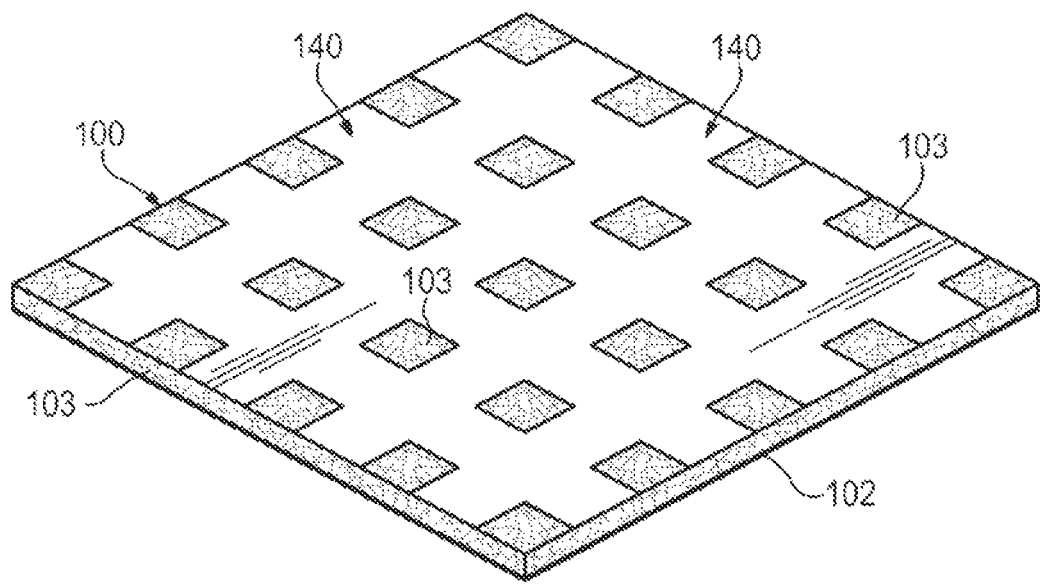

Although sheet 140 is depicted as having a solid or otherwise continuous configuration, sheet 140 may also be absent in various areas of the composite element. Referring to FIG. 18A, sheet 140 has the configuration of various strips of material, that extend across non-woven textile 100. A similar configuration is depicted in FIG. 18B, wherein sheet 140 has the configuration of a grid. In addition to imparting strength and tear-resistance to the composite element, the strip and grid configurations of sheet 140 expose portions of non-woven textile 100, thereby allowing permeability in the exposed areas. In each of FIGS. 16-18B, sheet 140 is depicted as having a thickness that is comparable to the thickness of non-woven textile 100. In FIG. 18C, however, sheet 140 is depicted as having a thickness that is substantially less than the thickness of non-woven textile 100. Even with a reduced thickness, sheet 140 may impart strength and tear-resistance, while allowing permeability.

Figure 19:
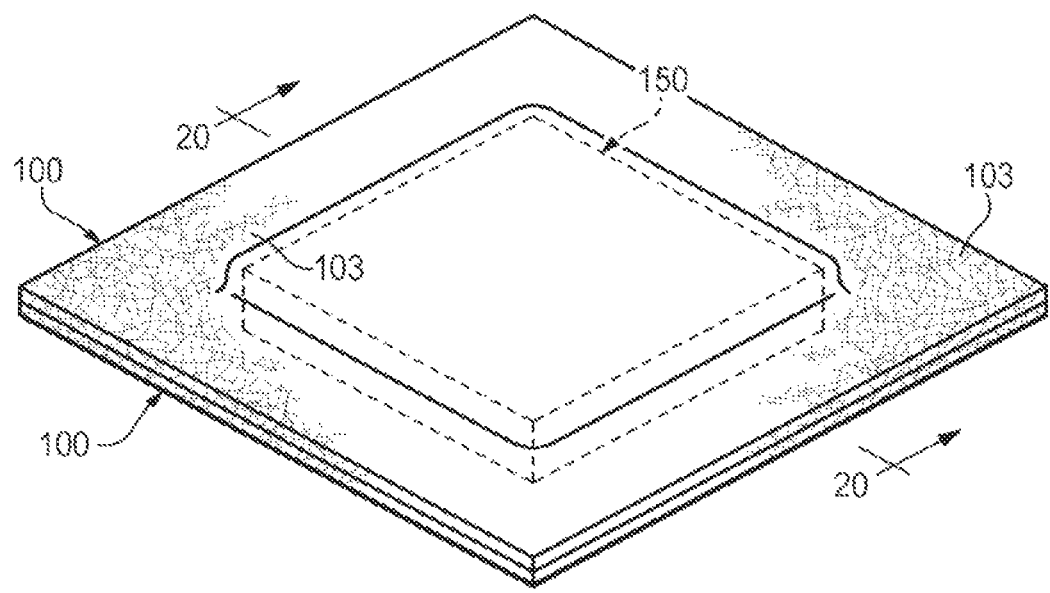
FIG. 19 is a perspective view of a fourth composite element that includes the non-woven textile.
Figure 20:
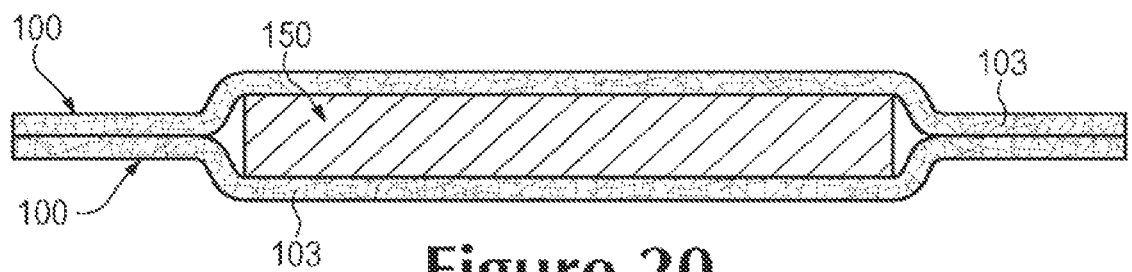
FIG. 20 is a cross-sectional view of the fourth composite element, as defined by section line 20-20 in FIG. 19.

A further example of a composite element that includes two layers of non-woven textile 100 and foam layer 150 is depicted in FIGS. 19 and 20. Foam layer 150 may be formed from a foamed polymer material that is either thermoset or thermoplastic. In configurations where foam layer 150 is formed from a thermoset polymer material, the thermoplastic polymer material from the two layers of non-woven textile 100 may extend into or infiltrate crevices or cavities on opposite sides of foam layer 150 to form heatbonds and secure the elements together. In configurations where foam layer 150 is formed from a thermoplastic polymer material, the thermoplastic polymer materials of the two layers of non-woven textile 100 and foam layer 150 may intermingle with each other to form heatbonds and secure the elements together.

A process similar to the process discussed above relative to FIGS. 12A-12C may be utilized to form the heatbonds between the two layer of non-woven textile 100 and foam layer 150. More particularly, foam layer 150 may be placed between the two layers of non-woven textile 100, and these three elements may be located between plates 111 and 112. Upon compressing and heating, heatbonds may form between the two layers of non-woven textile 100 and the opposite sides of foam layer 150. Additionally, the two layers of non-woven textile 100 may be heatbonded to each other around the perimeter of foam layer 150. That is, heatbonds may also be utilized to join the two layers of non-woven textile 100 to each other. In addition to foam layer 150, other intermediate elements (e.g., textile 130 or sheet 140) may be bonded between the two layers of non-woven textile 100. A needle punching process may also be utilized to push filaments 103 into or through foam layer 150 to join non-woven textile 100 and foam layer 150 or to supplement the heatbond, as well as stitching or adhesives.

The combination of the two layers of non-woven textile 100 and foam layer 150 may be suitable for articles of apparel where cushioning (i.e., attenuation of impact forces) is advantageous, such as padding for athletic activities that may involve contact or impact with other athletes or equipment. The lack of discontinuities in the area joining the layers of non-woven textile 100 and foam layer 150 may impart comfort to the individual wearing the apparel. The edges of the two layers of non-woven textile 100 may also be utilized to join the composite element to other textile elements or portions of the apparel. In addition to these advantages, various fused regions 104 may be formed in non-woven textile 100 to impart different degrees of permeability, durability, and stretch-resistance to the composite element.

Figure 21:
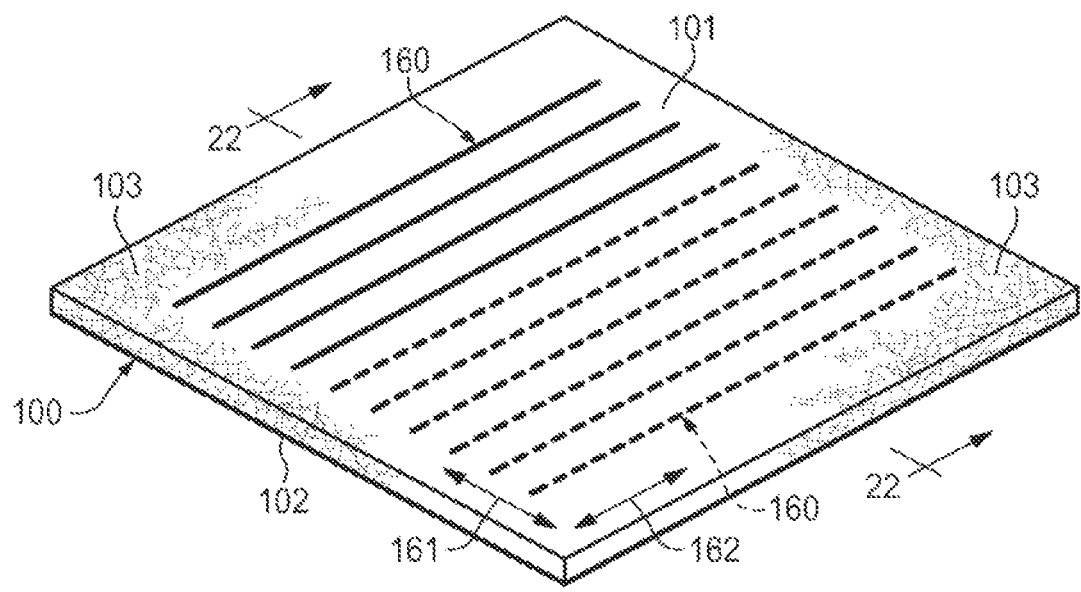
FIG. 21 is a perspective view of a fifth composite element that includes the non-woven textile.
Figure 22:
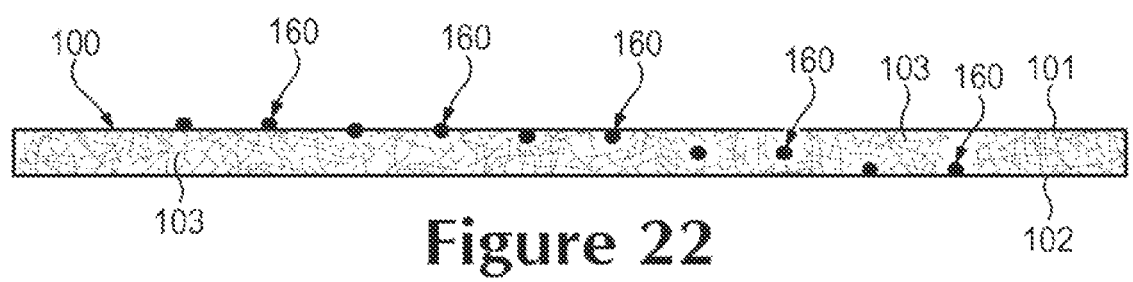
FIG. 22 is a cross-sectional view of the fifth composite element, as defined by section line 22-22 in FIG. 21.

An example of a composite element that includes non-woven textile 100 and a plurality of strands 160 is depicted in FIGS. 21 and 22. Strands 160 are secured to non-woven textile 100 and extend in a direction that is substantially parallel to either of surfaces 101 and 102. Referring to the cross-section of FIG. 22, the positions of strands 160 relative to surfaces 101 and 102 may vary significantly. More particularly, strands 160 may be located upon first surface 101, strands 160 may be partially embedded within first surface 101, strands 160 may be recessed under and adjacent to first surface 101, strands 160 may be spaced inward from first surface 101 and located between surfaces 101 and 102, or strands 160 may be adjacent to second surface 102. A heatbonding process may be utilized to secure strands 160 to non-woven textile 100. That is, thermoplastic polymer material of non-woven textile 100 may be softened or melted to form a heatbond that joins strands 160 to non-woven textile 100. Depending upon the degree to which the thermoplastic polymer material of non-woven textile 100 is softened or melted, strands 160 may be positioned upon first surface 101 or located inward from first surface 101.

Strands 160 may be formed from any generally one-dimensional material exhibiting a length that is substantially greater than a width and a thickness. Depending upon the material utilized and the desired properties, strands 160 may be individual filaments, yarns that include a plurality of filaments, or threads that include a plurality of yarns. As discussed in greater detail below, suitable materials for strands 160 include rayon, nylon, polyester, polyacrylic, silk, cotton, carbon, glass, aramids (e.g., para-aramid fibers and meta-aramid fibers), ultra high molecular weight polyethylene, and liquid crystal polymer, for example. In some configurations, strands 160 may also be metal wires or cables.

In comparison with the thermoplastic polymer material forming non-woven textile 100, many of the materials noted above for strands 160 exhibit greater tensile strength and stretch-resistance. That is, strands 160 may be stronger than non-woven textile 100 and may exhibit less stretch than non-woven textile 100 when subjected to a tensile force. The combination of non-woven textile 100 and strands 160 imparts a structure wherein the composite element may stretch in one direction and is substantially stretch-resistant and has more strength in another direction. Referring to FIG. 21, two perpendicular directions are identified with arrows 161 and 162. When the composite element is subjected to a tensile force (i.e., stretched) in the direction of arrow 161, non-woven textile 100 may stretch significantly. When the composite element is subjected to a tensile force (i.e., stretched) in the direction of arrow 162, however, strands 160 resist the force and are more stretch-resistant than non-woven textile 100. Accordingly, strands 160 may be oriented to impart strength and stretch-resistance to the composite element in particular directions. Although strands 160 are discussed herein as imparting stretch-resistance, strands 160 may be formed from materials that stretch significantly. Strands 160 may also be utilized to impart other properties to the composite element. For example, strands 160 may be electrically-conductive to allow the transmission of power or data, or strands 160 may be located within non-woven textile 100 to impart a particular aesthetic.

Figure 23A:
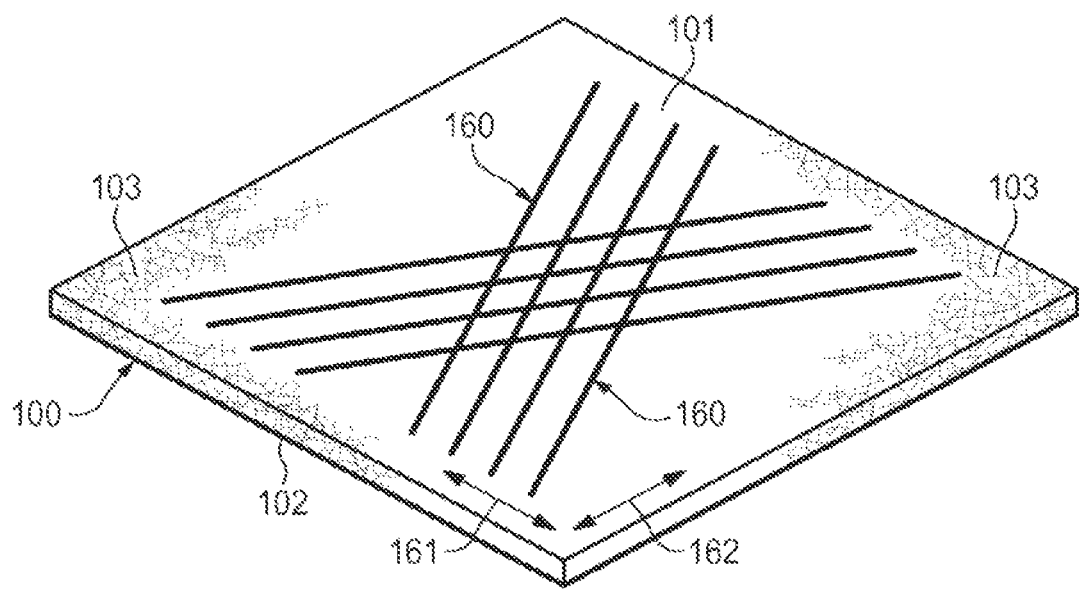
FIGS. 23A-23F are perspective views of further configurations of the fifth composite element.
Figure 23B:
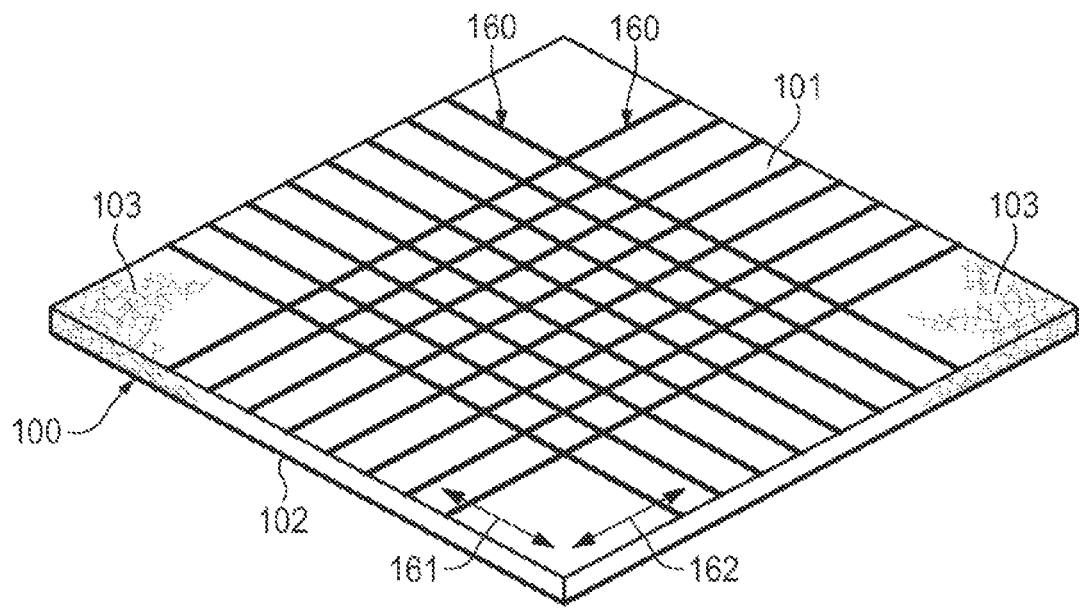
Figure 23C:
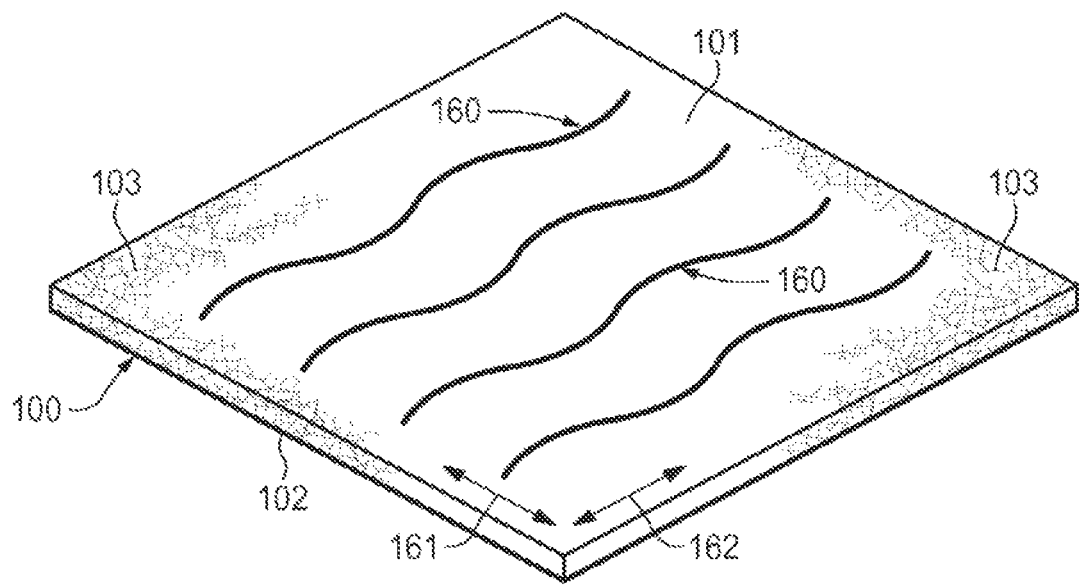
Figure 23D:
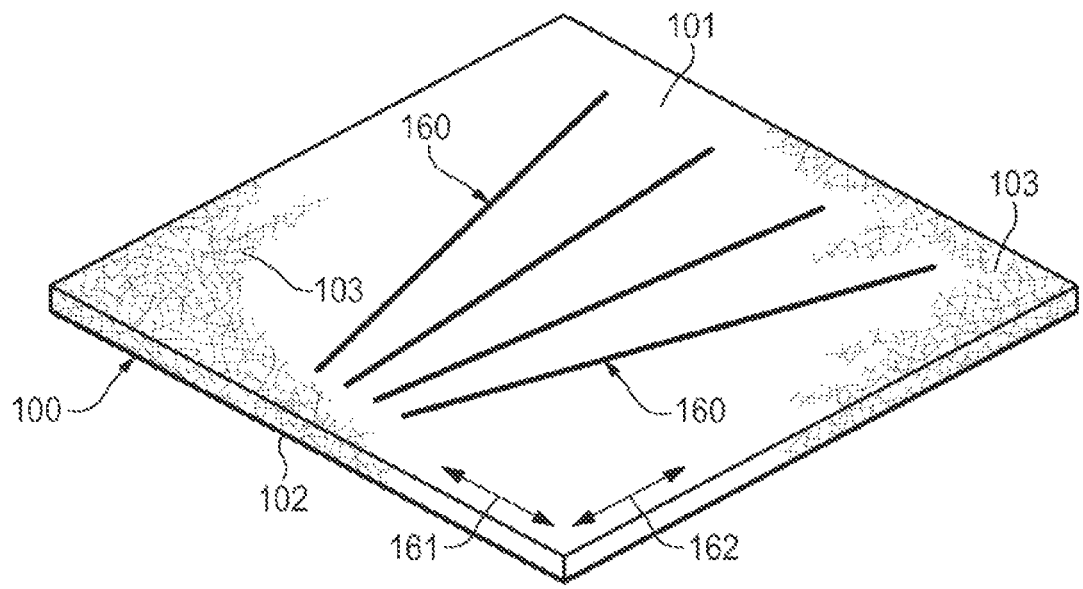

Strands 160 are depicted as being substantially parallel to each other in FIG. 21, and ends of strands 160 are depicted as being spaced inward from edges of non-woven textile 100. In other composite element configurations, strands 160 may be arranged in other orientations and may extend entirely or only partially across non-woven textile 100. Referring to FIG. 23A, strands 160 are depicted as crossing each other. Given the angle that strands 160 are oriented relative to each other, strands 160 may only partially limit the stretch in the direction of arrow 161, but the composite element may be substantially stretch-resistant in the direction of arrow 162. A similar configuration is depicted in FIG. 23B, wherein strands 160 cross each other at right angles. In this configuration, strands 160 may impart stretch-resistance in the directions of both arrows 161 and 162. That is, the composite element may be stretch-resistant in all directions due to the orientation of strands 160. As another matter, whereas ends of strands 160 are spaced inward from edges of non-woven textile 100 in FIG. 23A, the ends of strands 160 extend to the edges of non-woven textile 100 in FIG. 23B. Strands 160 are depicted as having a wave-like or non-linear configuration in FIG. 23C. In this configuration, strands 160 may permit some stretch in the direction of arrow 162. Once strands 160 straighten due to the stretch, however, then strands 160 may substantially resist stretch and provide strength in the direction of arrow 162. Another configuration is depicted in FIG. 23D, wherein strands 160 are arranged in a non-parallel configuration to radiate outward.

Figure 23E:
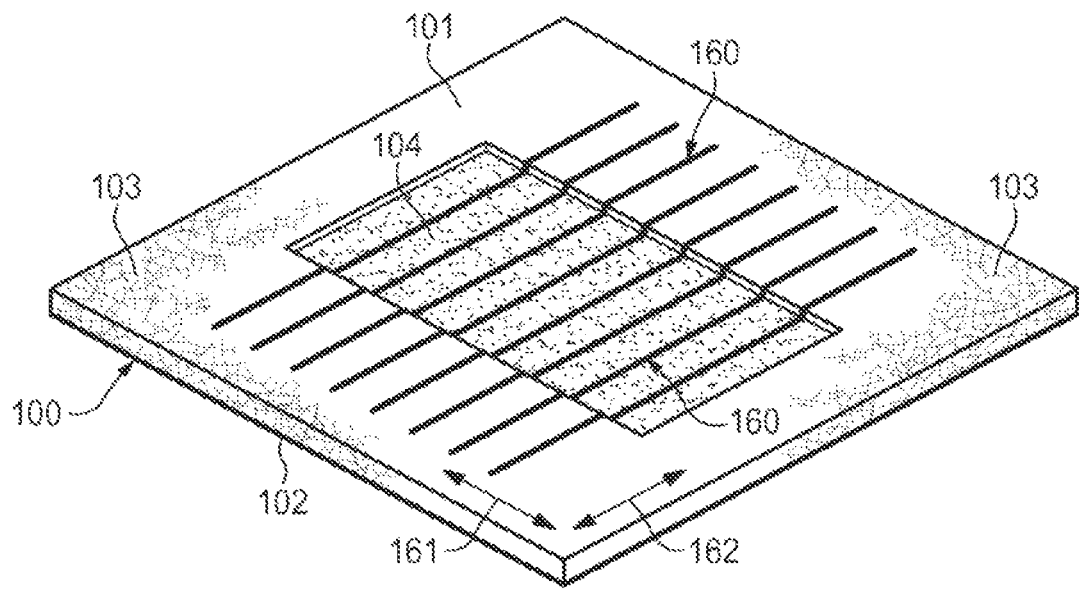
Figure 23F:
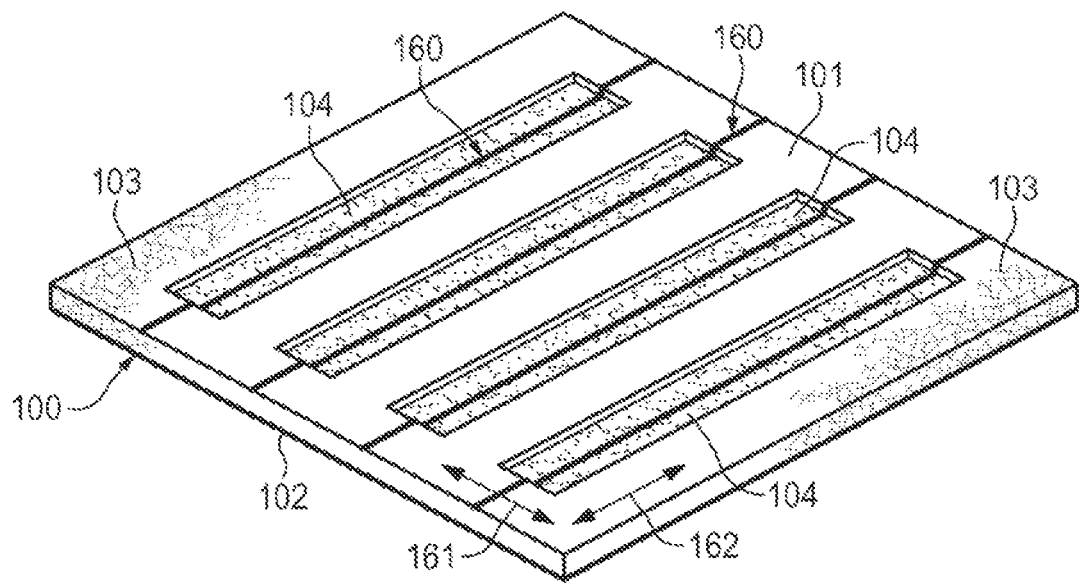

In some configurations of the composite element, fused regions 104 may be added to further affect the properties of the composite element. Referring to FIG. 23E, a single fused region 104 extends across non-woven textile 100 in the direction of arrow 161. Given that fused regions 104 may exhibit more stretch-resistance than other areas of non-woven textile 100, the fused region in FIG. 23E may impart some stretch-resistance in the direction of arrow 161, and strands 160 may impart stretch-resistance to the direction of arrow 162. In some configurations, fused regions may extend along strands 160 and in the direction of arrow 162, as depicted in FIG. 23F. Accordingly, fused regions 104 may be utilized with strands 160 to impart specific properties to a composite element.

The material properties of strands 160 relate to the specific materials that are utilized within strands 160. Examples of material properties that may be relevant in selecting specific materials for strands 160 include tensile strength, tensile modulus, density, flexibility, tenacity, and durability. Each of the materials noted above as being suitable for strands 160 exhibit different combinations of material properties. Accordingly, the material properties for each of these materials may be compared in selecting particular materials for strands 160. Tensile strength is a measure of resistance to breaking when subjected to tensile (i.e., stretching) forces. That is, a material with a high tensile strength is less likely to break when subjected to tensile forces than a material with a low tensile strength. Tensile modulus is a measure of resistance to stretching when subjected to tensile forces. That is, a material with a high tensile modulus is less likely to stretch when subjected to tensile forces than a material with a low tensile modulus. Density is a measure of mass per unit volume. That is, a particular volume of a material with a high density has more weight than the same volume of a material with a low density.

Nylon has a relatively low tensile strength, a relatively low tensile modulus, and an average density when compared to each of the other materials. Steel has an average tensile strength, a moderately high tensile modulus, and a relatively high density when compared to the other materials. While nylon is less dense than steel (i.e., lighter than steel), nylon has a lesser strength and a greater propensity to stretch than steel. Conversely, while steel is stronger and exhibits less stretch, steel is significantly more dense (i.e., heavier than nylon). Each of the engineering fibers (e.g., carbon fibers, aramid fibers, ultra high molecular weight polyethylene, and liquid crystal polymer) exhibit tensile strengths and tensile moduli that are comparable to steel. In addition, the engineering fibers exhibit densities that are comparable to nylon. That is, the engineering fibers have relatively high tensile strengths and tensile moduli, but also have relatively low densities. In general, each of the engineering fibers have a tensile strength greater than 0.60 gigapascals, a tensile modulus greater than 50 gigapascals, and a density less than 2.0 grams per centimeter cubed.

In addition to material properties, the structural properties of various configurations of strands 160 may be considered when selecting a particular configuration for a composite element. The structural properties of strands 160 relate to the specific structure that is utilized to form strands 160. Examples of structural properties that may be relevant in selecting specific configurations for strands 160 include denier, number of plies, breaking force, twist, and number of individual filaments, for example.

Based upon the above discussion, non-woven textile 100 may be heatbonded or otherwise joined (e.g., through stitching or adhesive bonding) to a variety of other components to form composite elements. An advantage of joining non-woven textile 100 to the other components is that the composite elements generally include combined properties from both non-woven textile 100 and the other components. As examples, composite elements may be formed by joining non-woven textile 100 to any of textile 130, sheet 140, foam layer 150, and strands 160.

VII—Seam Formation

In order to incorporate non-woven textile 100 into a product, non-woven textile 100 is often joined with other elements of the product to form a seam. For example, non-woven textile 100 may be joined with other non-woven textile elements, various mechanically-manipulated textile elements, or polymer sheets. Although stitching and adhesive bonding may be utilized to join non-woven textile 100 to the other elements of the product, the seam may also be formed through a heatbonding process.

As an example of the manner in which non-woven textile 100 may be joined to another element, FIGS. 24 and 25 depict a pair of elements of non-woven textile 100 that are joined to form a seam 106. That is, an edge area of one non-woven textile 100 is joined with an edge area of the other non-woven textile 100 at seam 106. More particularly, seam 106 is formed by heatbonding first surface 101 of one non-woven textile 100 with first surface 101 of the other non-woven textile 100. As with some conventional stitched seams, first surfaces 101 from each non-woven textile 100 are turned inward at seam 106 to face each other, and first surfaces 101 are joined to each other. In contrast with some conventional stitched seams, a heatbond is utilized to join first surfaces 101 from each non-woven textile 100 to each other. In some configurations, however, stitching or adhesive bonding may also be utilized to reinforce seam 106.

Figure 26A:
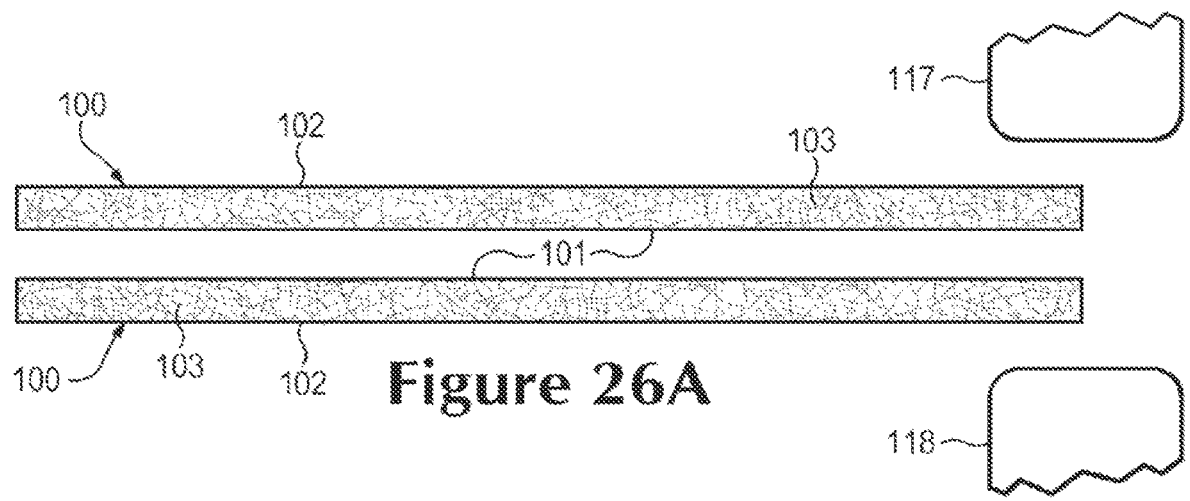
FIGS. 26A-26D are side elevational views of a process for forming the first seam configuration.
Figure 26B:
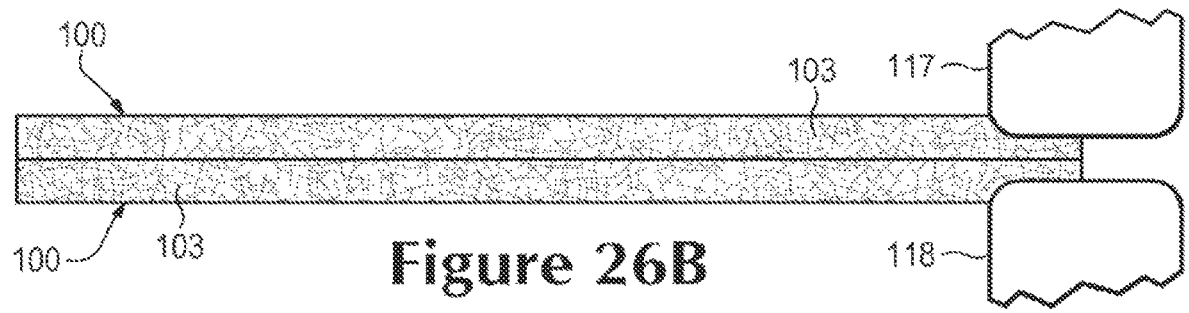
Figure 26C:
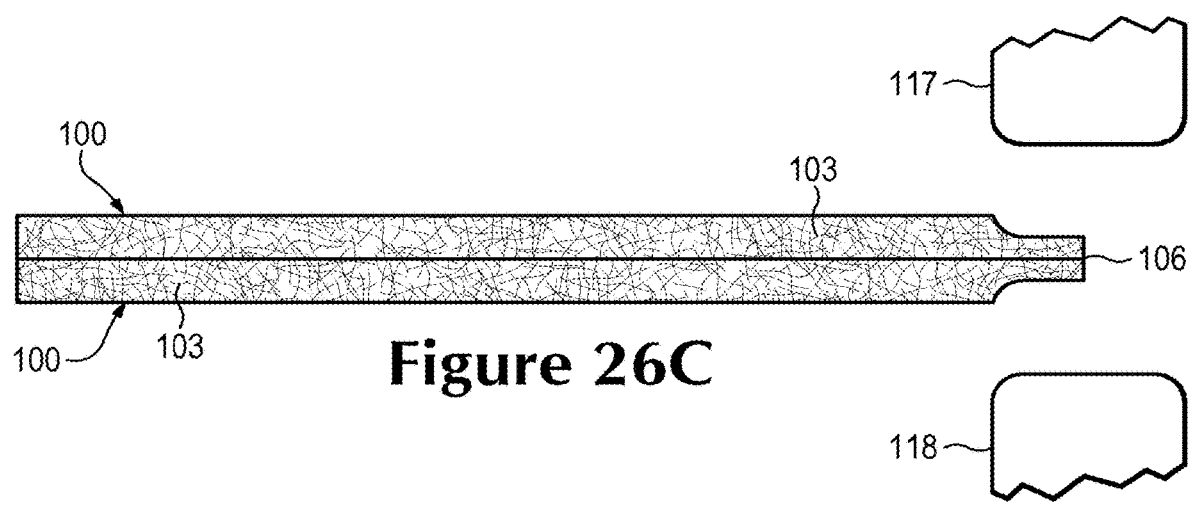
Figure 26D:
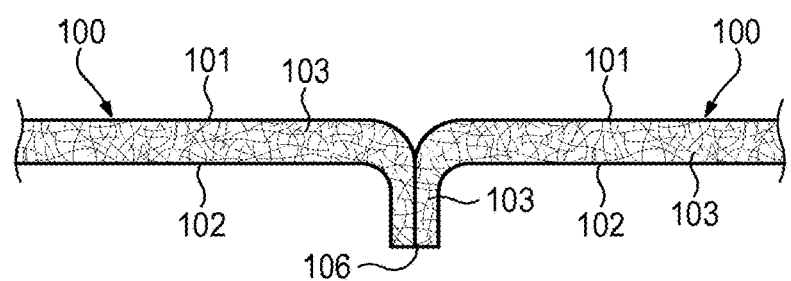

A general manufacturing process for forming seam 106 will now be discussed with reference to FIGS. 26A-26D. Initially, the pair of elements of non-woven textile 100 are located between a first seam-forming die 117 and a second seam-forming die 118, as depicted in FIG. 26A. Seam-forming dies 117 and 118 then translate or otherwise move toward each other in order to compress or induce contact between edge areas of the pair of elements of non-woven textile 100, as depicted in FIG. 26B. In order to form the heatbond and join the edge areas of the elements of non-woven textile 100, seam-forming dies 117 and 118 apply heat to the edge areas. That is, seam-forming dies 117 and 118 elevate the temperatures of the edge areas of the pair of elements of non-woven textile 100 to cause softening or melting of the thermoplastic polymer material at the interface between the edge areas. Upon separating seam-forming dies 117 and 118, as depicted in FIG. 26C, seam 106 is formed between the edge areas of the pair of elements of non-woven textile 100. After being permitted to cool, the pair of elements of non-woven textile 100 may be unfolded, as depicted in FIG. 26D. After forming, seam 106 may also be trimmed to limit the degree to which the end areas of the pair of elements of non-woven textile 100 extend downward at seam 106.

Figure 27:
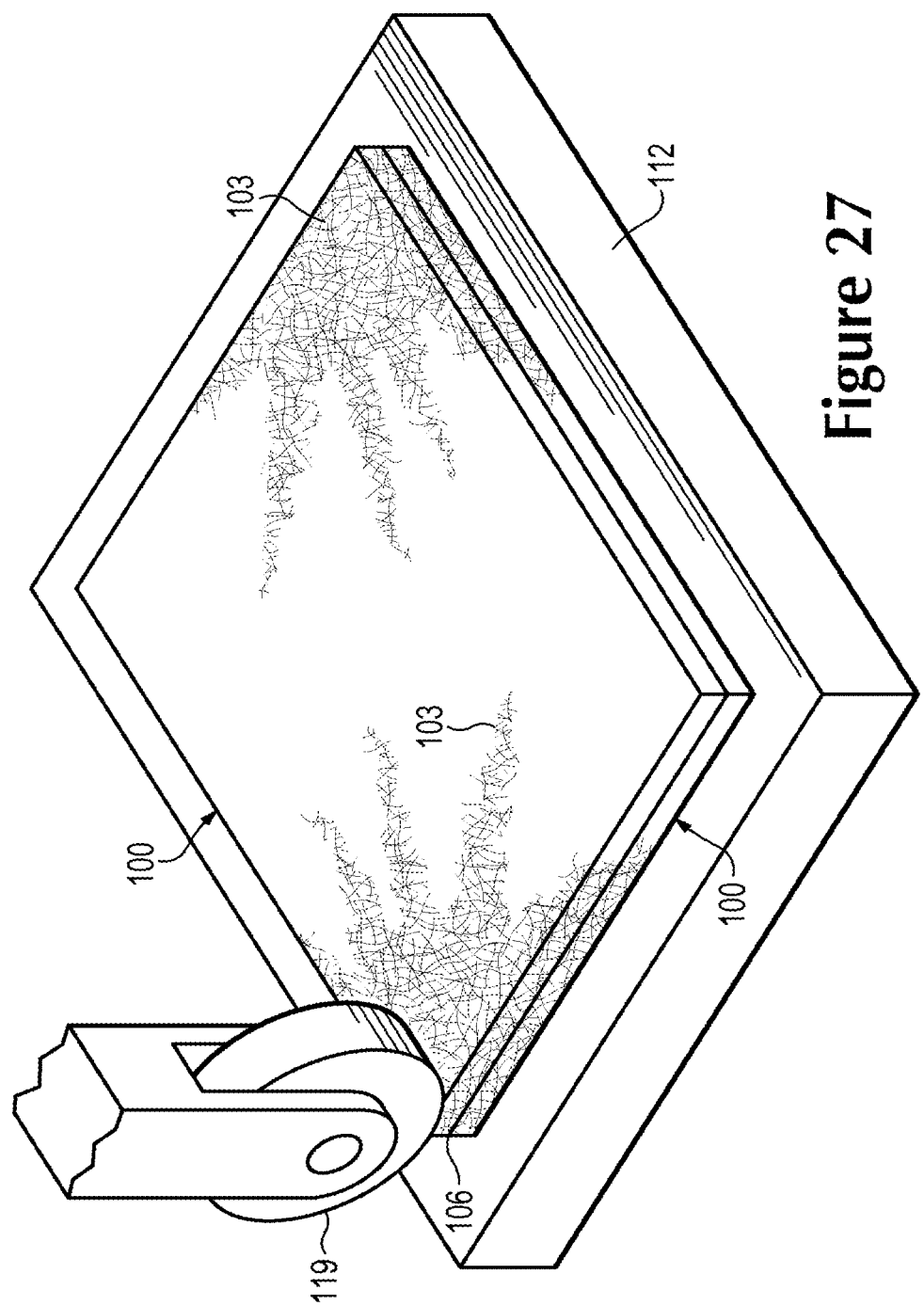
FIG. 27 is a perspective view of another process for forming the first seam configuration.

Although the general process discussed above may be utilized to form seam 106, other methods may also be utilized. Rather than heating the edge areas of elements of non-woven textile 100 through conduction, other methods that include radio frequency heating, chemical heating, or radiant heating may be utilized. In some processes, stitching or adhesives may also be utilized between the pair of elements of non-woven textile 100 to supplement the heatbond. As an alternate method, the pair of elements of non-woven textile 100 may be placed upon a surface, such as second plate 112, and a heated roller 119 may form seam 106, as depicted in FIG. 27.

As with the formation of fused regions 104, the formation of seam 106 involves softening or melting the thermoplastic polymer material in various filaments 103 that are located in the area of seam 106. Depending upon the degree to which filaments 103 change state, the various filaments 103 in the area of seam 106 may (a) remain in a filamentous configuration, (b) melt entirely into a liquid that cools into a non-filamentous configuration, or (c) take an intermediate configuration wherein some filaments 103 or portions of individual filaments 103 remain filamentous and other filaments 103 or portions of individual filaments 103 become non-filamentous. Referring to FIG. 25, filaments 103 are depicted as remaining in the filamentous configuration in the area of seam 106, but may be melted into a non-filamentous configuration or may take the intermediate configuration. Accordingly, although filaments 103 in the area of seam 106 are generally fused to a greater degree than filaments 103 in other areas of non-woven textile 100, the degree of fusing may vary significantly.

Figure 28A:
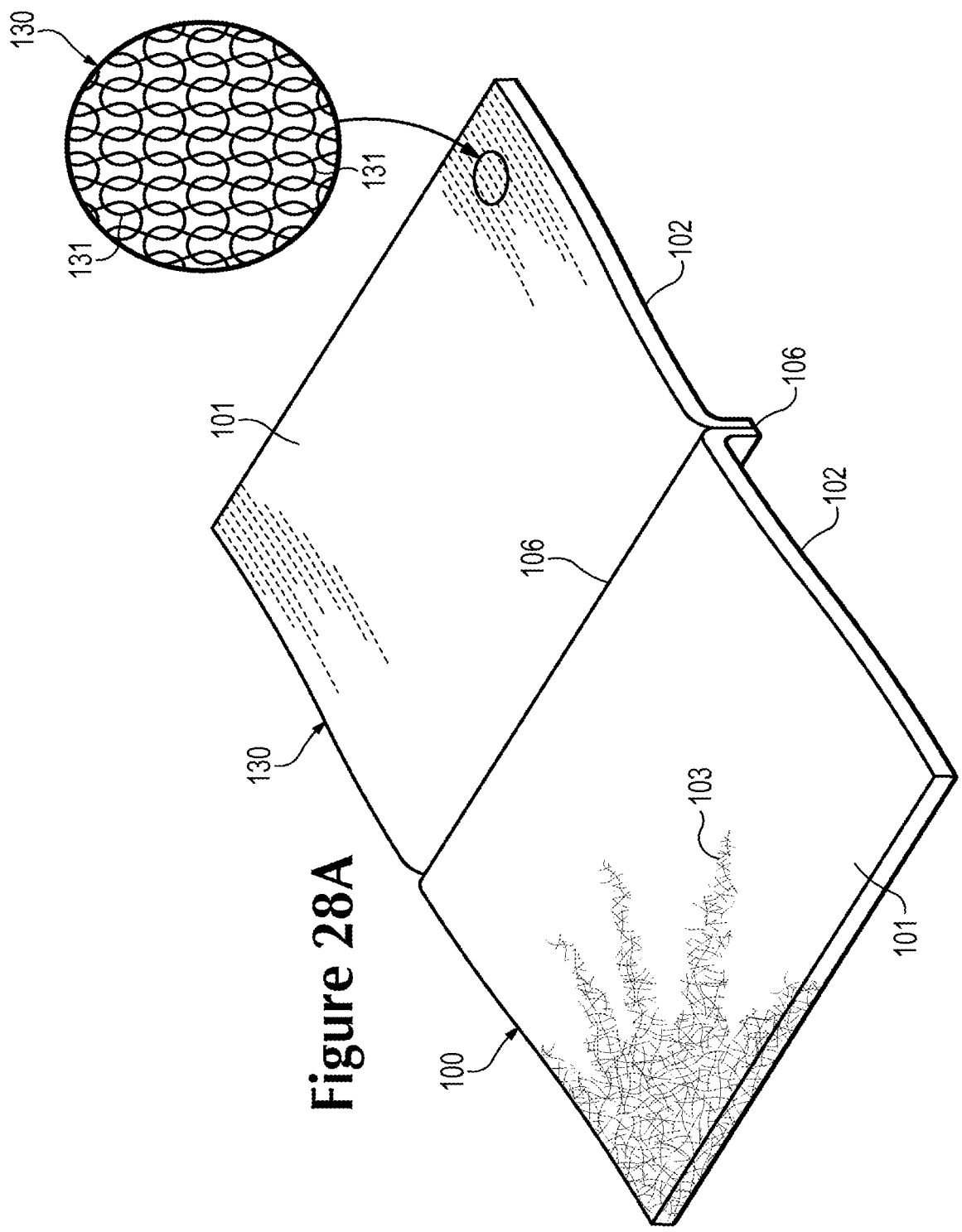
FIGS. 28A and 28B are perspective views of elements of the non-woven textile joined with other elements to form the first seam configuration.
Figure 28B:
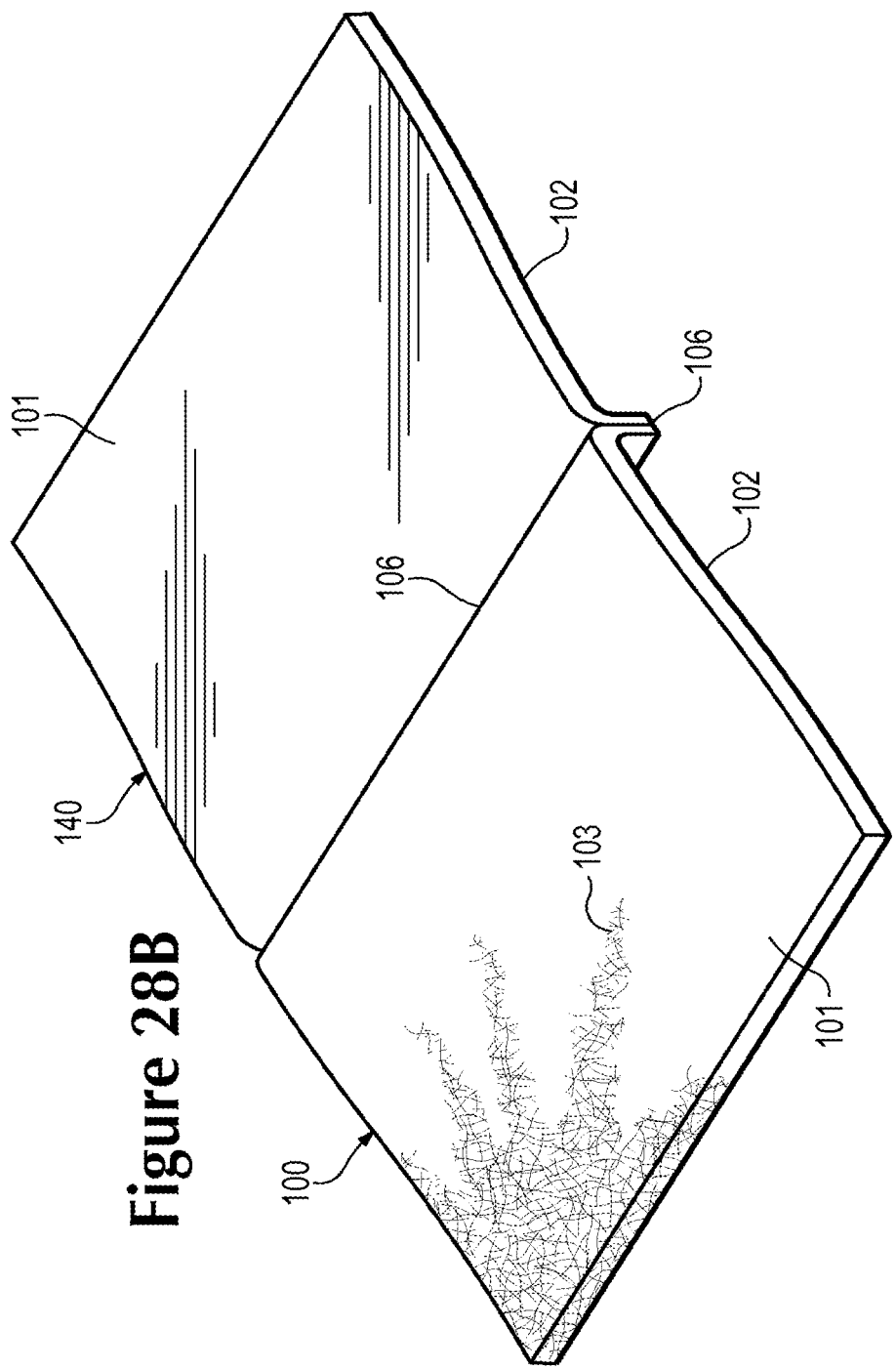

In forming seam 106 between the pair of elements of non-woven textile 100, the thermoplastic polymer materials from the various filaments 103 intermingle with each other and are secured together when cooled. Non-woven textile 100 may also be joined with other types of elements to form a similar seam 106. As a first example, non-woven textile 100 is depicted as being joined with mechanically-manipulated textile 130 at seam 106 in FIG. 28A. Although yarns 131 of textile 130 may be at least partially formed from a thermoplastic polymer material, many mechanically-manipulated textiles are formed from natural filaments (e.g., cotton, silk) or thermoset polymer materials. In order to form a heatbond between non-woven textile 100 and textile 130 at seam 106, the thermoplastic polymer material from non-woven textile 100 extends around or bonds with yarns 131 or extends into the structure of yarns 131 to secure the non-woven textile 100 and textile 130 together at seam 106 when cooled. As a second example, non-woven textile 100 is depicted as being joined with sheet 140 at seam 106 in FIG. 28B. In some configurations, sheet 140 may be a flexible polymer sheet. In order to form a heatbond between non-woven textile 100 and sheet 140 at seam 106, the thermoplastic polymer material of non-woven textile 100 may extend into or infiltrate crevices or cavities within sheet 140 to secure the elements together when cooled. In circumstances where sheet 140 is formed from a thermoplastic polymer material, then the thermoplastic polymer materials of non-woven textile 100 and sheet 140 may intermingle with each other to secure non-woven textile 100 and sheet 140 together at seam 106 when cooled.

Figure 29A:
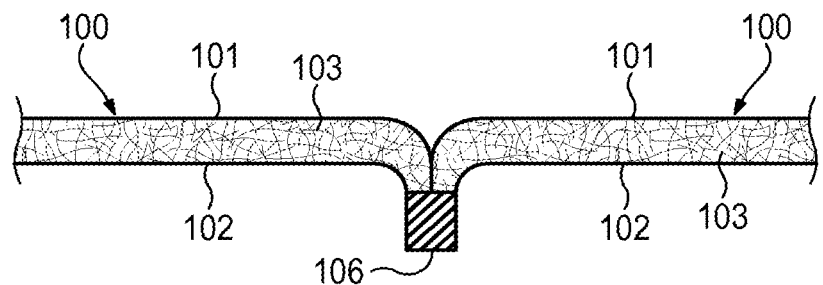
FIGS. 29A-29C are cross-sectional views corresponding with FIG. 25 and depicting further examples of the first seam configuration.
Figure 29B:
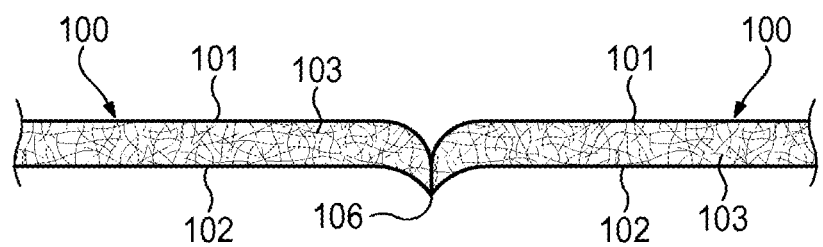
Figure 29C:
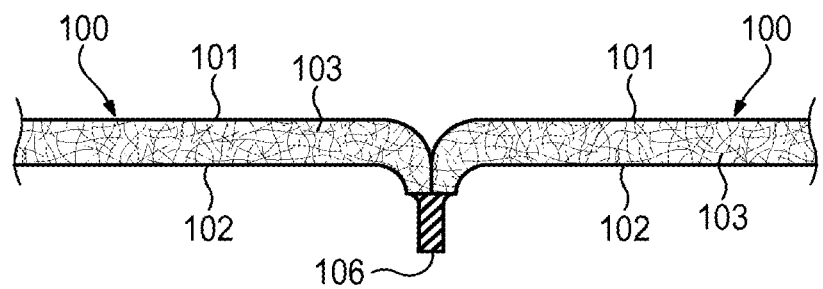

The thicknesses of elements of non-woven textile 100 are depicted as being substantially uniform, even in the areas of seam 106. Depending upon the temperature and pressure used to form seam 106, the configuration of seam 106 may vary to include a variety of other configurations. Referring to FIG. 29A, elements of non-woven textile 100 exhibit reduced thicknesses in the areas of seam 106, and the thermoplastic polymer material of filaments 103 is depicted as being in a non-filamentous configuration. Seam 106 may also exhibit a pointed configuration, as depicted in FIG. 29B. The temperature and pressure used to form seam 106 may also impart a stepped structure, as depicted in FIG. 29C. Accordingly, the configuration of the pair of elements of non-woven textile 100 at seam 106 may vary significantly. Moreover, similar configurations for seam 106 may result when non-woven textile 100 is joined with other elements, such as textile 130 or sheet 140.

As another example of the manner in which non-woven textile 100 may be joined to another element, FIGS. 30 and 31 depict a pair of elements of non-woven textile 100 that are joined to form a seam 107. In this configuration, an edge area of one non-woven textile 100 overlaps and is joined with an edge of the other non-woven textile 100 at seam 107. Although a heatbond is utilized to join the pair of elements of non-woven textile 100 to each other, stitching or adhesive bonding may also be utilized to reinforce seam 107. Moreover, a single non-woven textile 100 may also be joined with other types of elements, including textile 130 and sheet 140, to form a similar seam 107.

Figure 32A:
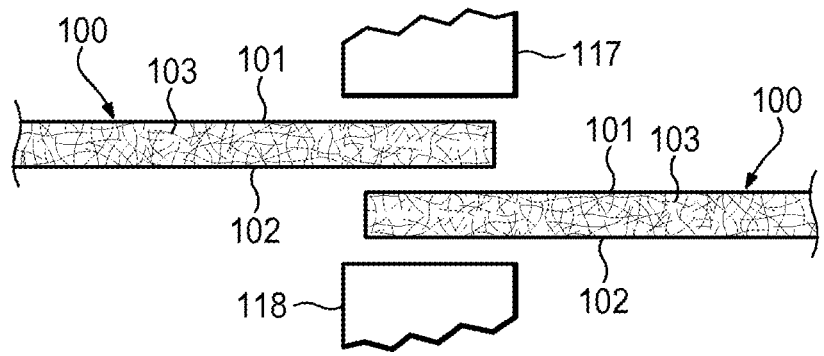
FIGS. 32A-32C are side elevational views of a process for forming the second seam configuration.
Figure 32B:
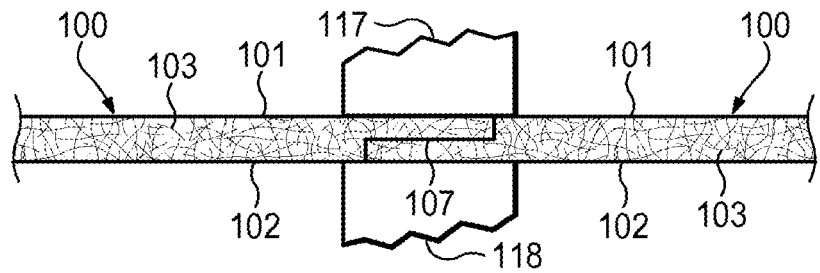
Figure 32C:
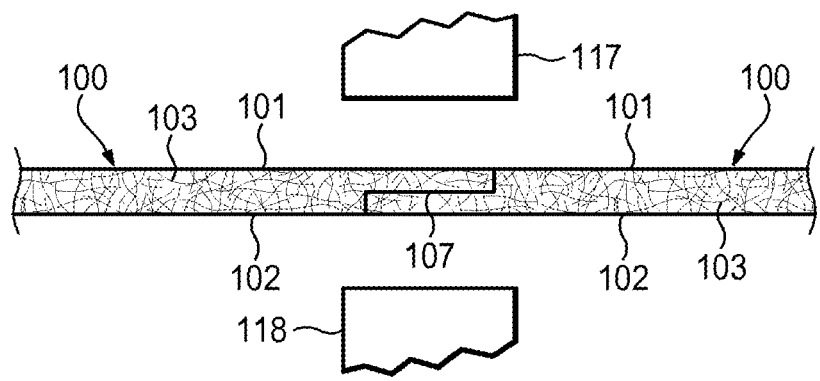

A general manufacturing process for forming seam 107 will now be discussed with reference to FIGS. 32A-32C. Initially, the pair of elements of non-woven textile 100 are positioned in an overlapping configuration between first seam-forming die 117 and second seam-forming die 118, as depicted in FIG. 32A. Seam-forming dies 117 and 118 then translate or otherwise move toward each other in order to compress or induce contact between edge areas of the pair of non-woven textile elements 100, as depicted in FIG. 32B. In order to form the heatbond and join the edge areas of the elements of non-woven textile 100, seam-forming dies 117 and 118 apply heat to the edge areas. That is, seam-forming dies 117 and 118 elevate the temperatures of the edge areas of the pair of elements of non-woven textile 100 to cause softening or melting of the thermoplastic polymer material at the interface between the edge areas. Upon separating seam-forming dies 117 and 118, as depicted in FIG. 32C, seam 107 is formed between the edge areas of the pair of elements of non-woven textile 100.

Figure 33:
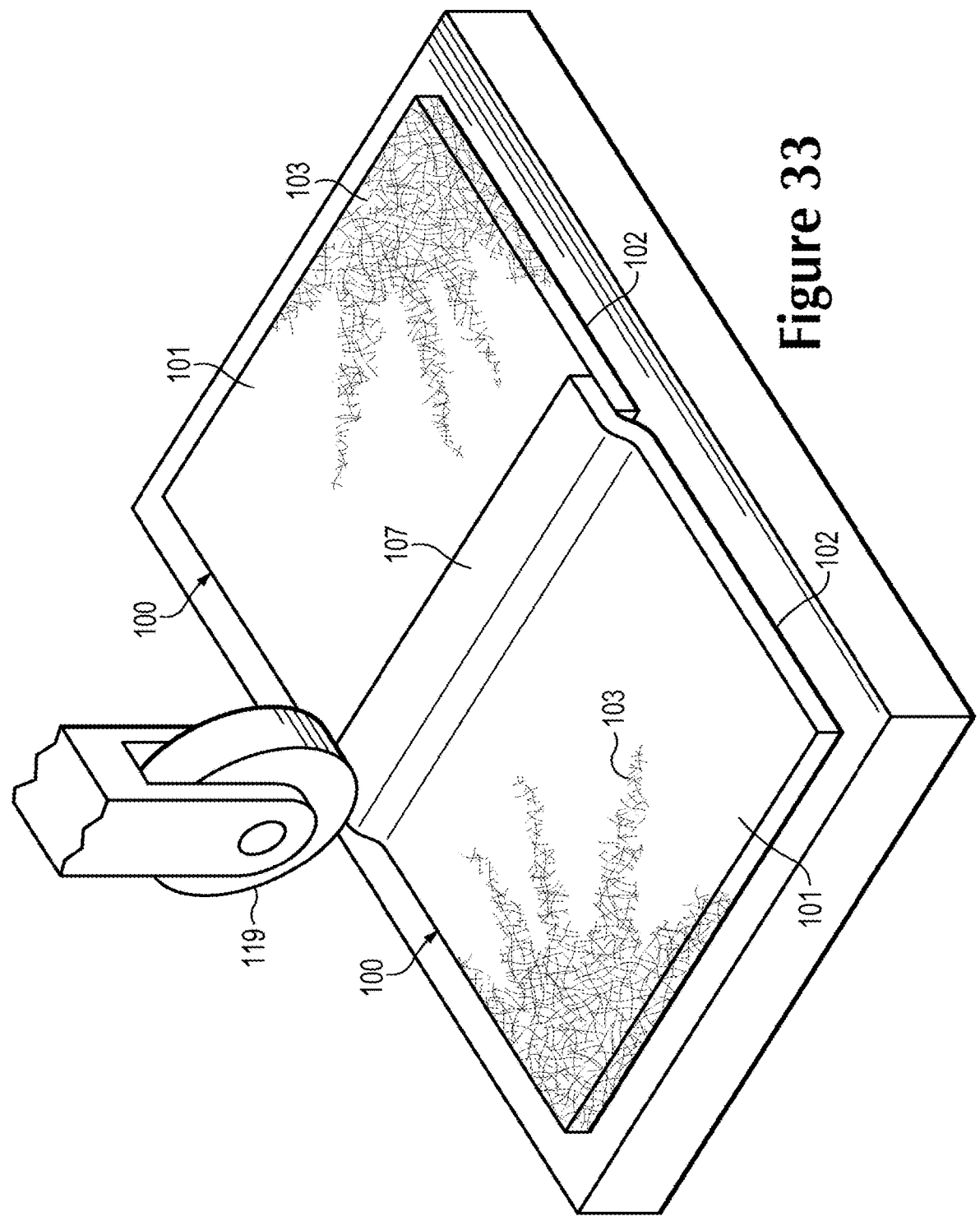
FIG. 33 is a perspective view of another process for forming the second seam configuration.

Although the general process discussed above may be utilized to form seam 107, other methods may also be utilized. Rather than heating the edge areas of elements of non-woven textile 100 through conduction, other methods that include radio frequency heating, chemical heating, or radiant heating may be utilized. In some processes, stitching or adhesives may also be utilized between the pair of elements of non-woven textile 100 to supplement the heatbond. As an alternate method, the pair of elements of non-woven textile 100 may be placed upon a surface, such as second plate 112, and heated roller 119 may form seam 107, as depicted in FIG. 33. Referring to FIG. 31, filaments 103 are depicted as remaining in the filamentous configuration in the area of seam 107, but may be melted into a non-filamentous configuration or may take the intermediate configuration. Accordingly, although filaments 103 in the area of seam 107 are generally fused to a greater degree than filaments 103 in other areas of non-woven textile 100, the degree of fusing may vary significantly.

Figure 34A:
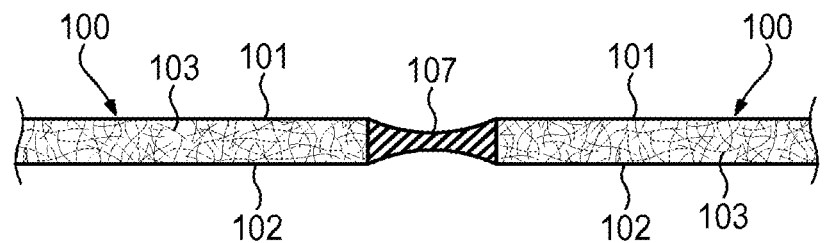
FIGS. 34A-34C are cross-sectional views corresponding with FIG. 31 and depicting further configurations of the second seam configuration.
Figure 34B:
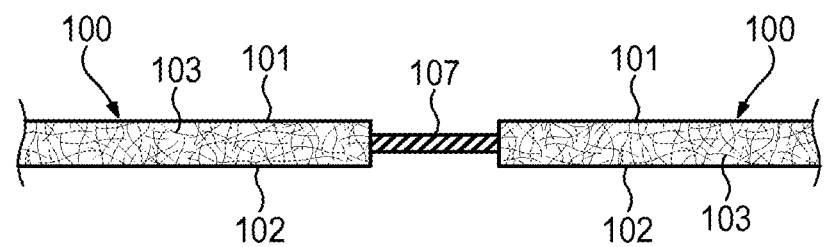
Figure 34C:
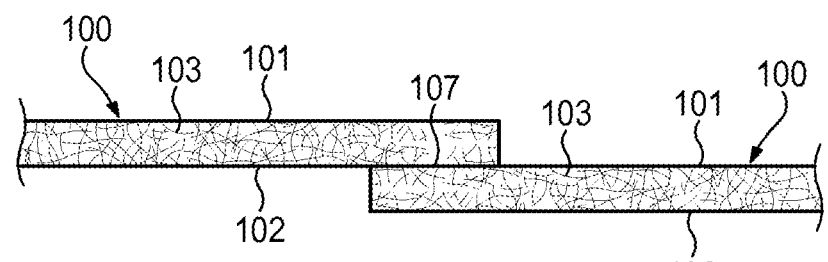

First surfaces 101 of the pair of elements of non-woven textile 100 are depicted as being co-planar or flush with each other in FIGS. 30 and 31. Similarly, second surfaces 102 of the pair of elements of non-woven textile 100 are also depicted as being coplanar or flush with each other. Depending upon the temperature and pressure used to form seam 107, the configuration of seam 107 may vary to include a variety of other configurations. Referring to FIG. 34A, surfaces 101 and 102 bow inward at seam 107, and the thermoplastic polymer material is depicted as having a non-filamentous configuration. Surfaces 101 and 102 angle inward more-abruptly in FIG. 34B, which may be caused from pressure exerted by seam-forming dies 117 and 118. As another configuration, FIG. 34C depicts the pair of elements of non-woven textile 100 as being joined at 107 in a non-coplanar configuration. Accordingly, the configuration of the pair of elements of non-woven textile 100 at seam 107 may vary significantly. Moreover, similar configurations for seam 107 may result when non-woven textile 100 is joined with other elements, such as textile 130 or sheet 140.

VIII—General Product Configurations

Non-woven textile 100, multiple elements of non-woven textile 100, or various composite element configurations may be utilized in articles of apparel (e.g., shirts, jackets and other outerwear, pants, footwear), containers, and upholstery for furniture. Various configurations of non-woven textile 100 may also be utilized in bed coverings, table coverings, towels, flags, tents, sails, and parachutes, as well as industrial purposes that include automotive and aerospace applications, filter materials, medical textiles, geotextiles, agrotextiles, and industrial apparel. Accordingly, non-woven textile 100 may be utilized in a variety of products for both personal and industrial purposes.

Although non-woven textile 100 may be utilized in a variety of products, the following discussion provides examples of articles of apparel that incorporate non-woven textile 100. That is, the following discussion demonstrates various ways in which non-woven textile 100 may be incorporated into a shirt 200, a pair of pants 300, and an article of footwear 400. Moreover, examples of various configurations of shirt 200, pants 300, and footwear 400 are provided in order to demonstrate various concepts associated with utilizing non-woven textile 100 in products. Accordingly, while the concepts outlined below are specifically applied to various articles of apparel, the concepts may be applied to a variety of other products.

IX—Shirt Configurations

Various configurations of shirt 200 are depicted in FIGS. 35A-35H as including a torso region 201 and a pair of arm regions 202 that extend outward from torso region 201. Torso region 201 corresponds with a torso of a wearer and covers at least a portion of the torso when worn. An upper area of torso region 201 defines a neck opening 203 through which the neck and head of the wearer protrude when shirt 200 is worn. Similarly, a lower area of torso region 201 defines a waist opening 204 through which the waist or pelvic area of the wearer protrudes when shirt 200 is worn. Arm regions 202 respectively correspond with a right arm and a left arm of the wearer and cover at least a portion of the right arm and the left arm when shirt 200 is worn. Each of arm regions 202 define an arm opening 205 through which the hands, wrists, or arms of the wearer protrude when shirt 200 is worn. Shirt 200 has the configuration of a shirt-type garment, particularly a long-sleeved shirt. In general, shirt-type garments cover a portion of a torso of the wearer and may extend over arms of the wearer. In further examples, apparel having the general structure of shirt 200 may have the configuration of other shirt-type garments, including short-sleeved shirts, tank tops, undershirts, jackets, or coats.

Figure 35A:
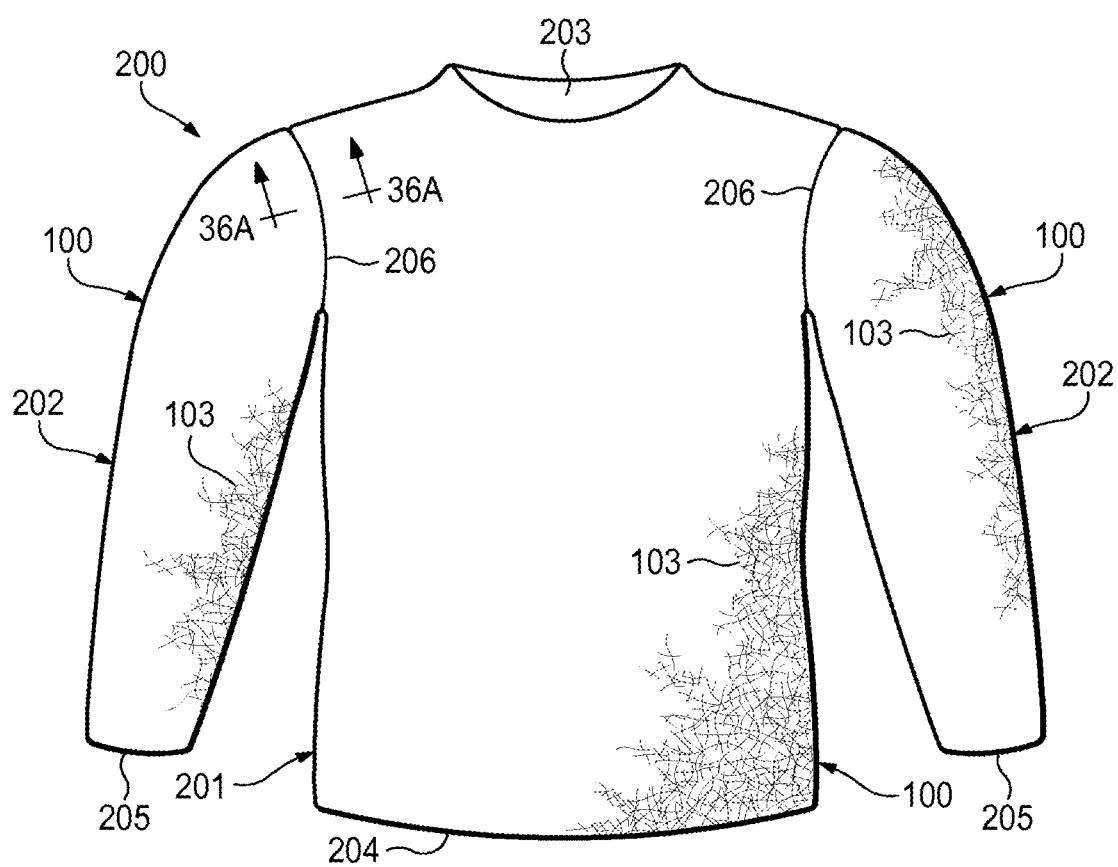
Figure 36A:
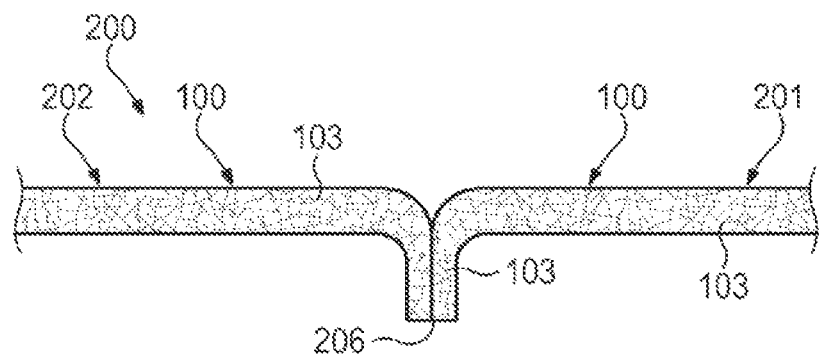
FIGS. 36A-36H are cross-sectional views of the configurations of the shirt, as respectively defined by section lines 36A-36A through 36H-36H in FIGS. 35A-35H.

A first configuration of shirt 200 is depicted in FIGS. 35A and 36A. A majority of shirt 200 is formed from non-woven textile 100. More particularly, torso region 201 and each of arm regions 202 are primarily formed from non-woven textile 100. Although shirt 200 may be formed from a single element of non-woven textile 100, shirt 200 is generally formed from multiple joined elements of non-woven textile 100. As depicted, for example, at least a front area of torso region 201 is formed one element of non-woven textile 100, and each of arm regions 202 are formed from different elements of non-woven textile 100. A pair of seams 206 extends between torso region 201 and arm regions 202 in order to join the various elements of non-woven textile 100 together. In general, seams 206 define regions where edge areas of the elements of non-woven textile 100 are heat-bonded with each other. Referring to FIG. 36A, one of seams 206 is depicted as having the general configuration of seam 106, but may also have the configuration of seam 107 or another type of seam. Stitching and adhesive bonding may also be utilized to form or supplement seams 206.

Figure 35B:
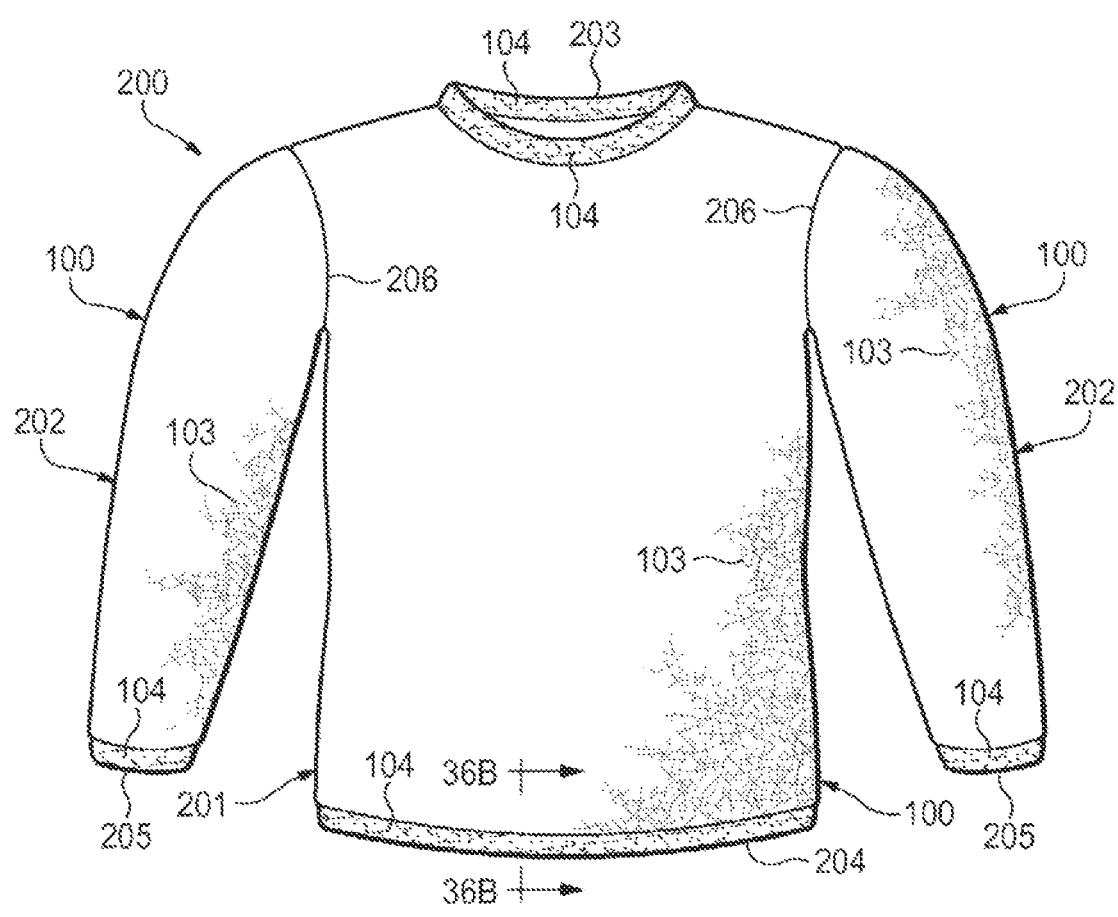
Figure 36B:
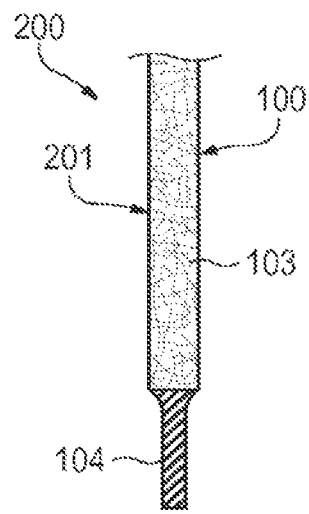

A second configuration of shirt 200 is depicted in FIGS. 35B and 36B. As with the configuration of FIG. 35A, a majority of shirt 200 is formed from non-woven textile 100. In order to impart different properties to specific areas of shirt 200, various fused regions 104 are formed in non-woven textile 100. More particularly, fused regions 104 are formed around neck opening 203, waist opening 204, and each of arm openings 205. Given that each of openings 203-205 may be stretched as shirt 200 is put on an individual and taken off the individual, fused regions 104 are located around openings 203-205 in order to impart greater stretch-resistance to these areas. Filaments 103 in fused regions 104 of shirt 200 are generally fused to a greater degree than filaments 103 in other areas of shirt 200 and may exhibit a non-filamentous configuration, as depicted in FIG. 36B. Filaments 103 in fused regions 104 of shirt 200 may also exhibit a filamentous configuration or the intermediate configuration. In addition to providing greater stretch-resistance, fused regions 104 impart enhanced durability to the areas around openings 203-205.

Figure 35C:
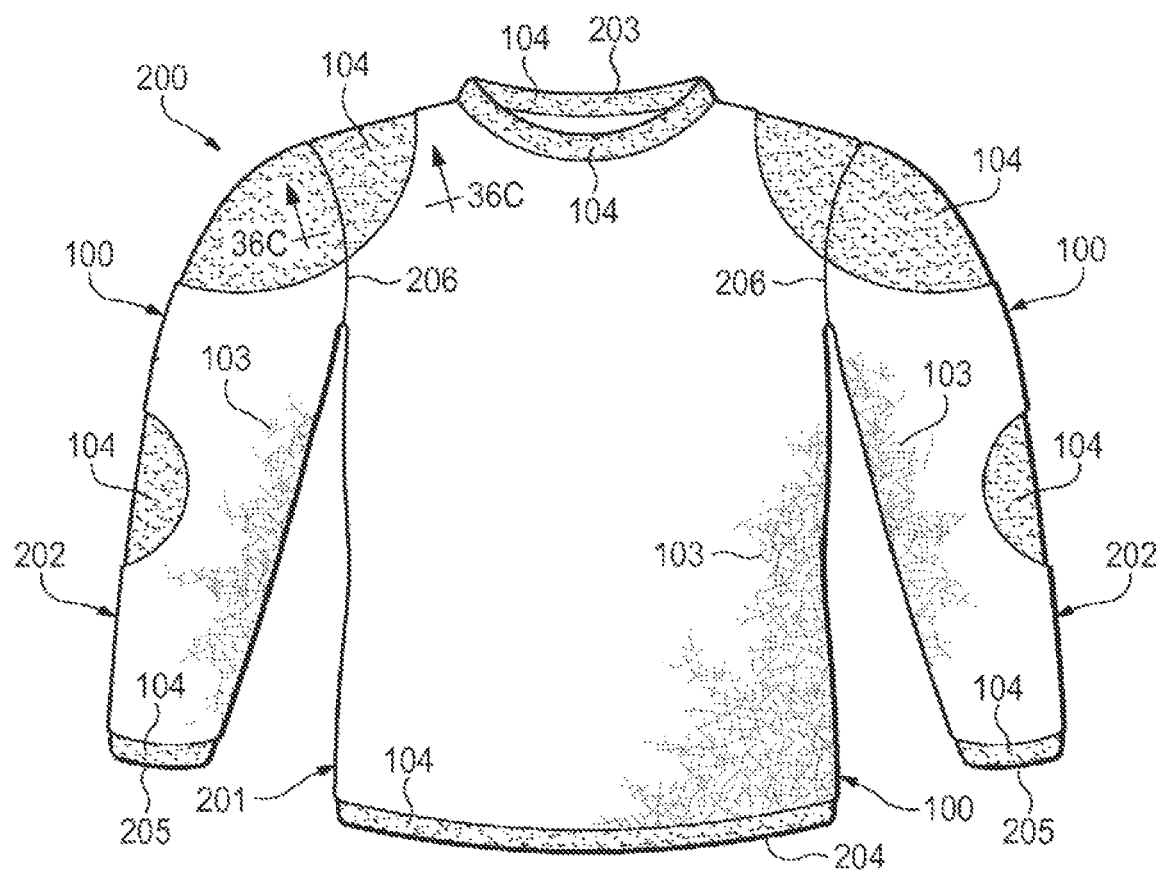
Figure 36C:
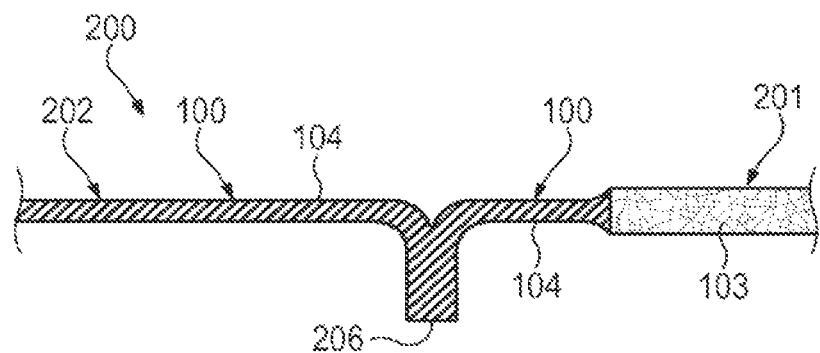

A third configuration of shirt 200 is depicted in FIGS. 35C and 36C as including further fused regions 104. Given that elbow areas of shirt 200 may be subjected to relatively high abrasion as shirt 200 is worn, some of fused regions 104 may be located in the elbow areas to impart greater durability. Also, backpack straps that extend over shoulder areas of shirt 200 may abrade and stretch the shoulder areas. Additional fused regions 200 are, therefore, located in the shoulder areas of shirt 200 to impart both durability and stretch-resistance. The areas of non-woven textile 100 that are located in the shoulder areas and around seams 206 effectively form both seams 206 and the fused regions 104 in the shoulder areas, as depicted in FIG. 36C. Two separate processes may be utilized to form these areas. That is, a first heatbonding process may form seams 206, and a second heating process may form the fused regions 104 in the shoulder areas. As an alternative, however, seams 206 and the fused regions 104 in the shoulder areas may be formed through a single heatbonding/heating process.

Although the size of fused regions 104 in shirt 200 may vary significantly, some of fused regions 104 generally have a continuous area of at least one square centimeter. As noted above, various embossing or calendaring processes may be utilized during the manufacturing process for non-woven textile 100. Some embossing or calendaring processes may form a plurality of relatively small areas (i.e., one to ten square millimeters) where filaments 103 are somewhat fused to each other. In contrast with the areas formed by embossing or calendaring, some of fused regions 104 have a continuous area of at least one square centimeter. As utilized herein, "continuous area" or variants thereof is defined as a relatively unbroken or uninterrupted region. As examples, and with reference to FIG. 35C, the fused region 104 around neck opening 203 individually forms a continuous area, each of the fused regions 104 in the elbow areas of shirt 200 individually form a continuous area, and each of the fused regions 104 in the shoulder areas of shirt 200 individually form a continuous area. All of fused regions 104 (i.e., around neck openings 203-205 and in the shoulder and elbow areas) are not collectively one continuous area because portions of non-woven textile 100 without significant fusing extend between these fused regions 104.

Figure 35D:
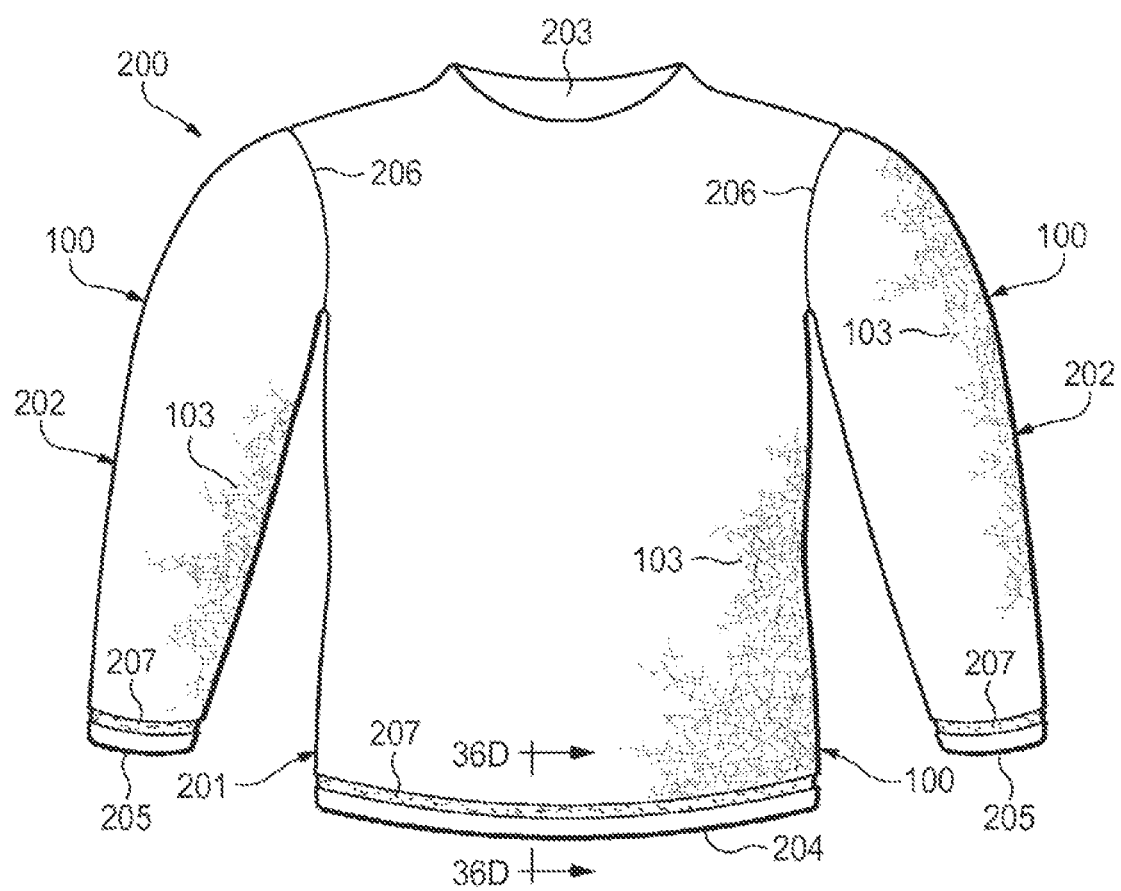
Figure 36D:
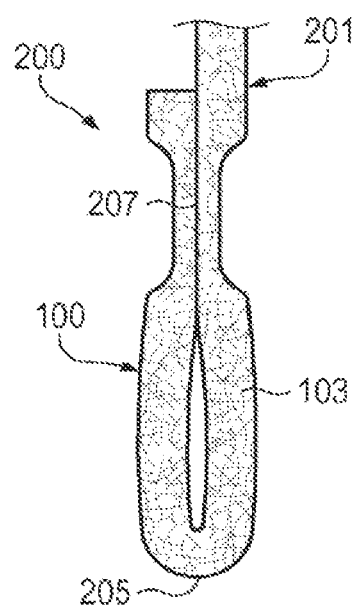

A fourth configuration of shirt 200 is depicted in FIGS. 35D and 36D. Referring to FIGS. 35B and 36B, fused regions 104 are utilized to provide stretch-resistance to the areas around openings 203-205. Another structure that may be utilized to provide stretch-resistance, as well as a different aesthetic, involves folding non-woven textile 100 and heatbonding or otherwise securing non-woven textile 100 to itself at various bond areas 207, as generally depicted in FIG. 36D. Although this structure may be utilized for any of openings 203-205, bond areas 207 where textile 100 is heatbonded to itself are depicted as extending around waist opening 204 and arm openings 205.

Figure 36E:
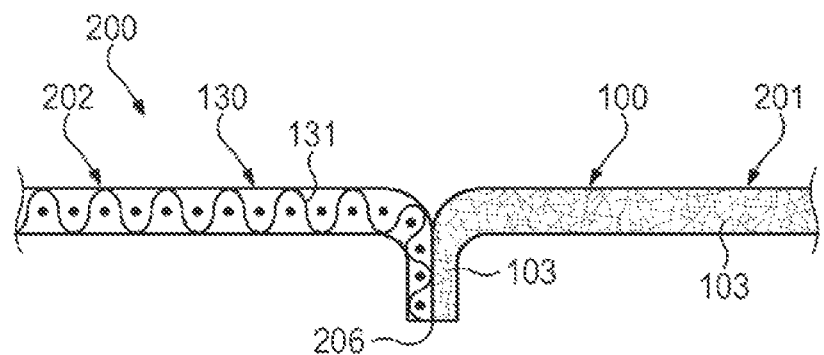

A fifth configuration of shirt 200 is depicted in FIGS. 35E and 36E. Whereas the configurations of shirt 200 depicted in FIGS. 35A-35D are primarily formed from non-woven textile 100, arm regions 202 in this configuration of shirt 200 are formed from textile 130, which is a mechanically-manipulated textile. As discussed above, seams having the configuration of seams 106 and 107 may join non-woven textile 100 with a variety of other materials, including textile 130. Seams 206 join, therefore, non-woven textile from torso region 201 with elements of textile 130 from arm regions 202. Utilizing various types of textile materials within shirt 200 may for example, enhance the comfort, durability, or aesthetic qualities of shirt 200. Although arm regions 202 are depicted as being formed from textile 130, other areas may additionally or alternatively be formed form textile 130 or other materials. For example, a lower portion of torso region 201 may be formed from textile 130, only an area around neck opening 203 may be formed from textile 130, or the configuration of FIG. 35E may be reversed such that torso region 201 is formed from textile 130 and each of arm regions 202 are formed from non-woven textile 100. Although textile 130 is utilized as an example, elements formed from the materials of sheet 140 or foam layer 150 may also be incorporated into shirt 200 and joined with non-woven textile 100. Accordingly, an article of apparel, such as shirt 200, may incorporate both non-woven textile 100 and various other textiles or materials. Various fused regions 104 are also formed in the non-woven textile 100 of torso region 201 in order to impart different properties to specific areas of shirt 200 that incorporate non-woven textile 100.

Figure 35F:
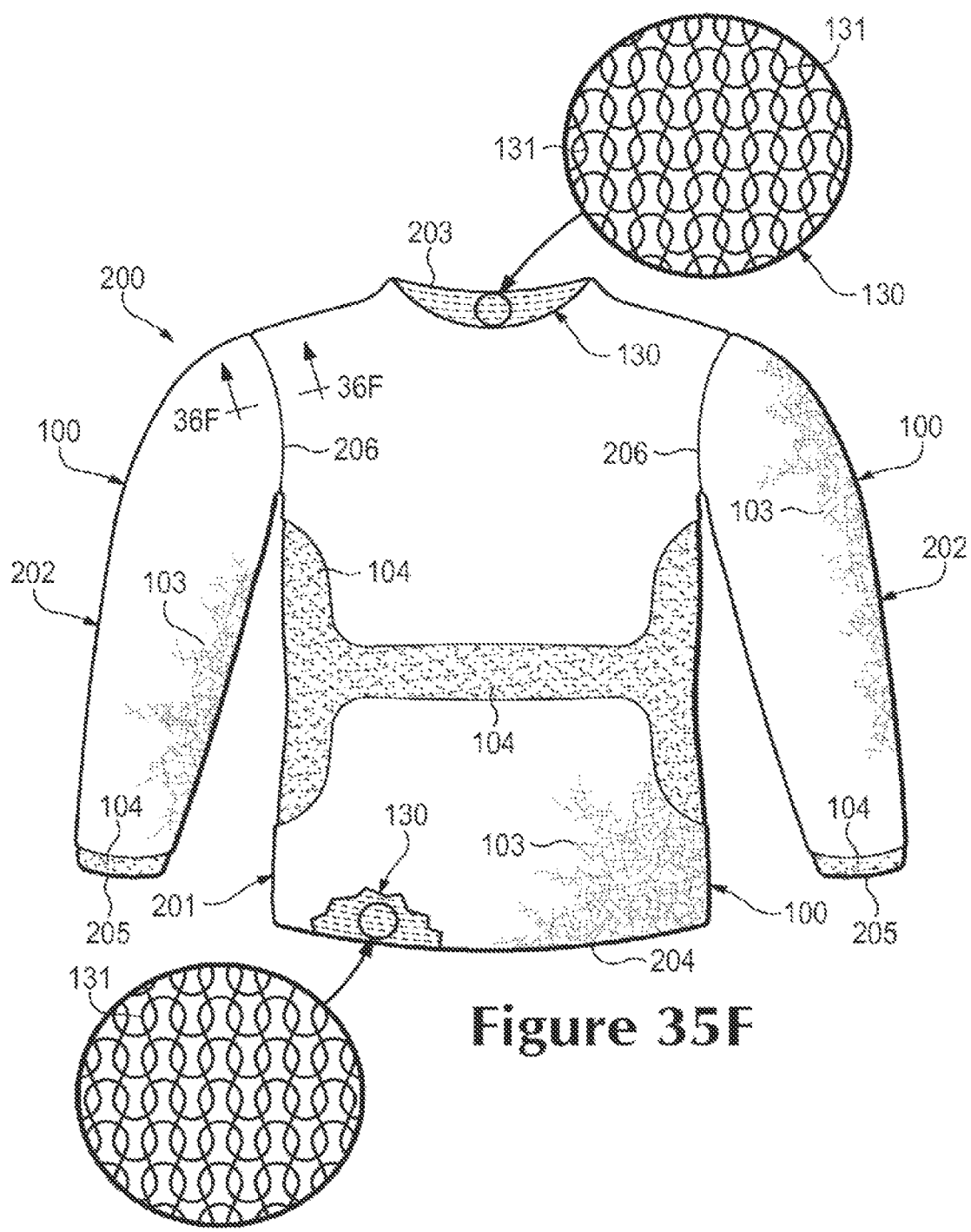
Figure 36F:
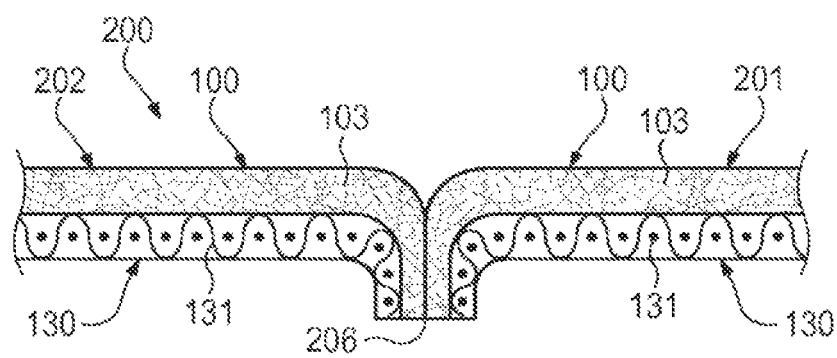

A sixth configuration of shirt 200 is depicted in FIGS. 35F and 36F, in which a majority of shirt 200 is formed from a composite element of non-woven textile 100 and textile 130. More particularly, the material forming shirt 200 has a layered structure including an outer layer of non-woven textile 100 and an inner layer of textile 130. The combination of non-woven textile 100 and textile 130 may impart some advantages over either of non-woven textile 100 and textile 130 alone. For example, textile 130 may exhibit one-directional stretch that imparts one-directional stretch to the composite element. Textile 130 may also be positioned to contact the skin of an individual wearing shirt 200, and the materials selected for textile 130 and the structure of textile 130 may impart more comfort than non-woven textile 100 alone. As an additional matter, the presence of non-woven textile 100 permits elements to be joined through heatbonding. Referring to FIG. 36F, surfaces of the composite material that include non-woven textile 100 are heatbonded to each other to join elements from torso region 201 and one of arm regions 202. Various fused regions 104 are also formed in regions 201 and 202 in order to impart different properties to specific areas of shirt 200.

Figure 35G:
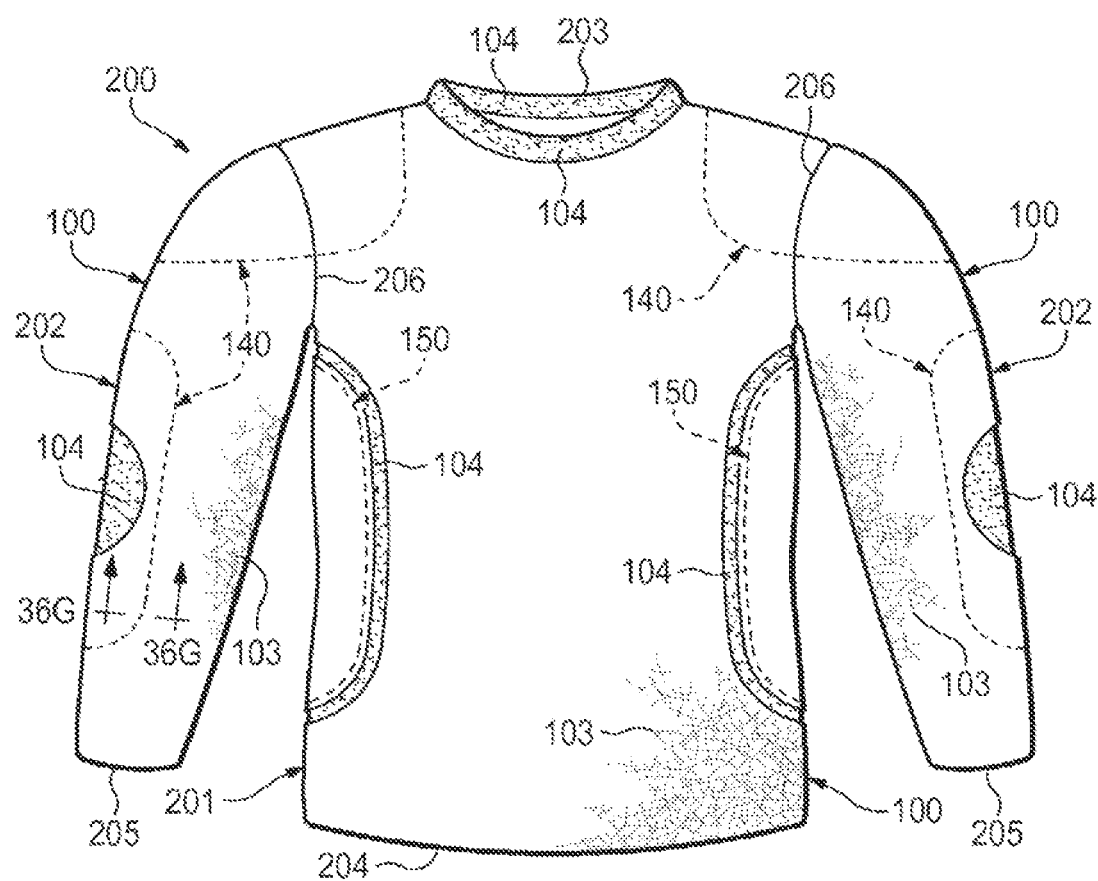
Figure 36G:
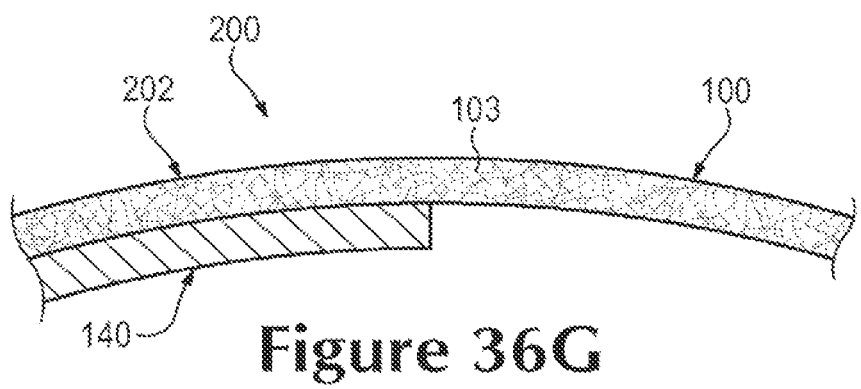

A seventh configuration of shirt 200 is depicted in FIGS. 35G and 36G. In order to provide protection to a wearer, various sheets 140 and foam layers 150 are heatbonded to an interior surface of non-woven textile 100. More particularly, two sheets 140 are located in the shoulder areas of shirt 200, two sheets 140 are located in arm regions 202, and two foam layers 150 are located on sides of torso region 201. Various fused regions 104 are also formed in non-woven textile 100. More particularly, a pair of fused regions 104 extend around the areas where foam layers 150 are located in torso region 201, and a pair of fused regions 104 extend over the areas where sheets 140 are located in arm regions 202. These fused regions 104 may be utilized to reinforce or add stretch-resistance to areas surrounding foam layers 150 or provide greater durability to areas over sheets 140, for example.

Figure 35H:
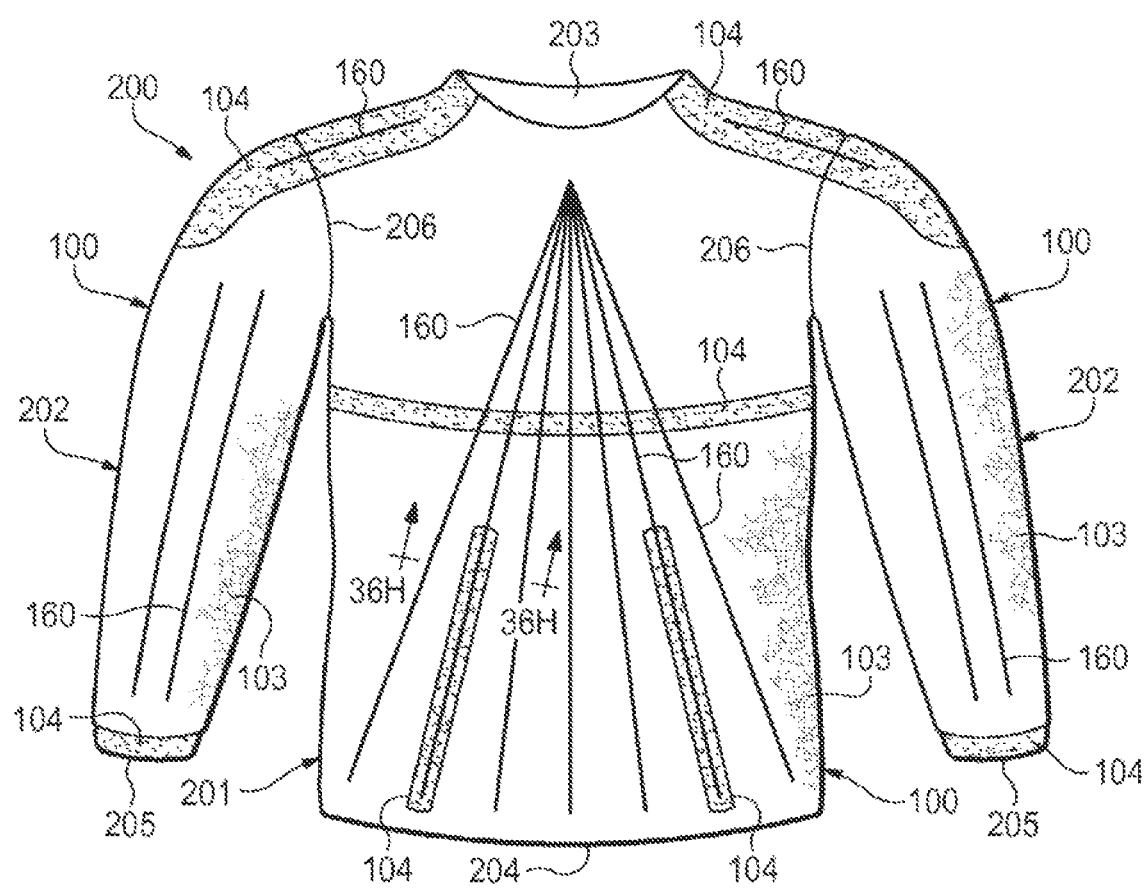
Figure 36H:
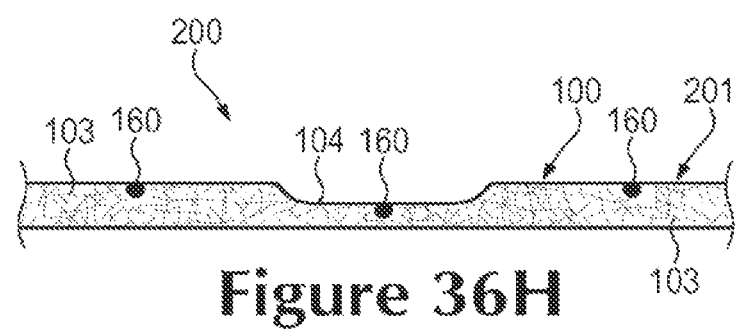

An eighth configuration of shirt 200 is depicted in FIGS. 35H and 36H. In addition to various fused regions 104 that are formed in non-woven textile 100, a plurality of strands 160 are also embedded within non-woven textile 100 to, for example, impart stretch-resistance or additional strength to specific areas of shirt 200. More particularly, seven strands 160 radiate outward and downward from a point in an upper portion of torso region 201, two strands 160 extend in parallel along each of arm regions 202, and at least one strand 160 extends across seams 206 in shoulder areas of shirt 200. Some of strands 160 extend through various fused regions 104 that may impart additional stretch-resistance or durability, for example, to the areas surrounding strands 160. In torso region 201, each of strands 160 pass through one of fused regions 104, while two of strands 160 extend along a pair of fused regions 104. In the shoulder areas of shirt 200, a pair of strands 160 are located entirely within fused regions 104. Accordingly, strands 160 may be utilized alone or coupled with fused regions 104.

Based upon the above discussion, non-woven textile 100 may be utilized in an article of apparel, such as shirt 200. In some configurations, seams 206 having the configuration of either of seams 106 or 107 may be used to join textile elements, including elements of non-woven textile 100. In order to impart different properties to areas of shirt 200, various fused regions 104 may be formed, different types of textiles may be incorporated into shirt 200, and composite elements may be formed by joining one or more of textile 130, sheet 140, foam layer 150, strands 160, or various other components to non-woven textile 100. By forming fused regions 104 in non-woven textile 100 and combining non-woven textile 100 with other components to form composite elements, various properties and combinations of properties may be imparted to different areas of shirt 200. That is, the various concepts disclosed herein may be utilized individually or in combination to engineer the properties of shirt 200 and tailor shirt 200 to a specific purpose. Given that non-woven textile 100 incorporates a thermoplastic polymer material, seams 206 and the composite elements may be formed through heatbonding.

X—Pants Configurations

Figure 37A:
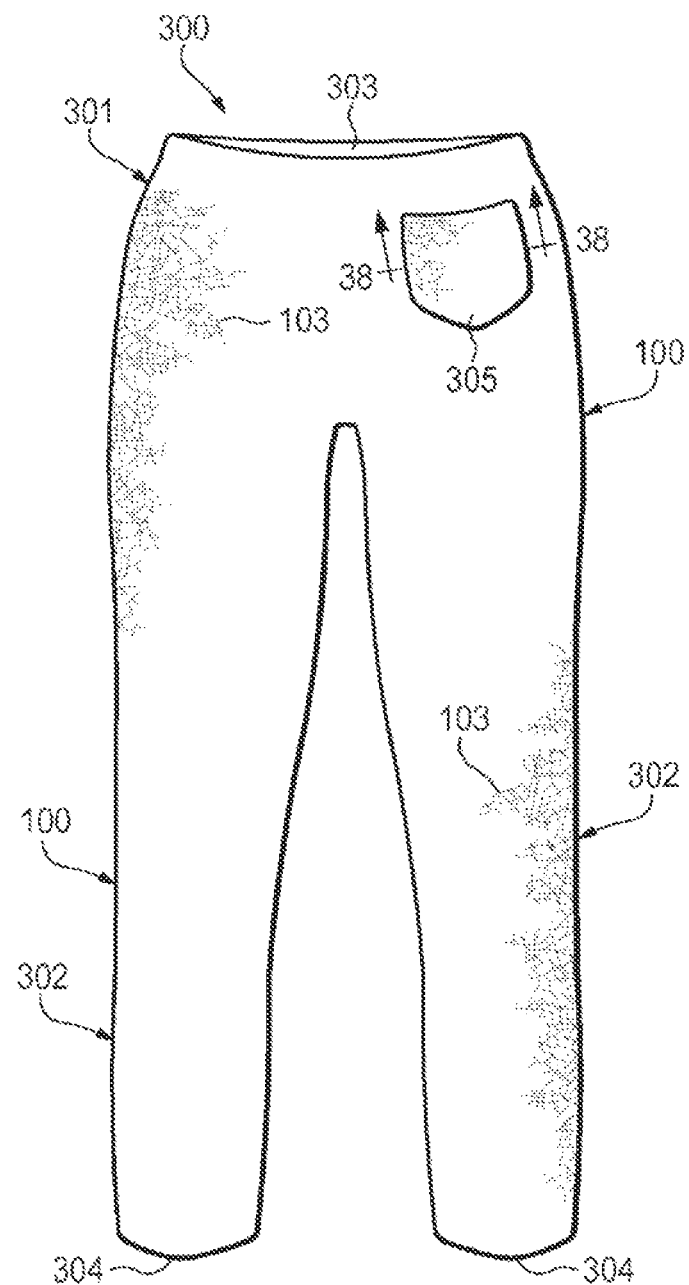
FIGS. 37A-37C are front elevational views of various configurations of a pair of pants that includes the non-woven textile.
Figure 37B:
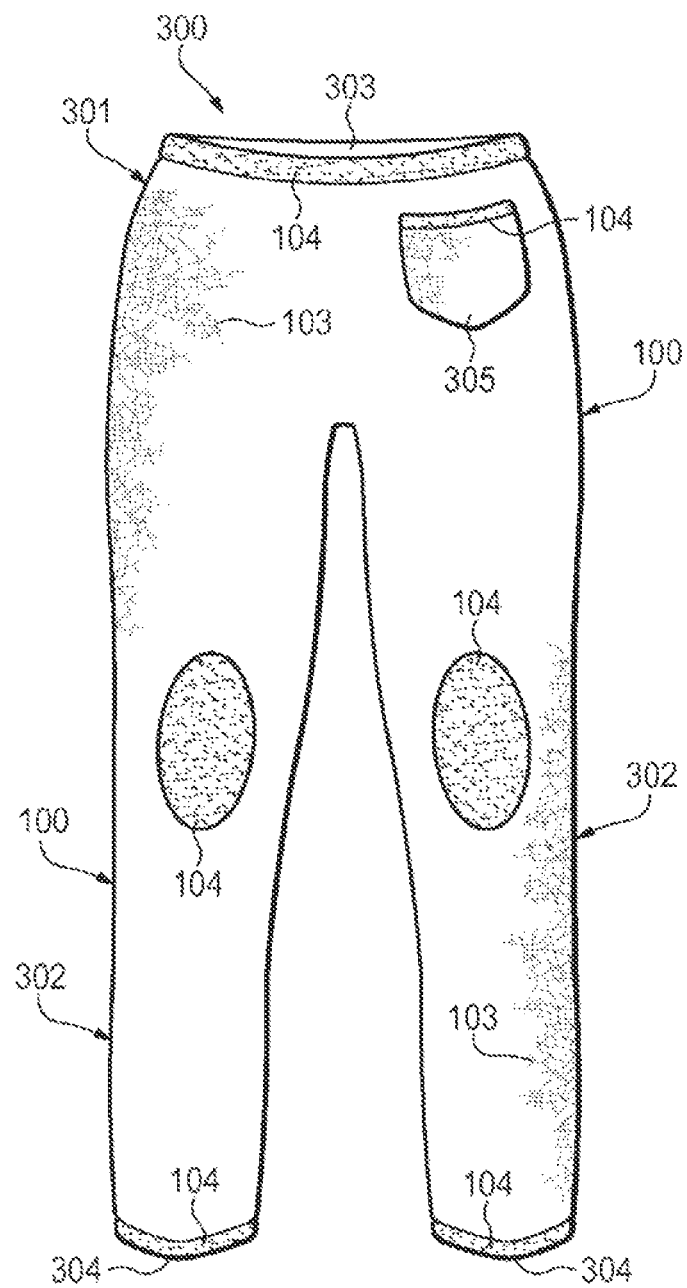
Figure 37C:
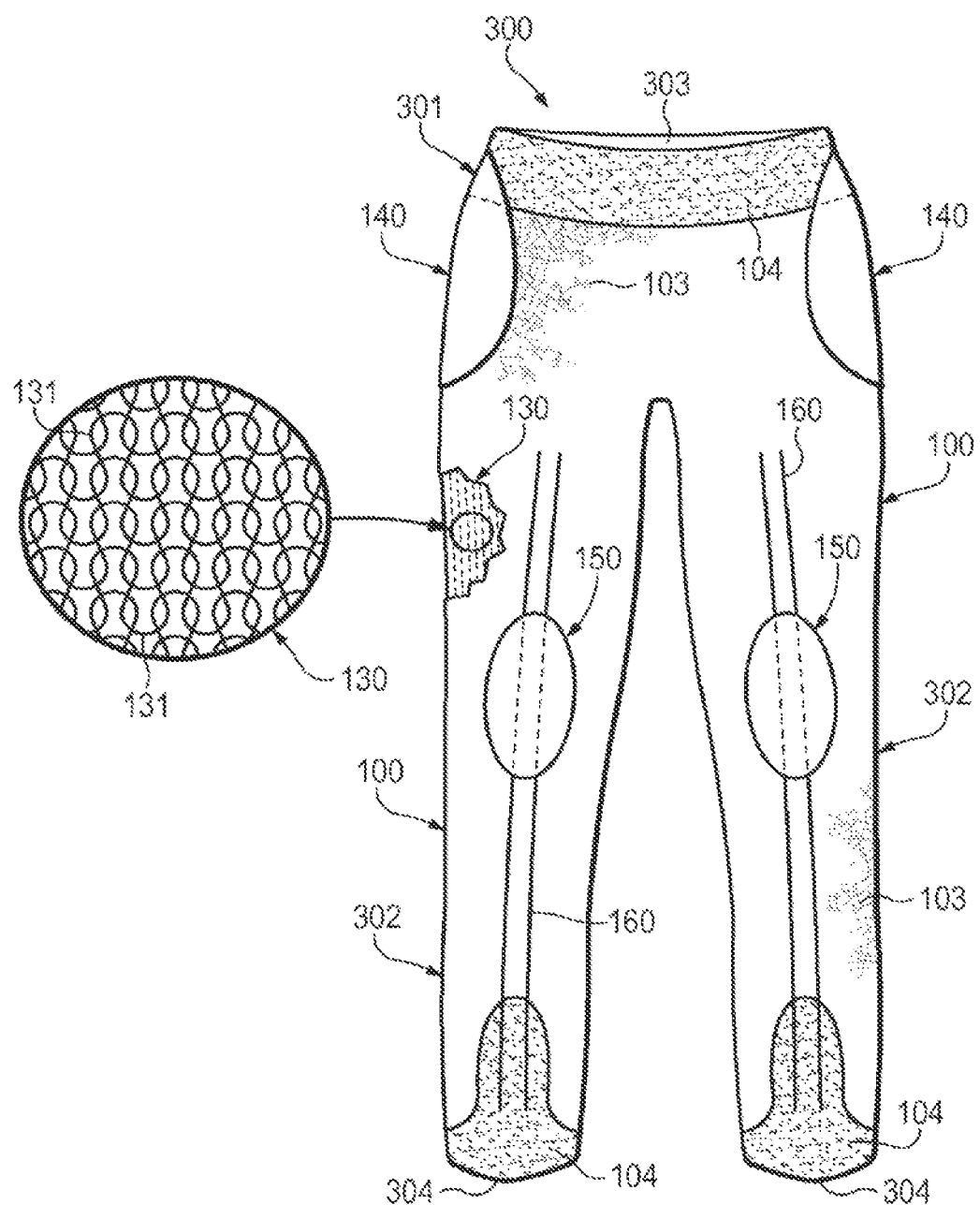

Various configurations of pants 300 are depicted in FIGS. 37A-37C as including a pelvic region 301 and a pair of leg regions 302 that extend downward from pelvic region 301.

Pelvic region 301 corresponds with a lower torso and pelvis bone of a wearer and covers at least a portion of the lower torso when worn. An upper area of pelvic region 301 defines a waist opening 303 through which the torso extends when pants 300 are worn. Leg regions 302 respectively correspond with a right leg and a left leg of the wearer and cover at least a portion of the right leg and the left leg when pants 300 are worn. Each of leg regions 302 define an ankle opening 304 through which the ankle and feet of the wearer protrude when pants 300 are worn. Pants 300 have the configuration of a pants-type garment, particularly a pair of athletic pants. In general, pants-type garments cover the lower torso of the wearer and may extend over legs of the wearer. In further examples, apparel having the general structure of pants 300 may have the configuration of other pants-type garments, including shorts, jeans, briefs, swimsuits, and undergarments.

A first configuration of pants 300 is depicted in FIG. 37A. A majority of pants 300 is formed from non-woven textile 100. More particularly, pelvic region 301 and each of leg regions 302 are primarily formed from non-woven textile 100. Although pants 300 may be formed from a single element of non-woven textile 100, pants 300 is generally formed from multiple joined elements of non-woven textile 100. Although not depicted, seams similar to seams 106, 107, or 206 may be utilized to join the various elements of non-woven textile 100 together. Stitching and adhesive bonding may also be utilized to form or supplement the seams.

Figure 38:
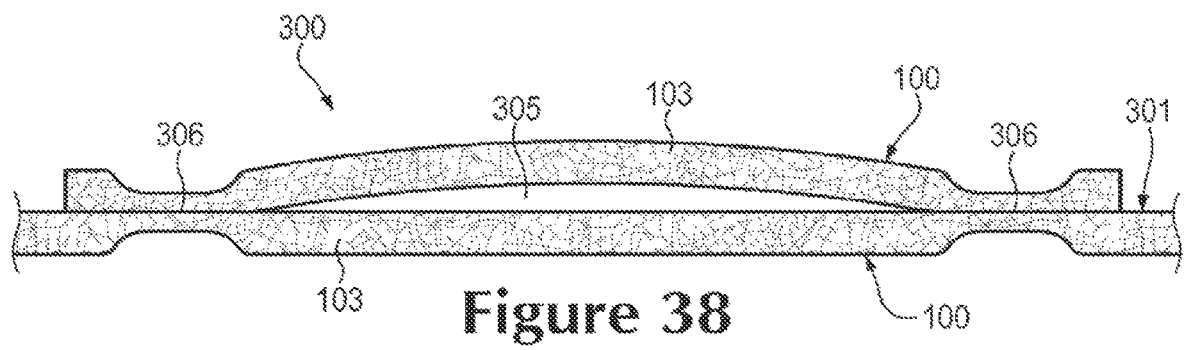
FIG. 38 is a cross-sectional view of the pair of pants, as defined by section line 38-38 in FIG. 33A.

A pocket 305 is formed in pants 300 and may be utilized to hold or otherwise contain relatively small objects (e.g., keys, wallet, identification card, mobile phone, portable music player). Two overlapping layers of non-woven textile 100 are utilized to form pocket 305, as depicted in FIG. 38. More particularly, a bond area 306 is utilized to heatbond the layers of non-woven textile 100 to each other. A central area of one of the layers of non-woven textile 100 remains unbonded, however, to form the areas within pocket 305 for containing the objects. A pocket similar to pocket 305 may also be formed in other products and articles of apparel, including shirt 200.

A second configuration of pants 300 is depicted in FIG. 37B. As with the configuration of FIG. 37A, a majority of pants 300 is formed from non-woven textile 100. In order to impart different properties to specific areas of pants 300, various fused regions 104 are formed in non-woven textile 100. More particularly, fused regions 104 are formed around waist opening 303 and each of leg openings 304. Another fused region 104 is formed at an opening for pocket 305. Given that each of openings 303 and 304, as well as the opening to pocket 305, may be stretched, fused regions 104 may be utilized to impart greater stretch-resistance to these areas. That is, filaments 103 in fused regions 104 of pants 300 are generally fused to a greater degree than filaments 103 in other areas of pants 300 and may have any of the filamentous, non-filamentous, or intermediate configurations discussed above. In addition to providing greater stretch-resistance, fused regions 104 impart enhanced durability. Given that knee areas of pants 300 may be subjected to relatively high abrasion as pants 300 are worn, additional fused regions 104 may be located in the knee areas to impart greater durability.

A third configuration of pants 300 is depicted in FIG. 37C. As with shirt 200, fused regions 104, textile 130, sheet 140, foam layer 150, and strands 160 may be utilized to impart properties to various areas of pants 300. In leg regions 302, for example, textile 130 is heatbonded to an interior surface of non-woven textile 100. A pair of sheets 140 are heatbonded to pants 300 in side areas of pelvic region 301, and portions of the fused region 104 around waist opening 303 extend under sheets 140. A pair of foam layers 150 are also located in the knee areas of pants 300, and strands 160 that extend along leg regions 302 extend under foam layers 150 (e.g., between non-woven textile 100 and foam layers 150). End areas of strands 160 also extend into fused regions 104 in lower areas of leg regions 302. Accordingly, fused regions 104, textile 130, sheet 140, foam layer 150, and strands 160 may be utilized or combined in a variety of ways to impart properties to different various areas of pants 300. Whereas various elements of sheet 140 and foam layer 150 are heatbonded with an interior surface of shirt 200 in FIG. 35G, various elements of sheet 140 and foam layer 150 are heatbonded with an exterior surface of pants 300 in FIG. 37C. Depending upon various structural and aesthetic factors, composite elements and apparel including the composite elements may be formed with components (e.g., textile 130, sheet 140, foam layer 150, strands 160) located on an exterior or an interior of non-woven textile 100.

Based upon the above discussion, non-woven textile 100 may be utilized in an article of apparel, such as pants 300. Seams of various types may be used to join textile elements, including elements of non-woven textile 100. In order to impart different properties to areas of pants 300, various fused regions 104 may be formed, different types of textiles may be incorporated into shirt 200, and composite elements may be formed by joining one or more of textile 130, sheet 140, foam layer 150, strands 160, or various other components to non-woven textile 100. By forming fused regions 104 in non-woven textile 100 and combining non-woven textile 100 with other components to form composite elements, various properties and combinations of properties may be imparted to different areas of pants 300. That is, the various concepts disclosed herein may be utilized individually or in combination to engineer the properties of pants 300 and tailor pants 300 to a specific purpose. Given that non-woven textile 100 incorporates a thermoplastic polymer material, the seams and composite elements may be formed through heatbonding.

XI—Footwear Configurations

Various configurations of footwear 400 are depicted in FIGS. 39A-39G as including a sole structure 410 and an upper 420. Sole structure 410 is secured to upper 420 and extends between the foot of a wearer and the ground when footwear 400 is placed upon the foot. In addition to providing traction, sole structure 410 may attenuate ground reaction forces when compressed between the foot and the ground during walking, running, or other ambulatory activities. As depicted, sole structure 410 includes a fluid-filled chamber 411, a reinforcing structure 412 that is bonded to and extends around an exterior of chamber 411, and an outsole 413 that is secured to a lower surface of chamber 411, which is similar to a sole structure that is disclosed in U.S. Pat. No. 7,086,179 to Dojan, et al., which is incorporated by reference herein. The configuration of sole structure 410 may vary significantly to include a variety of other conventional or nonconventional structures. As an example, sole structure 410 may incorporate a polymer foam element in place of chamber 411 and reinforcing structure 412, and the polymer foam element may at least partially encapsulate a fluid-filled chamber, as disclosed in either of U.S. Pat. No. 7,000,335 to Swigart, et al. and U.S. Pat. No. 7,386,946 to Goodwin, which are incorporated by reference herein. As another example, sole structure 410 may incorporate a fluid-filled chamber with an internal foam tensile member, as disclosed in U.S. Pat. No. 7,131,218 to Schindler, which is incorporated by reference herein. Accordingly, sole structure 410 may have a variety of configurations. Upper 420 defines a void within footwear 400 for receiving and securing the foot relative to sole structure 410. More particularly, upper 420 is structured to extend along a lateral side of the foot, along a medial side of the foot, over the foot, and under the foot, such that the void within upper 420 is shaped to accommodate the foot. Access to the void is provided by an ankle opening 421 located in at least a heel region of footwear 400. A lace 422 extends through various lace apertures 423 in upper 420 and permits the wearer to modify dimensions of upper 420 to accommodate the proportions of the foot. Lace 422 also permits the wearer to loosen upper 420 to facilitate entry and removal of the foot from the void. Although not depicted, upper 420 may include a tongue that extends under lace 422 to enhance the comfort or adjustability of footwear 400.

Figure 39A:
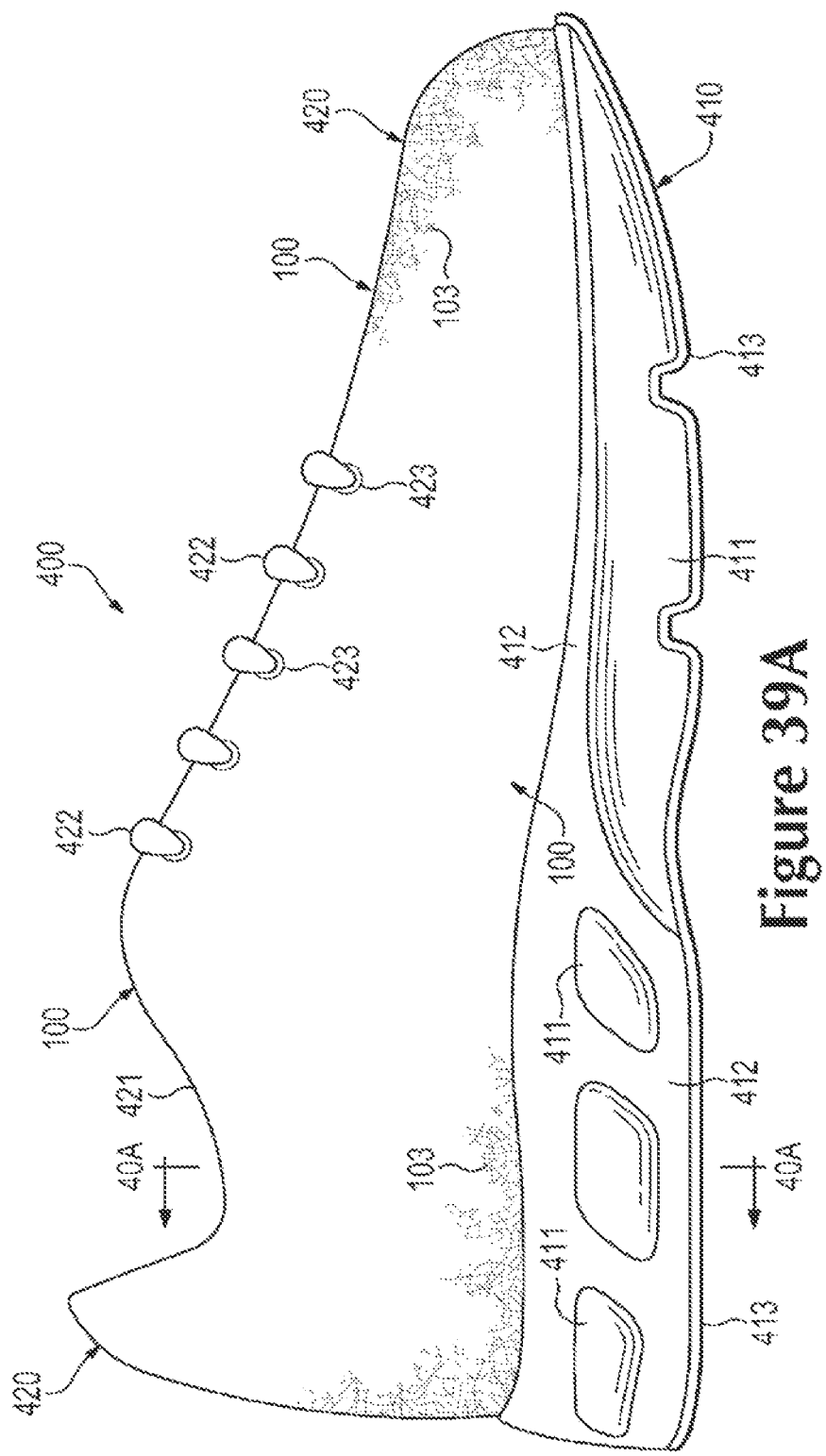
FIGS. 39A-39G are side elevational views of various configurations of an article of footwear that includes the non-woven textile.
Figure 40A:
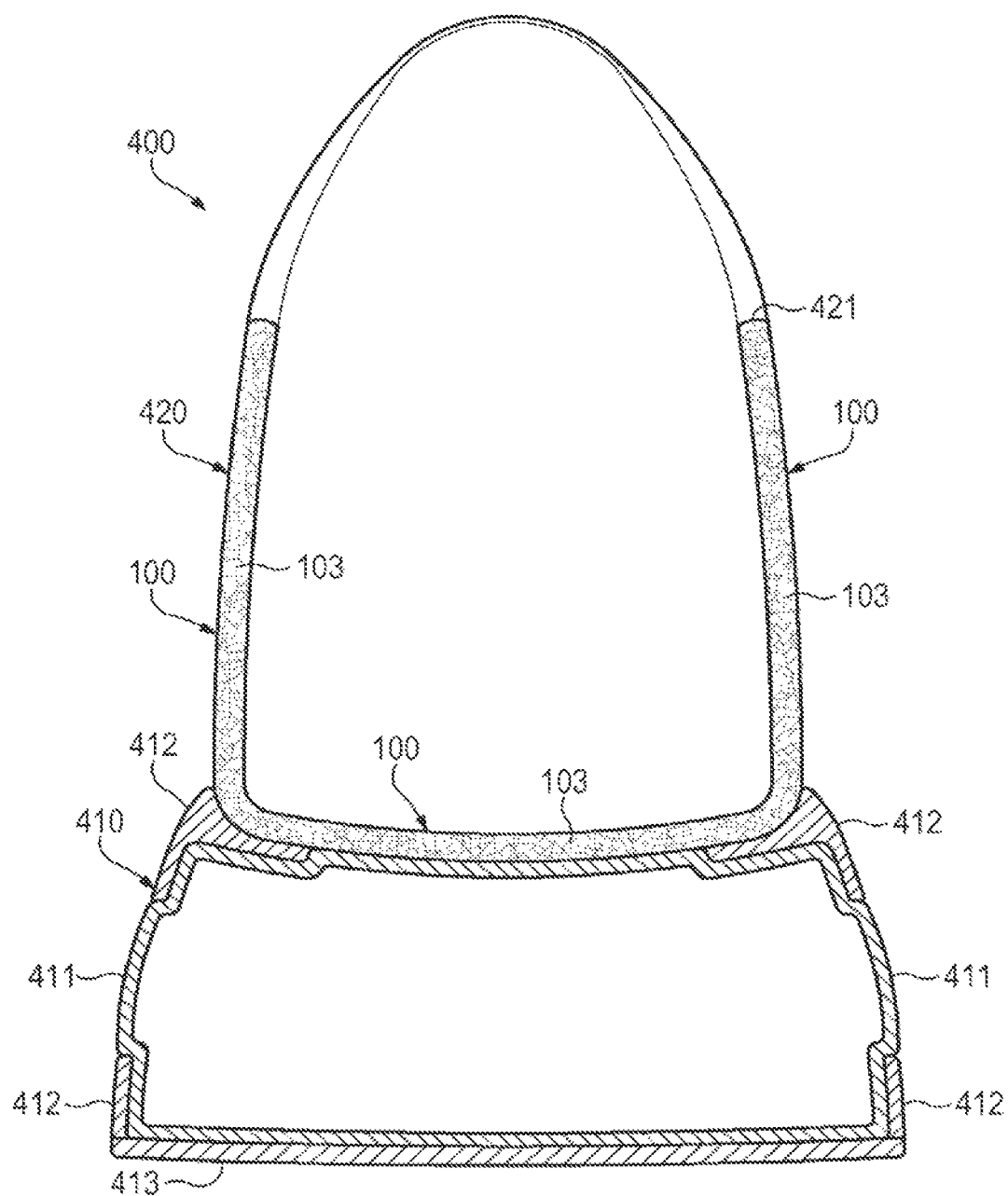
FIGS. 40A-40D are cross-sectional views of the configurations of the article of footwear, as respectively defined by section lines 40A-40A through 40D-40D in FIGS. 39A-39D.

A first configuration of footwear 400 is depicted in FIGS. 39A and 40A. Portions of upper 420 that extend along sides of the foot, over the foot, and under the foot may be formed from various elements of non-woven textile 100. Although not depicted, seams similar to seams 106 and 107 may be used to join the elements of non-woven textile 100. In many articles of footwear, stitching or adhesives are utilized to join the upper and sole structure. Sole structure 410, however, may be at least partially formed from a thermoplastic polymer material. More particularly, chamber 411 and reinforcing structure 412 may be at least partially formed from a thermoplastic polymer material that joins to upper 420 with a heatbond. That is, a heatbonding process may be utilized to join sole structure 410 and upper 420. In some configurations, stitching or adhesives may be utilized to join sole structure 410 and upper 420, or the heatbond may be supplemented with stitching or adhesives.

A relatively large percentage of footwear 400 may be formed from thermoplastic polymer materials. As discussed above, non-woven textile 100, chamber 411, and reinforcing structure 412 may be at least partially formed from thermoplastic polymer materials. Although lace 422 is not generally joined to upper 420 through bonding or stitching, lace 422 may also be formed from a thermoplastic polymer material. Similarly, outsole 413 may also be formed from a thermoplastic polymer material. Depending upon the number of elements of footwear 400 that incorporate thermoplastic polymer materials or are entirely formed from thermoplastic polymer materials, the percentage by mass of footwear 400 that is formed from the thermoplastic polymer materials may range from thirty percent to one-hundred percent. In some configurations, at least sixty percent of a combined mass of upper 420 and sole structure 410 may be from the thermoplastic polymer material of non-woven textile 100 and thermoplastic polymer materials of at least one of (a) other elements of upper 420 (i.e., lace 422) and (b) the elements of sole structure 410 (i.e., chamber 411, reinforcing structure 412, outsole 413). In further configurations, at least eighty percent or even at least ninety percent of a combined mass of upper 420 and sole structure 410 may be from the thermoplastic polymer material of non-woven textile 100 and thermoplastic polymer materials of at least one of (a) other elements of upper 420 and (b) the elements of sole structure 410. Accordingly, a majority or even all of footwear 400 may be formed from one or more thermoplastic polymer materials.

Figure 39B:
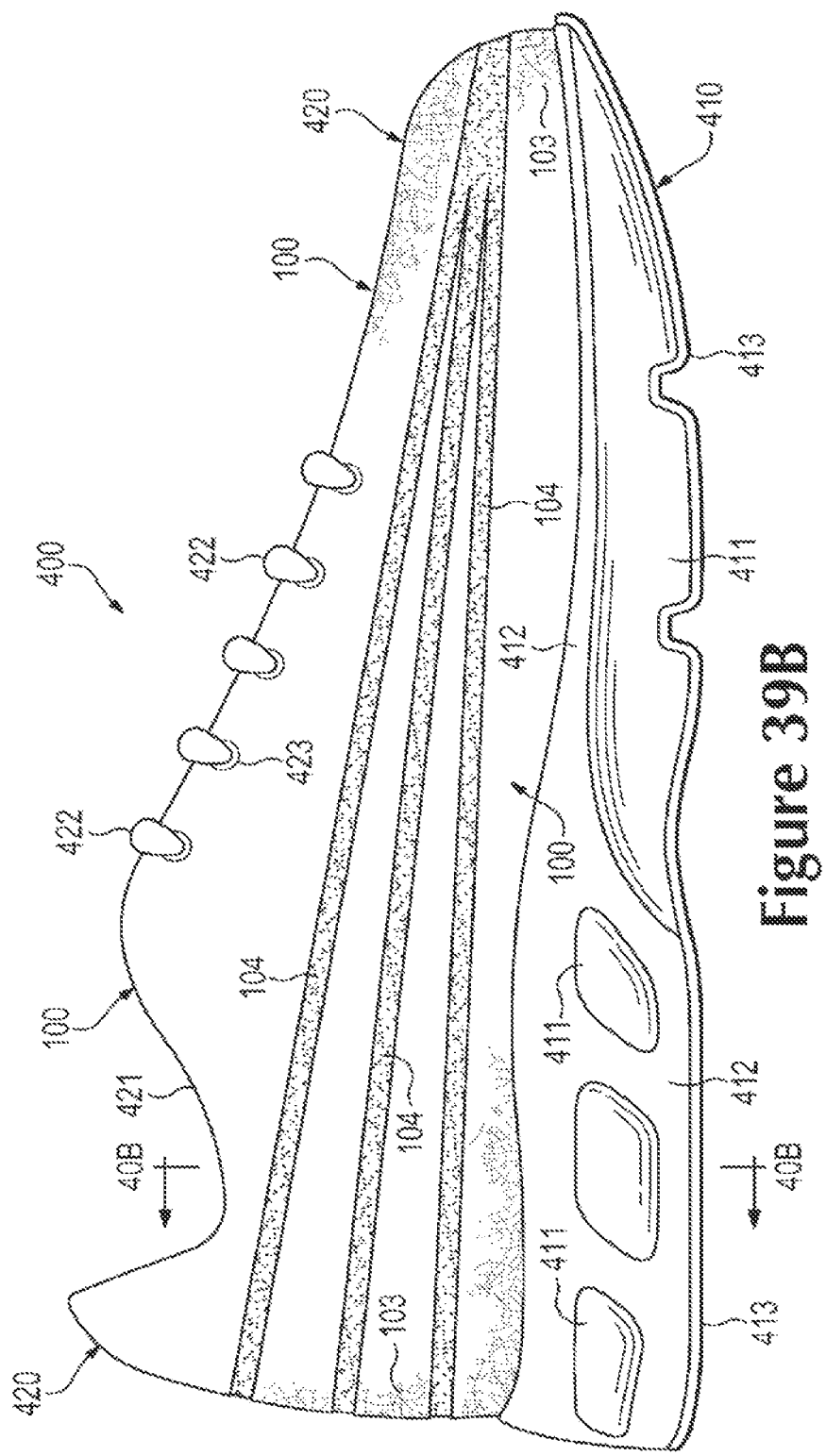
Figure 40B:
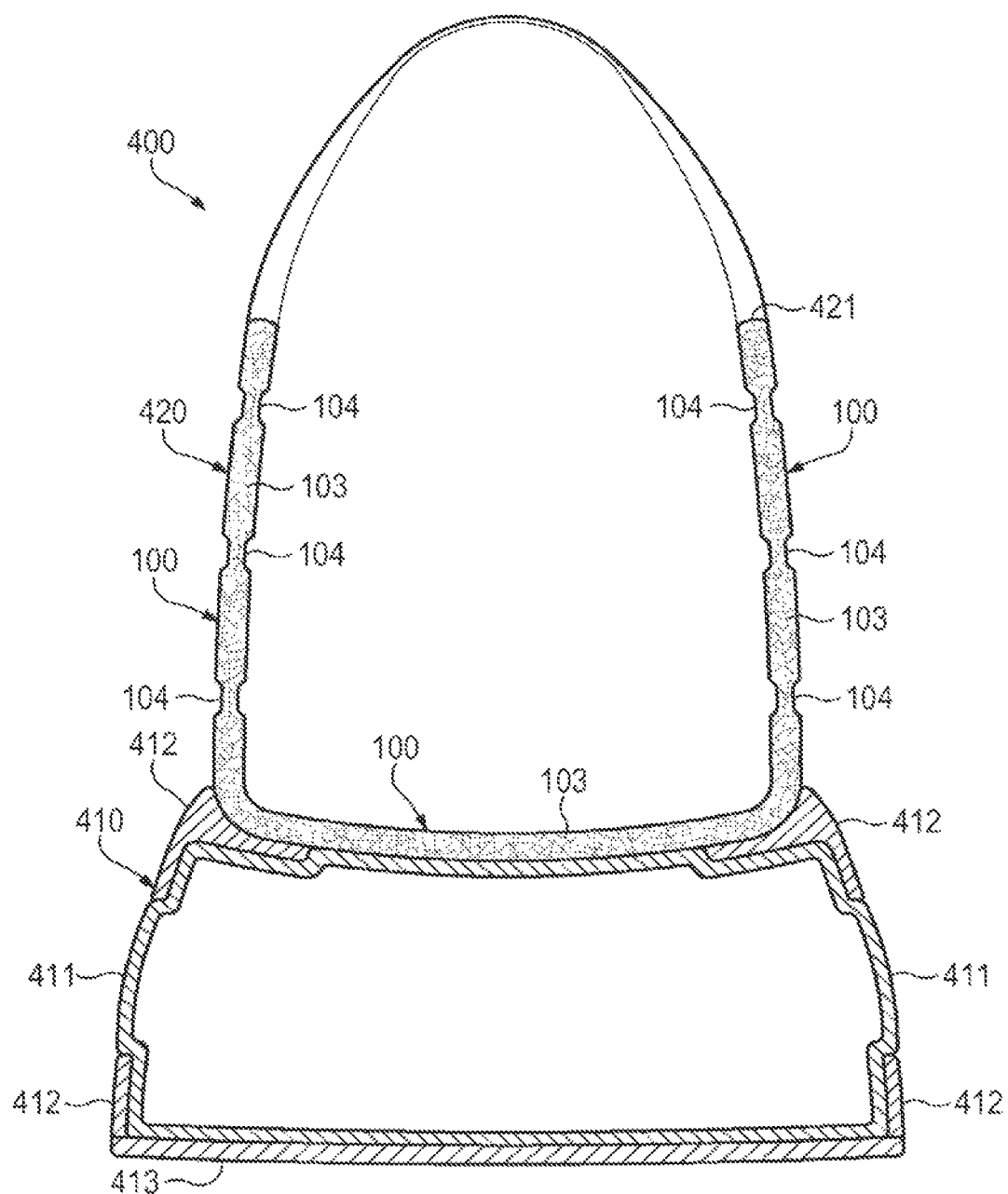

A second configuration of footwear 400 is depicted in FIGS. 39B and 40B, in which three generally linear fused regions 104 extend from a heel area to a forefoot area of footwear 400. As discussed in detail above, the thermoplastic polymer material forming filaments 103 of non-woven textile 100 is fused to a greater degree in fused regions 104 than in other areas of non-woven textile 100. The thermoplastic polymer material from filaments 103 may also be fused to form a non-filamentous portion of non-woven textile 100. The three fused regions 104 form, therefore, areas where filaments 103 are fused to a greater degree than in other areas of upper 420. Fused regions 104 have generally greater stretch-resistance than other areas of non-woven textile 100. Given that fused regions 104 extend longitudinally between the heel area and the forefoot area of footwear 400, fused regions 104 may reduce the amount of longitudinal stretch in footwear 400. That is, fused regions 104 may impart greater stretch-resistance to footwear 400 in the direction between the heel area and the forefoot area. Fused regions 104 may also increase the durability of upper 420 and decrease the permeability of upper 420.

Figure 39C:
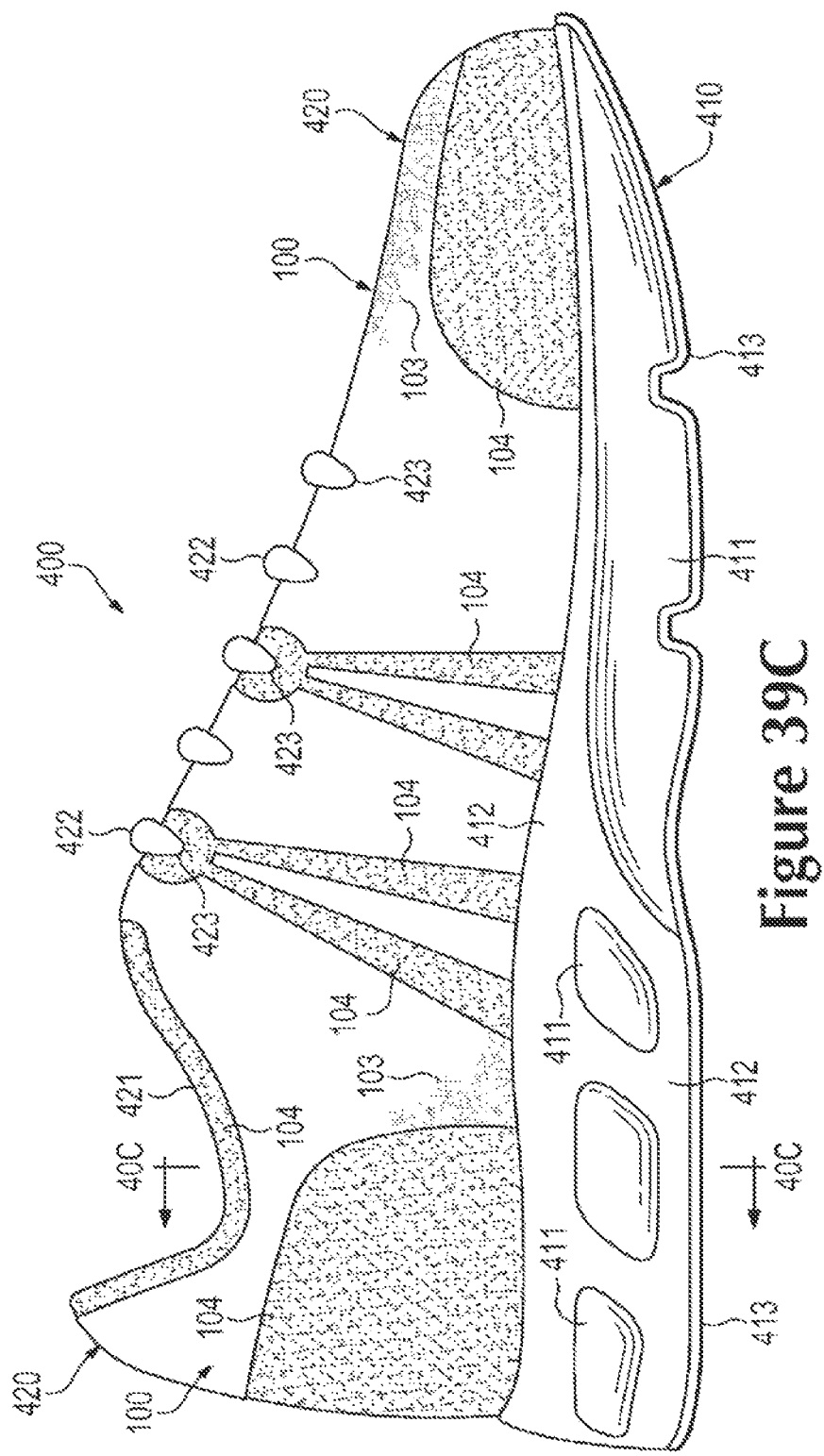
Figure 40C:
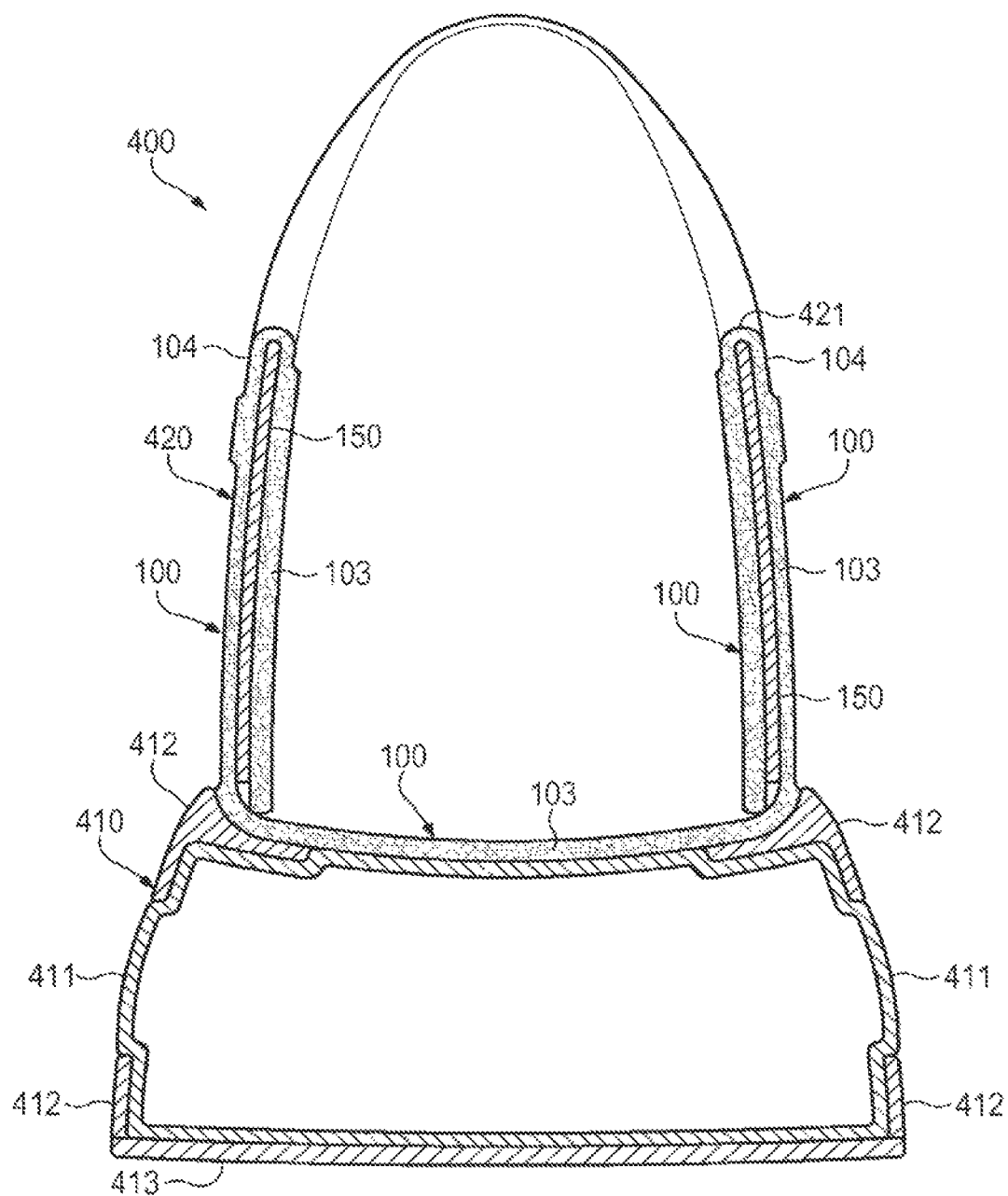

A third configuration of footwear 400 is depicted in FIGS. 39C and 40C. Various fused regions 104 are formed in non-woven textile 100. One of fused regions 104 extends around and is proximal to ankle opening 421, which may add greater stretch-resistance to the area around ankle opening 421 and assists with securely-retaining the foot within upper 420. Another fused region 104 is located in the heel region and extends around a rear area of the footwear to form a heel counter that resists movement of the heel within upper 420. A further fused region 104 is located in the forefoot area and adjacent to the sole structure, which adds greater durability to the forefoot area. More particularly, the forefoot area of upper 420 may experience greater abrasive-wear than other portions of upper 420, and the addition to fused region 104 in the forefoot area may enhance the abrasion-resistance of footwear 400 in the forefoot area. Additional fused regions 104 extend around some of lace apertures 423, which may enhance the durability and stretch-resistance of areas that receive lace 422. Fused regions 104 also extend downward from an area that is proximal to lace apertures 423 to an area that is proximal to sole structure 410 in order to enhance the stretch-resistance along the sides of footwear 400. More particularly, tension in lace 422 may place tension in the sides of upper 420. By forming fused regions 104 that extend downward along the sides of upper 420, the stretch in upper 420 may be reduced.

The size of fused regions 104 in footwear 400 may vary significantly, but fused regions 104 generally have a continuous area of at least one square centimeter. As noted above, various embossing or calendaring processes may be utilized during the manufacturing process for non-woven textile 100. Some embossing or calendaring processes may form a plurality of relatively small areas (i.e., one to ten square millimeters) where filaments 103 are somewhat fused to each other. In contrast with the areas formed by embossing or calendaring, fused regions 104 have a continuous area, as defined above, of at least one square centimeter.

Although a majority of upper 420 may be formed from a single layer of non-woven textile 100, multiple layers may also be utilized. Referring to FIG. 40C, upper 420 includes an intermediate foam layer 150 between two layers of non-woven textile 100. An advantage to this configuration is that foam layer imparts additional cushioning to the sides of upper 420, thereby protecting and imparting greater comfort to the foot. In general, the portions of upper 420 that incorporate foam layer 150 may be formed to have the general configuration of the composite element discussed above relative to FIGS. 19 and 20. Moreover, a heatbonding process similar to the process discussed above relative to FIGS. 12A-12C may be utilized to form the portions of upper 420 that incorporate foam layer 150. As an alternative to foam layer 150, textile 130 or sheet 140 may also be heatbonded to non-woven textile 100 in footwear 400. Accordingly, incorporating various composite elements into footwear 400 may impart a layered configuration with different properties.

Figure 39D:
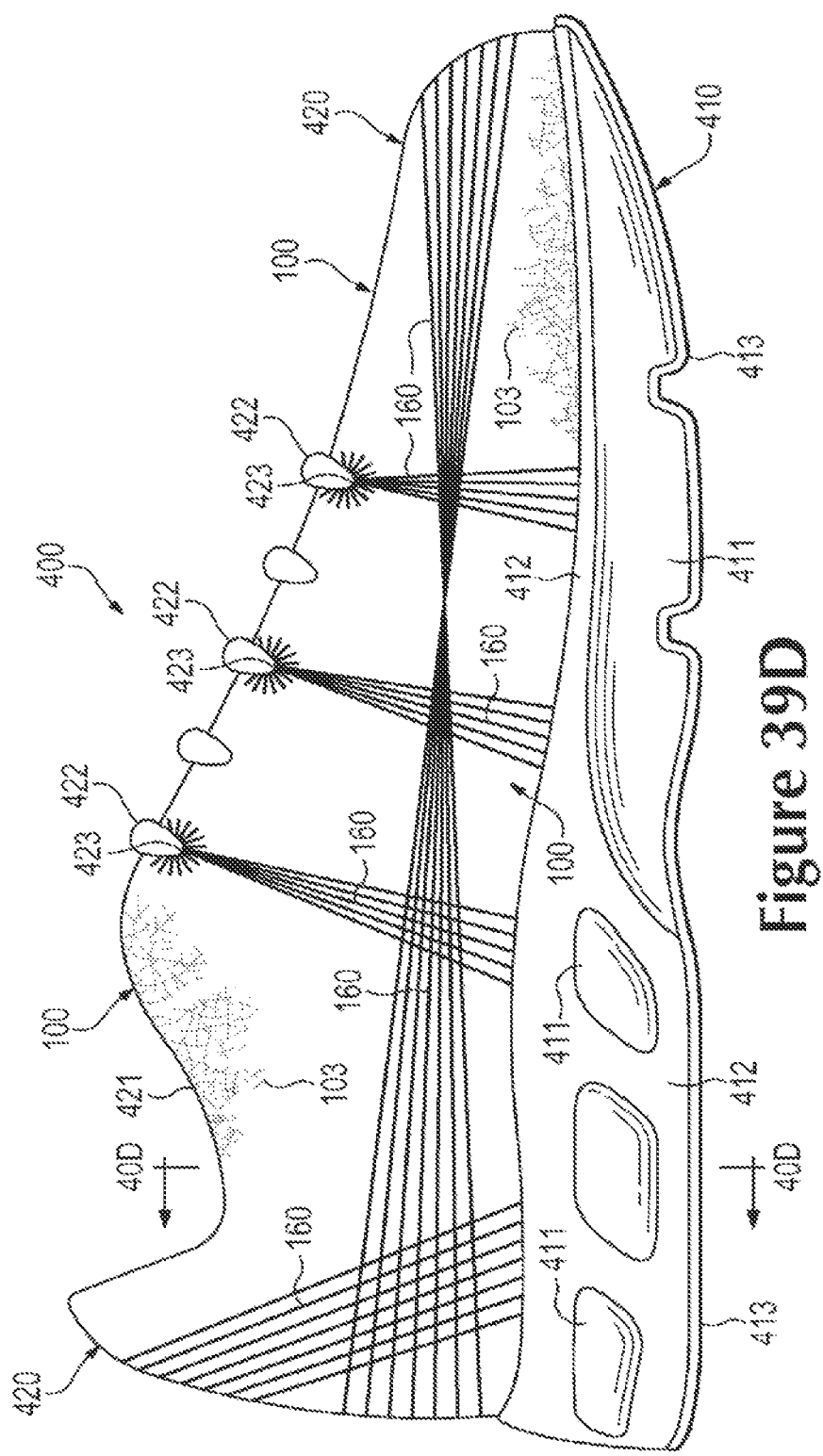
Figure 40D:
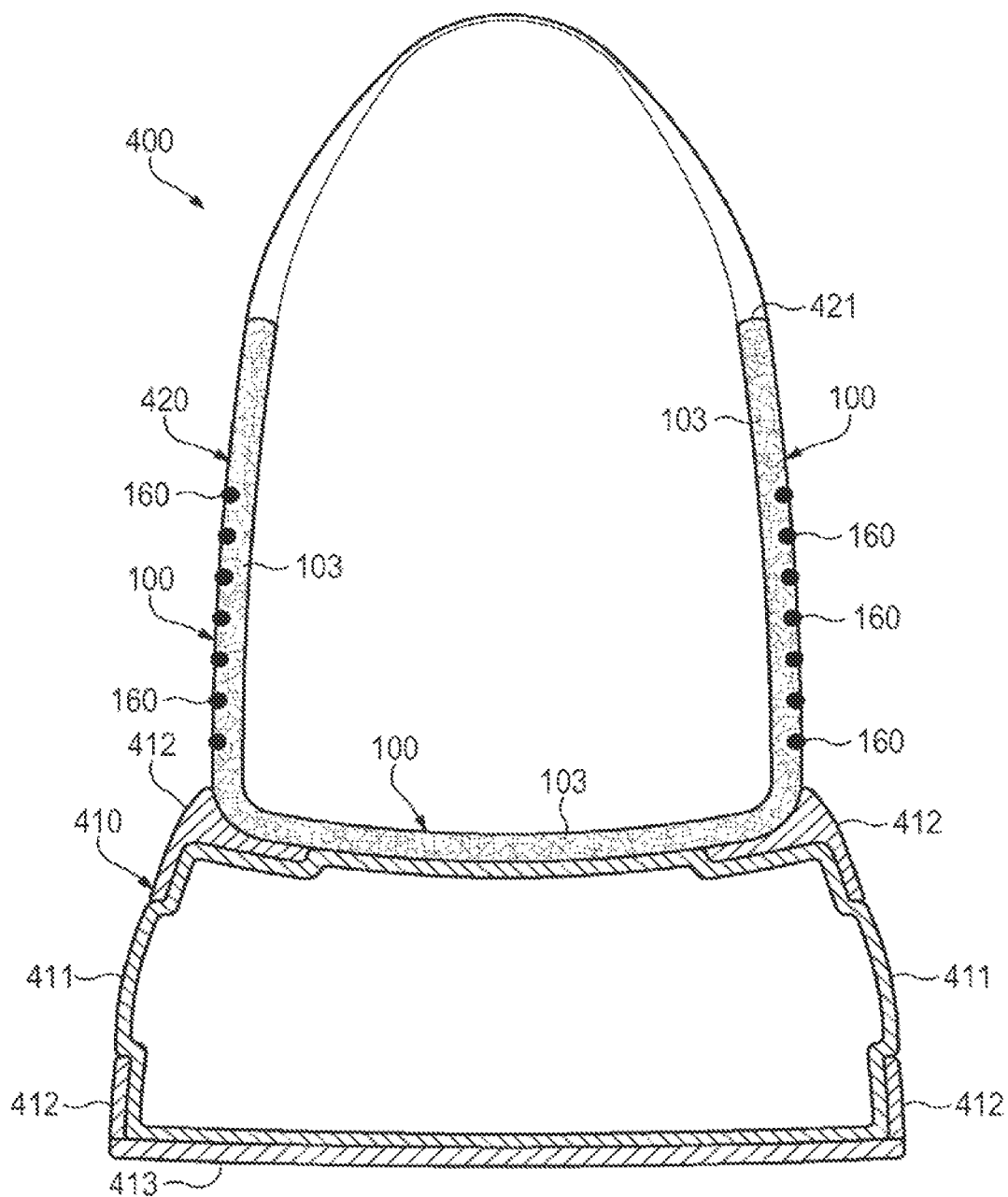

A fourth configuration of footwear 400 is depicted in FIGS. 39D and 40D, in which various strands 160 are embedded within non-woven textile 100. In comparison with the thermoplastic polymer material forming non-woven textile 100, many of the materials noted above for strands 160 exhibit greater tensile strength and stretch-resistance. That is, strands 160 may be stronger than non-woven textile 100 and may exhibit less stretch than non-woven textile 100 when subjected to a tensile force. When utilized within footwear 400, therefore, strands 160 may be utilized to impart greater strength and stretch-resistance than non-woven textile 100.

Strands 160 are embedded within non-woven textile 100 or otherwise bonded to non-woven textile 100. Many of strands 160 extend in a direction that is substantially parallel to a surface of non-woven textile 100 for a distance of at least five centimeters. An advantage to forming at least some of strands 160 to extend through the distance of at least five centimeters is that tensile forces upon one area of footwear 400 may be transferred along strands 160 to another area of footwear 400. One group of strands 160 extends from the heel area to the forefoot area of footwear 400 to increase strength and reduce the amount of longitudinal stretch in footwear 400. That is, these strands 160 may impart greater strength and stretch-resistance to footwear 400 in the direction between the heel area and the forefoot area. Another group of strands 160 extends downward from an area that is proximal to lace apertures 423 to an area that is proximal to sole structure 410 in order to enhance the strength and stretch-resistance along the sides of footwear 400. More particularly, tension in lace 422 may place tension in the sides of upper 420. By positioning strands 160 to extend downward along the sides of upper 420, the stretch in upper 420 may be reduced, while increasing the strength. A further group of strands 160 is also located in the heel region to effectively form a heel counter that enhances the stability of footwear 400. Additional details concerning footwear having a configuration that includes strands similar to strands 160 are disclosed in U.S. Patent Application Publication US2007/0271821 to Meschter, which is incorporated by reference herein.

Figure 39E:
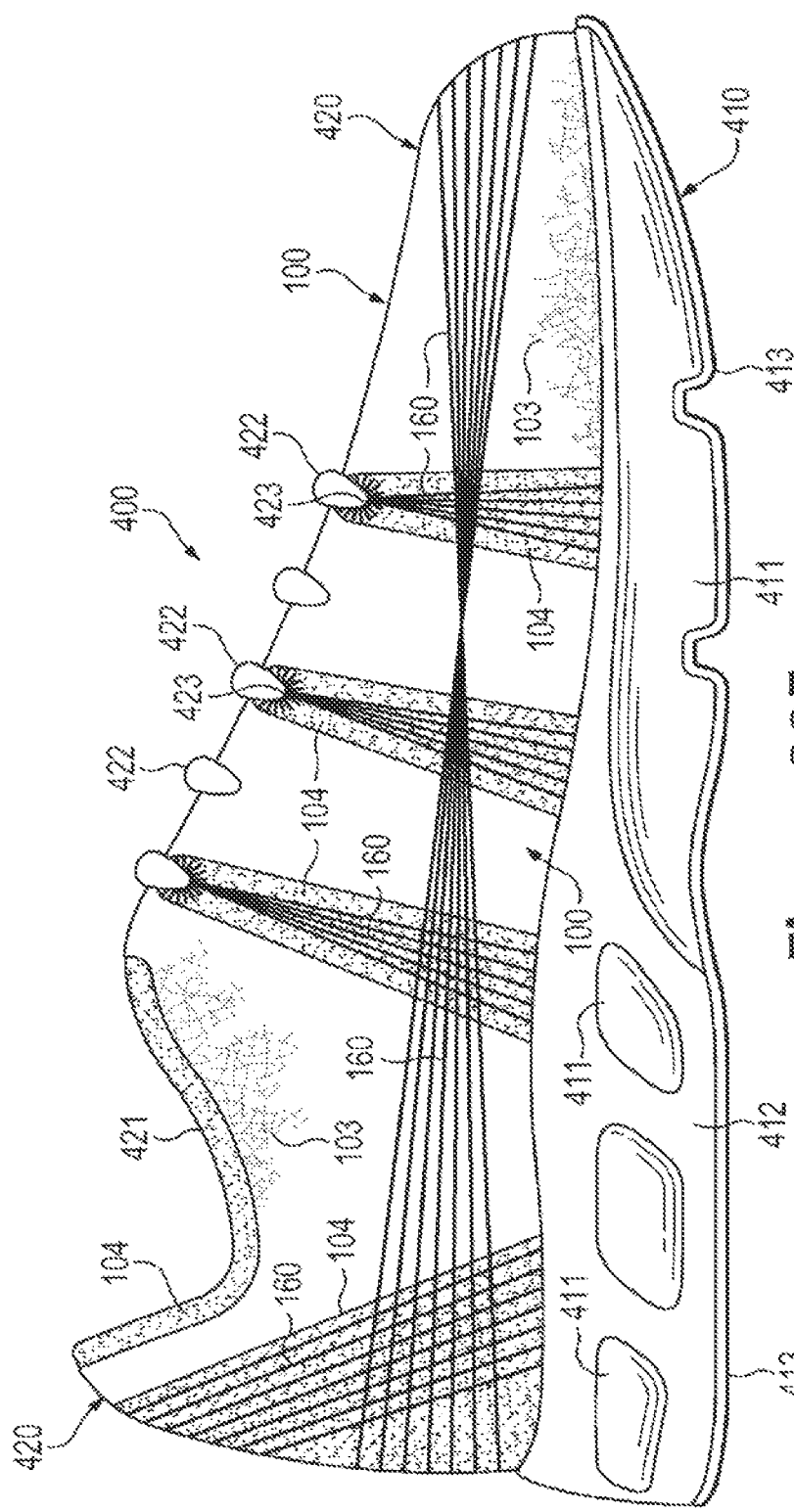

A fifth configuration of footwear 400 is depicted in FIG. 39E. In contrast with the configuration of FIGS. 39D and 40D, various fused regions 104 are formed in non-woven textile 100. More particularly, fused regions 104 are located in the areas of the groups of strands 160 that (a) extend downward from an area that is proximal to lace apertures 423 to an area that is proximal to sole structure 410 and (b) are located in the heel region. At least a portion of strands 160 extend through the fused regions 104, which imparts additional stretch-resistance and greater durability to the areas of upper 420 that incorporate strands 160, thereby providing greater protection to strands 160. Fused regions 104 may have a continuous area of at least one square centimeter, and the thermoplastic polymer material from filaments 103 within fused regions 104 may be either, filamentous, non-filamentous, or a combination of filamentous and non-filamentous.

Figure 39F:
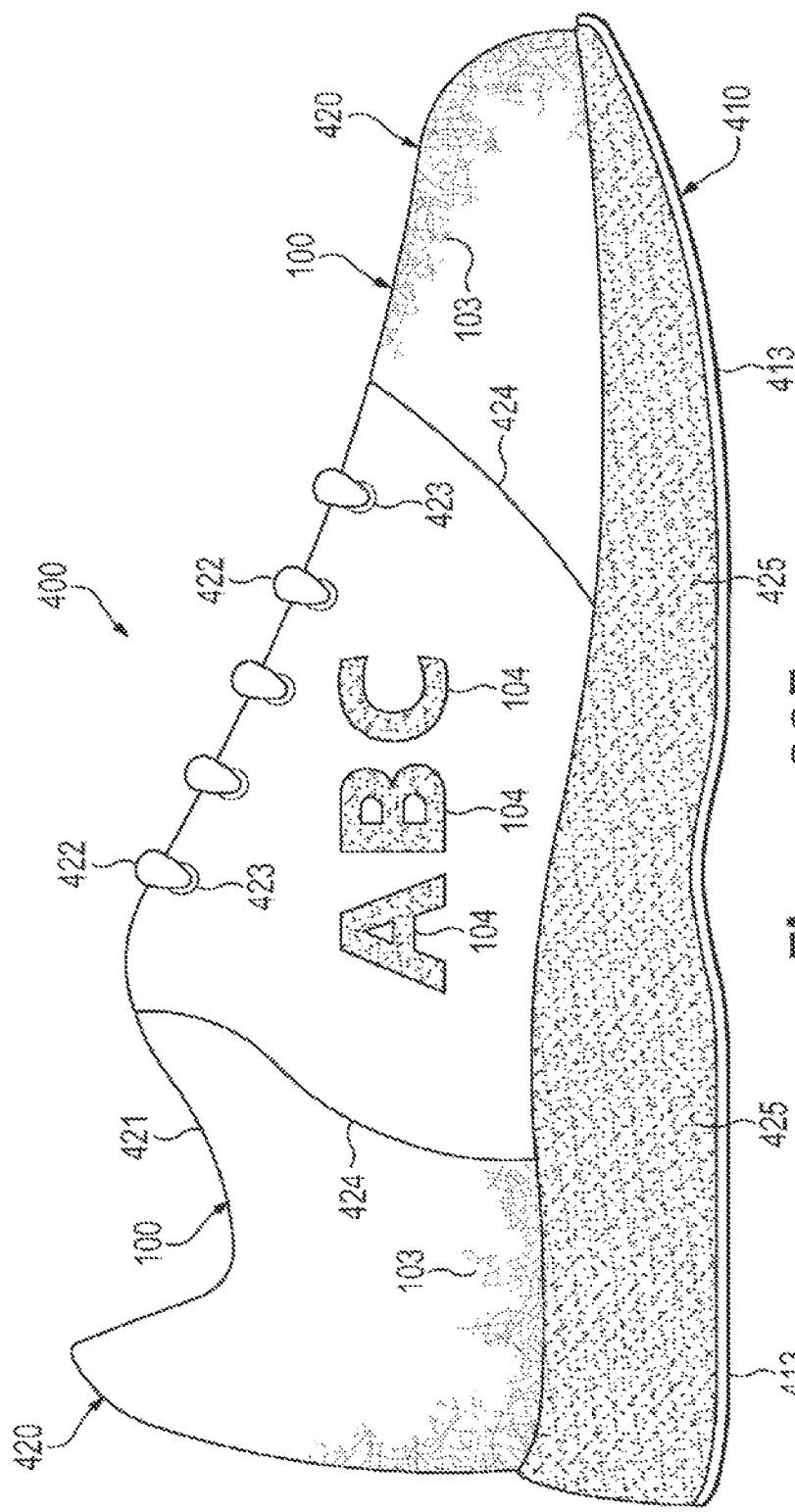

A sixth configuration of footwear 400 is depicted in FIG. 39F. Three fused regions 104 in the side of footwear 400 have the shapes of the letters "A," "B," and "C." As discussed above, fused regions 104 may be utilized to modify various properties of non-woven textile 100, including the properties of permeability, durability, and stretch-resistance. In general, various aesthetic properties may also be modified by forming fused regions 104, including the transparency and the darkness of a color of non-woven textile 100. That is, the color of fused regions 104 may be darker than the color of other portions of non-woven textile 100. Utilizing this change in aesthetic properties, fused regions 104 may be utilized to form indicia in areas of footwear 400. That is, fused regions 104 may be utilized to form a name or logo of a team or company, the name or initials of an individual, or an esthetic pattern, drawing, or element in non-woven textile 100. Similarly, fused regions 104 may be utilized to form indicia in shirt 200, pants 300, or any other product incorporating non-woven textile 100.

Fused regions 104 may be utilized to form indicia in the side of footwear 400, as depicted in FIG. 39F, and also in shirt 200, pants 300, or a variety of other products incorporating non-woven textile 100. As a related matter, elements of non-woven textile 100 may be heatbonded or otherwise joined to various products to form indicia. For example, elements of non-woven textile 100 having the shapes of the letters "A," "B," and "C" may be heatbonded to the sides of an article of footwear where the upper is primarily formed from synthetic leather. Given that non-woven textile 100 may be heatbonded to a variety of other materials, elements of non-woven textile 100 may be heatbonded to products in order to form indicia.

Seams similar to seams 106 and 107 may be used to join the elements of non-woven textile 100 in any configuration of footwear 400. Referring to FIG. 39F, a pair of seams 424 extend in a generally diagonal direction through upper 420 to join different elements of non-woven textile 100. Although heatbonding may be utilized to form seams 424, stitching or adhesives may also be utilized. As noted above, sole structure 410 may also have various structures, in addition to the structure that includes chamber 411 and reinforcing structure 412. Referring again to FIG. 39F, a thermoplastic polymer foam material 425 is utilized in place of chamber 411 and reinforcing structure 412, and upper 420 may be heatbonded to foam material 425 to join sole structure 410 to upper 420. Heatbonds may also be utilized when a thermoset polymer foam material is utilized within sole structure 410.

Figure 39G:
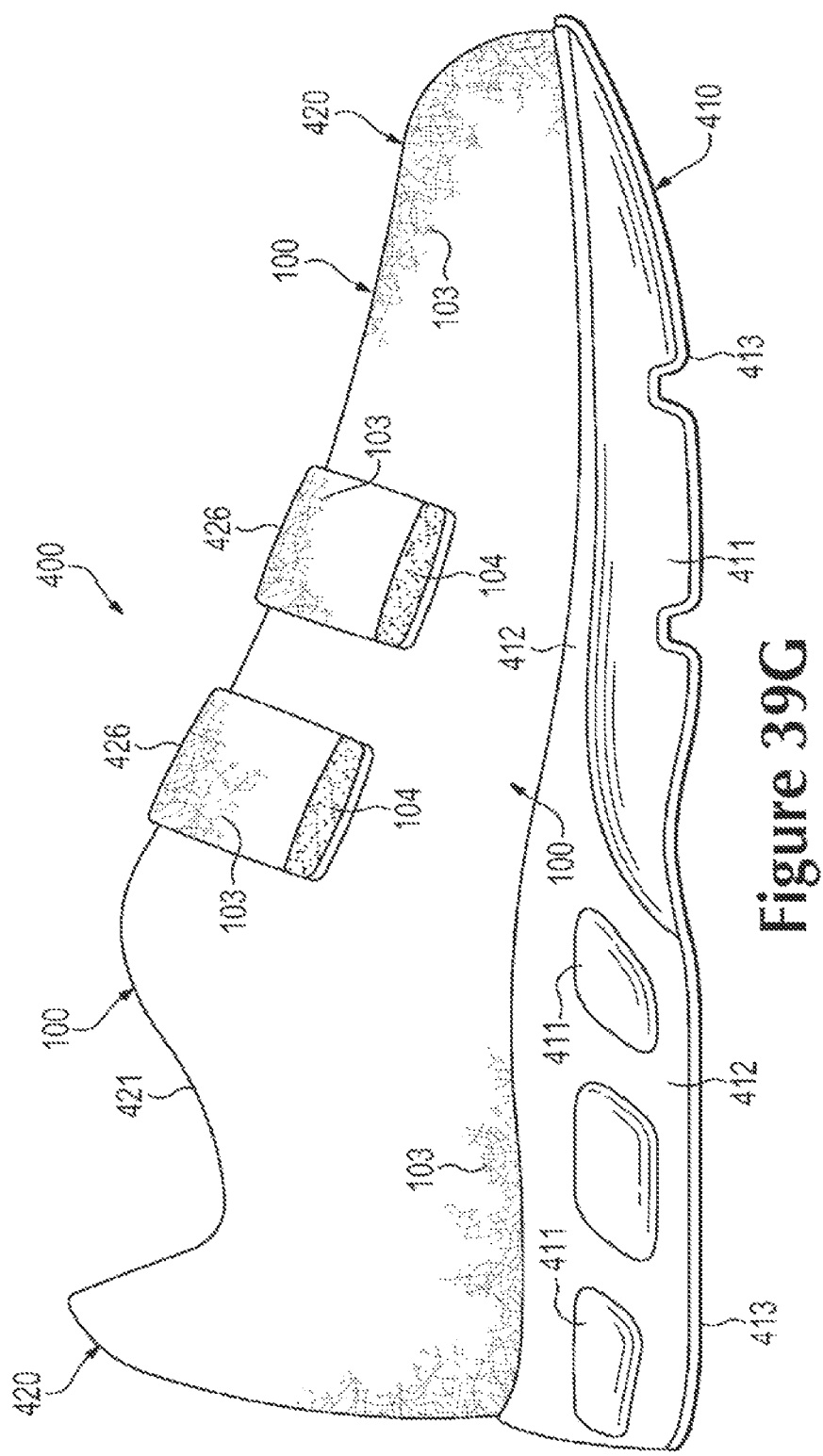

A seventh configuration of footwear 400 is depicted in FIG. 39G, wherein non-woven textile 100 is utilized to form a pair of straps 426 that replace or supplement lace 422. In general, straps 426 permit the wearer to modify dimensions of upper 420 to accommodate the proportions of the foot. Straps 426 also permit the wearer to loosen upper 420 to facilitate entry and removal of the foot from the void. One end of straps 426 may be permanently secured to upper 420, whereas a remainder of straps 426 may be joined with a hook-and-loop fastener, for example. This configuration allows straps to be adjusted by the wearer. As discussed above, non-woven textile 100 may stretch and return to an original configuration after being stretched. Utilizing this property, the wearer may stretch straps 426 to impart tension, thereby tightening upper 420 around the foot. By lifting straps, the tension may be released to allow entry and removal of the foot.

Figure 41:
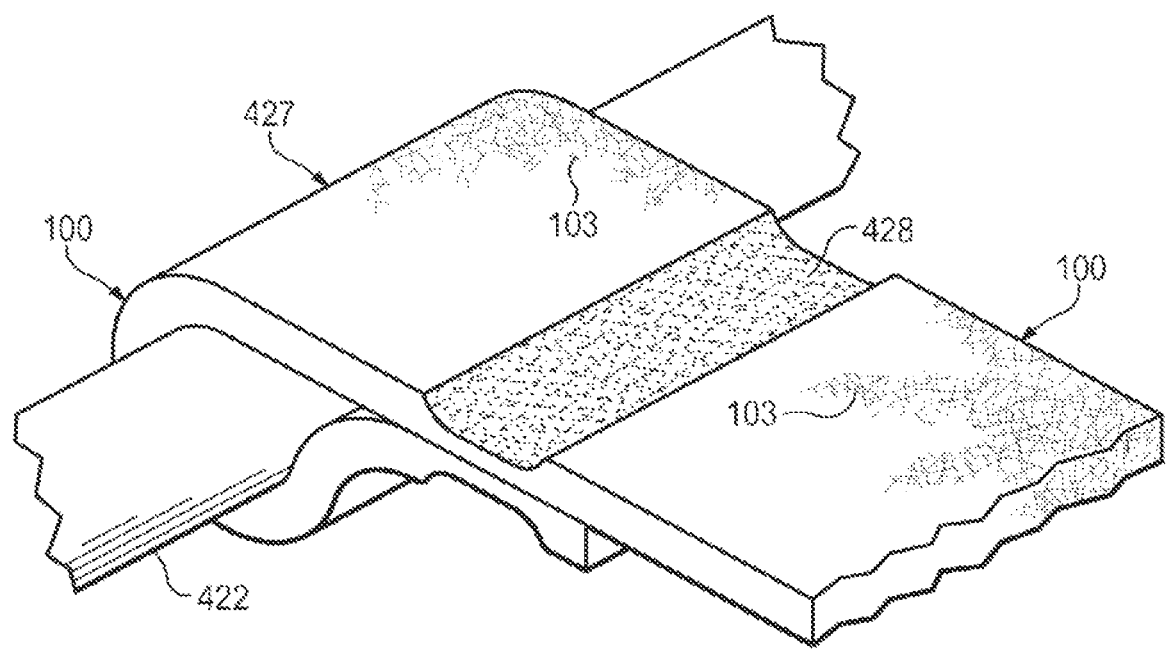
FIG. 41 is a perspective view of a lace loop for the article of footwear that includes the non-woven textile.

In addition to forming the portion of upper 420 that extends along and around the foot to form the void for receiving the foot, non-woven textile 100 may also form structural elements of footwear 400. As an example, a lace loop 427 is depicted in FIG. 41. Lace loop 427 may be incorporated into upper 420 as a replacement or alternative for one or more of the various lace apertures 423. Whereas lace apertures 423 are openings through upper 420 that receive lace 422, lace loop 427 is a folded or overlapped area of non-woven textile 100 that defines a channel through which lace 422 extends. In forming lace loop 427, non-woven textile 100 is heatbonded to itself at a bond area 428 to form the channel.

Based upon the above discussion, non-woven textile 100 may be utilized in apparel having the configuration of an article of footwear, such as footwear 400. In order to impart different properties to areas of footwear 400, various fused regions 104 may be formed, different types of textiles may be incorporated into footwear 400, and composite elements may be formed by joining one or more of textile 130, sheet 140, foam layer 150, strands 160, or various other components to non-woven textile 100. Given that non-woven textile 100 incorporates a thermoplastic polymer material, a heatbonding process may be utilized to join upper 420 to sole structure 410.

XII—Forming, Texturing, and Coloring the Non-Woven Textile

Figure 42A:
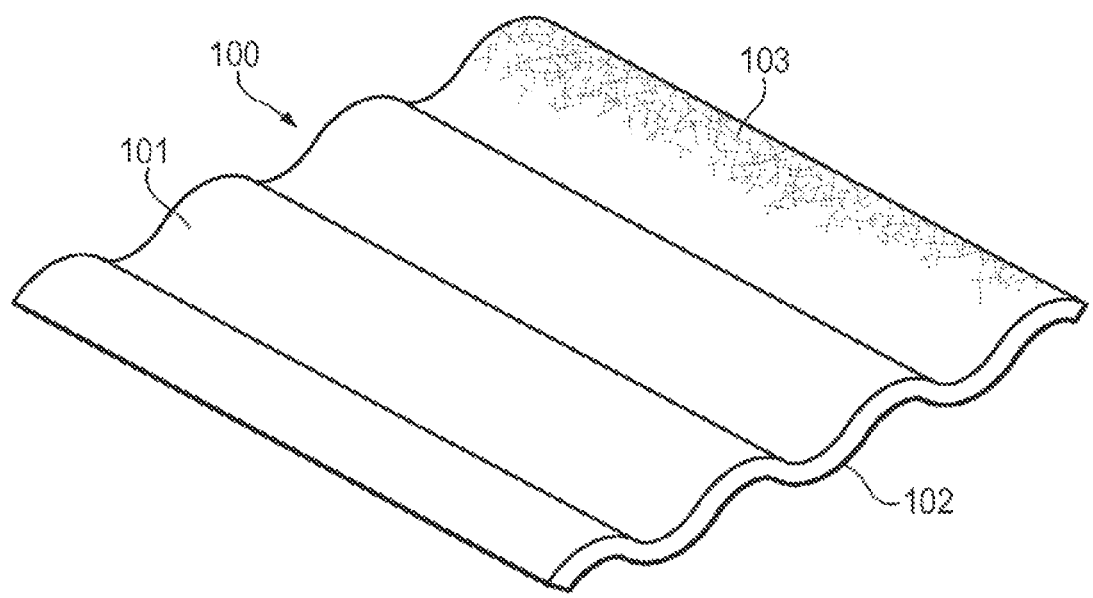
FIGS. 42A-42C are perspective views of three-dimensional configurations of the non-woven textile.
Figure 42B:
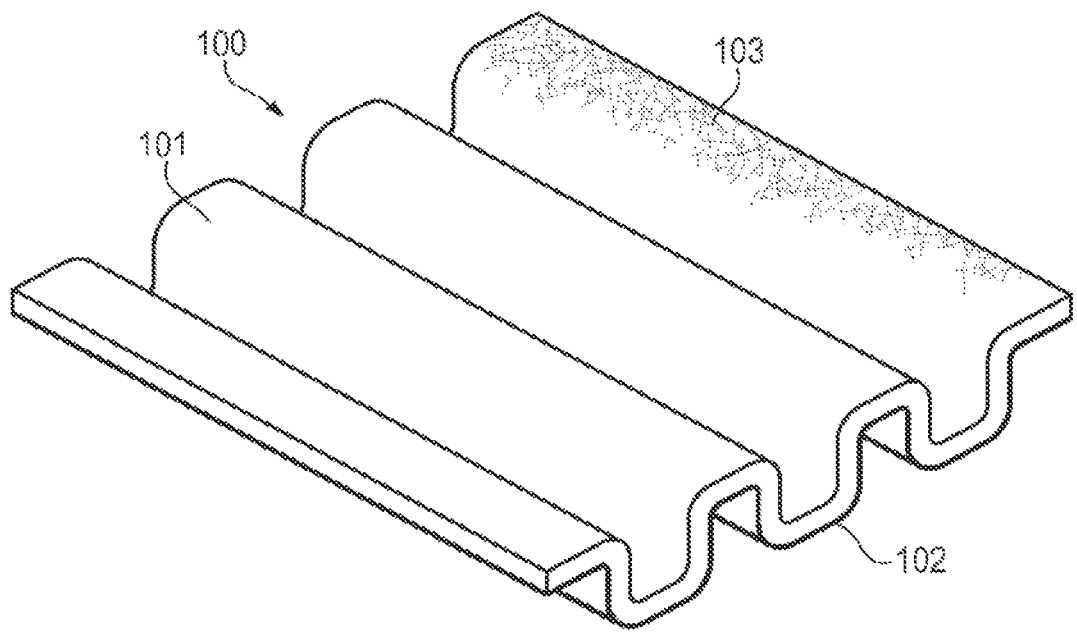
Figure 42C:
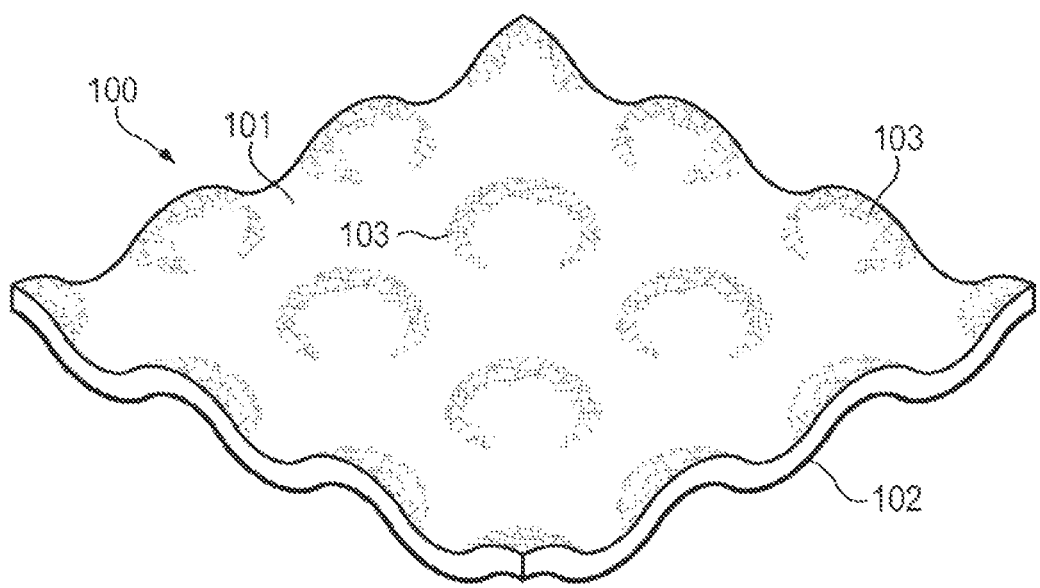

The configuration of non-woven textile 100 depicted in FIG. 1 has a generally planar configuration. Non-woven textile 100 may also exhibit a variety of three-dimensional configurations. As an example, non-woven textile 100 is depicted as having a wavy or undulating configuration in FIG. 42A. A similar configuration with squared waves is depicted in FIG. 42B. As another example, non-woven textile may have waves that extend in two directions to impart an egg crate configuration, as depicted in FIG. 42C. Accordingly, non-woven textile 100 may be formed to have a variety of non-planar or three-dimensional configurations.

Figure 43A:
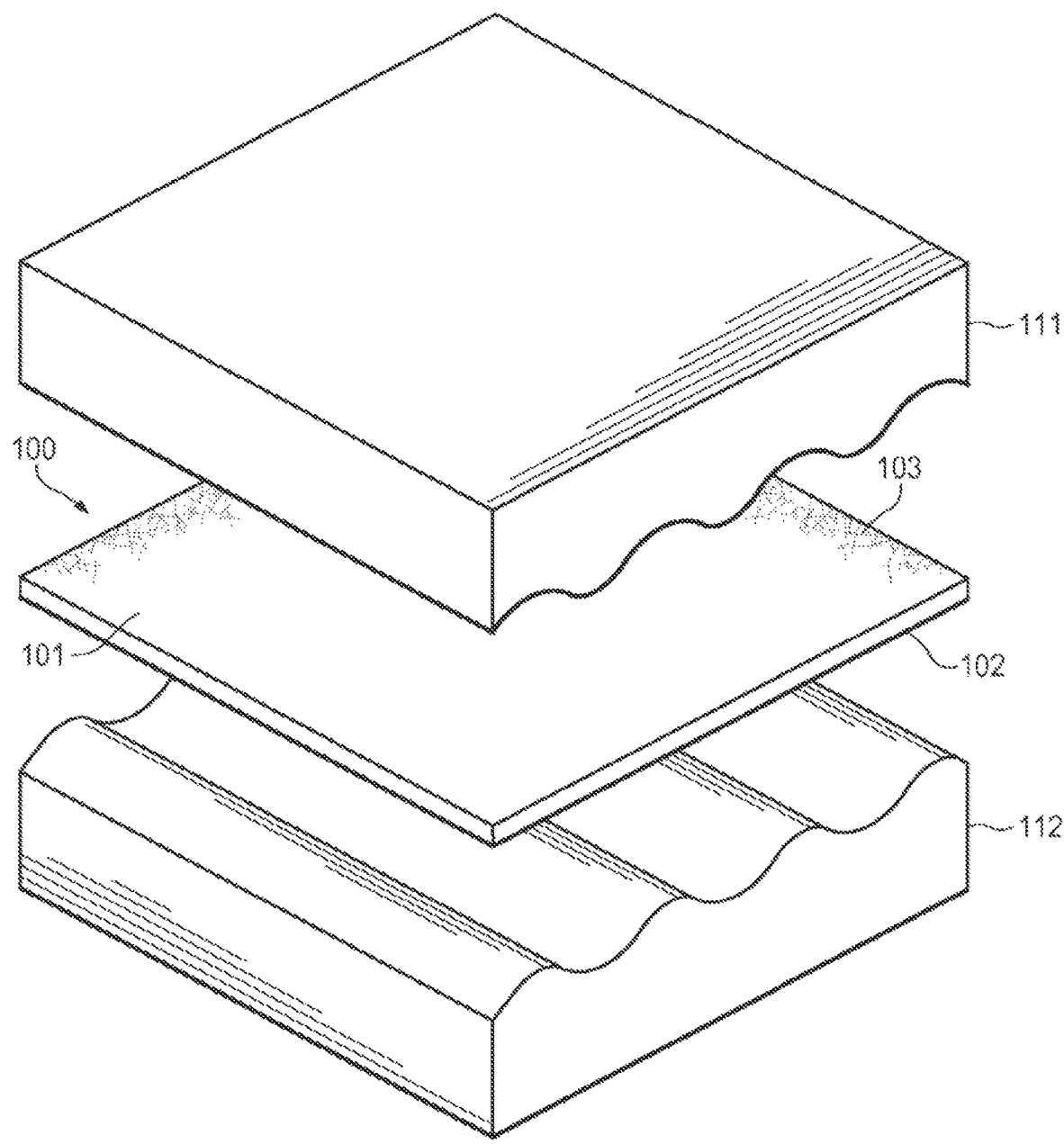
FIGS. 43A-43C are perspective views of a process for forming the three-dimensional configurations of the non-woven textile.
Figure 43B:
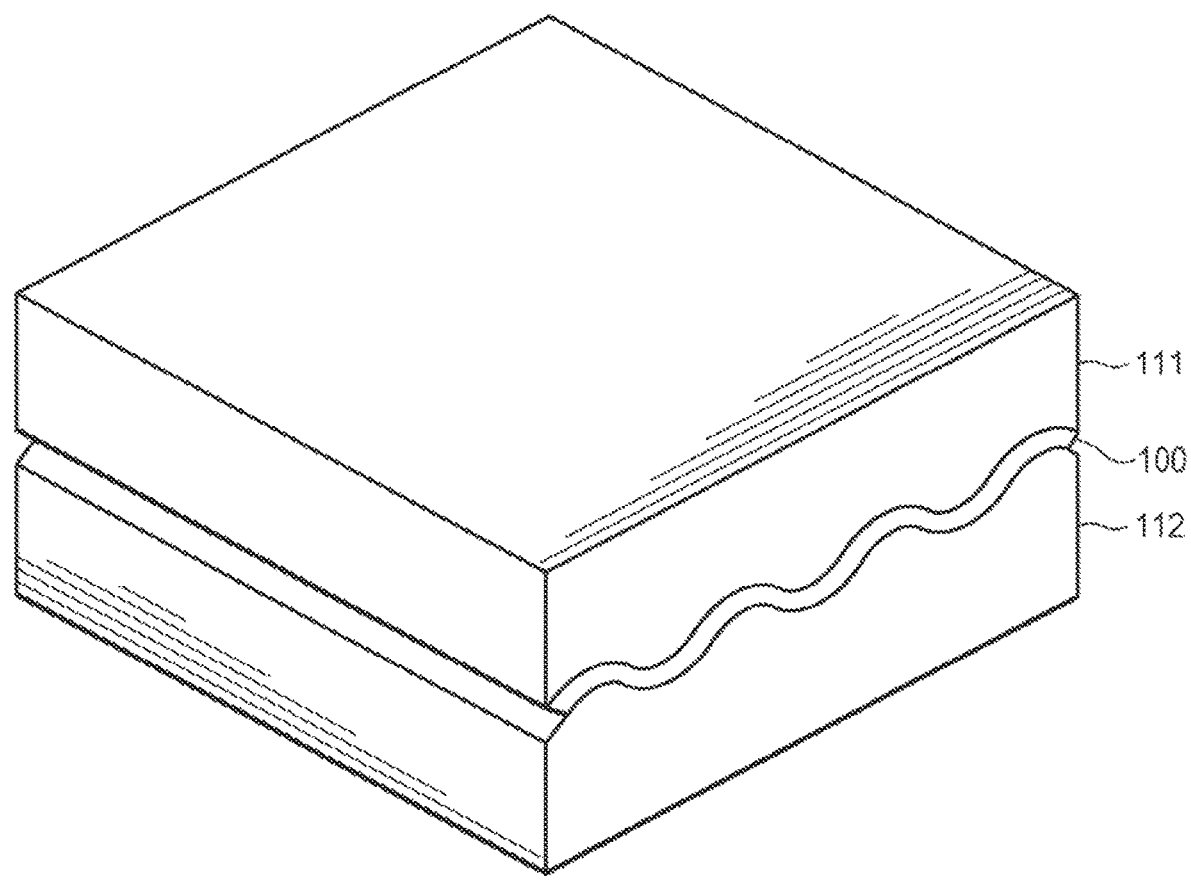
Figure 43C:
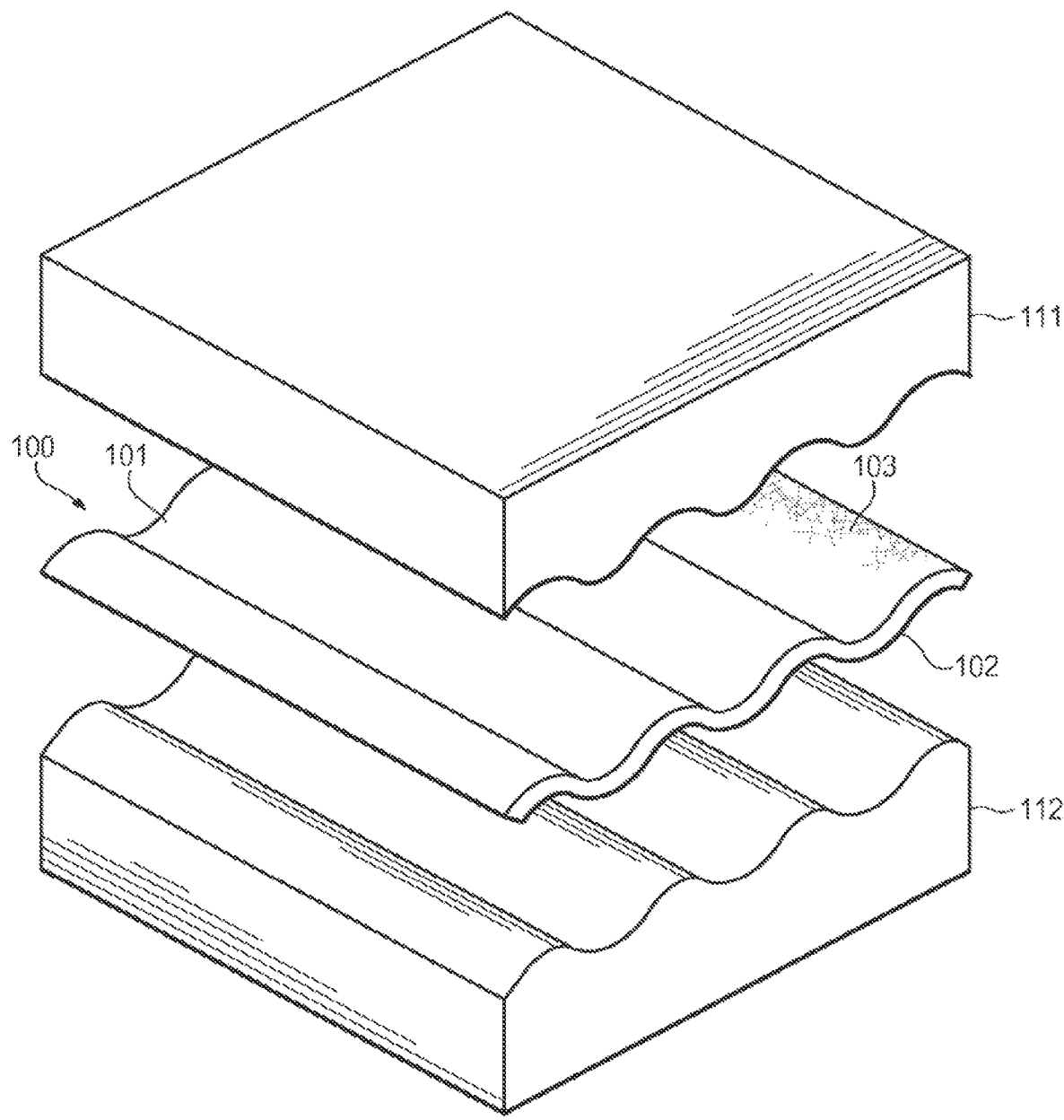

A variety of processes may be utilized to form a three-dimensional configuration in non-woven textile 100. Referring to FIGS. 43A-43C, an example of a method is depicted as involving first plate 111 and second plate 112, which each have surfaces that correspond with the resulting three-dimensional aspects of non-woven textile 100. Initially, non-woven textile 100 is located between plates 111 and 112, as depicted in FIG. 43A. Plates 111 and 112 then translate or otherwise move toward each other in order to contact and compress non-woven textile 100, as depicted in FIG. 43B. In order to form the three-dimensional configuration in non-woven textile 100, heat from one or both of plates 111 and 112 is applied to non-woven textile 100 so as to soften or melt the thermoplastic polymer material within filaments 103. Upon separating plates 111 and 112, as depicted in FIG. 43C, non-woven textile 100 exhibits the three-dimensional configuration from the surfaces of plates 111 and 112. Although heat may be applied through conduction, radio frequency or radiant heating may also be used. As another example of a process that may be utilized to form a three-dimensional configuration in non-woven textile 100, filaments 103 may be directly deposited upon a three-dimensional surface in the process for manufacturing non-woven textile 100.

Figure 44A:
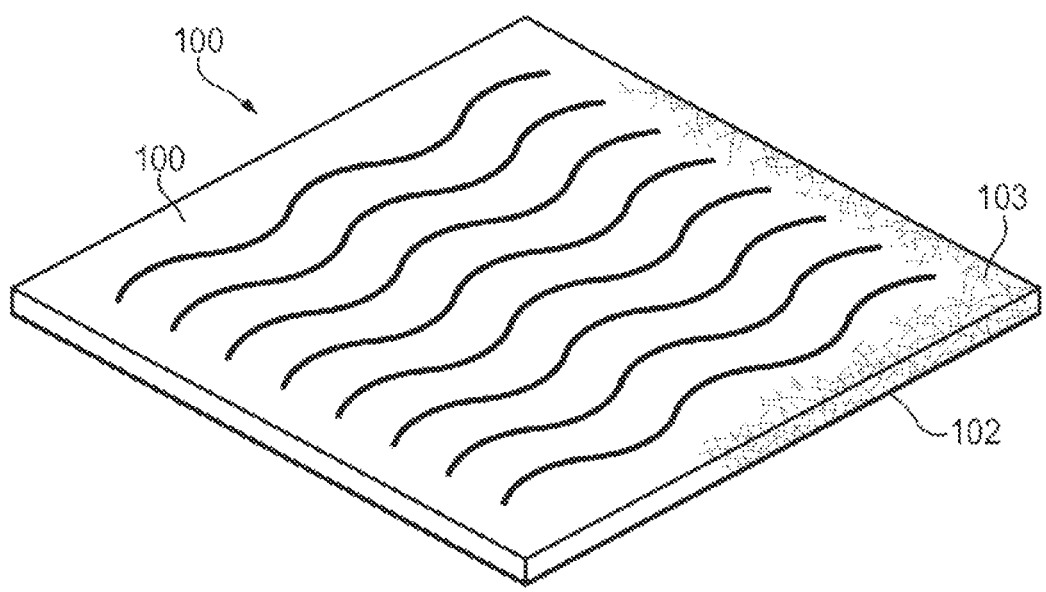
FIGS. 44A-44D are perspective views of textured configurations of the non-woven textile.
Figure 44B:
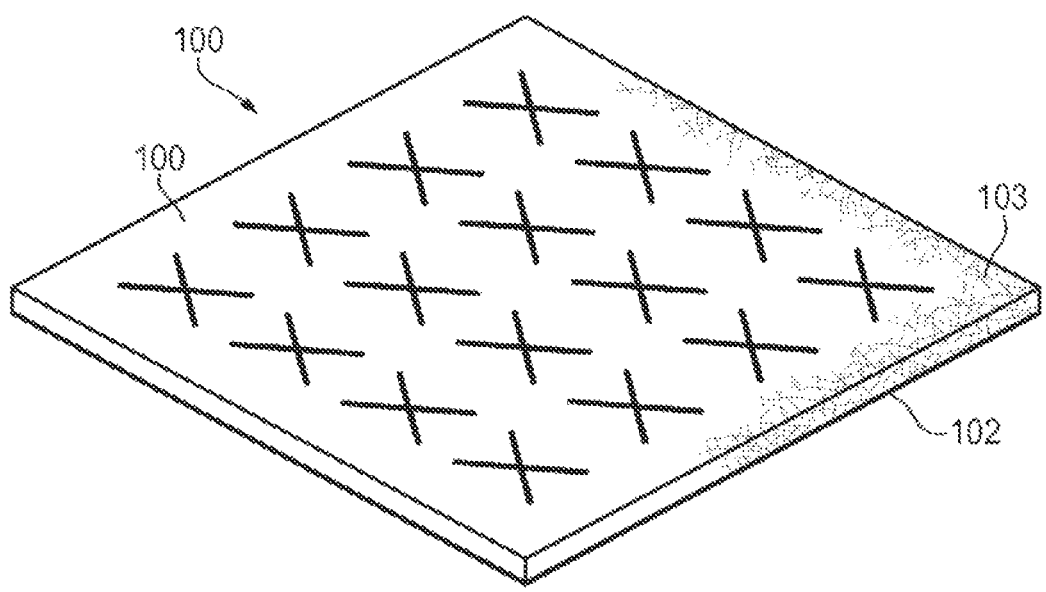
Figure 44C:
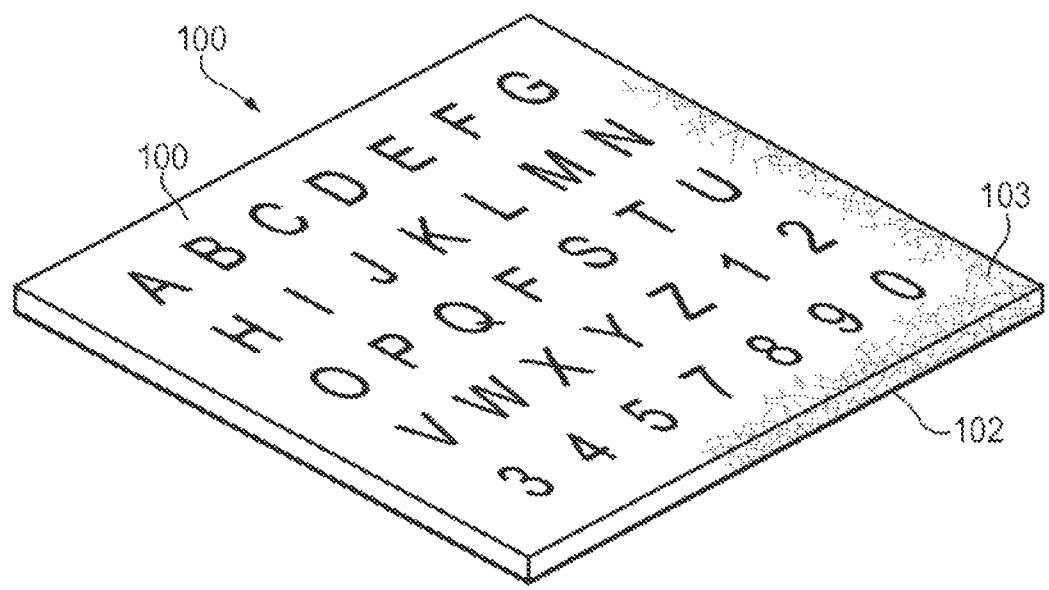
Figure 44D:
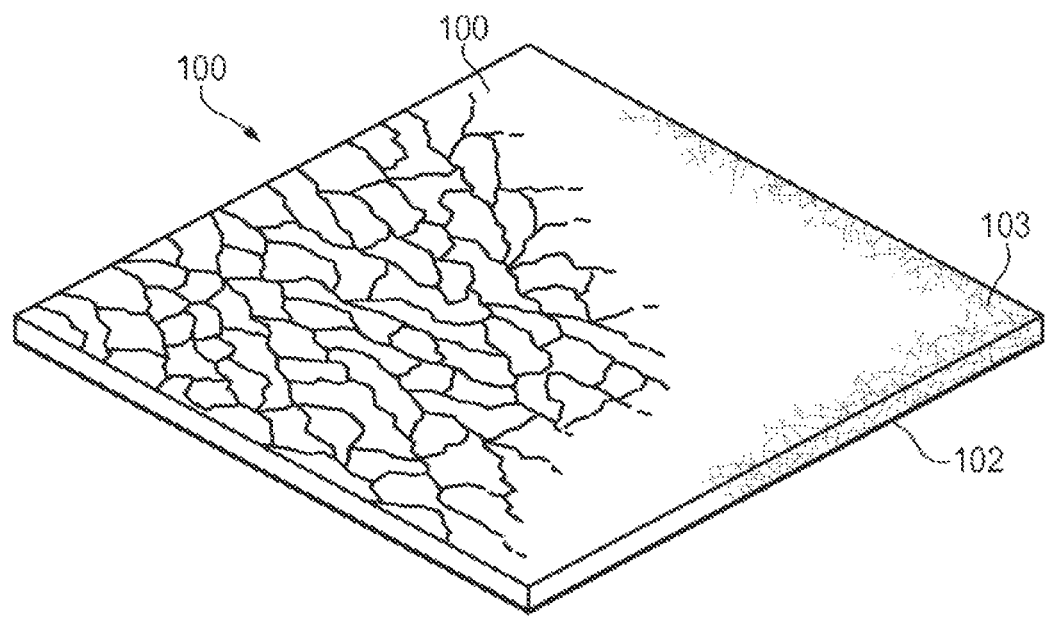

In addition to forming non-woven textile 100 to have three-dimensional aspects, a texture may be imparted to one or both of surfaces 101 and 102. Referring to FIG. 44A, non-woven textile 100 has a configuration wherein first surface 101 is textured to include a plurality of wave-like features. Another configuration is depicted in FIG. 44B, wherein first surface 101 is textured to include a plurality of x-shaped features. Textures may also be utilized to convey information, as in the series of alpha-numeric characters that are formed in first surface 101 in FIG. 44C. Additionally, textures may be utilized to impart the appearance of other materials, such as the synthetic leather texture in FIG. 44D.

Figure 45A:
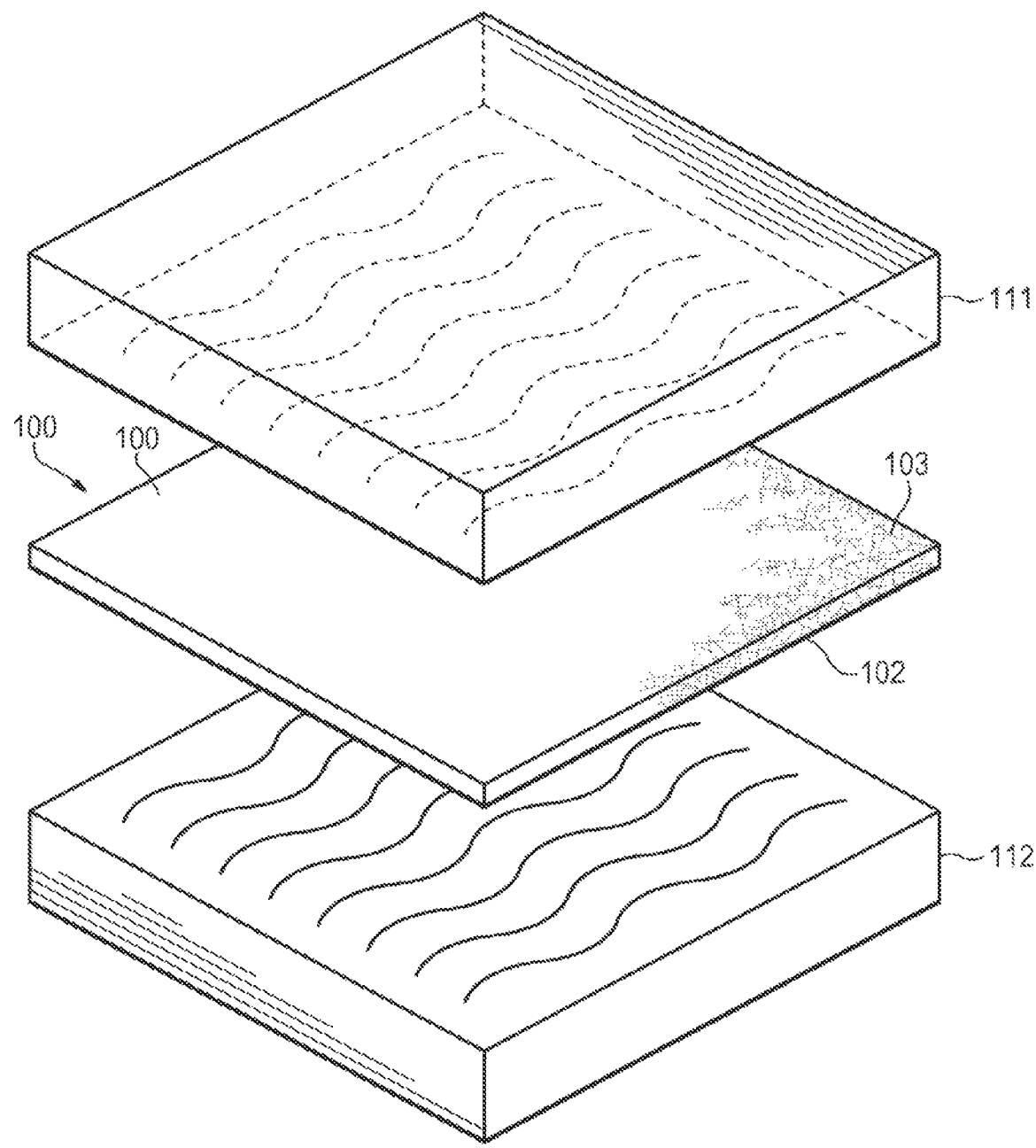
FIGS. 45A-45C are perspective views of a process for forming the textured configurations of the non-woven textile.
Figure 45B:
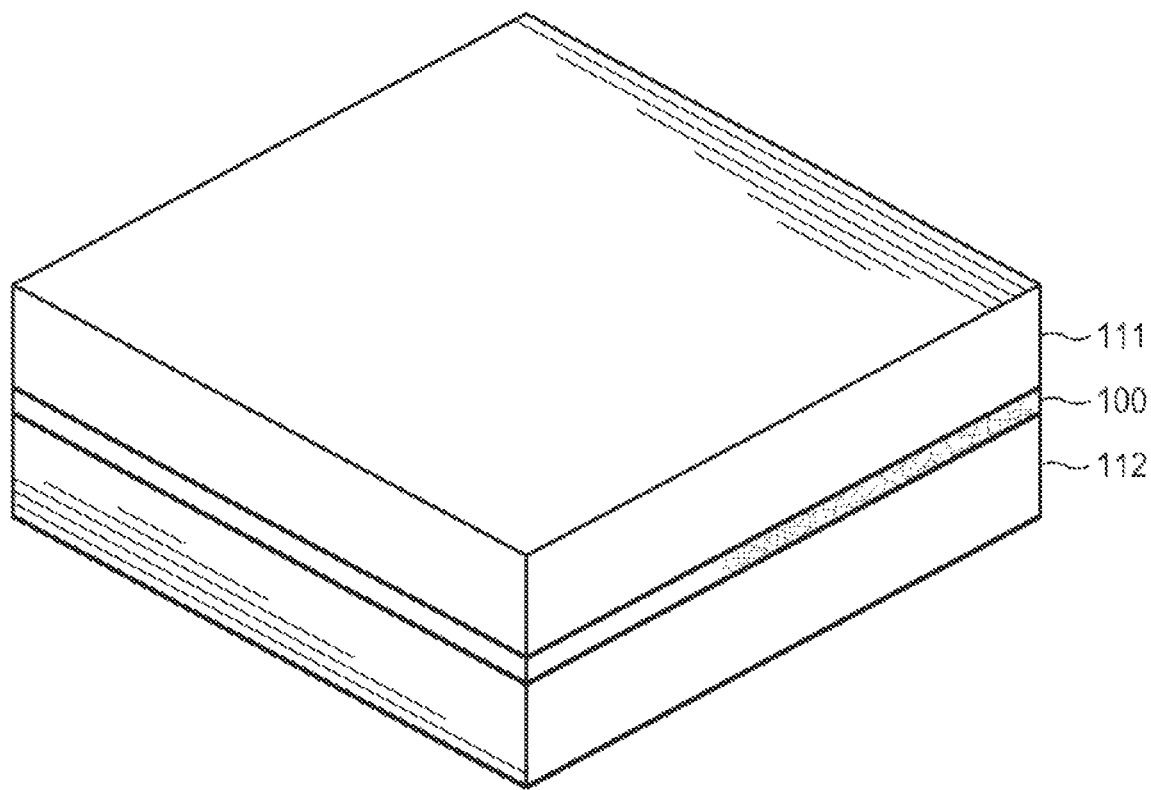
Figure 45C:
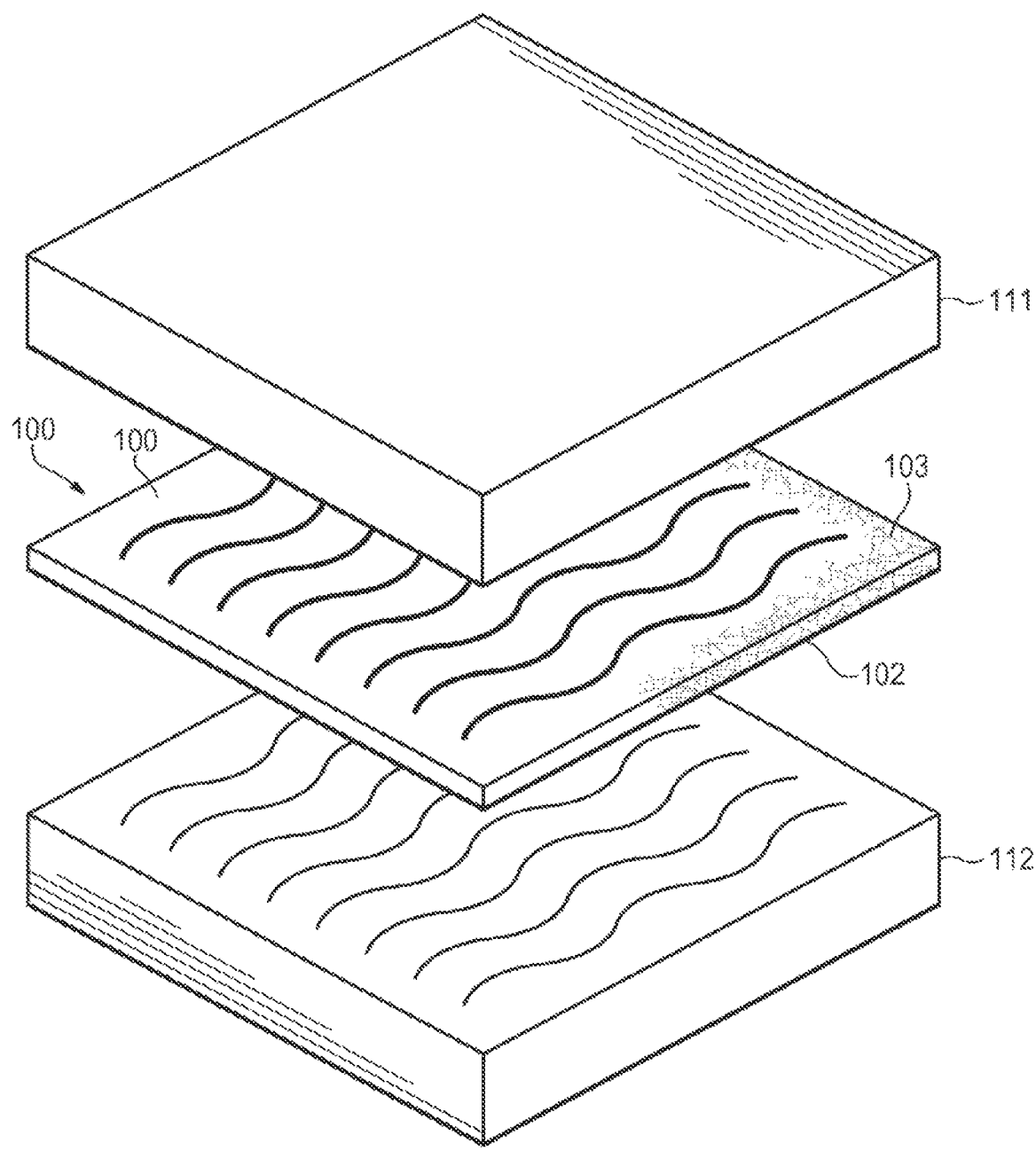

A variety of processes may be utilized to impart a texture to non-woven textile 100. Referring to FIGS. 45A-45C, an example of a method is depicted as involving first plate 111 and second plate 112, which each have textured surfaces. Initially, non-woven textile 100 is located between plates 111 and 112, as depicted in FIG. 45A. Plates 111 and 112 then translate or otherwise move toward each other in order to contact and compress non-woven textile 100, as depicted in FIG. 45B. In order to impart the textured configuration in non-woven textile 100, heat from one or both of plates 111 and 112 is applied to non-woven textile 100 so as to soften or melt the thermoplastic polymer material within filaments 103. Upon separating plates 111 and 112, as depicted in FIG. 45C, non-woven textile 100 exhibits the texture from the surfaces of plates 111 and 112. Although heat may be applied through conduction, radio frequency or radiant heating may also be used. As another example of a process that may be utilized to form textured surfaces in non-woven textile 100, a textured release paper may be placed adjacent to non-woven textile 100. Upon compressing and heating, the texture from the release paper may be transferred to non-woven textile 100.

Depending upon the type of polymer material utilized for non-woven textile 100, a variety of coloring processes may be utilized to impart color to non-woven textile 100. Digital printing, for example, may be utilized to deposit dye or a colorant onto either if surfaces 101 and 102 to form indicia, graphics, logos, or other aesthetic features. Instructions, size identifiers, or other information may also be printed onto non-woven textile 100. Moreover, coloring processes may be utilized before or after non-woven textile 100 is incorporated into a product. Other coloring processes, including screen printing and laser printing, may be used to impart colors or change the overall color of portions of non-woven textile 100.

Based upon the above discussion, three-dimensional, textured, and colored configurations of non-woven textile 100 may be formed. When incorporated into products (e.g., shirt 200, pants 300, footwear 400), these features may provide both structural and aesthetic enhancements to the products. For example, the three-dimensional configurations may provide enhanced impact force attenuation and greater permeability by increasing surface area. Texturing may increase slip-resistance, as well as providing a range of aesthetic possibilities. Moreover, coloring non-woven textile 100 may be utilized to convey information and increase the visibility of the products.

XIII—Stitch Configurations

Stitching may be utilized to join an element of non-woven textile 100 to other elements of non-woven textile 100, other textiles, or a variety of other materials. As discussed above, stitching may be utilized alone, or in combination with heatbonding or adhesives to join non-woven textile 100.

Figure 46A:
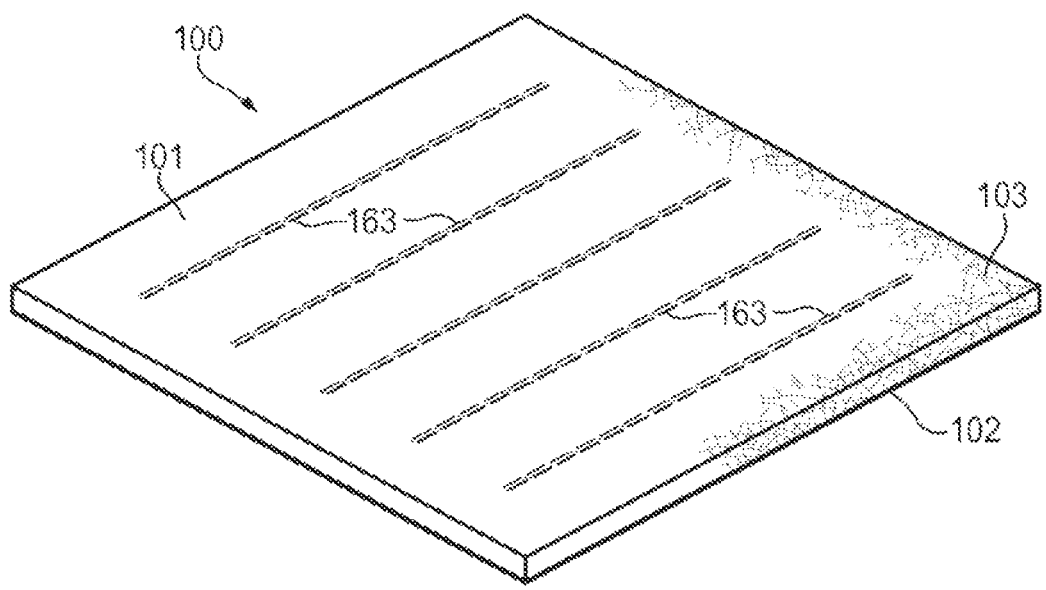
FIGS. 46A-46F are perspective views of stitched configurations of the non-woven textile.

Additionally, stitching, embroidery, or stitchbonding may be used to form a composite element and provide structural or aesthetic elements to non-woven textile 100. Referring to FIG. 46A, a thread 163 is stitched into non-woven textile 100 to form a plurality of parallel lines that extend across non-woven textile 100. Whereas strands 160 extend in a direction that is substantially parallel to either of surfaces 101 and 102, thread 163 repeatedly extends between surfaces 101 and 102 (i.e., through non-wove textile 100) to form a stitched configuration. Like strand 160, however, thread 163 may impart stretch-resistance and enhance the overall strength of non-woven textile 100. Thread 163 may also enhance the overall aesthetics of non-woven textile 100. When incorporated into products having non-woven textile 100 (e.g., shirt 200, pants 300, footwear 400), thread 163 may provide both structural and aesthetic enhancements to the products.

Figure 46B:
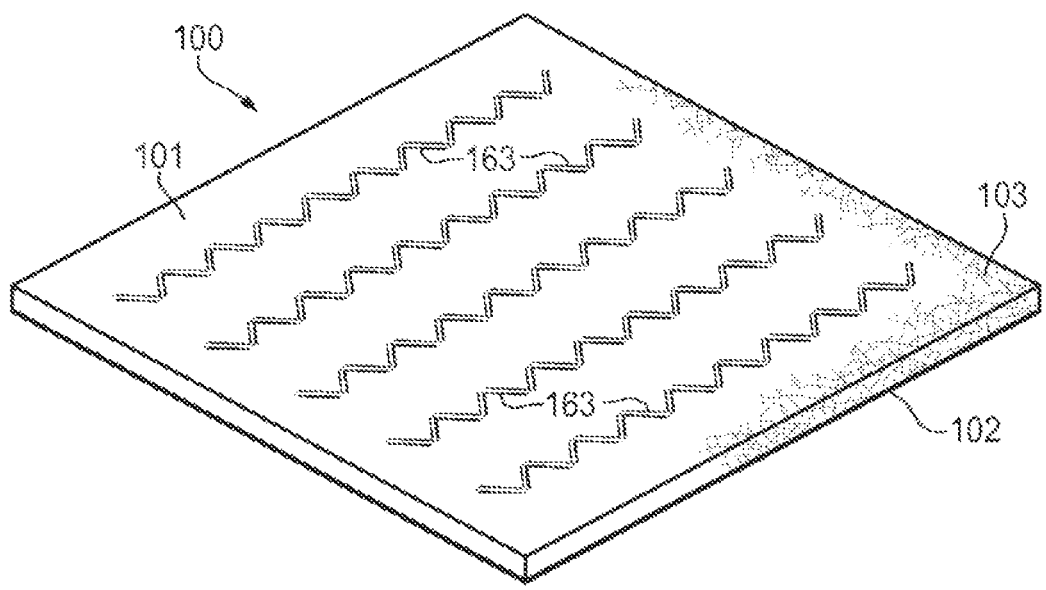
Figure 46C:
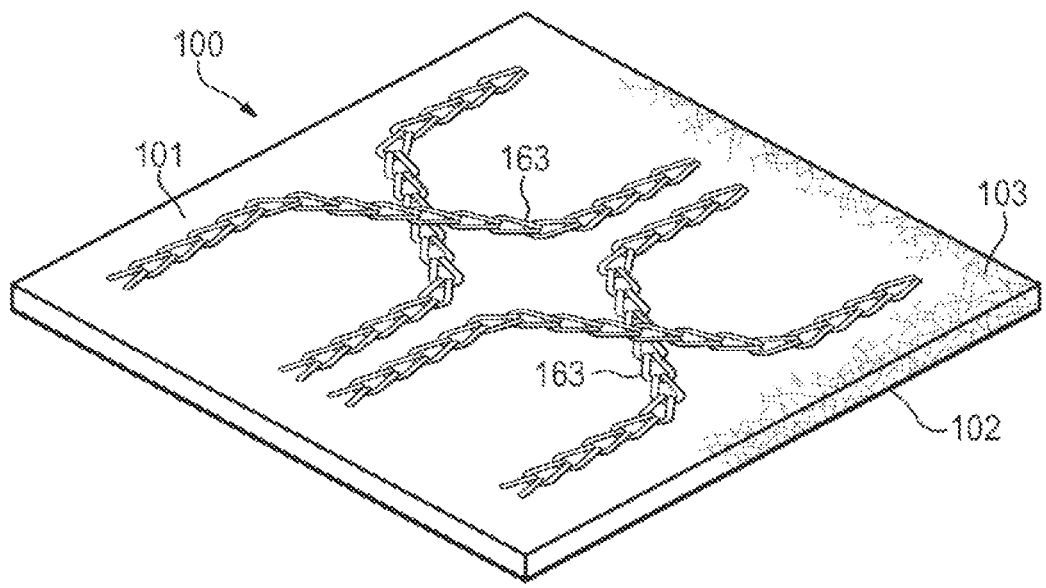
Figure 46D:
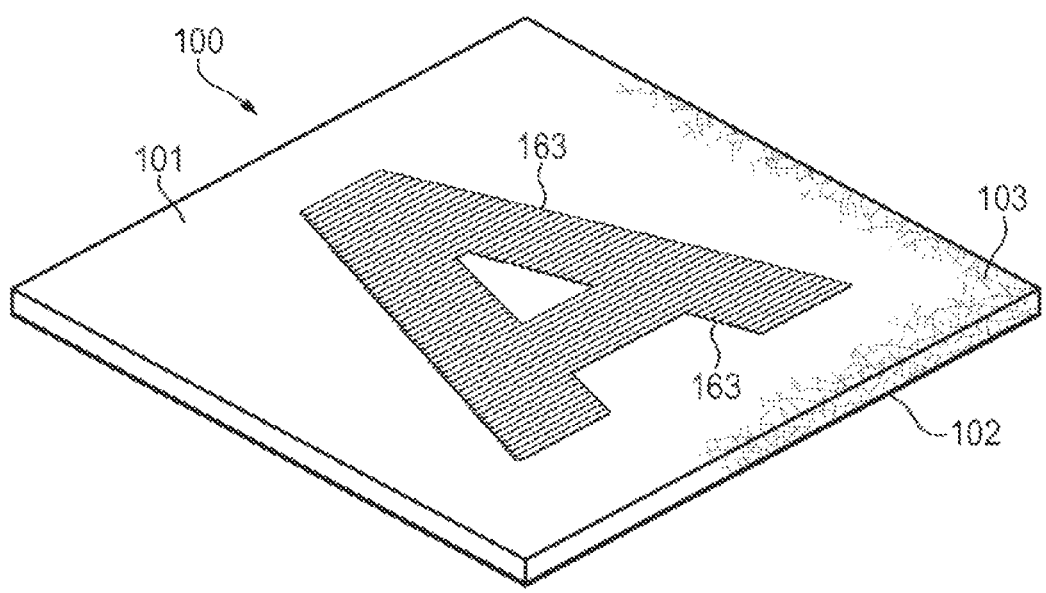
Figure 46E:
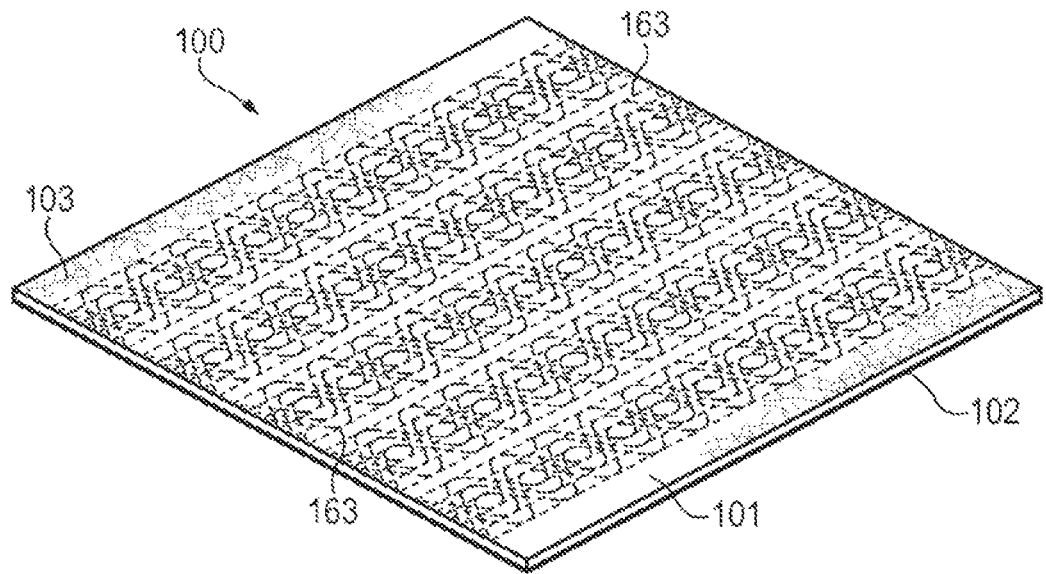
Figure 46F:
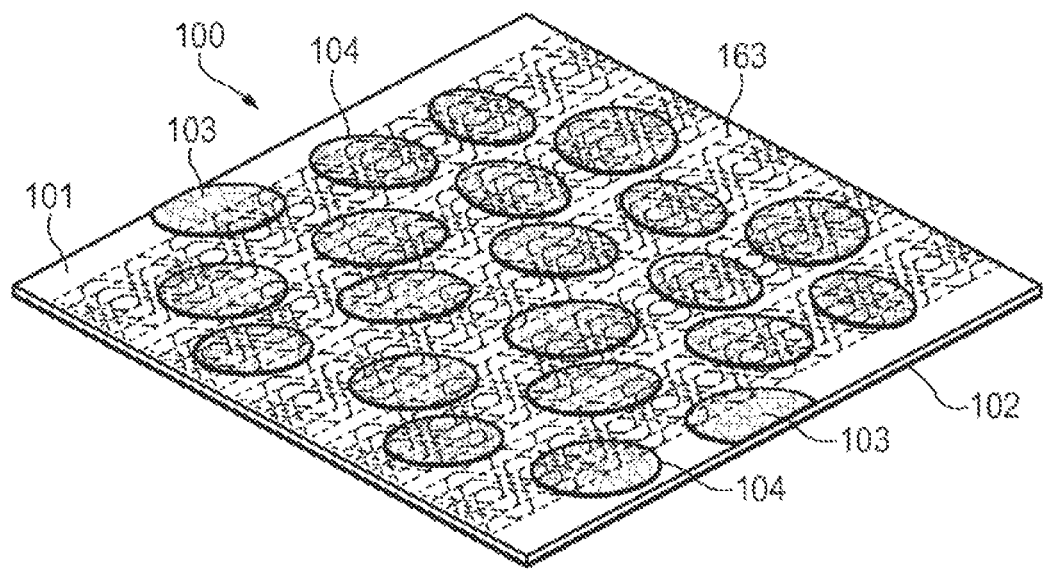

Thread 163 may be stitched to provide a variety of stitch configurations. As an example, thread 163 has the configuration of a zigzag stitch in FIG. 46B and the configuration of a chain stitch in FIG. 46C. Whereas thread 163 forms generally parallel lines of stitches in FIGS. 46A and 46B, the stitches formed by thread 163 are non-parallel and cross each other in FIG. 46C. Thread 163 may also be embroidered to form various configurations, as depicted in FIG. 46D. Stitching may also be utilized to form more complicated configurations with thread 163, as depicted in FIG. 46E. Non-woven textile 100 may also include various fused regions 104, with the stitches formed by thread 163 extending through both fused and non-fused areas of non-woven textile 100, as depicted in FIG. 46F. Accordingly, thread 163 may be utilized to form a variety of stitch types that may impart stretch-resistance, enhance strength, or enhance the overall aesthetics of non-woven textile 100. Moreover, fused regions 104 may also be formed in non-woven textile 100 to modify other properties.

XIV—Adhesive Tape

Figure 47:
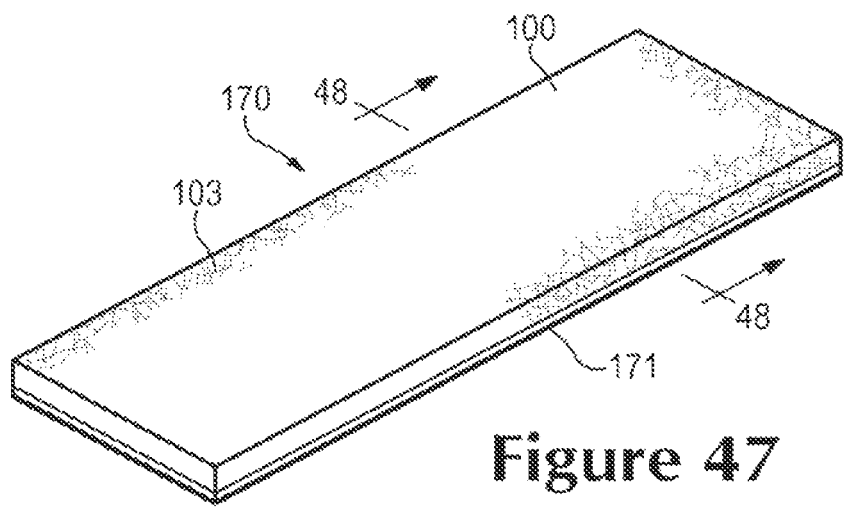
FIG. 47 is a perspective view of an element of tape that includes the non-woven textile.
Figure 48:
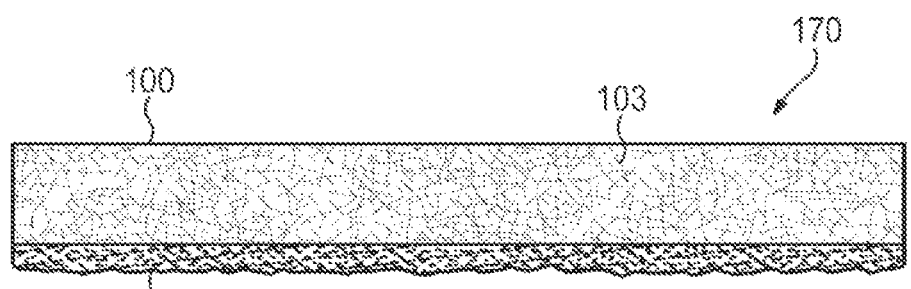
FIG. 48 is a cross-sectional view of the tape, as defined by section line 48-48 in FIG. 47.

An element of tape 170 is depicted in FIGS. 47 and 48 as having the configuration of a composite elements that includes non-woven textile 100 and an adhesive layer 171. Tape 170 may be utilized for a variety of purposes, including as packing tape, as painting tape, or as medical or therapeutic tape. An advantage to utilizing tape 170 as medical or therapeutic tape, for example, is that the permeability and stretch-resistance, among other properties, may be controlled. With regard to permeability, when tape 170 to be adhered to the skin of an individual (i.e., with adhesive layer 171), air and water may pass through tape 170 to impart breathability and allow the underlying skin to be washed or otherwise cleansed. Tape 170 may also resist stretch when adhered to the skin of the individual to provide support for surrounding soft tissue. Examples of suitable materials for adhesive layer 171 include any of the conventional adhesives utilized in tape-type products, including medical-grade acrylic adhesive.

Figure 49A:
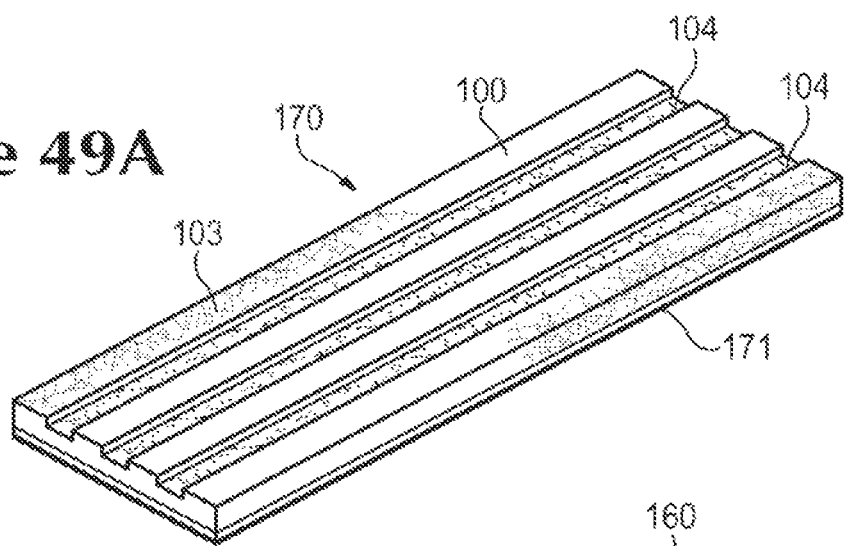
FIGS. 49A-49C are perspective views of additional configurations of the element of tape.
Figure 49B:
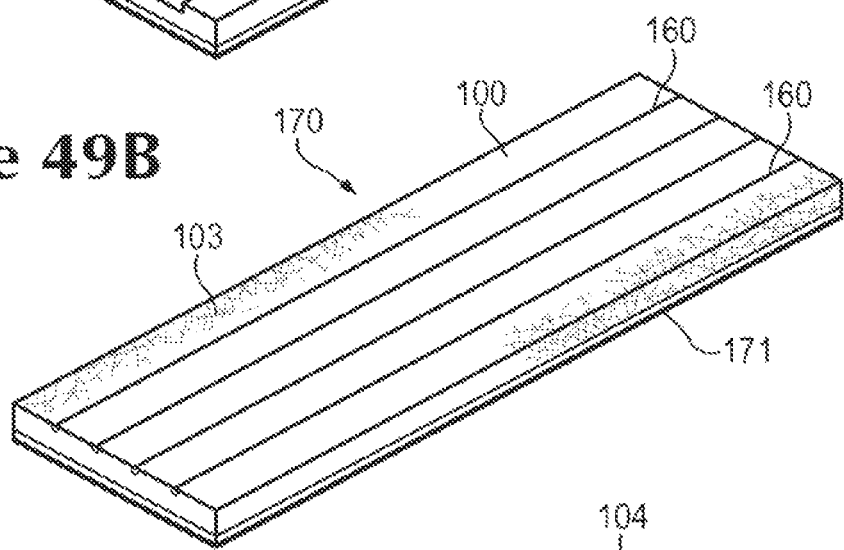
Figure 49C:
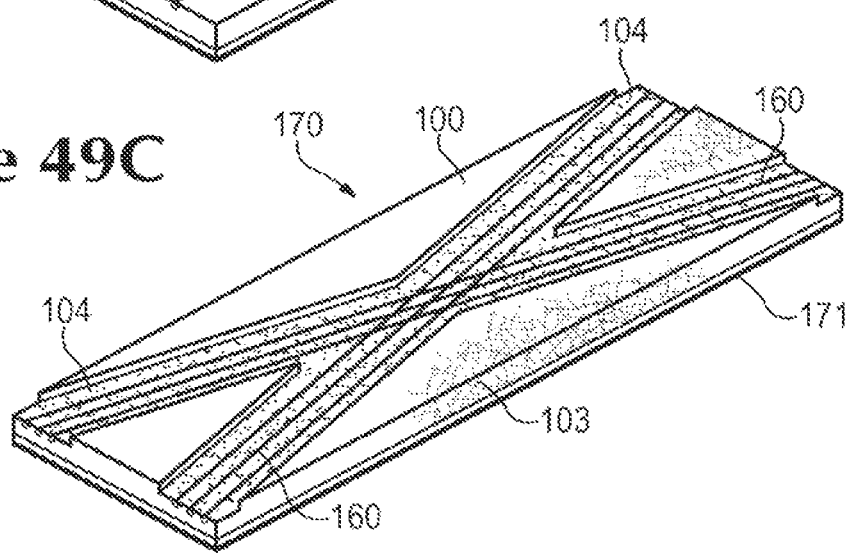

A variety of structures that be utilized to impart specific degrees of stretch-resistance to tape 170. As an example, the stretch-resistance to tape 170 may be controlled though the thickness of non-woven textile 100 or the materials forming filaments 103 in non-woven textile 100. Referring to FIG. 49A, fused regions 104 may also be formed in tape 170 to control stretch-resistance. Strands 160 may also be incorporated into tape 170 to impart a higher level of stretch-resistance, as depicted in FIG. 49B. Additionally, some configurations of tape 170 may include both fused regions 104 and strands 160, as depicted in FIG. 49C.

XV—Recycling the Non-Woven Textile

Filaments 103 of non-woven textile 100 include a thermoplastic polymer material. In some configurations of non-woven textile 100, a majority or substantially all of filaments 103 are formed from the thermoplastic polymer material. Given that many configurations of shirt 200 and pants 300 are primarily formed from non-woven textile 100, then a majority or substantially all of shirt 200 and pants 300 are formed from the thermoplastic polymer material. Similarly, a relatively large percentage of footwear 400 may also be formed from thermoplastic polymer materials. Unlike many articles of apparel, the materials of shirt 200, pants 300, and footwear 400 may be recycled following their useful lives.

Figure 50:
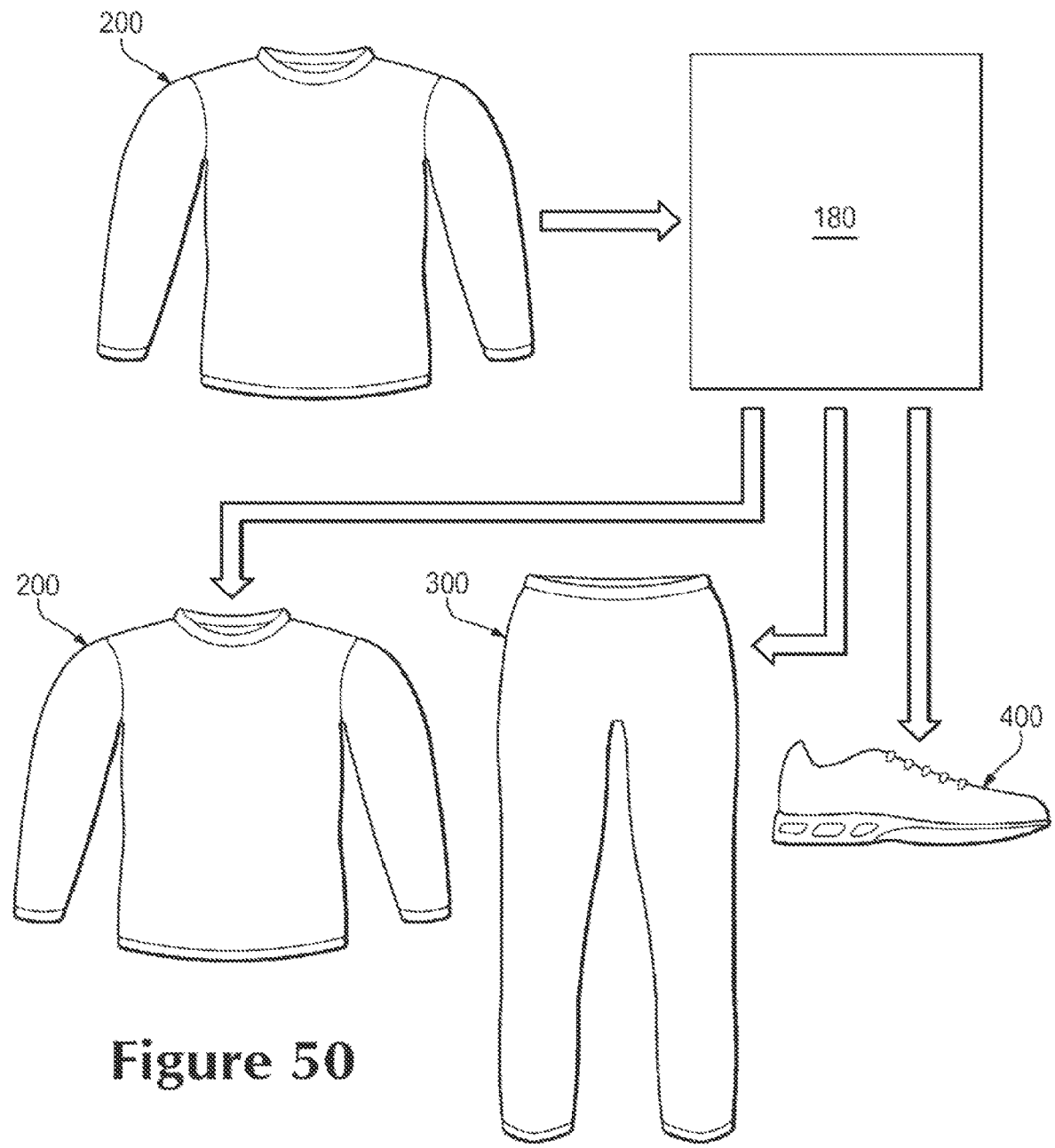
FIG. 50 is a schematic view of a recycling process.

Utilizing shirt 200 as an example, the thermoplastic polymer material from shirt 200 may be extracted, recycled, and incorporated into another product (e.g., apparel, container, upholstery) as a non-woven textile, a polymer foam, or a polymer sheet. This process is generally shown in FIG. 50, in which shirt 200 is recycled in a recycling center 180, and thermoplastic polymer material from shirt 200 is incorporated into one or more of another shirt 200, pants 300, or footwear 400. Moreover, given that a majority or substantially all of shirt 200 is formed from the thermoplastic polymer material, then a majority or substantially all of the thermoplastic polymer material may be utilized in another product following recycling. Although the thermoplastic polymer material from shirt 200 was initially utilized within non-woven textile 100, for example, the thermoplastic polymer material from shirt 200 may be subsequently utilized in another element of non-woven textile 100, another textile that includes a thermoplastic polymer material, a polymer foam, or a polymer sheet. Pants 300, footwear 400, and other products incorporating non-woven textile 100 may be recycled through a similar process. Accordingly, an advantage of forming shirt 200, pants 300, footwear 400, or other products with the various configurations discussed above relates to recyclability.

XVI—Conclusion

Non-woven textile 100 includes a plurality of filaments 103 that are at least partially formed from a thermoplastic polymer material. Various fused regions 104 may be formed in non-woven textile 100 to modify properties that include permeability, durability, and stretch-resistance. Various components (textiles, polymer sheets, foam layers, strands) may also be secured to or combined with non-woven textile 100 (e.g., through heatbonding) to impart additional properties or advantages to non-woven textile 100. Moreover, fused regions 104 and the components may be combined to impart various configurations to non-woven textile 100.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed:

1. An article of footwear, comprising:
an upper comprising a textile that defines at least a top area, a rear area, and a lateral area of the upper, wherein the textile includes a plurality of filaments, wherein the textile comprises:
(i) a first fused region forming a heel counter at the rear area;
(ii) a second fused region at the lateral area;
(iii) a plurality of lace apertures formed adjacent to the lateral area; and
(iv) a tongue positioned adjacent to the top area;
a sole structure extending between an upper surface and a lower surface, the sole structure comprising a foam, the upper surface of the sole structure being thermally coupled to the upper;
an outsole coupled to the lower surface of the sole structure on an opposite side of the sole structure relative to the upper;
a plurality of apertures at least partially formed in the sole structure;
and a lace coupled to the upper at the textile and received through the plurality of lace apertures;
wherein each of the plurality of filaments of the textile, the foam of the sole structure, the outsole, and the lace comprises a thermoplastic polymer material such that substantially all of the article of footwear comprises the thermoplastic polymer material, wherein the thermoplastic polymer material comprises a thermoplastic polyamide, and at least a portion of the thermoplastic polyamide comprises a material extracted or recycled from another article of footwear;
and wherein the plurality of filaments positioned at the first fused region and the second fused region are fused together to form non-filamentous portions along the upper, and the textile has a smaller thickness at the first fused region and/or the second fused region relative to remaining regions of the textile.

2. The article of footwear of claim 1, wherein the non-filamentous portions are configured to increase a stretch-resistance of the textile at the first fused region and the second fused region relative to remaining regions of the textile.

3. The article of footwear of claim 1, wherein the non-filamentous portions are configured to increase a durability of the textile at the first fused region and the second fused region relative to remaining regions of the textile.

4. The article of footwear of claim 1, wherein the non-filamentous portions are configured to decrease a permeability of the textile at the first fused region and the second fused region relative to remaining regions of the textile.

5. The article of footwear of claim 1, wherein the thermoplastic polyamide constitutes at least ninety-five percent of the article of footwear.

6. An article of footwear, comprising:
an upper comprising a textile including a plurality of filaments that compositionally comprise a thermoplastic polymer material;
wherein the textile comprises:
a first set of fused regions positioned along a rear area of the upper, the first set of fused regions forms a heel counter at the rear area that enhances a stretch-resistance of the upper at the rear area; and
a second set of fused regions positioned along a side area of the upper, the upper at the second set of fused regions has a smaller thickness than adjacent regions at the side area;
a sole structure comprising a foam element that comprises the thermoplastic polymer material, the sole structure is thermally coupled to the upper; and
an outsole coupled to the sole structure on an opposing side from the upper, the outsole comprises the thermoplastic polymer material;
wherein the thermoplastic polymer material comprises a thermoplastic polyamide such that at least ninety percent of the article of footwear by weight comprises the thermoplastic polyamide.

7. The article of footwear of claim 6, wherein the article of footwear by weight that comprises the thermoplastic polyamide equals at least ninety-five percent.

8. The article of footwear of claim 6, further comprising a lace coupled to the upper through a plurality of apertures formed through the textile, wherein the lace comprises the thermoplastic polymer material.

9. The article of footwear of claim 6, the textile further comprising a third set of fused regions positioned along a forefoot area of the upper, wherein the third fused region is configured to increase a durability of the textile at the forefoot area and resist abrasion of the textile during use of the article of footwear.

10. The article of footwear of claim 9, the textile further comprising a fourth set of fused regions positioned around an ankle opening of the upper, the fourth set of fused regions is configured to increase a stretch-resistance of the textile and securely retain a foot received within the article of footwear through the ankle opening.

11. The article of footwear of claim 6, wherein at least a portion of the thermoplastic polyamide comprises a material extracted or recycled from a mixture of another article of footwear and a shirt.

12. The article of footwear of claim 6, further comprising a plurality of apertures formed through a surface of the sole structure.

13. The article of footwear of claim 6, wherein the plurality of filaments positioned at the first fused region and the second fused region are fused together to form non-filamentous portions along the upper.

14. An article of footwear, comprising:
an upper defined by a textile that comprises a plurality of filaments formed of a first thermoplastic polymer material, wherein the textile comprises a first set of fused regions positioned at a rear of the upper and a second set of fused regions positioned at a side of the upper, the textile has a smaller thickness at the first set of fused regions and/or the second set of fused regions relative to remaining regions of the textile;
a sole structure defined by a foam layer that is formed of a second thermoplastic polymer material, the sole structure is coupled to the upper without an adhesive or stitching positioned between the sole structure and the upper;
an outsole coupled to the sole structure opposite from the upper, wherein the outsole is formed of a third thermoplastic polymer material; and
a lace formed of a fourth thermoplastic polymer material, wherein the lace is coupled to the upper and extends at least partially through the textile;
wherein the first thermoplastic polymer material, the second thermoplastic polymer material, the third thermoplastic polymer material, and the fourth thermoplastic polymer material comprise a single material, and a percentage of a combined mass of the upper, the sole structure, the outsole, and the lace that are formed of the single material equals at least ninety percent.

15. The article of footwear of claim 14, wherein the first set of fused regions comprises a heel counter configured to increase a stretch-resistance of the textile.

16. The article of footwear of claim 15, wherein the heel counter is configured to inhibit movement of a foot received within the article of footwear relative to the upper, the sole structure, and the outsole during use of the article of footwear.

17. The article of footwear of claim 14, wherein the first set of fused regions comprises one or more strands extending along the upper from the rear towards the side.

18. The article of footwear of claim 17, wherein the one or more strands are configured to increase a tensile strength of the textile and transfer tensile forces applied to at least one of the rear or the side to the other.

19. The article of footwear of claim 18, wherein the one or more strands are embedded or thermally bonded to the textile, and at least partially define a heel counter of the upper.

20. The article of footwear of claim 14, wherein a transparency or a color of the textile on at least one of the first set of fused regions and the second set of fused regions varies relative to one or more remaining regions of the upper.

* * * * *